United States Patent
Green et al.

(10) Patent No.: US 11,326,798 B2
(45) Date of Patent: May 10, 2022

(54) REFRIGERANT LEAK DETECTION AND MITIGATION SYSTEM AND METHOD

(71) Applicants: Kenneth Ray Green, Crossroads, TX (US); Douglas Hiram Morse, Decatur, TX (US)

(72) Inventors: Kenneth Ray Green, Crossroads, TX (US); Douglas Hiram Morse, Decatur, TX (US)

(*) Notice: Subject to any disclaimer, the term of this patent is extended or adjusted under 35 U.S.C. 154(b) by 90 days.

(21) Appl. No.: 16/855,238

(22) Filed: Apr. 22, 2020

(65) Prior Publication Data

US 2020/0248919 A1  Aug. 6, 2020

Related U.S. Application Data

(63) Continuation-in-part of application No. 16/747,422, filed on Jan. 20, 2020, and a continuation-in-part of
(Continued)

(51) Int. Cl.
| | |
|---|---|
| *F24F 11/36* | (2018.01) |
| *F24F 11/84* | (2018.01) |
| *G05B 23/02* | (2006.01) |
| *F24F 11/526* | (2018.01) |
| *F24F 11/58* | (2018.01) |
| *F24F 110/65* | (2018.01) |
| *F24F 110/10* | (2018.01) |

(Continued)

(52) U.S. Cl.
CPC ............ *F24F 11/36* (2018.01); *F24F 11/526* (2018.01); *F24F 11/58* (2018.01); *F24F 11/84* (2018.01); *G05B 23/027* (2013.01); *F24F 11/52* (2018.01); *F24F 2110/10* (2018.01); *F24F 2110/20* (2018.01); *F24F 2110/65* (2018.01); *F25B 2500/22* (2013.01); *F25B 2500/222* (2013.01)

(58) Field of Classification Search
CPC ............ F25B 2500/22; F25B 2500/221; F25B 2500/222; G05B 23/0267; G05B 23/027
See application file for complete search history.

(56) References Cited

U.S. PATENT DOCUMENTS

| | | | |
|---|---|---|---|
| 9,638,436 B2* | 5/2017 | Arensmeier | G05B 15/02 |
| 10,060,642 B2* | 8/2018 | Sikora | F24F 11/30 |
| 2014/0123685 A1* | 5/2014 | Kim | F25B 41/20 |
| | | | 62/56 |

* cited by examiner

*Primary Examiner* — Jerry-Daryl Fletcher
*Assistant Examiner* — Daniel C Comings
(74) *Attorney, Agent, or Firm* — Kevin Mark Klughart

(57) ABSTRACT

A refrigerant leak detection and mitigation system/method for use in heating, ventilation, and air conditioning (HVAC) systems that incorporates a refrigerant gas sensor (RGS), sensor signal conditioner (SSC), alarm status indicator (ASI), and digital control processor (DCP) is disclosed. The RGS detects ambient refrigerant gas (ARG) and indicates this as a refrigerant sensor voltage (RSV) to the SSC. The DCP and SSC form a closed control loop (CCL) in which the SSC electrical characteristics are adjusted by the DCP such that the RSV is continuously and dynamically recalibrated to account for background refrigerant gas levels, changes in ambient air conditions, RGS manufacturing tolerances, and other field-specific operational conditions that impact the RGS detection capabilities. The DCP is configured to log alarms to the ASI if a RGS refrigerant leak is detected and optionally shutdown one or more HVAC system components such as a specific air handler leaking refrigerant.

32 Claims, 128 Drawing Sheets

Related U.S. Application Data application No. 16/580,717, filed on Sep. 24, 2019, now abandoned, and a continuation-in-part of application No. 15/902,452, filed on Feb. 22, 2018, now abandoned.

(60) Provisional application No. 62/938,132, filed on Nov. 20, 2019, provisional application No. 62/886,020, filed on Aug. 13, 2019, provisional application No. 62/854,676, filed on May 30, 2019, provisional application No. 62/750,383, filed on Oct. 25, 2018, provisional application No. 62/462,570, filed on Feb. 23, 2017.

(51) Int. Cl.
*F24F 110/20* (2018.01)
*F24F 11/52* (2018.01)

FIG. 27

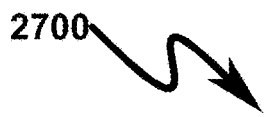

| Model | | WSP5110 |
|---|---|---|
| Sensor Type | | Semiconductor flat surfaced sensor |
| Standard Encapsulation | | Metal Cap |
| Detection Gas | | Refrigerant, benzene, alcohol &etc. |
| Detection range | | 10~1000ppm |
| Standard circuit | Loop voltage $V_C$ | ≤24V DC |
| | Heating voltage $V_H$ | 5.0V±0.1V AC or DC |
| | Load resistance $R_L$ | Adjustable |
| sensor features in standard test condition | Heating resistance $R_H$ | 90Ω±10Ω (Room Temperature) |
| | Heating consumption $P_H$ | ≤300mW |
| | Surface resistance $R_S$ | 30KΩ~200KΩ (in 100ppm Refrigerant) |
| | Sensitivity S | Rs(in air)/Rs(in 100ppm Refrigerant)≥3 |
| | Concentration slope α | ≤0.65($R_{200ppm}/R_{50ppm}$ refrigerant) |
| Standard condition of test | Temperature, humidity | 20°C±2°C; 65%±5%RH |
| | Standard test circuit | Vc:5.0V±0.1V; $V_H$:5.0V±0.1V |
| | Warm-up time | Not less than 120 hours |

REFRIGERANT LEAK DETECTION AND MITIGATION SYSTEM AND METHOD

CROSS REFERENCE TO RELATED APPLICATIONS

Continuation-in-Part Patent Application (CIP)

This is a continuation-in-part (CIP) patent application of and incorporates by reference United States Utility Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

This is a continuation-in-part (CIP) patent application of and incorporates by reference United States Utility Patent Application for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370.

This is a continuation-in-part (CIP) patent application of and incorporates by reference United States Utility Patent Application for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

PCT Patent Applications

This patent application claims benefit under 35 U.S.C. § 120 and incorporates by reference PCT Patent Application for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with serial number PCT/US2018/019161.

Utility Patent Applications

This patent application claims benefit under 35 U.S.C. § 120 and incorporates by reference United States Utility Patent Applications for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253.

This patent application claims benefit under 35 U.S.C. § 120 and incorporates by reference United States Utility Patent Applications for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370.

This patent application claims benefit under 35 U.S.C. § 120 and incorporates by reference United States Utility Patent Applications for REFRIGERANT METERING SYSTEM AND METHOD by inventor Kenneth R. Green, filed electronically with the USPTO on 20 Jan. 2020, with Ser. No. 16/747,422, EFSID 38342840, confirmation number 1232.

Provisional Patent Applications

This patent application claims benefit under 35 U.S.C. § 119 and incorporates by reference United States Provisional Patent Application for LEAK CONTAINMENT SYSTEMS by inventors Kenneth R. Green, et al., filed electronically with the USPTO on 20 Nov. 2019, with Ser. No. 62/938,132, EFS ID 37810820, confirmation number 6339 .

This patent application claims benefit under 35 U.S.C. § 119 and incorporates by reference United States Provisional Patent Application for LEAK DETECTION TROUBLESHOOTER by inventors Kenneth R. Green, et al., filed electronically with the USPTO on 13 Aug. 2019, with Ser. No. 62/886,020, EFS ID 36861132, confirmation number 1376.

This patent application claims benefit under 35 U.S.C. § 119 and incorporates by reference United States Provisional Patent Application for AC BOX ENGINEERING, DESIGNS, AND DEVICES by inventors Kenneth R. Green, et al., filed electronically with the USPTO on 30 May 2019, with Ser. No. 62/854,676, EFS ID 36158820, confirmation number 6929.

United States Utility Patent Applications for DISTRIBUTED RESIDENTIAL CLIMATE-CONTROL SYSTEMS AND METHODS WITH DISTRIBUTED PROTECTION AGAINST REFRIGERANT LOSS by inventors Kenneth R. Green, et al., filed electronically with the USPTO on 24 Sep. 2019, with Ser. No. 16/580,717, EFS ID 37259582, confirmation number 6370, claims benefit under 35 U.S.C. § 119 and incorporates by reference United States Provisional Patent Application for DISTRIBUTED RESIDENTIAL CLIMATE-CONTROL SYSTEMS AND METHODS WITH REFRIGERANT MANAGEMENT by inventors Kenneth R. Green, et al., filed electronically with the USPTO on 25 Oct. 2018, with Ser. No. 62/750,383, EFS ID 34113773, confirmation number 1062.

United States Utility Patent Applications for DISTRIBUTED CLIMATE-CONTROL SYSTEMS AND METHODS WITH DISTRIBUTED PROTECTION AGAINST REFRIGERANT LOSS by applicant Laura D. Green, inventors Kenneth R. Green, et al., filed electronically with the USPTO on 22 Feb. 2018, with Ser. No. 15/902,452, EFS ID 31861708, confirmation number 1253, claims benefit under 35 U.S.C. § 119 and incorporates by reference United States Provisional Patent Application for REFRIGERANT LEAK CONTAINMENT SYSTEM by inventor Kenneth R. Green, filed electronically with the USPTO on 23 Feb. 2017, with Ser. No. 62/462,570, confirmation number 1047 .

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention relates to heating, ventilation, and air conditioning (HVAC) systems, and specifically the detection and mitigation of refrigerant leaks within these HVAC systems. Without limitation, the present invention may have application in situations where a refrigerant leak must be detected or mitigated in a Variable Refrigerant Flow (VRF) climate control heating, ventilation, and air conditioning (HVAC) system. In these situations the HVAC system may service multiple air handler units and as such a refrigerant leak in any one of the related evaporator coil(s) and/or condenser coil(s) can result in a significant disruption of HVAC service to the facility. The present invention in these circumstances is designed to detect the cause of the refrigerant leak and provide an indication of the failing refrigerant coil within the multiple refrigerant paths within the HVAC system and optionally mitigate the refrigerant leak by isolating a failing refrigerant coil within the system and allow the HVAC system to continue functioning in a fallback operational mode.

BACKGROUND AND PRIOR ART

Regulatory Background

The Clean Air Act (CAA) (42 U.S.C. § 7401 et seq.) is a comprehensive Federal law that regulates all sources of air emissions. The 1970 CAA authorized the U.S. Environmental Protection Agency (EPA) to establish National Ambient Air Quality Standards (NAAQS) to protect public health and the environment. Section 608 of the Clean Air Act prohibits the knowing release of refrigerant during the maintenance, service, repair, or disposal of air-conditioning and refrigeration equipment. The EPA requires proper refrigerant management practices by owners and operators of refrigeration and air-conditioning systems, technicians, and others.

In the fall of 2016, the EPA updated the existing requirements related to ozone depleting substances (ODS), such as CFCs and HCFCs, and extended them to substitutes such as HFCs. The updates include:

(1) More stringent requirements for repairing leaks in larger appliances;
(2) New recordkeeping for the disposal of appliances containing five to 50 pounds of refrigerant;
(3) New reporting requirement that kicks in when larger appliances leak 125% or more of their charge in a calendar year;
(4) Restricting the sale of HFC refrigerant to technicians certified under Sections 608 or 609 of the Clean Air Act; and
(5) Changes to improve readability and simplify compliance.

Regulation Application

The following regulatory requirements apply to supermarkets and property and facility managers as of Jan. 1, 2019:

Affected Appliances

The leak repair regulations apply to industrial process refrigeration (IPR), commercial refrigeration, and comfort cooling appliances containing 50 pounds or more of ODS or substitute refrigerant.

Leak Rate Calculations

Owners/operators must calculate the leak rate every time ODS or substitute refrigerant is added to an appliance (unless the addition is made immediately following a retrofit, installation of a new appliance, or qualifies as a seasonal variance).

Appliance Repairs

Owners/operators must identify and repair leaks that exceed 30% for IPR, 20% for commercial refrigeration, and 10% for comfort cooling within 30 days of when the ODS or substitute refrigerant is added. Leaks must be repaired such that the leak rate is brought below the applicable leak rate.

Owners/operators of all three appliance types must perform and document both an initial and follow-up verification test of leak repairs, for appliances that exceed the applicable leak rate. An initial verification test must be performed before any additional refrigerant is added to the appliance. A follow-up verification test must be performed only after the appliance has returned to normal operating characteristics and conditions. There is no minimum timeframe.

The verification tests must demonstrate that leaks were successfully repaired. If either the initial or follow-up verification test indicates that repairs were not successful, owners/operators may conduct as many additional repairs and verification tests as needed within the 30 day repair period.

Owners/operators of IPR, commercial refrigeration, and comfort cooling equipment may request limited extensions to the 30 day (120 days if an industrial process shutdown is required) repair deadline.

If owners/operators fail to bring the leak rate below the threshold leak rate, owners/operators must create and implement a retrofit or retirement plan.

Leak Inspections

Owners/operators must conduct leak inspections for appliances that have exceeded the applicable leak ate, according to the schedule in the schedule below. Leak inspections must be conducted by a certified technician. All visible and accessible components of an appliance must be inspected.

Quarterly or annual leak inspections are not required on appliances (or portions of appliances) that are continuously monitored by an automatic leak detection system that is audited and calibrated annually.

Commercial Refrigeration and Industrial Process Refrigeration

For full charge >500 pounds, the frequency of leak inspections is once every three months until the owner/operator can demonstrate through leak rate calculations that the leak rate has not exceeded 20% (commercial refrigeration) or 30% (IPR) for four quarters in a row.

For full charge 50 to 500 pounds, the frequency of leak inspections is once per calendar year until the owner/operator can demonstrate through the leak rate calculations that the leak rate has not exceeded 20% (commercial refrigeration) or 30% (IPR) for one year.

Comfort Cooling

For full charge 50 or more pounds, the frequency of leak inspections is once per calendar year until the owner/operator can demonstrate through the leak rate calculations that the leak rate has not exceeded 10% for one year.

Retrofit or Retirement Plans

Owners/operators must create a retrofit or retirement plan within 30 days$_3$ of an appliance leaking ODS or substitute refrigerant above the applicable leak rate if:
 (a) The owner/operator intends to retrofit or retire rather than repair the leak; or
 (b) The owner/operator fails to identify and repair the leak; or
 (c) The appliance continues to leak above the applicable leak rate after required repairs and verification tests.

Retrofit or retirement plans must contain: identification and location of the appliance; type and full charge of the refrigerant in use; type and full charge of alternative refrigerant (if retrofitting); itemized procedure for converting the appliance to a different refrigerant, including changes required for compatibility with the new refrigerant (if retrofitting); plan for disposition of recovered refrigerant; plan for disposition of the appliance (if retiring); and a schedule for completion within one year.

The retrofit or retirement must be completed within one year of the plan's date unless granted extra time.

Owners/operators must repair all identified leaks as part of any retrofit.

Owners/operators may request relief from the obligation to retrofit or retire an appliance if they can establish within 180 days of the plan's date that the appliance no longer exceeds the applicable leak rate and agrees in writing to repair all identified leaks within one year of the plan's date.

Chronically Leaking Appliances

Owners/operators must submit reports to the EPA if any appliance leaks 125% or more of its full charge in one calendar year. This report must describe efforts to identify leaks and repair the appliance.

Recordkeeping and Reporting Requirements

Owners/operators must maintain hard or electronic copies of:
 Records documenting the full charge of appliances.
 Records, such as invoices, showing when service or maintenance is performed, when refrigerant is added to an appliance (or removed, in the case of disposal), when a leak inspection is performed, and when a verification test is conducted.
 If using an automatic leak detection system, documentation that the system is installed and calibrated annually and records of when the monitoring system identifies a leak and the location of the leak.
 Retrofit and/or retirement plans.
 Requests submitted to the EPA to extend the repair or retrofit deadlines.
 If a system is mothballed to suspend a deadline, maintain records documenting when the system was mothballed and when it was brought back on-line (i.e., when refrigerant was added back into the appliance).
 Records to demonstrate a seasonal variance.
 Reports on appliances that leak 125% or more of the full charge in a calendar year.

Prior Art Application to Regulation Requirements

The prior art has yet to address the EPA regulatory requirements regarding refrigerant leak detection, mitigation, and the requirement for monitoring of refrigerant leaks and the associated recordkeeping requirements of these EPA regulations.

Application to Existing HVAC Systems

Conventional HVAC systems often experience failures of refrigerant coils within the refrigerant flow loop. This may take the form of condenser or evaporator coil failures. In either case the loss of refrigerant can cause system failure in multiple locations, especially if the system incorporates a single compressor/condenser and multiple evaporator coils, as might be configured in a commercial building or other similar structure.

Prior art mechanisms to detect and/or mitigate these failures have proven unsuccessful in discriminating true refrigerant leaks from ambient hydrocarbon emissions as might be experienced from the use of cleaning solvents and/or other cleaning materials that are typically used in a commercial building context. For this reason, a system that can detect and/or mitigate refrigerant leaks in a HVAC system and provide monitoring/logging of refrigerant leaks represents a long-felt need within the HVAC servicing industry, especially in light of recently enacted EPA regulatory requirements.

BRIEF SUMMARY OF THE INVENTION

The present invention pertains to a system and method wherein a HVAC system having a failing refrigerant coil (or other system component leaking refrigerant) may be quickly detected, isolated, and brought back to service. To accomplish this goal the present invention implements a system and method of refrigerant detection that is tolerant of background hydrocarbon emissions as well as dynamically adaptable to the changing characteristics of wide variety of refrigerant gas sensors (RGS). By dynamically calibrating the operation of the RGS and adjusting for background detected hydrocarbon levels using a closed control loop (CCL) operating between a digital control processor (DCP) and a sensor signal conditioner (SSC), the overall system/method can be used to both detect true refrigerant leaks and in some embodiments close solenoid valves and/or electrical contactors to inhibit HVAC operation and isolate failing components to mitigate refrigerant loss in the HVAC system.

BRIEF DESCRIPTION OF THE DRAWINGS

For a fuller understanding of the advantages provided by the invention, reference should be made to the following detailed description together with the accompanying drawings wherein:

FIG. 27 illustrates a chart depicting an exemplary model WSP-5110 RGS electrical characteristic;

FIG. 119 illustrates a top view of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak;

FIG. 120 illustrates a bottom view of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak;

Figure 121:
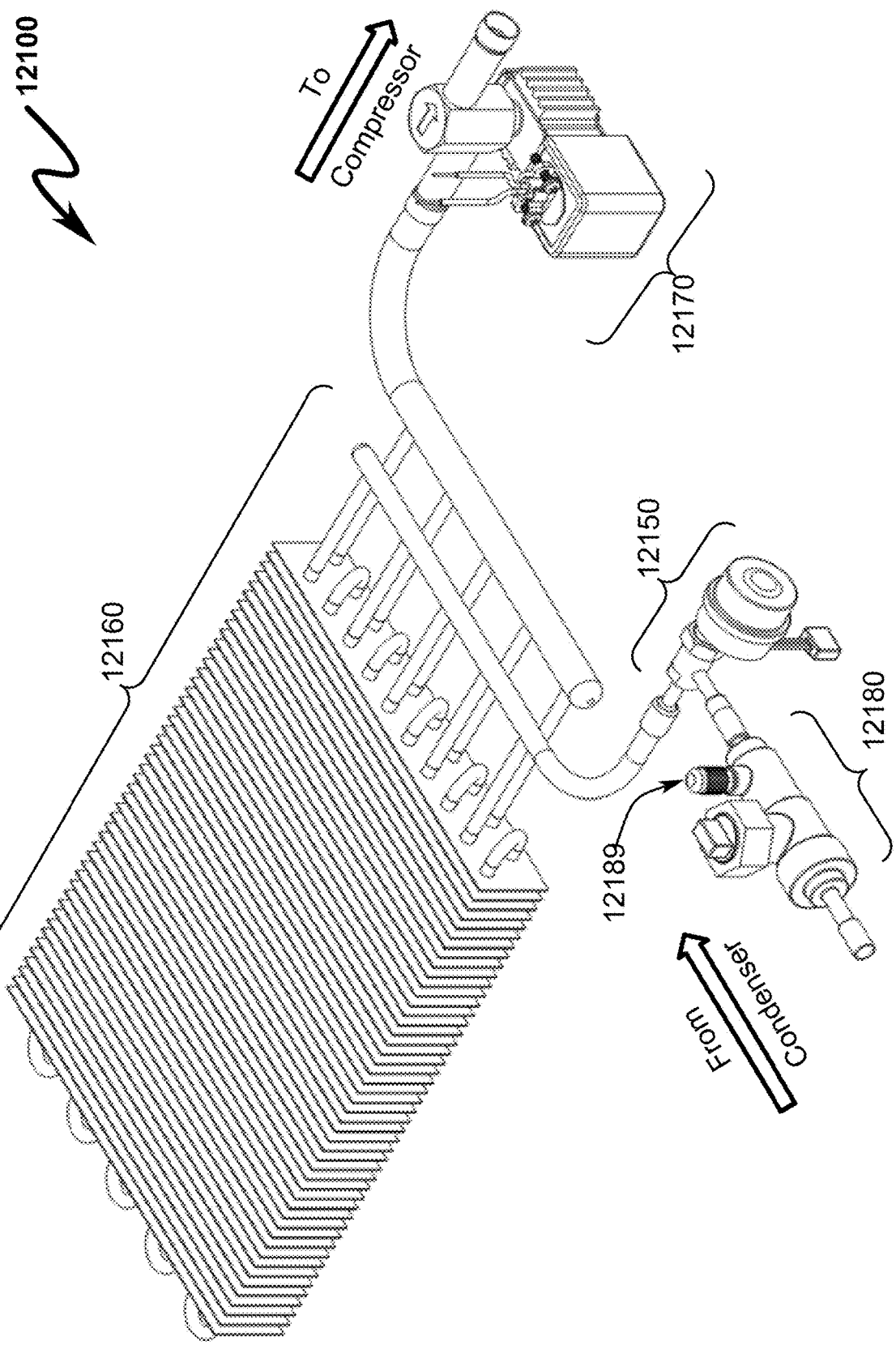
Figure 122:
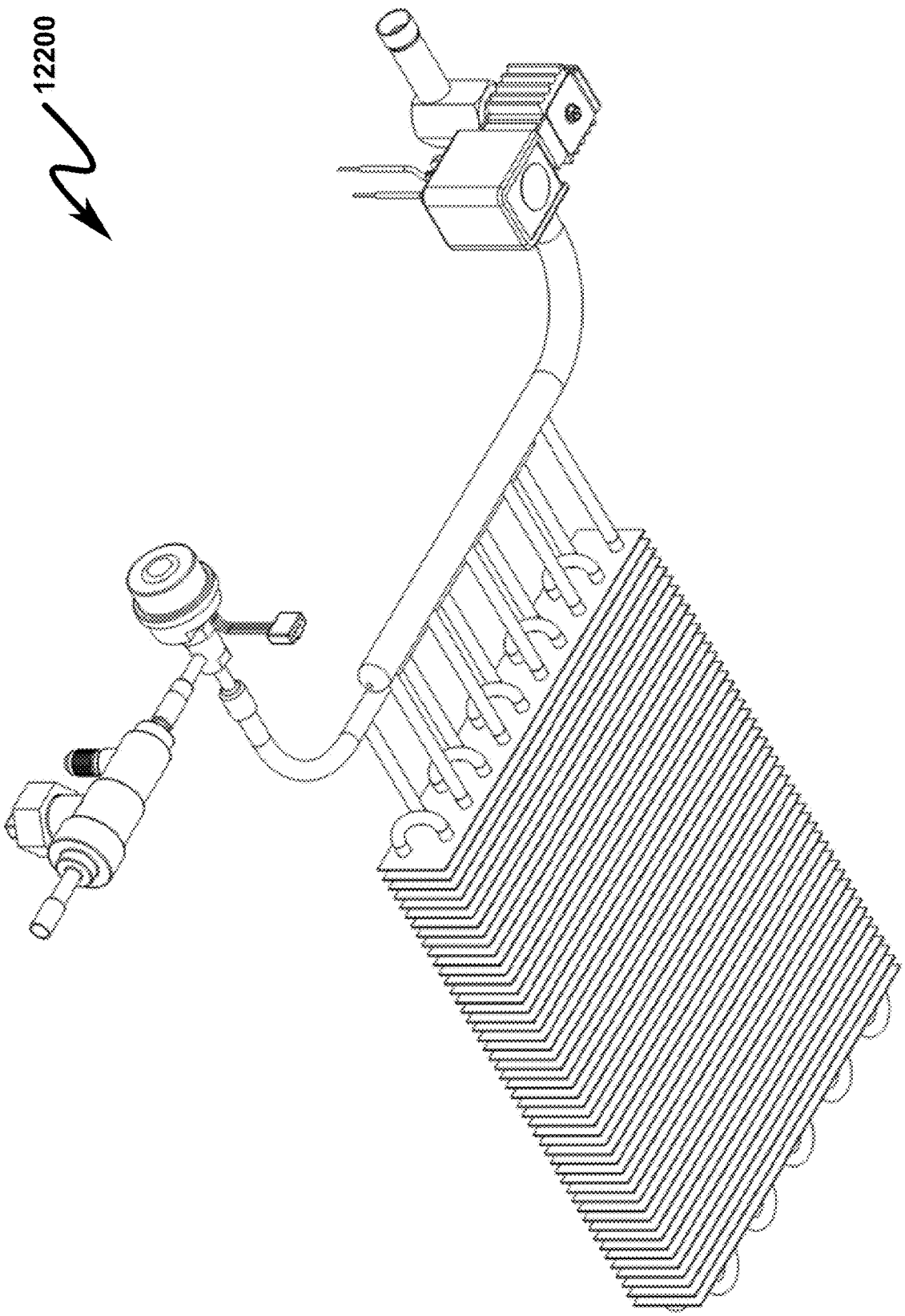
Figure 123:
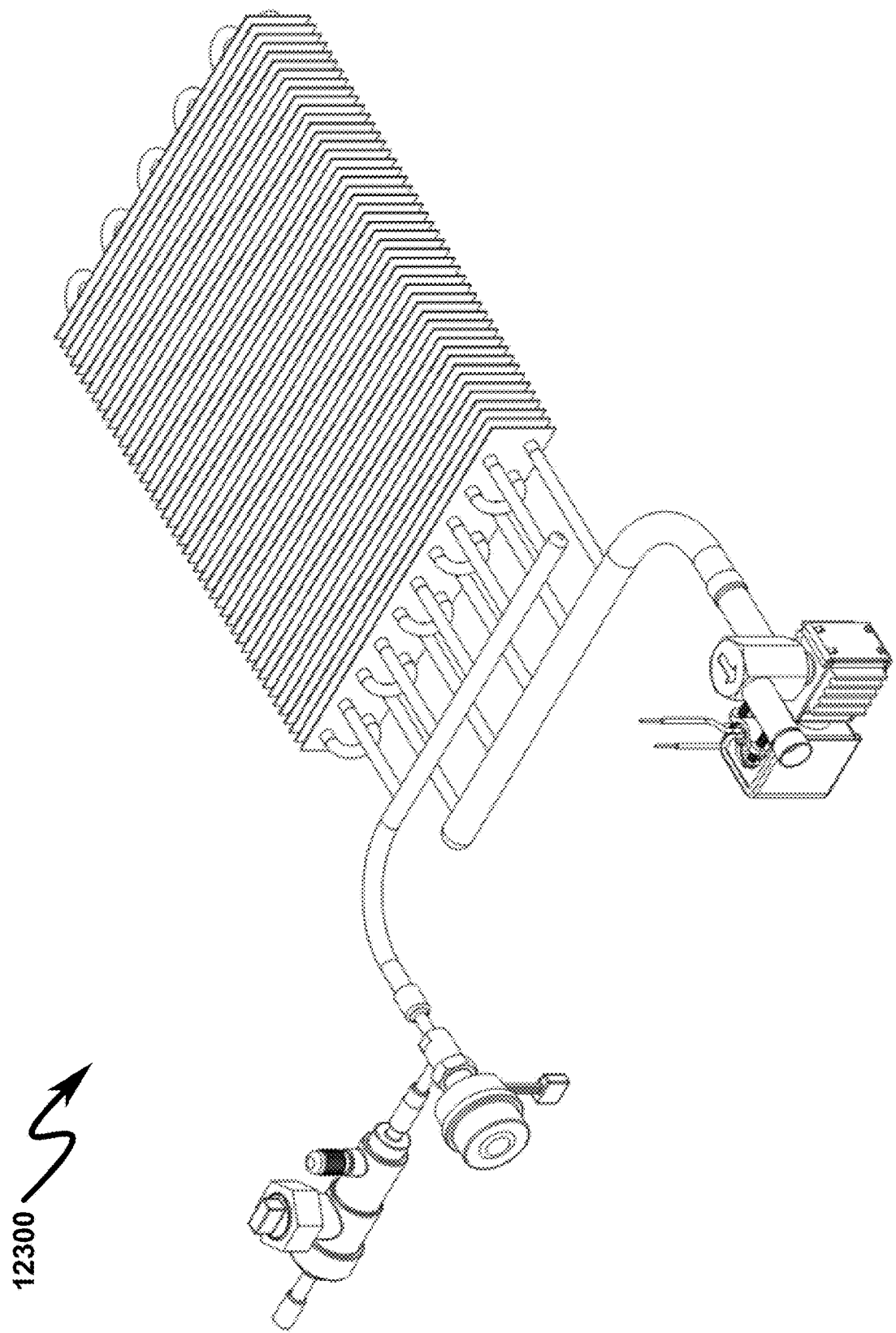
Figure 124:
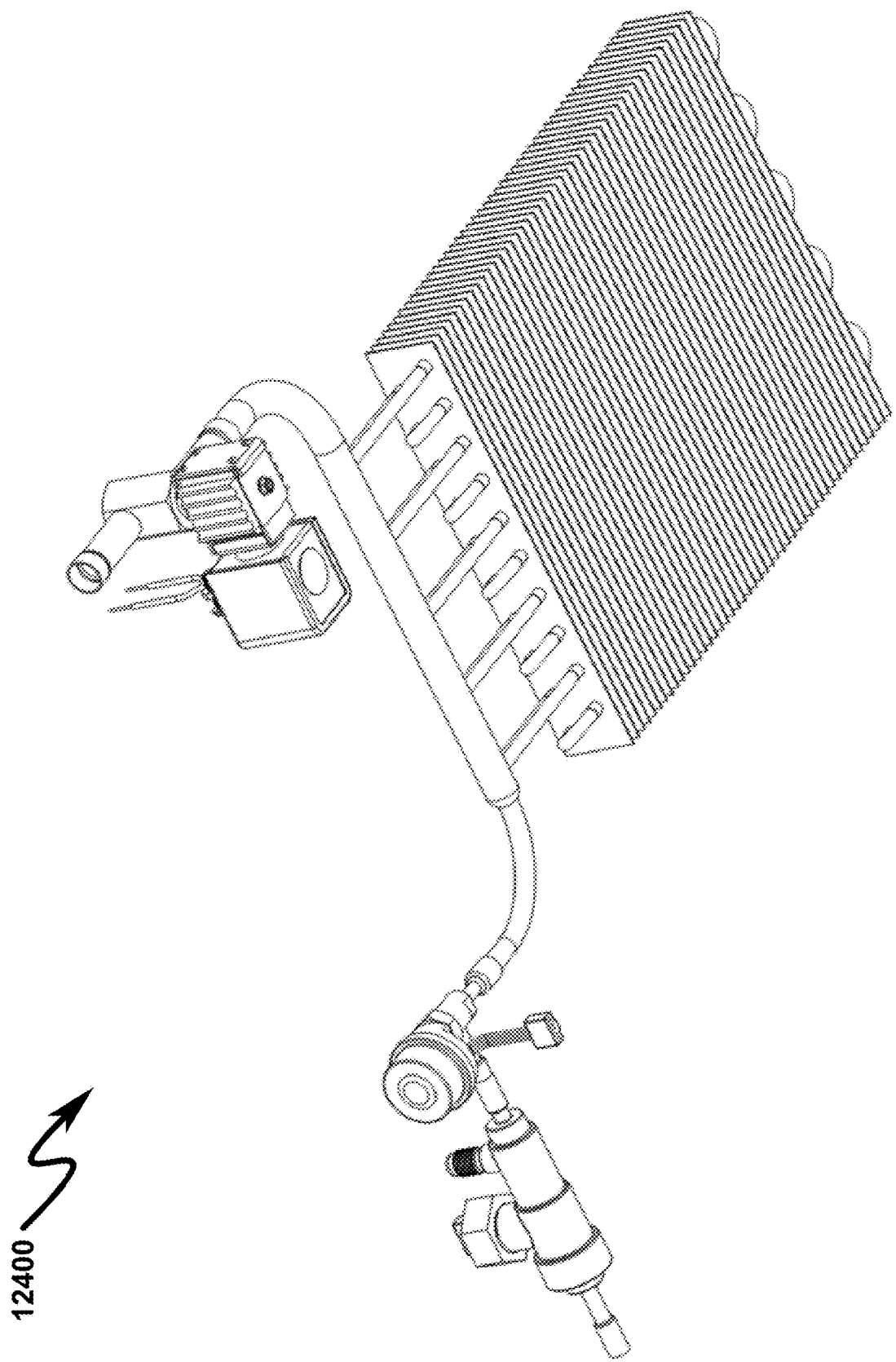
Figure 125:
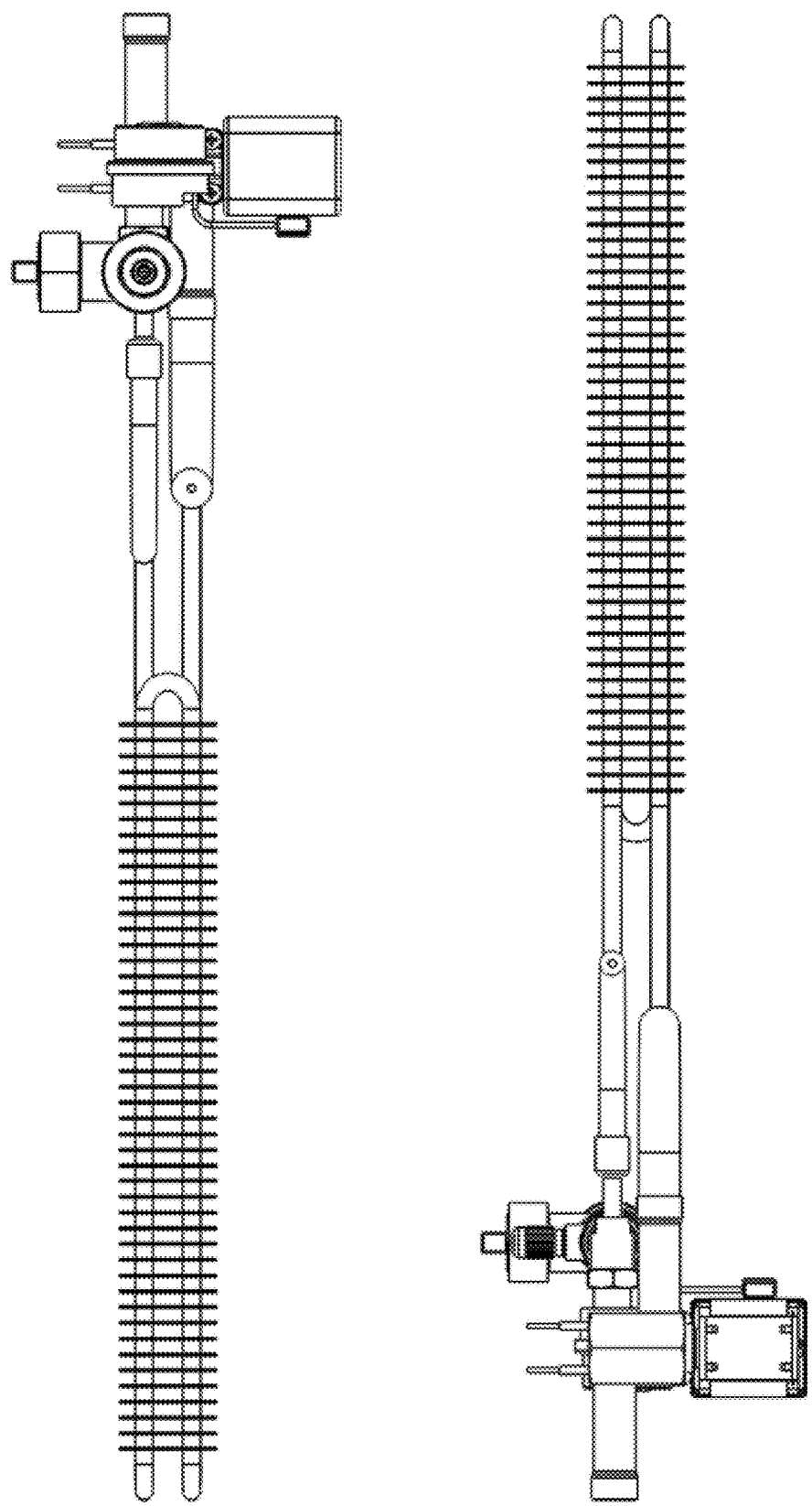
Figure 126:
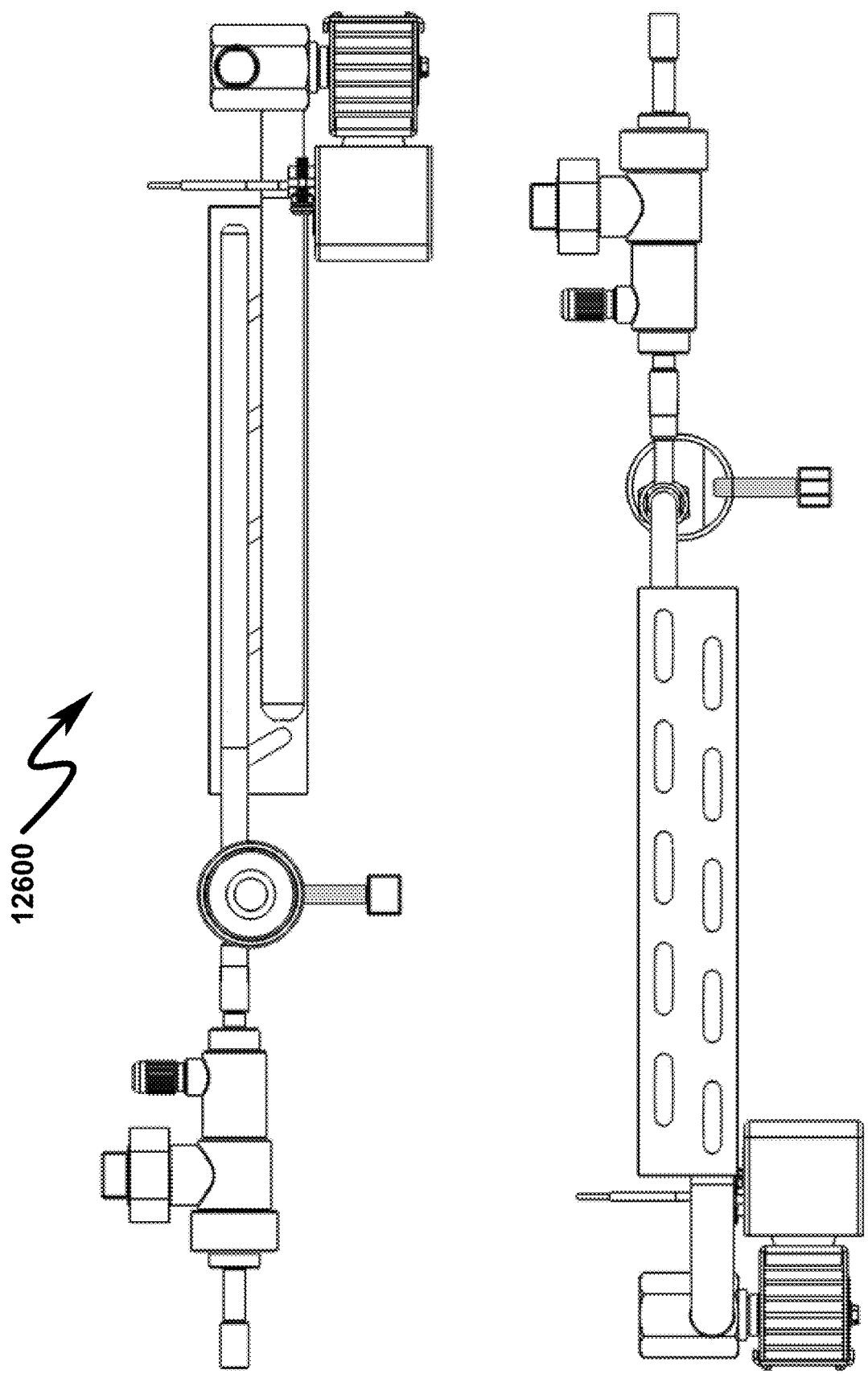
Figure 127:
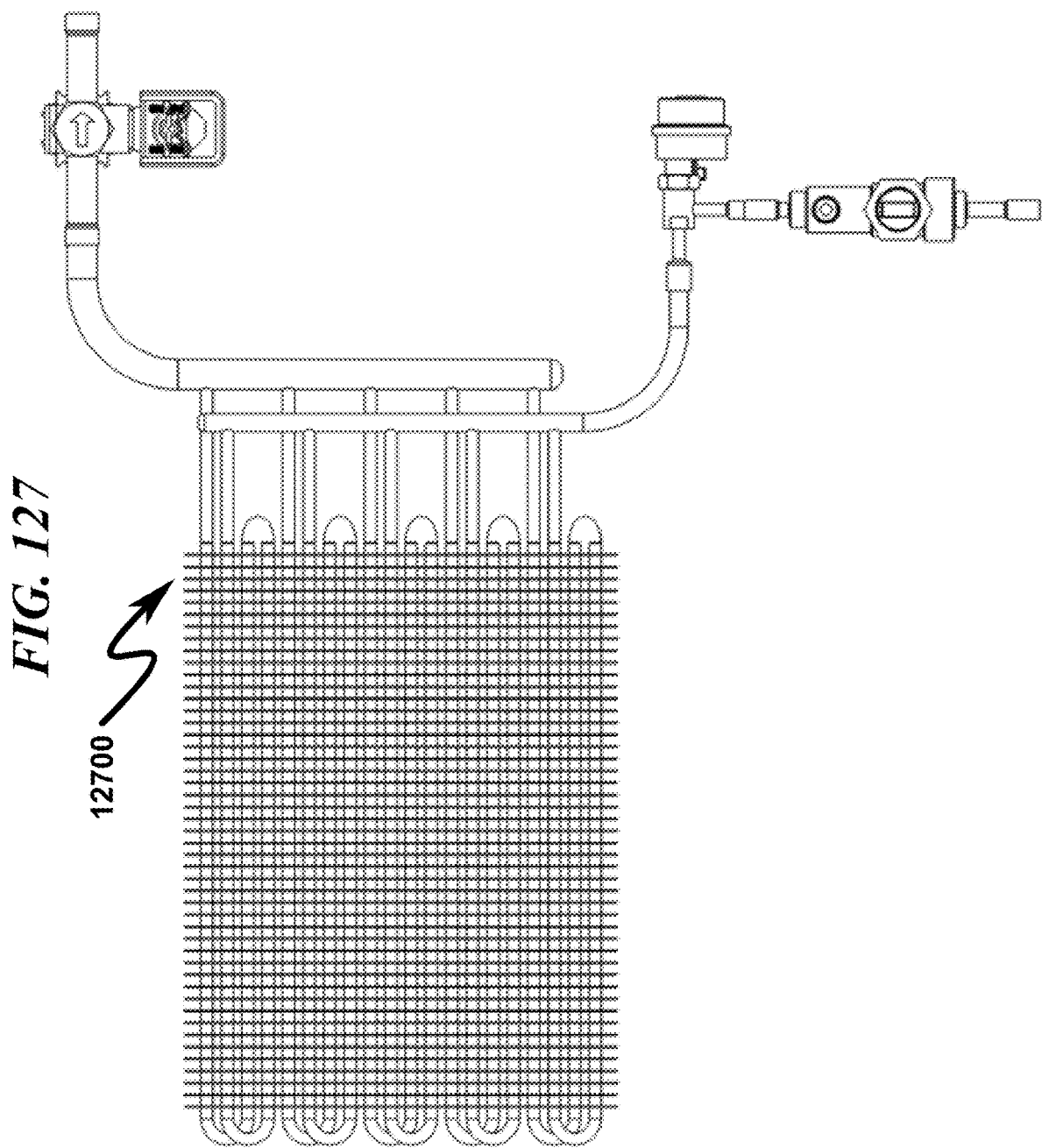
Figure 128:
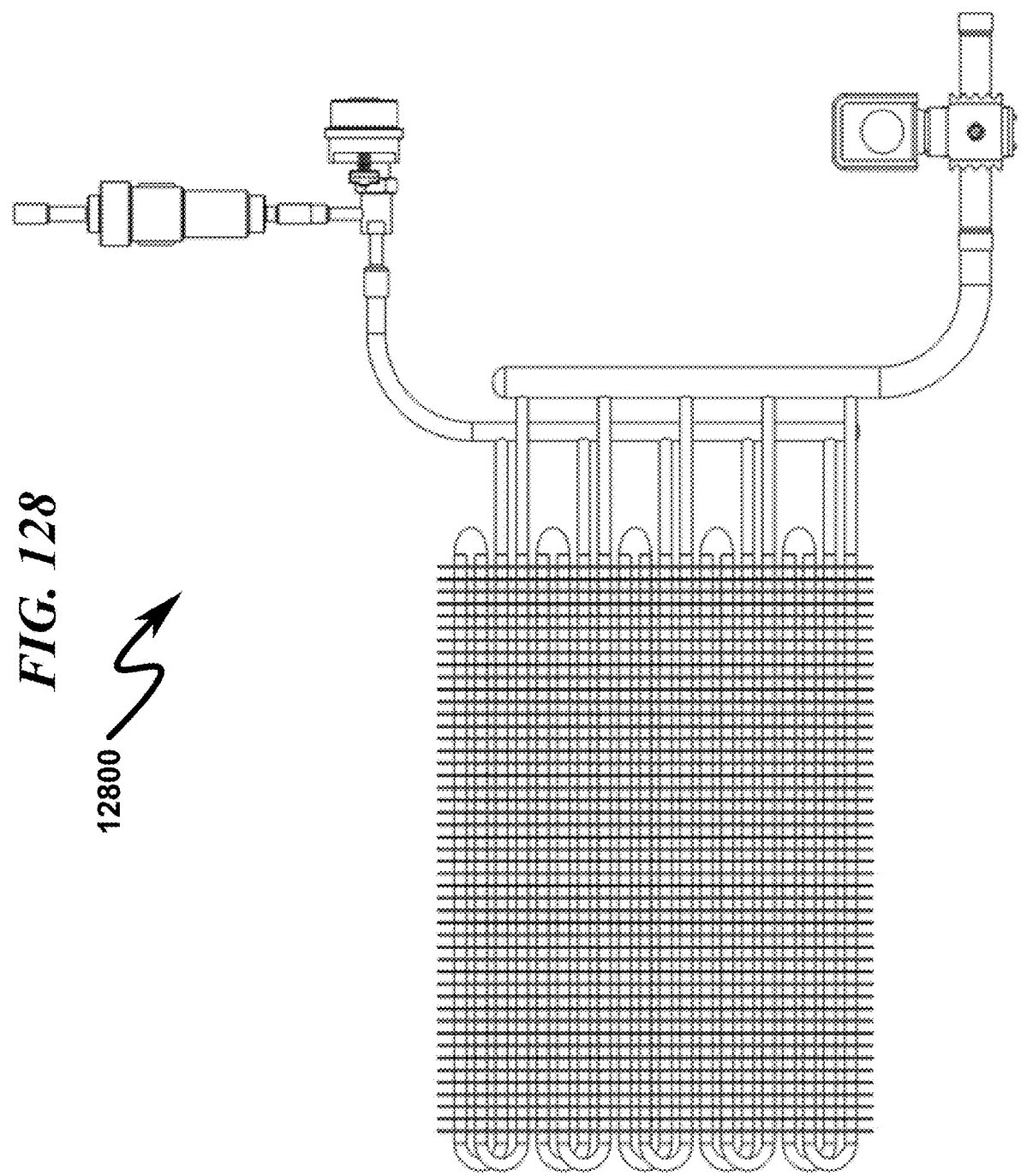

FIG. 121 illustrates a top left front perspective view of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak;

FIG. 122 illustrates a bottom left front perspective view of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak;

FIG. 123 illustrates a top right front perspective view of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak;

FIG. 124 illustrates a bottom right front perspective view of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak;

FIG. 125 illustrates left side and right side views of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak;

FIG. 126 illustrates front side and rear side views of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak;

FIG. 127 illustrates a top view of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak; and FIG. 128 illustrates a bottom view of a preferred exemplary embodiment of the present invention in which a refrigerant evaporator coil (REC) and electronic expansion valve (EEV) configuration are augmented with a flow isolation valve (FIV) at the EEV input port and a refrigerant control valve (RCV) at the output port of the REC to allow positive isolation of the REC and EEV in the event of a refrigerant leak.

DESCRIPTION OF THE PRESENTLY PREFERRED EXEMPLARY EMBODIMENTS

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a REFRIGERANT LEAK DETECTION AND MITIGATION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

HVAC Heating/Cooling Operation not Limitive

The present invention will be described in terms of a conventional HVAC heating/cooling system. In some application contexts, the system is operated solely as a cooling system. Thus, the present invention is not limited to heating, cooling, or heating/cooling systems, but combinations of these configurations are also anticipated. The present invention may be utilize with heat pumps, heat recovery, refrigeration, and other systems that employ LEV/EEV/TEV/AEV controls and/or REC components. The discussion herein does not limit the type of environment in which the present invention may be applied.

Furthermore, the terms "input port" and "output port" will be referenced to conventional refrigeration systems herein, but it should be understood that these designations will be reversed for heat recovery systems that are also anticipated by the present invention. One skilled in the art will have no trouble in reversing these designations where appropriate in this disclosure to allow the claimed invention to encompass both refrigeration and heat recovery systems.

Refrigerant Coil not Limitive

While the present invention has particular application to the detection and mitigation of refrigerant leaks in HVAC evaporator coils, the present invention may equally be applied to HVAC condenser coils. Thus, the term "refrigerant coil" and it synonyms should be given a broad meaning within the scope of this disclosure and the claimed invention.

Refrigerant not Limitive

Throughout this document the term "refrigerant" will be used in relation to the detection of any gas/fluid that may be used within a circulating loop in a HVAC system. The present invention may broadly detect a wide range of refrigerant classes in this context, including but not limited to a wide variety of halocarbons that may include traditional refrigerant classes (R11, R12, R113, R114, R115, R22, R123, R134a, R404a, R407C, R410a, etc.) as well as other newer refrigerants (R290, R32, R600, etc.) that may contain hydrocarbons such as butane and/or propane and/or natural gas (NG). Thus, the term "refrigerant" as used herein should be given broad interpretation to cover any of these refrigerant types and others that may be implemented in the future.

With respect to refrigerant types that are combustible, the present invention may be configured to sound alarms notifying occupants that they have a combustible gas leak if a refrigerant leak is detected and the system may be configured to shutoff natural gas (NG) to an indoor furnace if the refrigerant leak is detected, and the level of refrigerant leak in this instance may be reduced to be more sensitive to the detection of natural gas or other combustible refrigerant types.

Refrigerant Control Valves LEV/EEV/TEV/AEV not Limitive

The present invention will be discussed in terms of using in some circumstances refrigerant control valves (RCV) to enable/disable refrigerant flow within a HVAC refrigerant loop (HRL). The term refrigerant control valve (RCV) and its variants herein may encompass a wide variety of flow control valves, including but not limited to: linear expansion valve (LEV), electronic expansion valve (EEV), automated expansion valve, solenoid actuated valves, and other types of electrically or mechanically actuated refrigerant valves and metering devices known to those of ordinary skill in the art. Thus, the phrase refrigerant control valves (RCV) and variants should be broadly interpreted within the context of this disclosure.

LCS/LDT not Limitive

The present invention will be described in terms of a leak containment system (LCS) (otherwise referred to as a refrigerant leak containment (RLC) or refrigerant leak mitigation (RLM)) in which a leak detection tool (or alternatively as a leak detection troubleshooter) (LDT) or a refrigerant leak detector (RLD)) is used to dynamically monitor ambient refrigerant levels, determine if a refrigerant leak has occurred, pinpoint the location of the leak, and mitigate any adverse effects of the leak by containing the leak to a portion of the HVAC system in which the refrigerant flows.

Thus, the system and method described herein may be used for leak detection and/or leak mitigation and troubleshooting and in some circumstances may be implemented as a leak detection only system/method and in others as a leak detection and mitigation system/method.

Connection Fitting Type not Limitive

While the present invention will be described herein using components that utilize soldered connections, the present invention anticipates that other connection fittings may be utilized on the components with no loss of generality in the invention teachings or claim scope. Specifically, the RFV and EIV described herein may incorporate a wide variety of connection fittings, including but not limited to: soldered; brazed; flared; compression; or national pipe thread (NPT). One skilled in the art will not need additional information to make these substitutions based on specific application context as these connection fittings are standards and well known in the art.

RFV Orientation not Limitive

The refrigerant flow valve (RFV) depicted herein is configured with an input transfer port that is configured to be perpendicular to a central transfer port and associated output transfer port. The present invention anticipates that a wide variety of input/central/output port configurations may be utilized with the present invention without loss of generality in the invention teachings or claim scope. One skilled in the art will not need additional information to make these substitutions based on specific application context, as variants of these configurations are well known in the art.

Condenser Isolation Valve (CIV) not Limitive

Some preferred exemplary invention embodiments employ a condenser isolation valve (CIV) to isolate refrigerant flow from the output of the refrigerant condenser coil (RCC) to the refrigerant flow valve (RFV). In many preferred embodiments this CIV is implemented as a ball valve having soldered, brazed, flare, or pipe thread (NPT) fittings. In some preferred embodiments this CIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these CIVs are preferred in many invention embodiments, they are not limitive of the scope of CIV that may be utilized in the present invention.

Flow Isolation Valve (FIV) not Limitive

Some preferred exemplary invention embodiments employ a flow isolation valve (FIV) to isolate refrigerant flow from the output of the refrigerant flow valve (RFV) to the refrigerant evaporator coil (REC). In many preferred embodiments this FIV is implemented as a ball valve having soldered, brazed, flare, or pipe thread (NPT) fittings. In some preferred embodiments this FIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these FIVs are preferred in many invention embodiments, they are not limitive of the scope of FIV that may be utilized in the present invention.

Evaporator Isolation Valve (EIV) not Limitive

Some preferred exemplary invention embodiments employ an evaporator isolation valve (EIV) to isolate refrigerant flow from the output of the refrigerant evaporator coil (REC) to the refrigerant compressor (RFC). In many preferred embodiments this EIV is implemented as a ball valve having soldered, brazed, flare, or pipe thread (NPT) fittings. In some preferred embodiments this EIV may be a MITSUBISHI ELECTRIC® brand Diamondback BV-FV Series Unibody Design Ball Valve Model selected from a group consisting of: BV14FFSI2; BV28FFSI2; BV12FFSI2; BV58FFSI2; BB14BBSI; BB38BBSI; BB12BBSI; and BB58BBSI. While these EIVs are preferred in many invention embodiments, they are not limitive of the scope of EIV that may be utilized in the present invention.

Isolation Valve Count not Limitive

While the present invention as discussed herein provides examples of system embodiments wherein a CIV, FIV, and EIV are implemented, the present invention is not limited to these particular configuration and some preferred exemplary system embodiments may have fewer than these three valves or combinations of less than these three valves.

Schrader/American Valve not Limitive

While many of the CIV/FIV/EIV used in implementing the present invention may incorporate one or more Schrader valves (also called an American valve) between the CIV/FIV/EIV refrigerant input port (RIP) and refrigerant output port (ROP) (between which is positioned the refrigerant control valve (RCV) that allows the CIV/FIV/EIV to halt refrigerant flow from the RIP to the ROP) to allow the refrigerant flow lines and/or REC to be evacuated and filled with refrigerant on one or more sides of the CIV/FIV/EIV valve structure, this is not necessarily a requirement of the CIV/FIV/EIV.

The positioning of the Schrader valve in these implementations is preferred to be between the CIV RIP and the RCC output port, the FIV ROP and the REC input port, and the EIV RIP and the REC output port. This configuration allows isolation of the RFV and/or the REC to affect repair and/or replacement of either of these HVAC system components as well as the AEV. These valves as positioned in the HVAC system allow the REC to be evacuated and filled with refrigerant without impacting the RFV or RCC. These valves as positioned in the HVAC system allow the AEV to be replaced and/or repaired without impacting the RFV, RCC, or REC.

However, some invention embodiments may place the Schrader valve at different positions within the CIV/FIV/EIV, while other embodiments may utilize two Schrader valves, one between the RIP and the RCV, and another between the ROP and the RCV. While the use of Schrader valves is preferred and these valves are well known in the art, the present invention is not limited to this particular type of valve in the implementation.

Solenoid Cutoff Valves not Limitive

Many preferred embodiments of the present invention may incorporate electrically actuated solenoid drive refrigerant cutoff valves to isolate one or more components of the HVAC system when a refrigerant leak is detected. While many valve types may be used in this application context, several preferred invention embodiments make use of solenoid cutoff valve model SD-15/52015, available from Parker Hannifin Corporation, Sporlan Division, 206 Lange Drive, Washington, Mo. 63090 USA, phone 636-239-1111, fax 636-239-9130, www.sporlan.com.

These valves in some circumstances may be substituted with manually activated refrigerant cutoff valves (RCV) such as the FIV/EIV described above that are actuated by an operator in response to alarms provided by the refrigerant leak detector (RLD) described herein.

Drawings not to Scale

The drawings presented herein have been scaled in some respects to depict entire system components and their connections in a single page. As a result, the components shown may have relative sizes that differ from that depicted in the exemplary drawings. One skilled in the art will recognize that piping sizes, thread selections, and other component values will be application specific and have no bearing on the scope of the claimed invention.

Schematics Exemplary

The present invention may be taught to one of ordinary skill in the art via the use of exemplary schematics as depicted herein. One skilled in the art will recognize that these schematics represent only one possible variation of the invention as taught and that their specific connectivity, components, and values are only one possible configuration of the invention. As such, the presented schematics and their associated component values and illustrated voltage levels do not limit the scope of the claimed invention. Additionally, it should be noted that conventional power supply decoupling capacitors are omitted in the presented schematics as they are generally application specific in value and placement.

Digital Control Processor (DCP) not Limitive

The implementation of the digital control processor (DCP) described herein may take many forms, including but not limited to discrete digital logic, microcontrollers, finite state machines, and/or mixed analog-digital circuitry. While in many preferred exemplary embodiments the DCP is implemented using an 8051-class (8021, 8041, 89C microcontroller, the present invention is not limited to this particular hardware implementation.

States/Modes not Limitive

The present invention will be herein described in terms of CCL STATES in many embodiments. These states may equivalently be described in terms of CCL MODES of operation.

Time Delays not Limitive

The present invention may make use of a variety of DCP selected time delays during the operation of the system. The time delays presented herein are only exemplary of those found in some preferred embodiments and are not limitive of the claimed invention. A "selected time delay" will refer to any time delay found appropriate in a particular application context of the present invention.

Wireless Communication Interface (WCI) not Limitive

Some preferred invention embodiments may incorporate a wireless communication interface (WCI) allowing control and/or interrogation of the DCP from a mobile user device (MUD) or some other type of networked computer control. The WCI may take many forms, but many preferred invention embodiments utilize a BLUETOOTH® compatible interface to the DCP to accomplish this function.

Wireless Communication Protocol not Limitive

Some preferred invention embodiments utilize a wireless communication interface (WCI) to allow external communication and/or control of the DCP. In this manner the operational STATE of the CCL can be interrogated, ASI alarms enabled/inhibited, HVAC controls manually operated, and stored information regarding the details of the particular HVAC system stored/retrieved. In many preferred exemplary embodiments the WCI is implemented using a BLUETOOTH® radio frequency transceiver, and in some circumstances a Shenzhen Xintai Micro Technology Co., Ltd. Model JDY-30/JDY-31 BLUETOOTH® SPP Serial Port Transparent Transmission Module or DSD TECH model HM-10/HM-11 (www.dsdtech-global.com) that implement a BLUETOOTH® wireless transceiver using a digital serial port of the DCP. One skilled in the art will recognize that this is just one of many possible WCI implementations.

Mobile User Device (MUD) not Limitive

Some preferred invention embodiments may incorporate a mobile user device (MUD) allowing control and/or interrogation of the DCP via a WCI or other computer network. The MUD may take many forms, but many preferred invention embodiments utilize a tablet, smartphone, or other handheld device to wirelessly communicate with the DCP using a WCI. In some circumstances this MUD may utilize telephone or Internet communications to affect this DCP command/interrogation capability.

Alarm Status Indicator (ASI) not Limitive

Many preferred invention embodiments may incorporate an alarm status indicator (ASI) comprising one or more light emitting diode (LED) displays (including LED displays utilizing a digital or segmented format) and/or audible alarm indicators. These devices may take many forms, including but not limited to single LED indicators, LED multi-segment displays, and piezo-electric audible indicators. In each of these cases the activation duty cycle and frequency of operation of these displays may be altered to provide indications of alarm status values or to provide information as to the STATE in which the system is operating. The present invention makes no limitation on how these displays operate or in what combination they are combined to provide the ASI functionality.

Power Supply not Limitive

The present invention as described in the exemplary embodiments herein makes use of AC power derived from the HVAC system (AC power, typically for use with RLM implementations) or in other circumstances may use battery power (battery power, typically for use with RLD implementations). However, some implementations may utilize ETHERNET or some other wired network that supports power-over-Ethernet) (POE). In these circumstances the wireless communication interface (WCI) will encompass a wired communication network (WCN) that provides power to the system. The WCI as described herein encompasses the possibility of the use of a WCN incorporating power-over-Ethernet (POE) as a power source for the system.

In these circumstances the RLD/RLM may be connected directly to maintenance technician or facility manager computers to allow these remote computers to perform HVAC system analysis, generate reports on HVAC systems, refrigerant leak detection, and perform other functions on the RLD/RLM units.

Refrigerant Leak Detection (RLD) Overview (0100)-(0600)

Basic Refrigerant Leak Detection (RLD) (0100)

Figure 1:
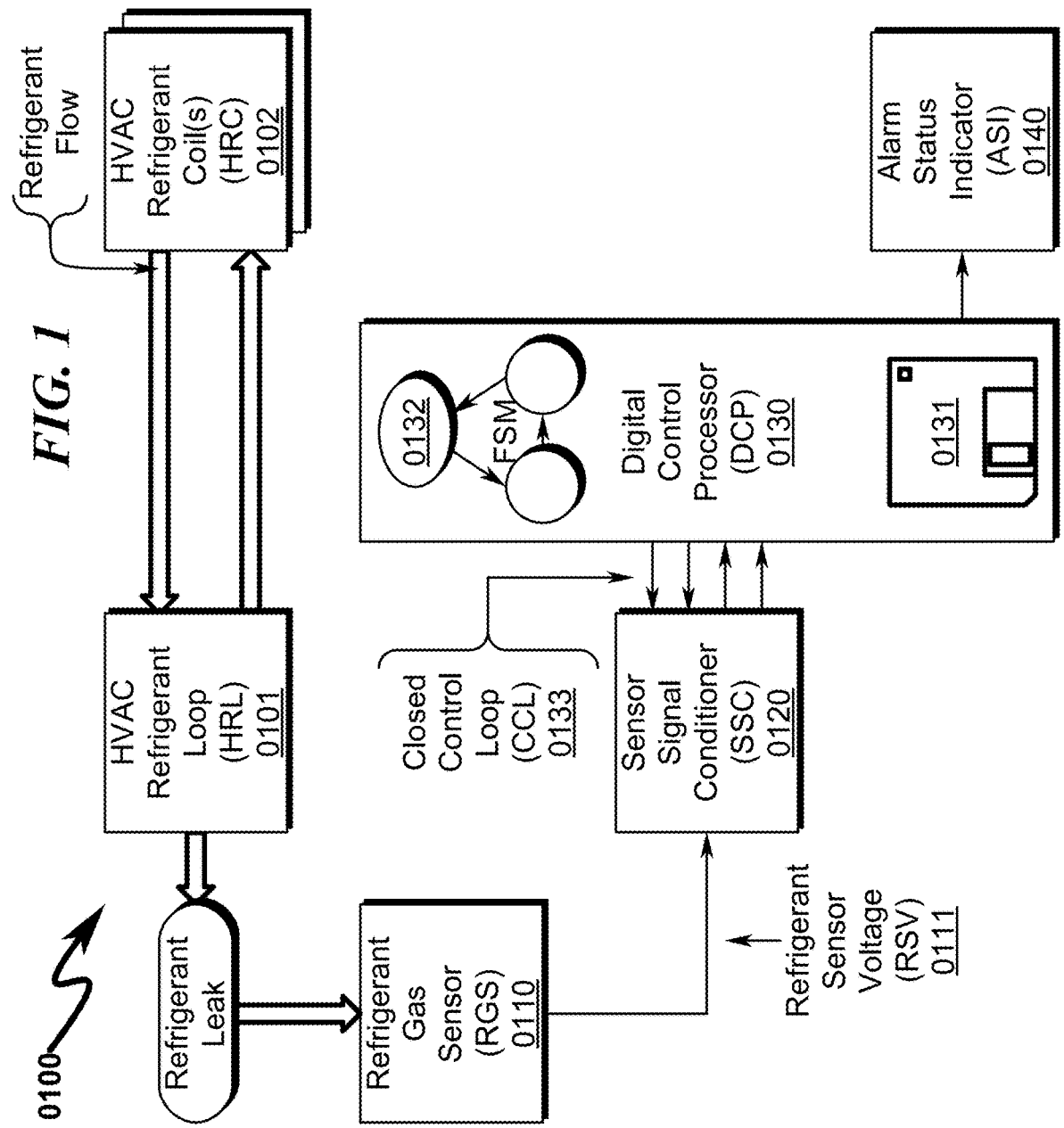
FIG. 1 illustrates a system block diagram depicting a preferred exemplary embodiment of a present invention refrigerant leak detection system (RLD)

The present invention refrigerant leak detection (RLD) system in its simplest form is generally depicted in FIG. 1 (0100) wherein a refrigerant gas sensor (RGS) (0110) detects refrigerant in ambient air surrounding a HVAC system refrigerant loop (HRL) (0101) and produces a refrigerant sensor voltage (RSV) (0111) that is manipulated by a sensor signal conditioner (SSC) (0120) electrically configured by a digital control processor (DCP) (0130). The DCP (0130) may execute machine instructions read from a tangible computer readable medium (0131) and/or executes a finite state machine (FSM) (0132) to form a closed control loop (CCL) (0133) in which the analog electrical characteristics of the SSC (0120) are continually adjusted to account for dynamic recalibration of the RGS (0110).

Since the RGS (0110) may have a wide range of manufacturing variations resulting in a wide range of electrical characteristics, the DCP (0130) adjusts the SSC (0120) to account for these variations as well as ambient refrigerant level variations in order to achieve a reliable indication of an actual refrigerant leak in the HRL (0101). Once a reliable indication of a refrigerant leak has been detected, the DCP (0130) provides an indication of this via the use of one or more alarm status indicators (ASI) (0140) that may encompass audible and/or visual leak detection alarms.

The closed control loop (CCL) (0133) interaction between the analog electrical characteristics of the SSC (0120) and the DCP (0130) is critical to the proper operation of the overall refrigerant leak detection (RLD) system in that the RGS (0110) as implemented by most manufacturers is sensitive to refrigerant, benzene, alcohol, and a variety of other hydrocarbons. Thus, the RGS (0110) would typically detect a wide range of cleaning compounds that are commonly utilized in institutional settings such as commercial buildings and other structures that incorporate distributed HVAC systems. Without some form of dynamic recalibration, these other hydrocarbons would falsely indicate a refrigerant leak and render the RLD useless as a true indicator of a HRL (0101) refrigerant leak.

Air Intake Fan (AIF)(0200)

Figure 2:
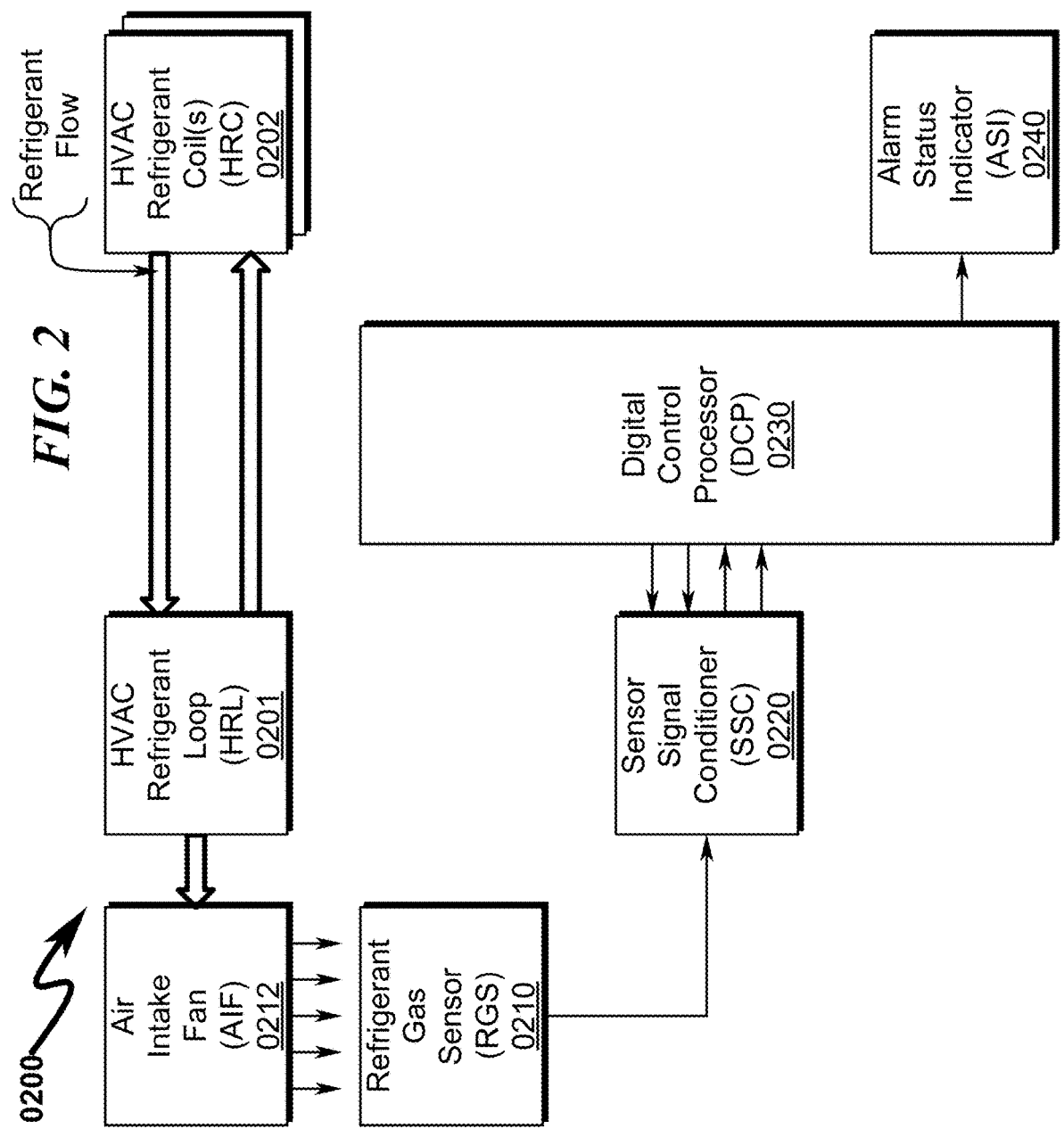
FIG. 2 illustrates a system block diagram depicting a preferred exemplary embodiment of a present invention refrigerant leak detection system (RLD) augmented with an air intake fan (AIF)

As generally depicted in FIG. 2 (0200), the RLD may in some preferred embodiments be augmented with one or more air intake fans (AIF) (0212) that force ambient air surrounding one or more elements of the HVAC refrigerant loop (HRL) (0201) across the RGS (0210) so as to enable better detection of a refrigerant leak in the HRL (0201) as well as force "stale" ambient air containing contaminants away from the RGS (0210) to enable rapid recalibration and reconfiguration of the SSC (0220) by the DCP (0230) and inhibit false refrigeration leak indications by the DCP (0230).

Sensor Record Memory (SRM)/Real-Time Clock (RTC) (0300)

Figure 3:
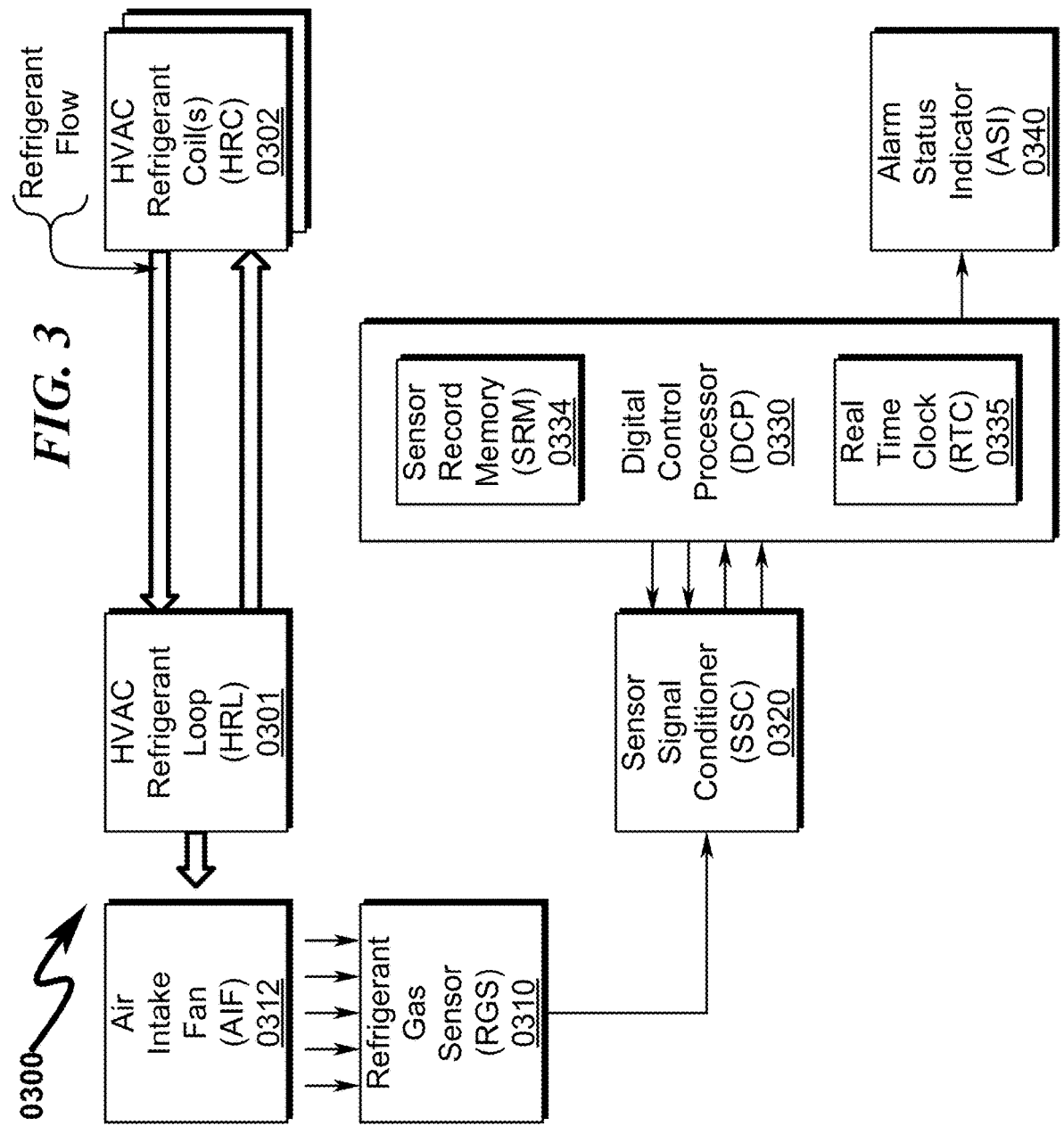
FIG. 3 illustrates a system block diagram depicting a preferred exemplary embodiment of a present invention refrigerant leak detection system (RLD) augmented with an air intake fan (AIF), sensor record memory (SRM), and real-time clock (RTC)

As generally depicted in FIG. 3 (0300), the DCP (0330) may in some preferred embodiments be augmented with a sensor record memory (SRM) (0334) and/or a real-time clock (RTC) (0335) that allows the DCP (0330) to log refrigeration leak detections by the DCP (0330). This logging information may then be later communicated to an operator via the ASI (0340) or an alternative communication mechanism such as a wireless network. The SRM (0334) and/or a RTC (0335) may be implemented within the DCP (0330) or optionally incorporated as separate components in the overall system implementation.

Temperature/Humidity Sensor (THS) (0400)

Figure 4:
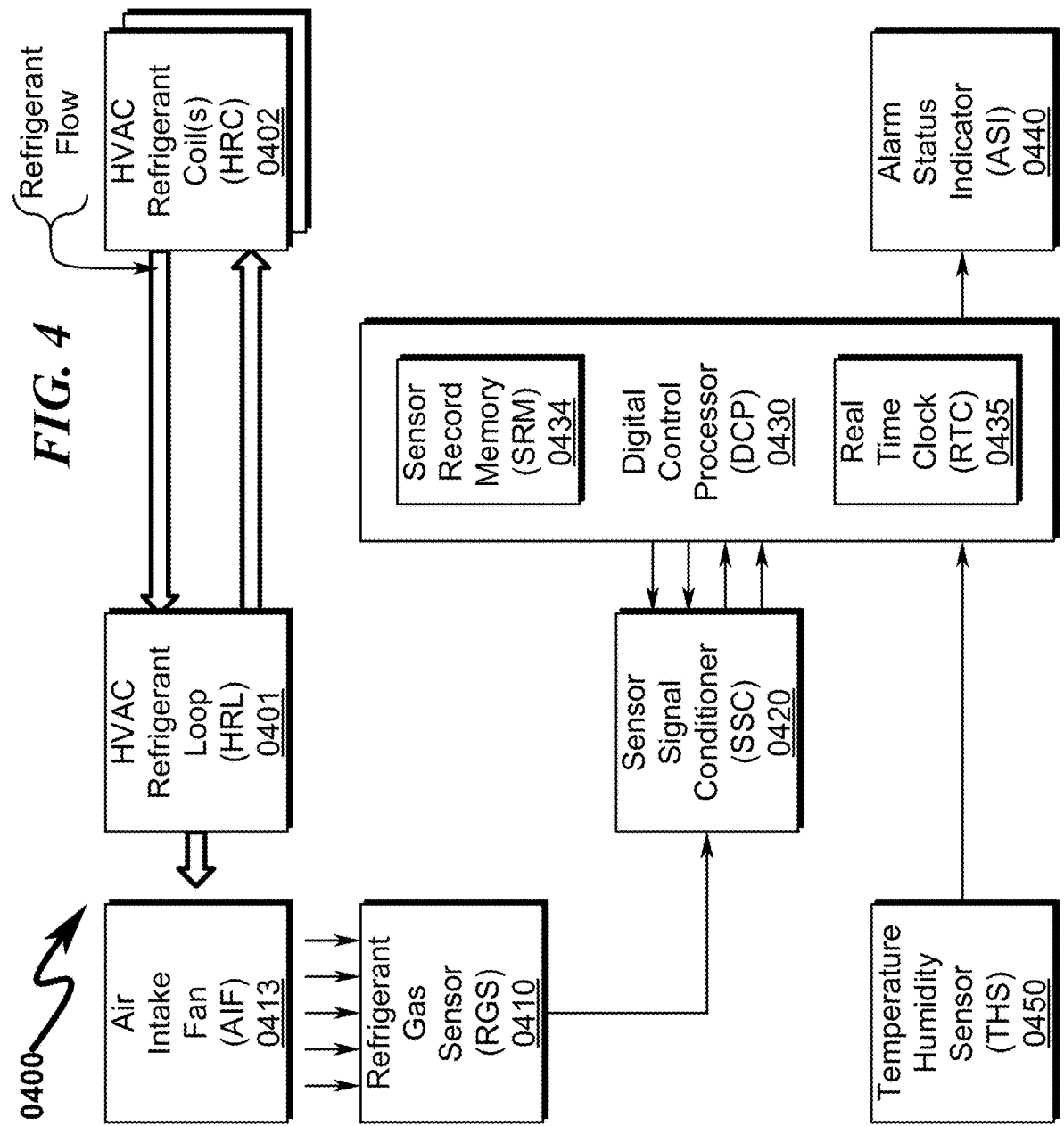
FIG. 4 illustrates a system block diagram depicting a preferred exemplary embodiment of a present invention refrigerant leak detection system (RLD) augmented with an air intake fan (AIF), sensor record memory (SRM), real-time clock (RTC), and temperature/humidity sensor (THS)

As generally depicted in FIG. 4 (0400), the RLD system may in some preferred embodiments be augmented with a temperature/humidity sensor (THS) (0450) that allows the DCP (0430) to adjust the dynamic recalibration of the RGS (0410) based on ambient temperature and/or humidity readings. This THS (0450) may also be used by the DCP (0430) to trigger performance alarms for the HVAC system even if no refrigerant leak is detected by the RGS (0410). In some circumstances a very slow refrigerant leak may reduce the performance of the HVAC system over time and be undetectable using the RGS (0450). In these circumstances a refrigerant recharge may be in order and this condition can be determined in some circumstances by monitoring the refrigerant coil temperatures during operation of the HVAC system. Thus, one or more THS (0450) sensors may be employed to constantly check the performance of the HVAC system and log these conditions as alarms to a technician or other individual.

Wireless Communication Interface (WCI)/Mobile User Device (MUD) (0500)

Figure 5:
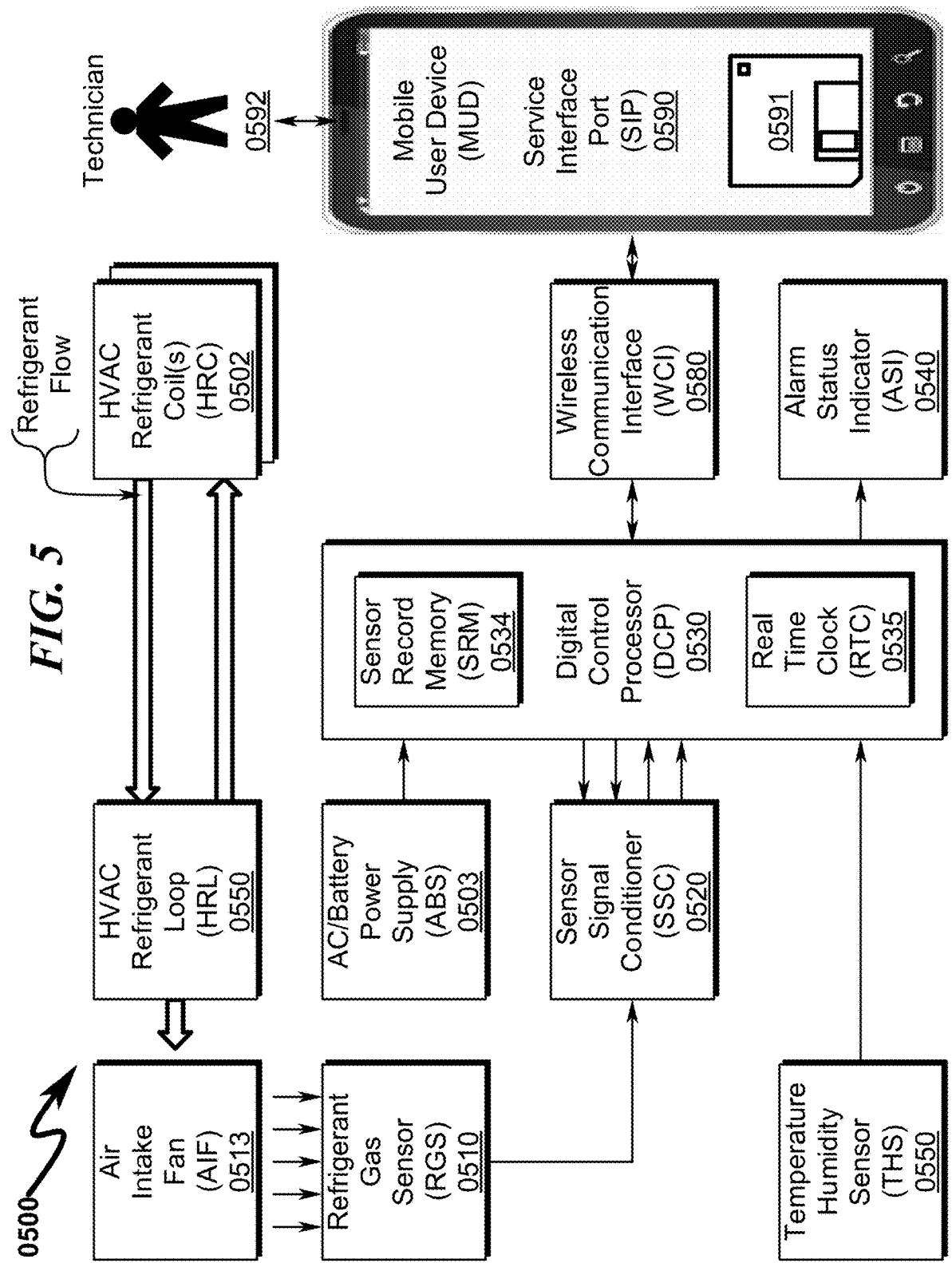
FIG. 5 illustrates a system block diagram depicting a preferred exemplary embodiment of a present invention refrigerant leak detection system (RLD) augmented with an air intake fan (AIF), sensor record memory (SRM), real-time clock (RTC), temperature/humidity sensor (THS), AC/battery power supply (ABS), wireless communications interface (WCI), and mobile user device (MUD) service interface port (SIP)
Figure 7:
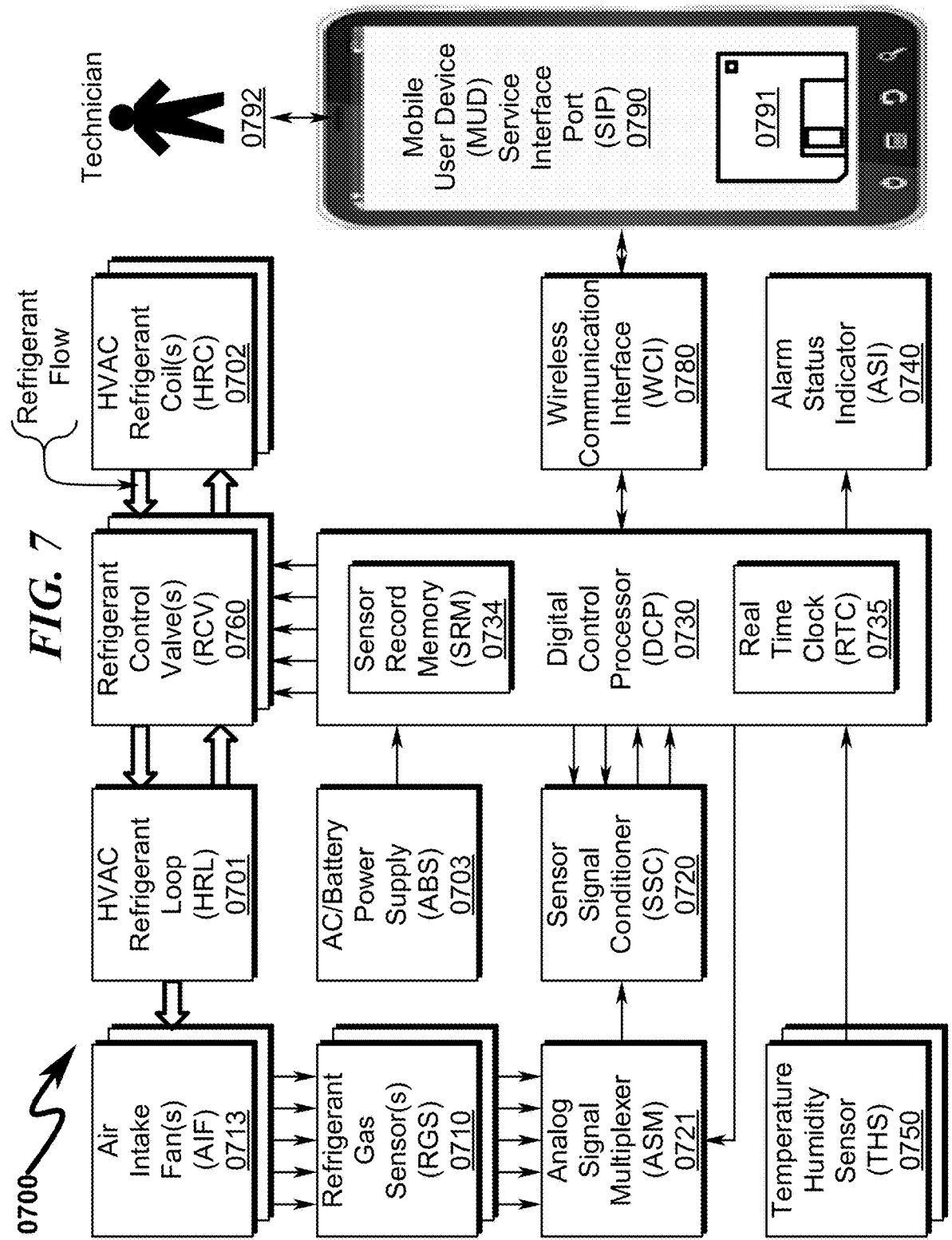
FIG. 7 illustrates a system block diagram depicting a preferred exemplary embodiment of a present invention refrigerant leak mitigation system (RLM) incorporating refrigerant control valves (RCV) to enable shutdown of a leaking HVAC refrigerant coil (HRC)

As generally depicted in FIG. 5 (0500), the RLD system may in some preferred embodiments be augmented with a wireless communication interface (WCI) (0580) and/or a mobile user device (MUD) service interface port (SIP) (0590) that allows information to be transmitted to/from the DCP (0530) relating to the state of the HVAC system, detected refrigerant leaks, and other information that may be logged in the sensor record memory (SRM) (0534). This WCI (0580)/MUD (0590) may also be used in some circumstances to control operation of the HVAC system such as control refrigerant flow valves or compressor contactors using the DCP (0530) as generally depicted in FIG. 7 (0700)-FIG. 8 (0800).

In many preferred embodiments an AC/Battery power supply (ABS) (0503) may be incorporated into the RLD system so as to allow it to be placed local to a potentially leaking HRC (0502) or HVAC compressor to allow logging of refrigerant leaks and reporting of same to the WCI (0580)/MUD (0590). In this manner a number of RLD systems can be deployed at a plurality of HRC (0502) or HVAC compressors and then a MUD (0590) be used at a later time to scan the individual RLD systems to determine which particular HRC (0502) or HVAC compressor is actually leaking. Since these leak conditions may be environmentally triggered and not constant, the ability to set the RLD systems in place, leave the facility, and return to obtain the SRM (0534) refrigerant leak logging information from each individual RLD system greatly simplifies the detection of refrigerant leaks in a spatially diverse and complex HRL (0501).

Multiplexed RGS Sensors (0600)

Figure 6:
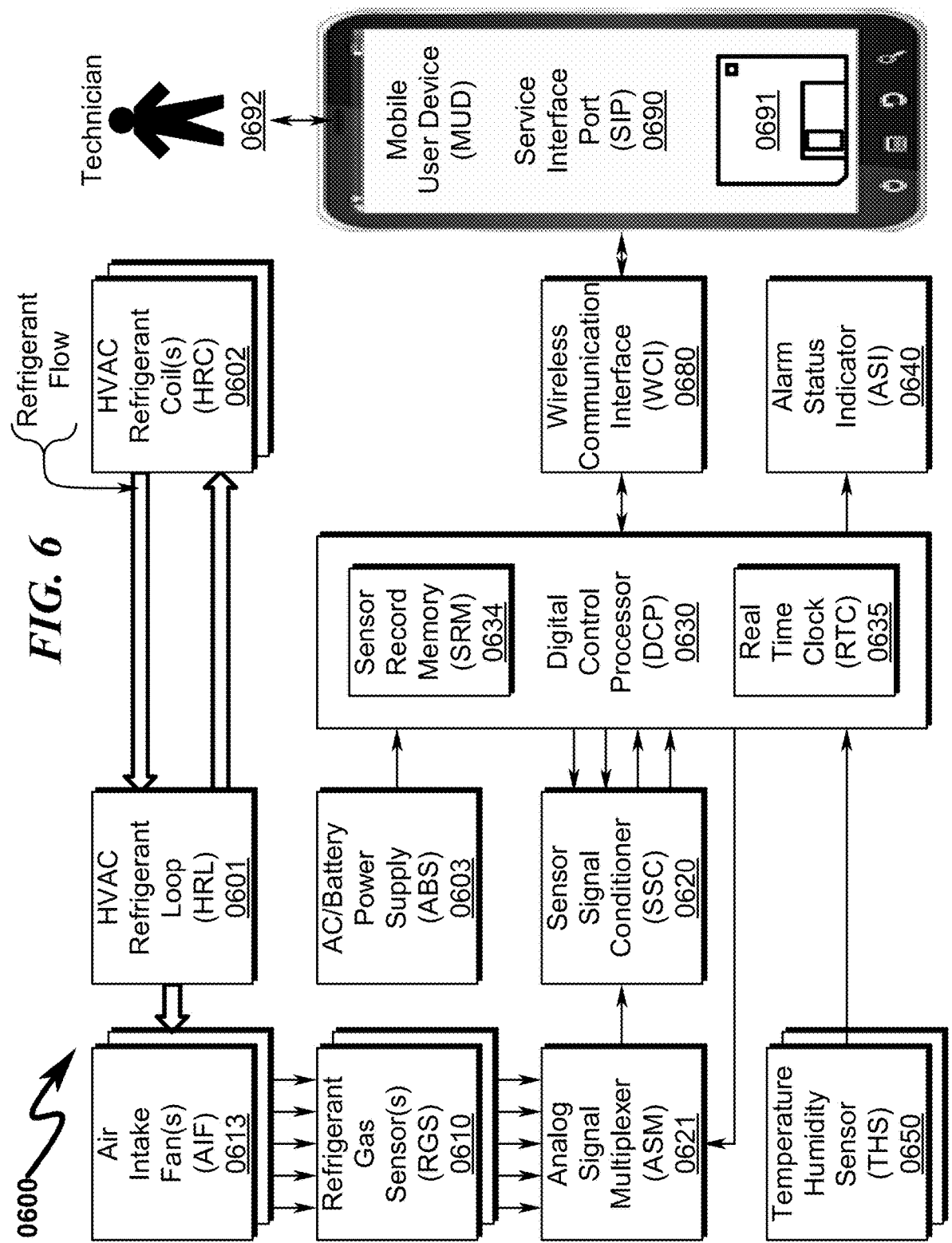
FIG. 6 illustrates a system block diagram depicting a preferred exemplary embodiment of a present invention refrigerant leak detection system (RLD) augmented with an air intake fan (AIF), sensor record memory (SRM), real-time clock (RTC), temperature/humidity sensor (THS), AC/battery power supply (ABS), wireless communications interface (WCI), mobile user device (MUD) service interface port (SIP), and analog multiplexer multi-RGS sensor support.

As generally depicted in FIG. 6 (0600), the RLD system may in some preferred embodiments be augmented with an analog signal multiplexer (ASM) (0621) to allow inputs from multiple RGS (0610) to be inspected by the DCP (0630). In this manner a single RLD system may be used to gather refrigerant leak information from a multiple number of RGS (0610) sensors. Also shown in this diagram is the fact that many of the components such as the AIF (0613), RGS (0610), and THS (0650) may be replicated in the RLD system to provide for additional sensor monitoring functions based on particular application context.

Refrigerant Leak Mitigation (RLM) Overview (0700)-(0800)

HVAC Refrigerant Coil (HRC) Individual Shutdown (0700)

The present invention refrigerant leak mitigation (RLM) system may contain any combination of RLD elements previously discussed in FIG. 1 (0100)-FIG. 6 (0600) and augments this RLD element configuration as generally depicted in FIG. 7 (0700) with one or more refrigerant control valves (RCV) (0760). The RCV (0760) are typically configured as a refrigerant flow valve (RFV) and an evaporator isolation valve (EIV) that are positioned on either side of a HVAC refrigerant coil (HRC) (0702) implemented as a refrigerant evaporator coil (REC), but may also be configured as a first condenser isolation valve (FCI) and second condenser isolation valve (SCI) that are used to isolate the outside refrigerant condenser coil (RCC).

The RLM operation is such that when the DCP (0730) detects a refrigerant leak as signaled by the RGS (0710), an ALARM STATE is activated within the DCP (0730) and the DCP operates the RCV (0760) to shutdown refrigerant flow to the HRC (0702). In this manner a HVAC system servicing multiple HRC (0702) can be partially shut down so as to limit the refrigerant leak to one failing HRC (0702) rather than allowing the entire HVAC refrigerant loop (0701) to be drained of refrigerant due to the leak in a particular HRC (0702). The ALARM STATE activated within the DCP (0730) will then activate appropriate alarms within the ASI (0740) and/or provide for an indication of the failing HRC (0702) via wireless communication (0780) to a mobile user device (0790) such as a tablet, smart phone, or other portable display device.

HVAC Compressor Contactor (HCC) Shutdown (0800)

Figure 8:
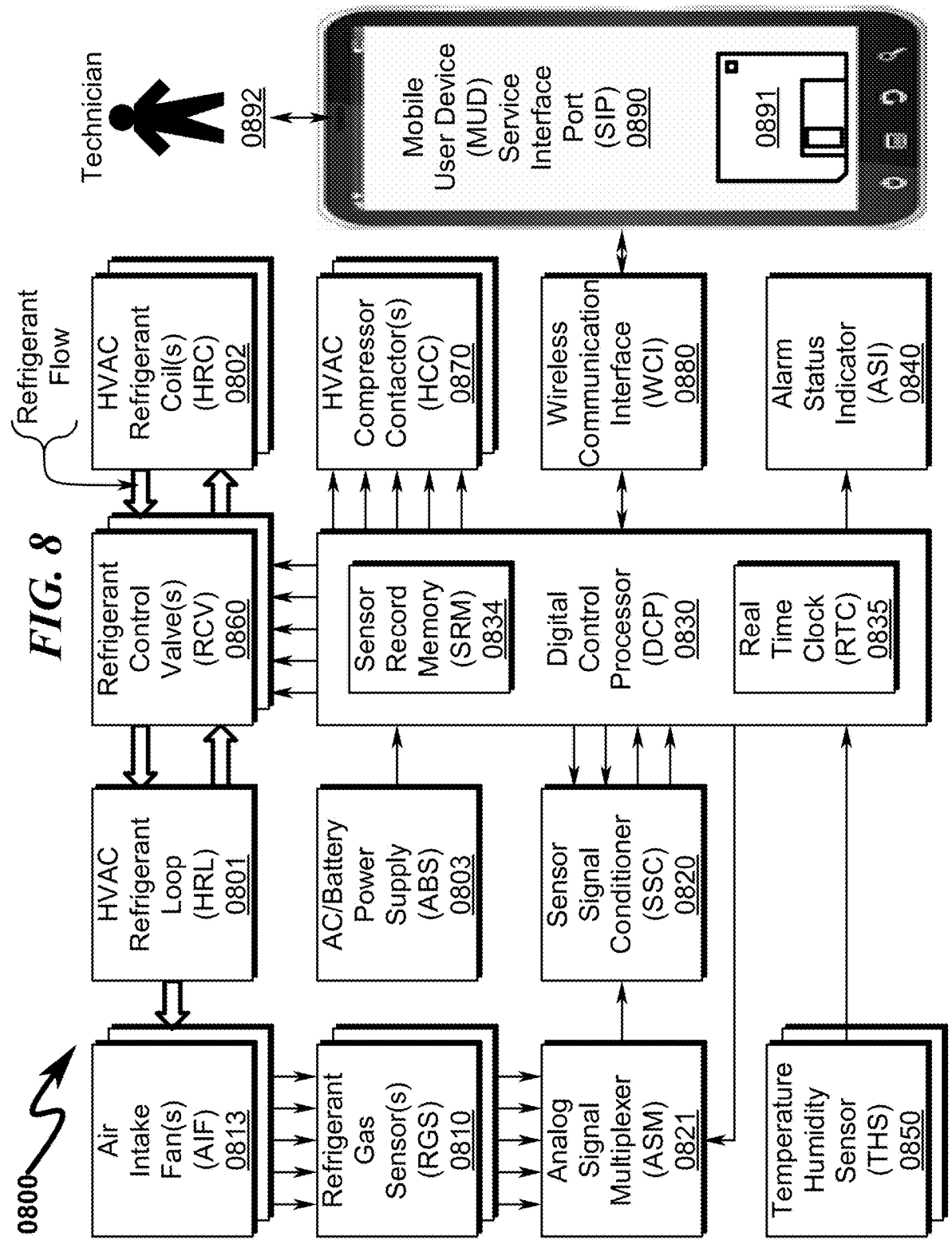
FIG. 8 illustrates a system block diagram depicting a preferred exemplary embodiment of a present invention refrigerant leak mitigation system (RLM) incorporating refrigerant control valves (RCV) to enable shutdown of a leaking HVAC refrigerant coil (HRC) augmented with HVAC compressor contactors (HCC) to enable shutdown of the HVAC compressor.

The present invention refrigerant leak mitigation (RLM) system discussed in FIG. 7 (0700) may be augmented as depicted in FIG. 8 (0800) with an HVAC compressor contactor (HCC) (0870) interface to the DCP (0830) such that when the DCP (0830) ALARM STATE deactivates the HVAC refrigerant flow loop (HRL) (0801) to one or more of the HVAC refrigerant coils (HRC) (0802) via the use of one or more refrigerant control valves (RCV) (0860), the HCC (0870) are deactivated to inhibit operation of the HVAC refrigerant compressor. In this circumstance the offending HRC (0802) may be isolated and the HRL (0801) inhibited from losing refrigerant. As with the discussion of the RLM configuration of FIG. 7 (0700), the ALARM STATE activated within the DCP (0730) may then activate appropriate alarms within the ASI (0840) and/or provide for an indication of the failing HRC (0802) via wireless communication (0880) to a mobile user device (0890) such as a tablet, smart phone, or other portable display device.

Dynamic Sensor Calibration

The present invention incorporates dynamic sensor calibration to affect refrigerant leak detection (RLD) and refrigerant leak containment (RLC). Because refrigerant sensing detectors (RSD) are manufactured with wide variances in sensor detection levels and electrical tolerances, under normal circumstances a conventional RSD must be calibrated at the factory and these calibration constants embedded within the microcontroller or other instrument used in the field for RLD/RLC purposes.

LCS/LDT Sensor Calibration—Introduction

The refrigerant gas sensor (RGS) used in both the LCS and LDT consists of a heater and metal oxide semiconductor material on a ceramic substrate with a detection sensitivity typically in the range of 10-1000 ppm. Higher target gas concentrations result in a decrease of sensing element resistance. The RGS is heated above ambient temperature by an internal heating element and requires a minimum warm up of about two minutes to stabilize.

The LCS and LDT typically integrate the RGS with a microcontroller to form a control loop consisting of two digital potentiometers, an operational amplifier, and internal comparator within the microcontroller. There are four phases of operation controlled by machine instructions executed by the microcontroller that are stored in a non-tangible computer-readable medium (typically within the microcontroller): WARMUP STATE, MONITOR STATE, GAS DETECTION STATE, and ALARM STATE.

WARMUP STATE Operation

It is imperative that during the WARMUP STATE the device be placed outside the area to be tested with a good source of "clean air" such as a stairwell, open lobby, etc.

Digital potentiometers U2 (100 k) and U3 (10 k) are controlled by U1, the microcontroller which controls the digital potentiometer wiper positions and direction with a full range of 100 steps. The wiper of U2, pin 5 (W) is wired as a rheostat and forms a sensor load resistor that is varied as the sensor is heated. The voltage developed across U2 (W) is connected to operation amplifier U4 that is set to a gain of 4. U4 output is connected to the internal microcontroller comparator input AIN0.

Digital potentiometer U3 (10 k) controlled by U1 functions as a reference voltage and is connected to the internal microcontroller comparator input AIN1.

At power up, the wiper of potentiometer U3 is set 2.5V which is applied to comparator input AIN1. Digital potentiometer U2 is initially set to a maximum resistance of 100 k and decremented in 1 k ohm steps until the output voltage of U4 connected to comparator input AIN0 drops to 2.5V and the internal comparator output flips to 0. This loop which requires about one second is then repeated during the selected warming time. The initial gas sensor resistance will steadily decrease as the sensor is heated until it stabilizes to a resistance of about 20 k ohms depending on quality of fresh air.

Monitor State

When the WARMUP STATE is complete and the device is relocated to the testing area, operation now switches to the MONITOR STATE that functions as a window comparator with U3 wiper output alternately switching from an upper threshold voltage of approximately 2.65V to a lower voltage threshold reference voltage of approximately 2.4V. The sensor output, which was calibrated in fresh air, is stabilized at 2.5V within the window of these upper and lower threshold voltages.

At this point one of three events will occur depending on refrigerant sensor voltage:
 (1) If air quality remains constant, sensor output will remain between the upper and lower threshold voltage levels.
 (2) If air within the testing area is "cleaner" causing sensor resistance to increase, that will cause a voltage decrease at AIN0 and if voltage drops below the lower threshold of 2.4V, the sensor will be recalibrated by adjusting U2 wiper back to 2.5V.
 (3) If air within the testing area contains refrigerant gas (as small as 20 ppm), sensor resistance will decrease causing an increase in AIN0 voltage until it exceeds the upper threshold of 2.65V. At that point the auto calibrate function is disabled and control changes to the GAS DETECTION STATE.

Gas Detection State

Once sensor output exceeds upper threshold voltage, control will increment the wiper output voltage of U3, connected to AIN1 in 50 mVDC increments and compare it to the sensor output at AIN0. The delay between each step is selectable in various amounts from 10 seconds to 2 minutes. A STEP COUNTER is incremented and stored as AIN1 chases the sensor voltage. The STEP COUNT is used as a diagnosis tool to determine severity of refrigerant gas leaks. If leak level exceeds 3.7 VDC or about 21 steps, system operation goes into ALARM STATE.

If gas leak concentrations decrease causing a decrease in sensor output, U3 will chase the sensor output decrementing by 50 mV and decrement step counter until system stabilizes or reenters MONITOR STATE.

Alarm State

When gas concentrations cause a sensor output greater than 3.7V then ALARM STATE is triggered. In the LCS product HVAC valve operation voltages would be disabled closing both solenoid valves, opening contacts to building management systems, and enabling an audible and visual alarm. In the LDT only the audible and visual alarms would be enabled. The system then reenters the WARMUP STATE by performing a remote reset or power reset.

Refrigerant Leak Mitigation Method Overview (0900)-(1000)

Figure 9:
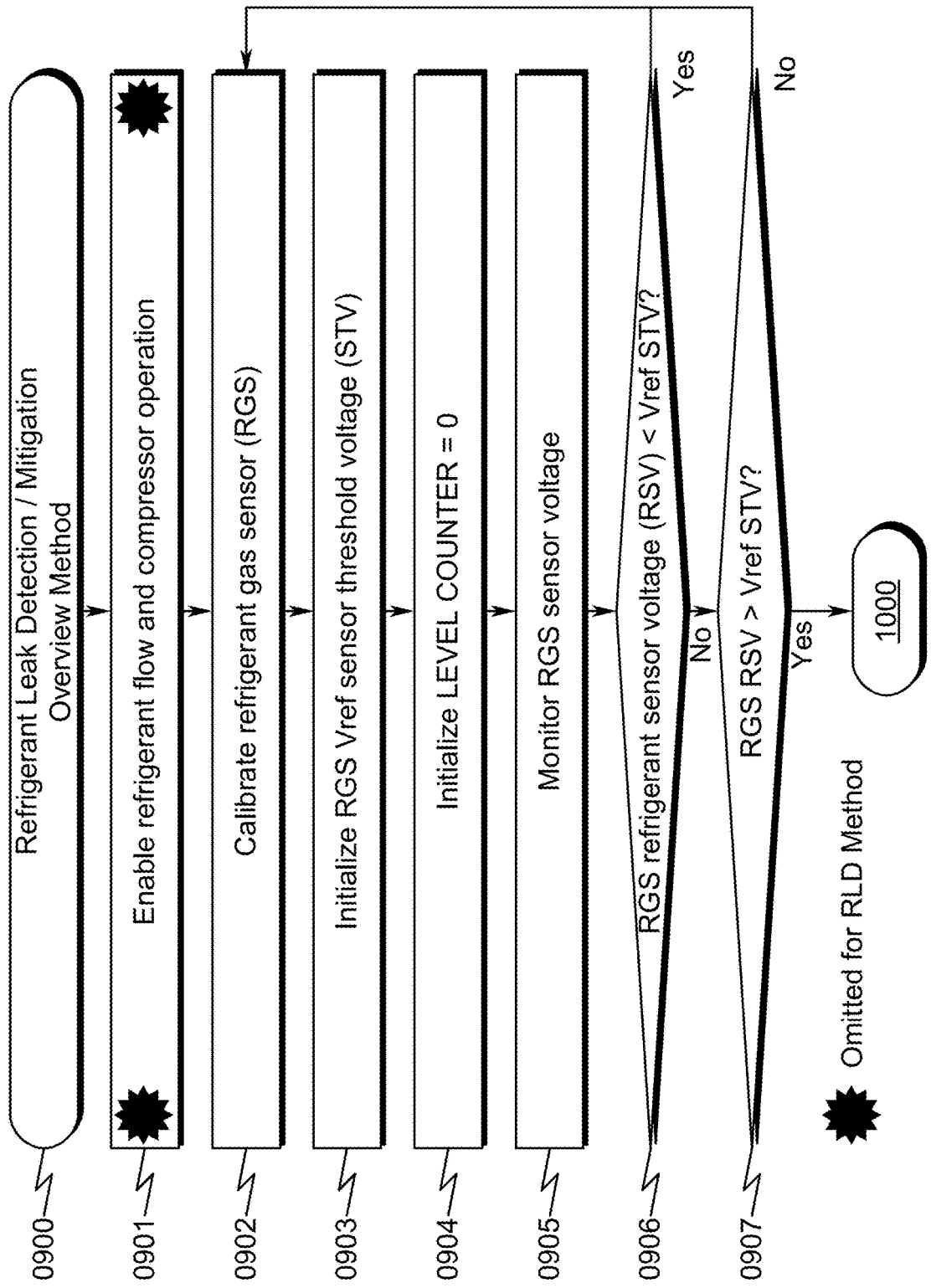
FIG. 9 illustrates a flowchart depicting a refrigerant leak detection/mitigation overview method (1 of 2)
Figure 10:
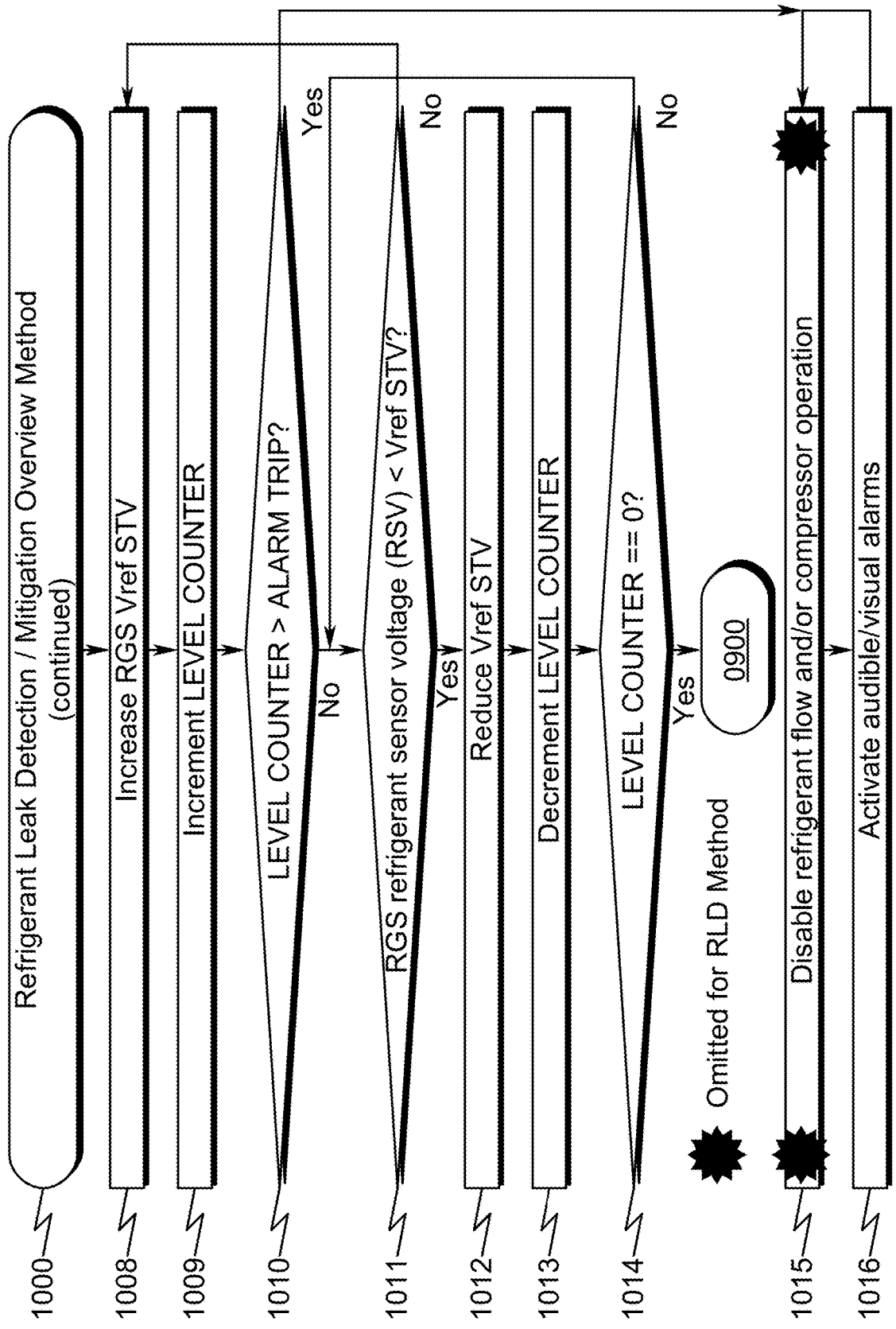
FIG. 10 illustrates a flowchart depicting a refrigerant leak detection/mitigation overview method (2 of 2)

An exemplary embodiment of a refrigerant leak mitigation (RLM) method overview is generally depicted in FIG. 9 (0900)-FIG. 10 (1000). This method encompasses many, if not all, of the steps associated with a corresponding refrigerant leak (RLD) detection method but provides additional steps in which the refrigerant control valves (RCV) are open/closed as necessary to isolate portions of the HVAC system experiencing a refrigerant leak. In the case of a RLD system implementation, the alarms present in the method steps are designed to alert an operator or repair technician as to the presence of a refrigerant leak and the severity of the leak in question.

Figure 16:
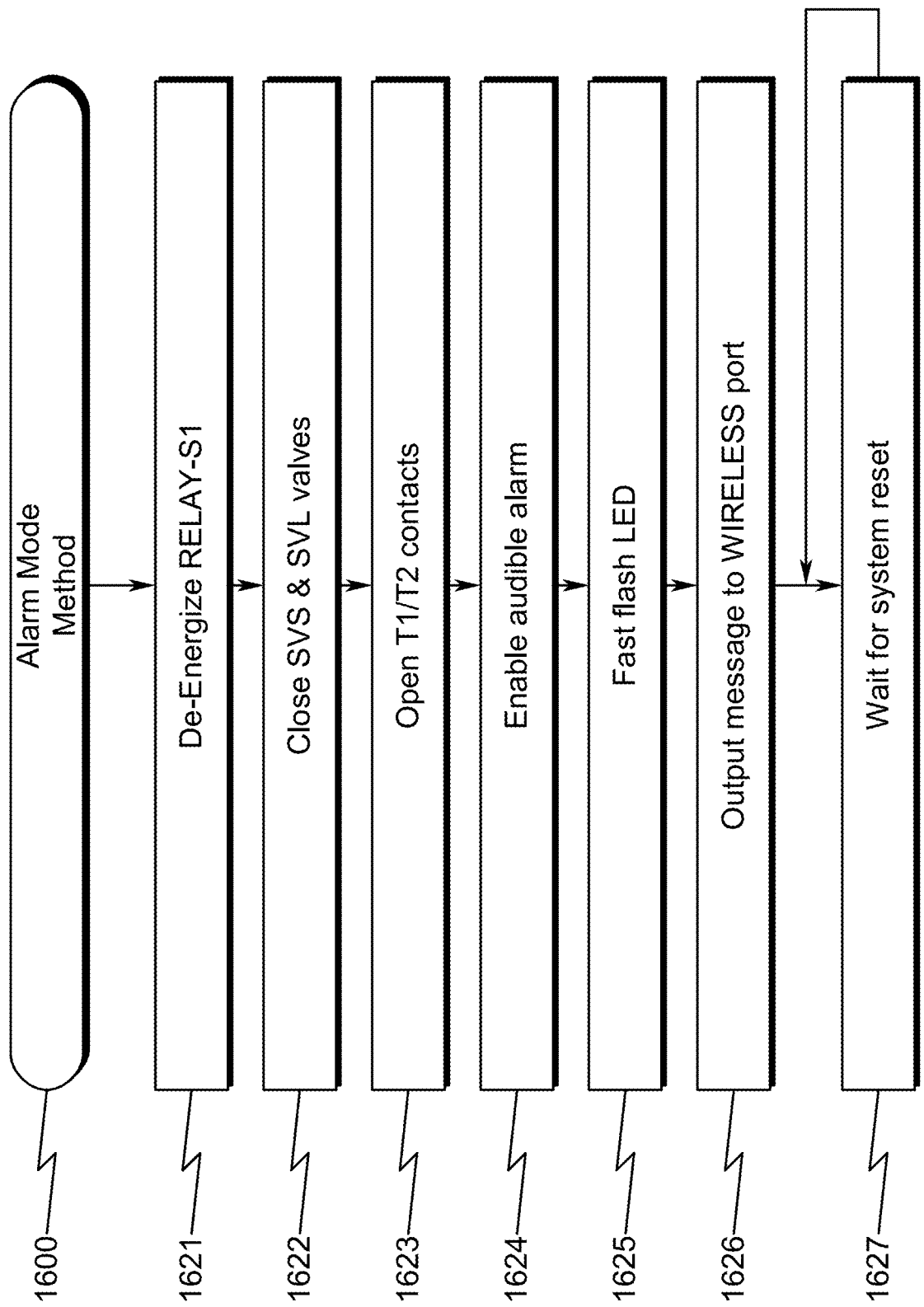
FIG. 16 illustrates a flowchart depicting a refrigerant leak detection/mitigation detail method (alarm mode) (6 of 6)

As generally depicted in FIG. 9 (0900)-FIG. 16 (1600), the RLM method comprises the following steps:
 (1) with the DCP, enabling refrigerant flow and compressor operation in the HVAC system (0901);
 (2) with the DCP and the SSC, calibrating the refrigerant gas sensor (RGS) (0902);
 (3) with the DCP and the SSC, initializing the RGS Vref sensor threshold voltage (STV) (0903);
 (4) with the DCP, initializing a LEVEL COUNTER to 0 (0904);
 (5) with the DCP and the SSC, monitoring the RGS refrigerant sensor voltage (RSV) (0905);
 (6) with the DCP and the SSC, determining if the RGS RSV is less than the Vref STV, and if so, proceeding to step (2) (0906);
 (7) with the DCP and the SSC, determining if the RGS RSV is greater than the Vref STV, and if not, proceeding to step (2) (0907);
 (8) with the DCP and the SSC, initializing the Vref STV (1008);
 (9) with the DCP, increasing the LEVEL COUNTER (1009);
 (10) with the DCP, determining if the LEVEL COUNTER is greater than an ALARM TRIP value, and if so, proceeding to step (15) (1010);
 (11) with the DCP and the SSC, determining if the RGS RSV is less than the RGS Vref STV, and if not, proceeding to step (8) (1011);
 (12) with the DCP and the SSC, reducing the RGS Vref STV (1012);
 (13) with the DCP, decrementing the LEVEL COUNTER (1013);
 (14) with the DCP, determining if the LEVEL COUNTER is 0, and if not, proceeding to step (11), otherwise proceeding to step (1) (1014);
 (15) with the DCP, disabling HVAC refrigerant flow and/or compressor operation (1015);
 (16) with the DCP, activating audible/visual alarms and proceeding to step (15) (1016).

One skilled in the art will recognize that these process steps are exemplary and may be rearranged, augmented, or redacted and will by necessity be adjusted based on application context and the hardware implementation of the system.

Refrigerant Leak Detection Method Overview (0900)-(1000)

An exemplary embodiment of a refrigerant leak detection (RLD) method overview is generally depicted in FIG. 9

(0900)-FIG. 10 (1000) wherein some of the steps of the RLM method are omitted. In the case of a RLD system implementation, the alarms present in the method steps are designed to alert an operator or repair technician as to the presence of a refrigerant leak and the severity of the leak in question.

As generally depicted in FIG. 9 (0900)-FIG. 16 (1600), the RLD method comprises the following steps:
(1) with the DCP and the SSC, calibrating the refrigerant gas sensor (RGS) (0902);
(2) with the DCP and the SSC, initializing the RGS Vref sensor threshold voltage (STV) (0903);
(3) with the DCP, initializing a LEVEL COUNTER to 0 (0904);
(4) with the DCP and the SSC, monitoring the RGS refrigerant sensor voltage (RSV) (0905);
(5) with the DCP and the SSC, determining if the RGS RSV is less than the Vref STV, and if so, proceeding to step (1) (0906);
(6) with the DCP and the SSC, determining if the RGS RSV is greater than the Vref STV, and if not, proceeding to step (1) (0907);
(7) with the DCP and the SSC, initializing the Vref STV (1008);
(8) with the DCP, increasing the LEVEL COUNTER (1009);
(9) with the DCP, determining if the LEVEL COUNTER is greater than an ALARM TRIP value, and if so, proceeding to step (14) (1010);
(10) with the DCP and the SSC, determining if the RGS RSV is less than the RGS Vref STV, and if not, proceeding to step (7) (1011);
(11) with the DCP and the SSC, reducing the RGS Vref STV (1012);
(12) with the DCP, decrementing the LEVEL COUNTER (1013);
(13) with the DCP, determining if the LEVEL COUNTER is 0, and if not, proceeding to step (10), otherwise proceeding to step (1) (1014);
(14) with the DCP, activating audible/visual alarms and proceeding to step (14) (1016).

One skilled in the art will recognize that these process steps are exemplary and may be rearranged, augmented, or redacted and will by necessity be adjusted based on application context and the hardware implementation of the system.

Refrigerant Leak Mitigation Method Detail (1100)-(1600)

Figure 11:
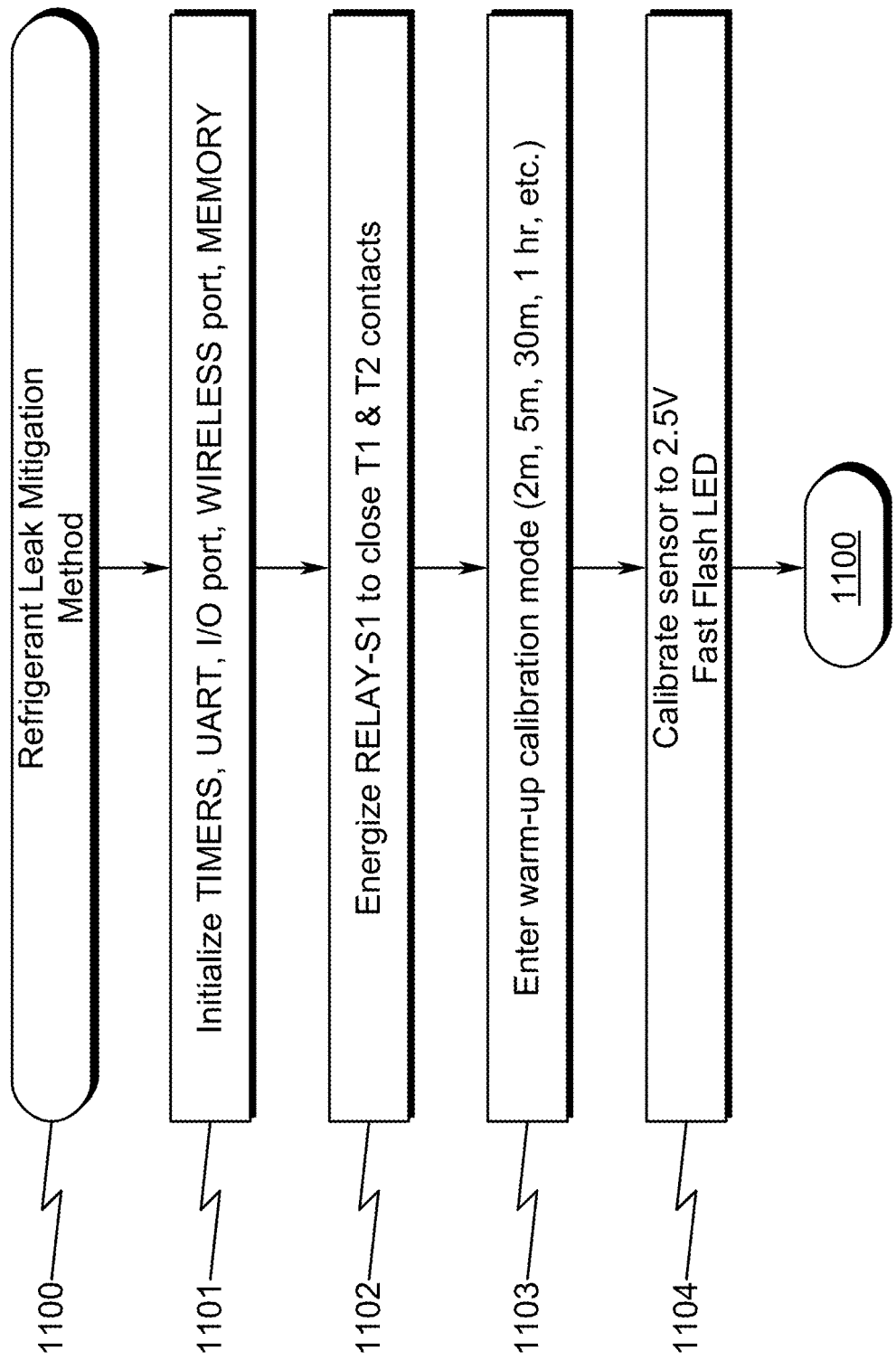
FIG. 11 illustrates a flowchart depicting a refrigerant leak detection/mitigation detail method (1 of 6)
Figure 12:
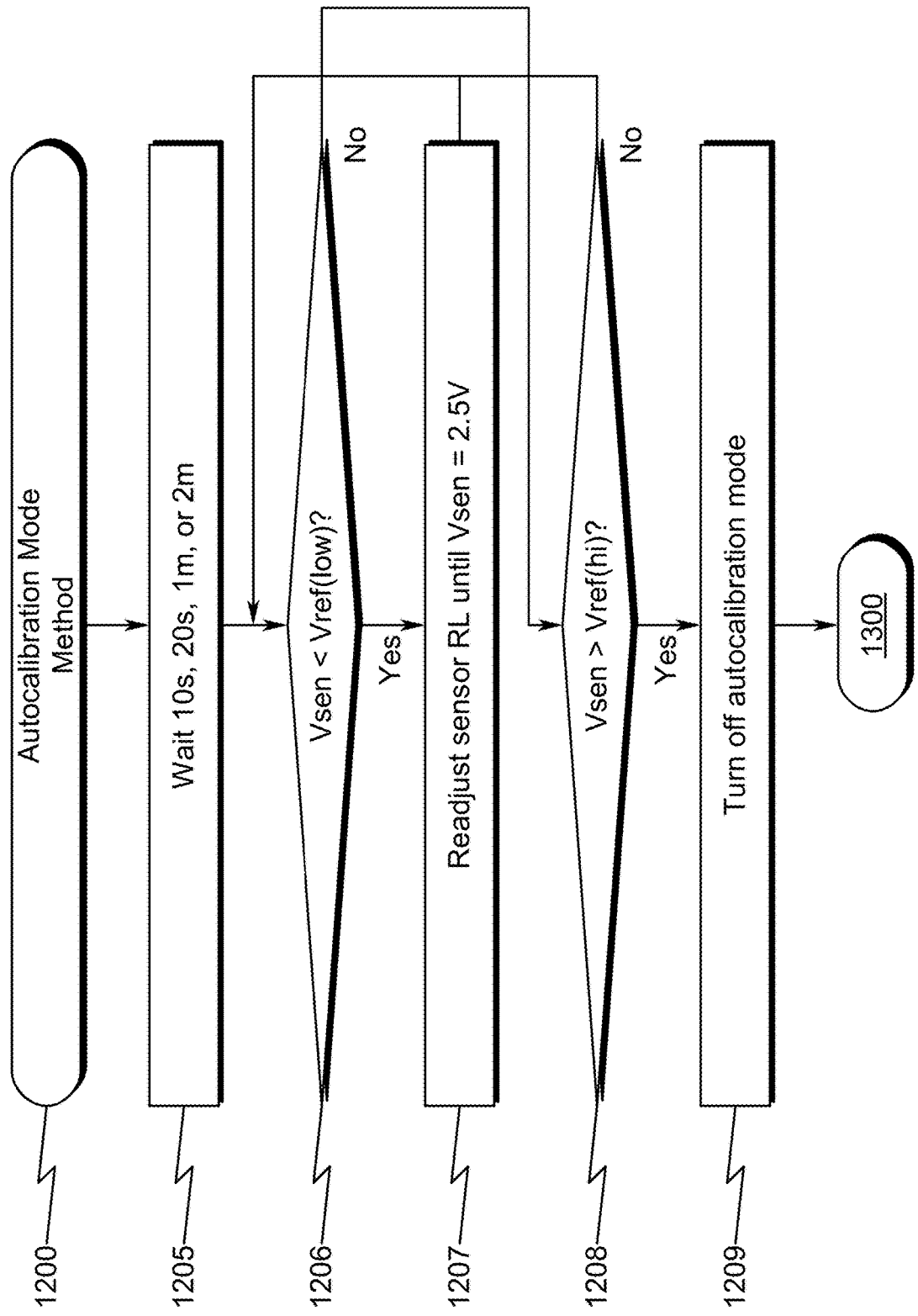
FIG. 12 illustrates a flowchart depicting a refrigerant leak detection/mitigation detail method (autocalibrate mode) (2 of 6)
Figure 13:
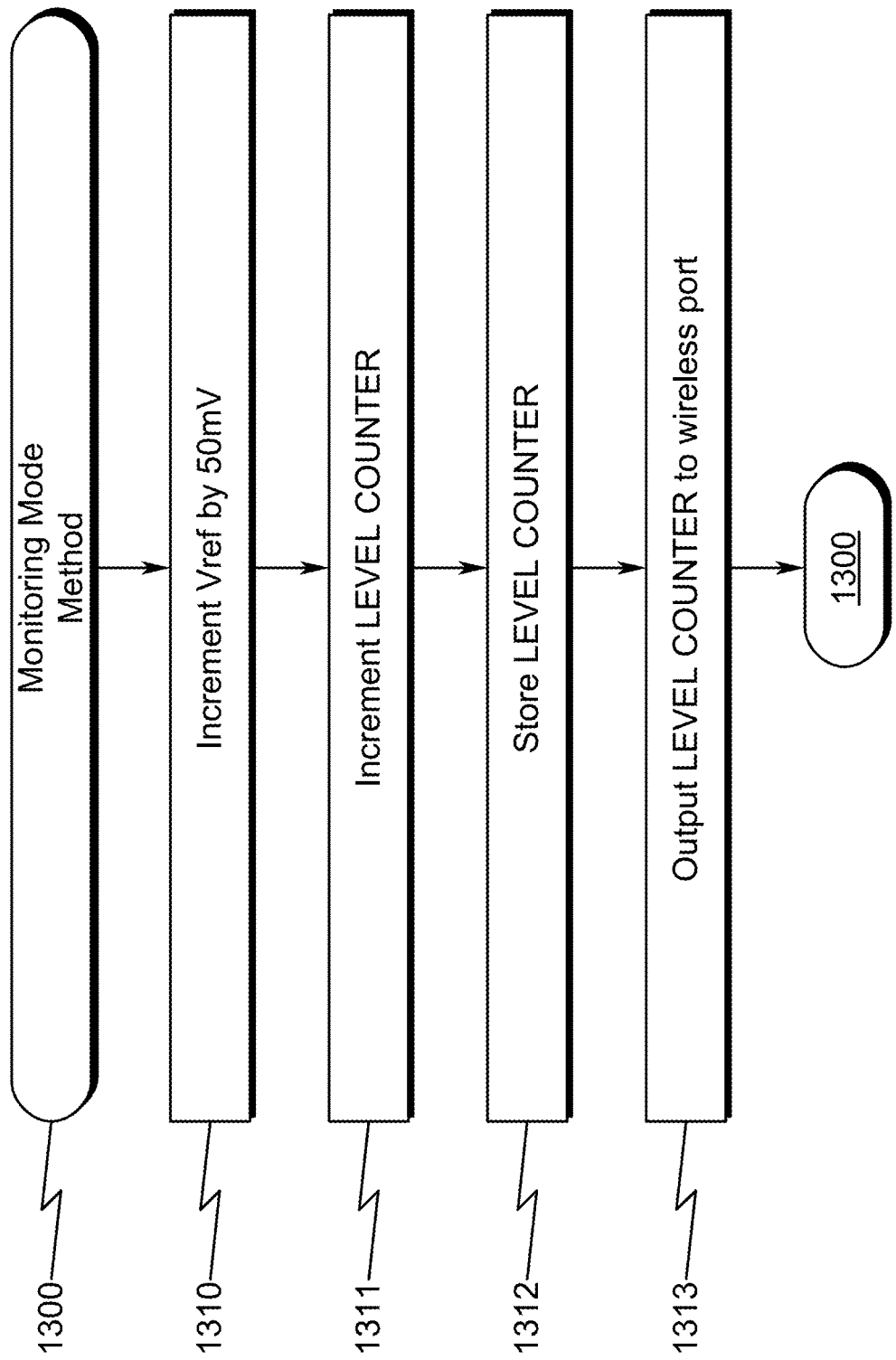
FIG. 13 illustrates a flowchart depicting a refrigerant leak detection/mitigation detail method (monitoring mode) (3 of 6)
Figure 14:
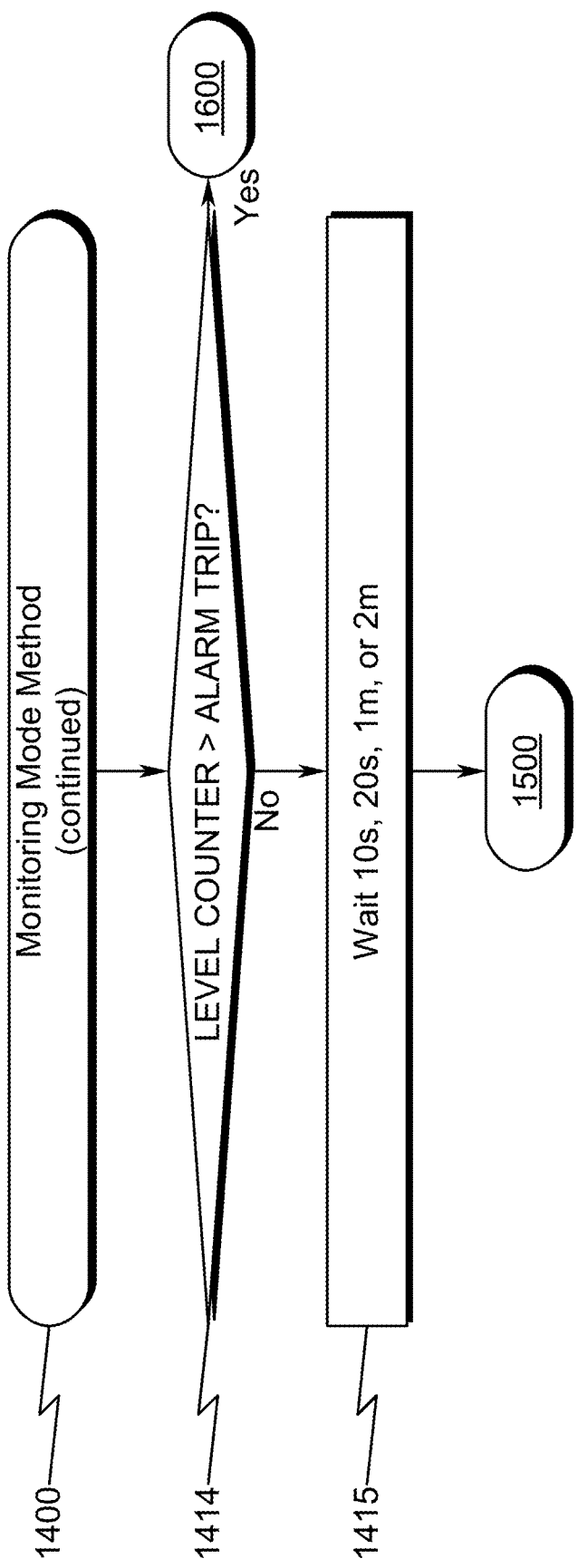
FIG. 14 illustrates a flowchart depicting a refrigerant leak detection/mitigation detail method (monitoring mode continued) (4 of 6)
Figure 15:
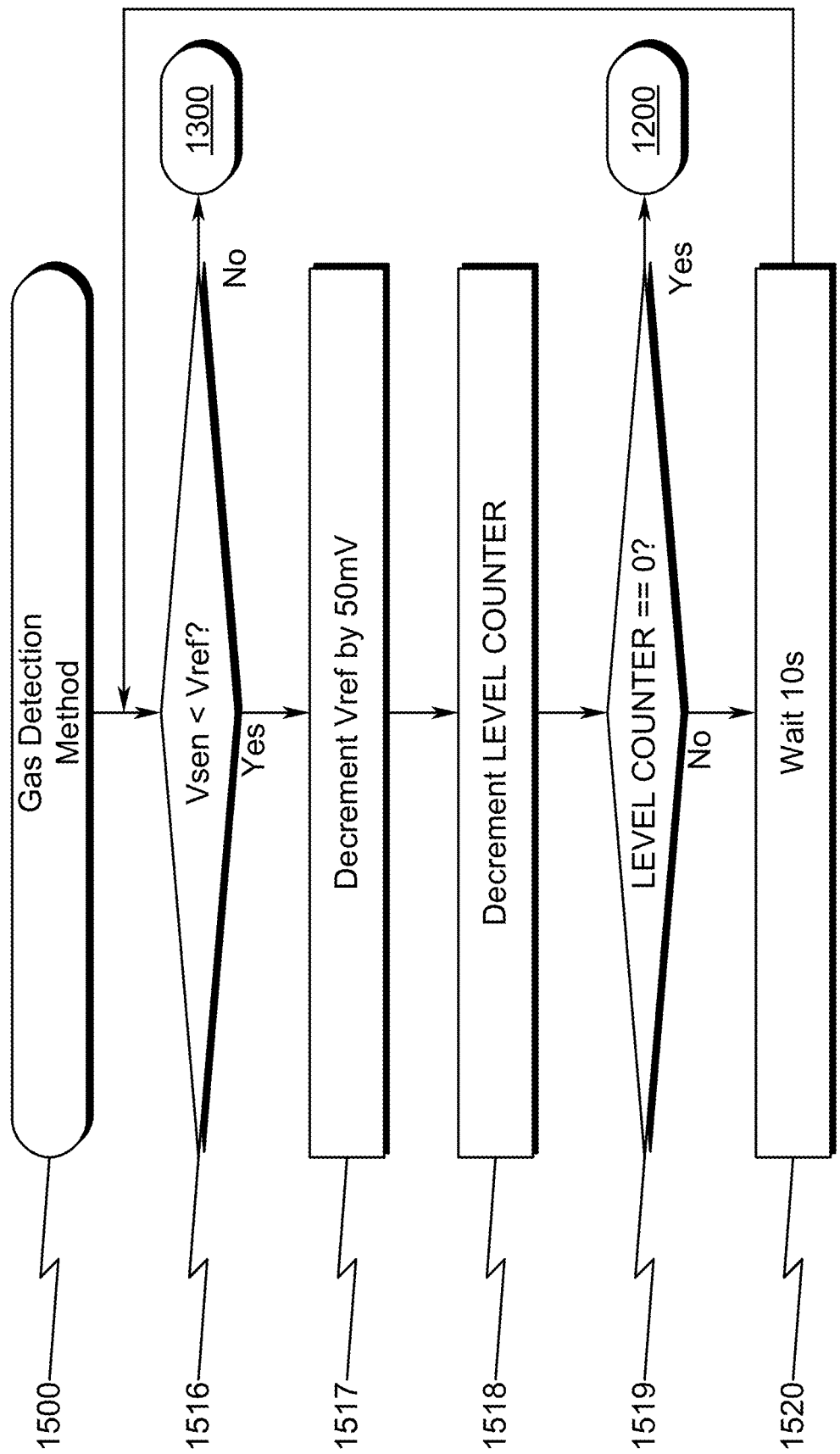
FIG. 15 illustrates a flowchart depicting a refrigerant leak detection/mitigation detail method (gas detection mode) (5 of 6)

Additional detail of a refrigerant leak mitigation (RLM) method is generally depicted in FIG. 11 (1100)-FIG. 16 (1600). This method encompasses many, if not all, of the steps associated with a corresponding refrigerant leak (RLD) detection method but provides additional steps in which the refrigerant control valves (RCV) are open/closed as necessary to isolate portions of the HVAC system experiencing a refrigerant leak. In the case of a RLD system implementation, the alarms present in the method steps are designed to alert an operator or repair technician as to the presence of a refrigerant leak and the severity of the leak in question.

As generally depicted in FIG. 11 (1100)-FIG. 16 (1600), the RLM method detail comprises the following steps:
(1) with the DCP, initializing TIMERS, UART, I/O PORTS, WIRELESS PORT, and MEMORY (1101);
(2) with the DCP, energizing RELAY-S1 to close T1 & T2 contacts for RFV and HCC (1102);
(3) with the DCP, entering a warm-up calibration mode for a selected timer period (2 m, 5 m, 30 m, 1 hr, etc.) (1103);
(4) with the DCP and the SSC, calibrating the RGS to 2.5V and indicating calibration mode with a flashing LED (1104);
(5) with the DCP, entering AUTOCALIBRATION MODE by delaying a selected time period (10 s, 20 s, 1 m, 2 m, etc.) (1205);
(6) with the DCP and the SSC, determining if the RGS Vsen output is less than the Vref low trip level, and if not, proceeding to step (8) (1206);
(7) with the DCP and the SSC, readjusting the RGS sensor RL until Vsen=2.5V, and proceeding to step (6) (1207);
(8) with the DCP and the SSC, determining if the RGS Vsen output is greater than the Vref low trip level, and if not, proceeding to step (6) (1208);
(9) with the DCP, disabling AUTOCALIBRATION MODE (1209);
(10) with the DCP and the SSC, entering MONITORING MODE by incrementing Vref by 50 mV (1310);
(11) with the DCP, incrementing the LEVEL COUNTER (1311);
(12) with the DCP, storing the LEVEL COUNTER in local memory for later retrieval (1312);
(13) with the DCP, outputting the LEVEL COUNTER to the wireless communication interface (WCI) port (1313);
(14) with the DCP, determining if the LEVEL COUNTER is greater than an ALARM TRIP threshold value, and if so, proceeding to step (21) (1414);
(15) with the DCP, delaying a selected period of time (10 s, 20 s, 1 m, 2 m, etc.) (1415);
(16) with the DCP and the SSC, entering a GAS DETECTION MODE and determining if the RGS Vsen is less than Vref, and if not, proceeding to step (10) (1516);
(17) with the DCP and the SSC, decrementing Vref by 50 mV (1517);
(18) with the DCP, decrementing the LEVEL COUNTER (1518);
(19) with the DCP, determining if the LEVEL COUNTER is 0, and if so, proceeding to step (5) (1519);
(20) with the DCP, delaying a selected time period (10 s, 20 s, etc.) (1520);
(21) with the DCP, entering an ALARM MODE, and de-energizing HVAC RELAY-S1 (1621);
(22) with the DCP, closing SVS and SVL refrigerant control valves (RCV) to isolate a HVAC refrigerant coil (1622);
(23) with the DCP, opening T1/T2 contacts in a HVAC relay (1623);
(24) with the DCP, enabling an audible alarm (1624);
(25) with the DCP, enabling a LED visual alarm (1625);
(26) with the DCP, outputting a message to the WIRELESS PORT (1626); and
(27) with the DCP, halting HVAC refrigerant flow and waiting for a system reset and proceeding to step (27) (1627).

One skilled in the art will recognize that these process steps are exemplary and may be rearranged, augmented, or redacted and will by necessity be adjusted based on application context and the hardware implementation of the system.

State Machine Detail (1700)-(2000)

State Machine Overview (1700)

Figure 17:
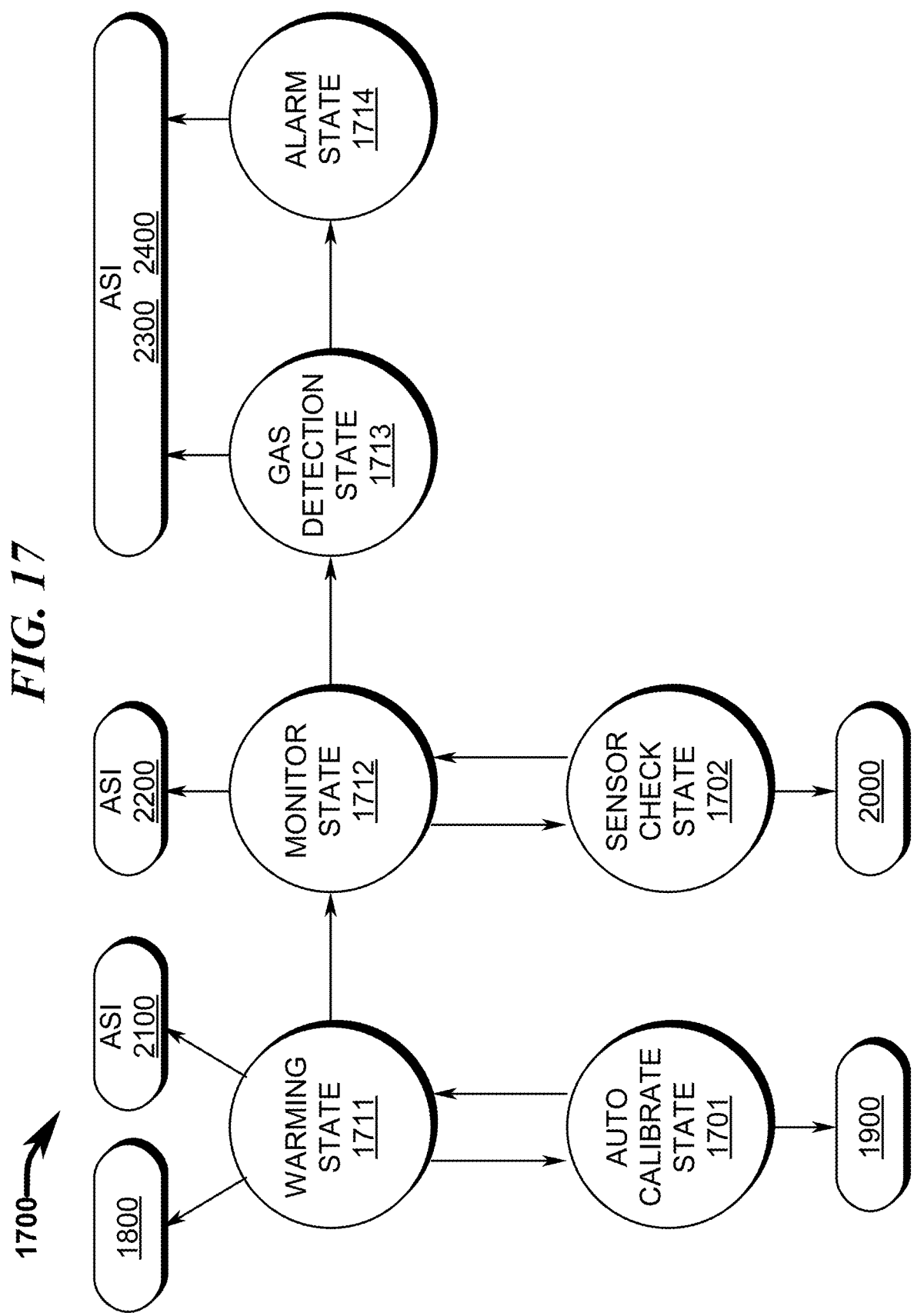
FIG. 17 illustrates a state diagram depicting various states associated with the CCL and DCP.
Figure 20:
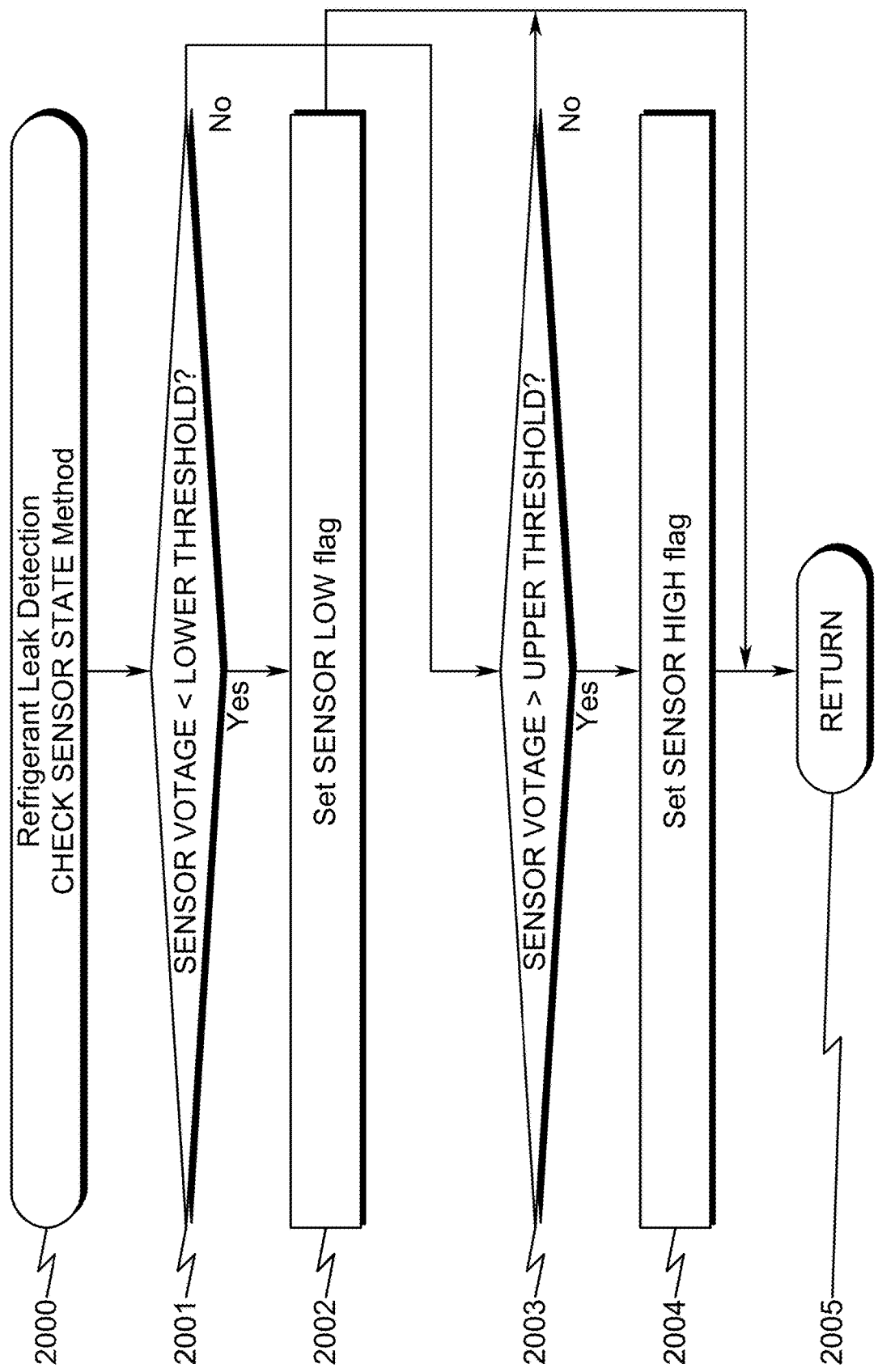
FIG. 20 illustrates a flowchart depicting a refrigerant leak detection method (check sensor state)

A more detailed overview of the closed control loop (CCL) implemented between the DCP and the SSC is generally depicted in FIG. 17 (1700)-FIG. 20 (2000). Referencing the state machine diagram depicted in FIG. 17 (1700), it can be seen that the CCL comprises major states consisting of: a WARMING STATE (1711), a MONITORING STATE (1712), a GAS DETECTION STATE (1713), and an ALARM STATE (1714), and is supplemented with ancillary AUTO CALIBRATION STATE (1701) and SENSOR CHECK STATE (1702).

Figure 25:
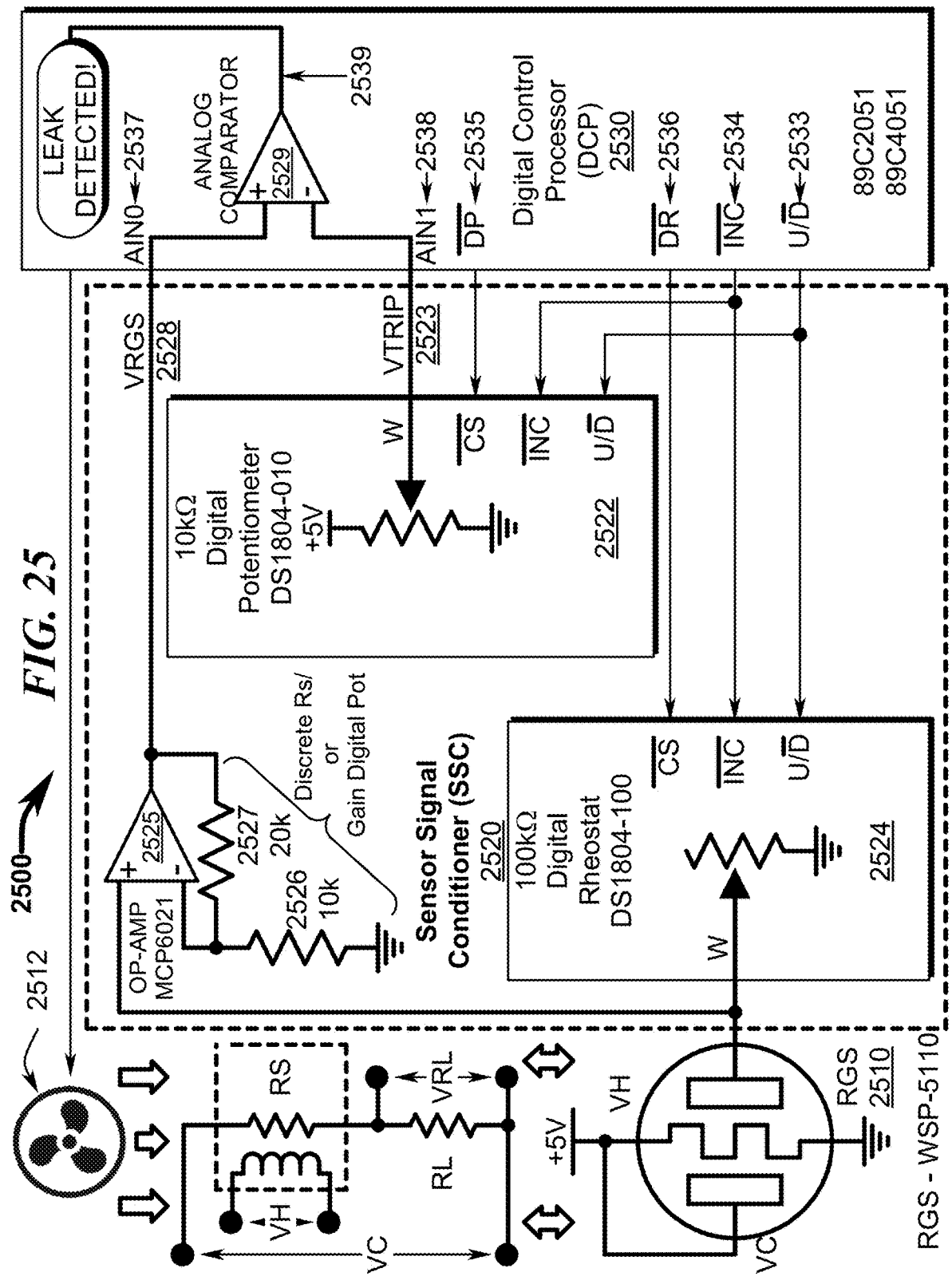
FIG. 25 illustrates a schematic depicting a preferred exemplary sensor signal conditioner (SSC) embodiment.
Figure 64:
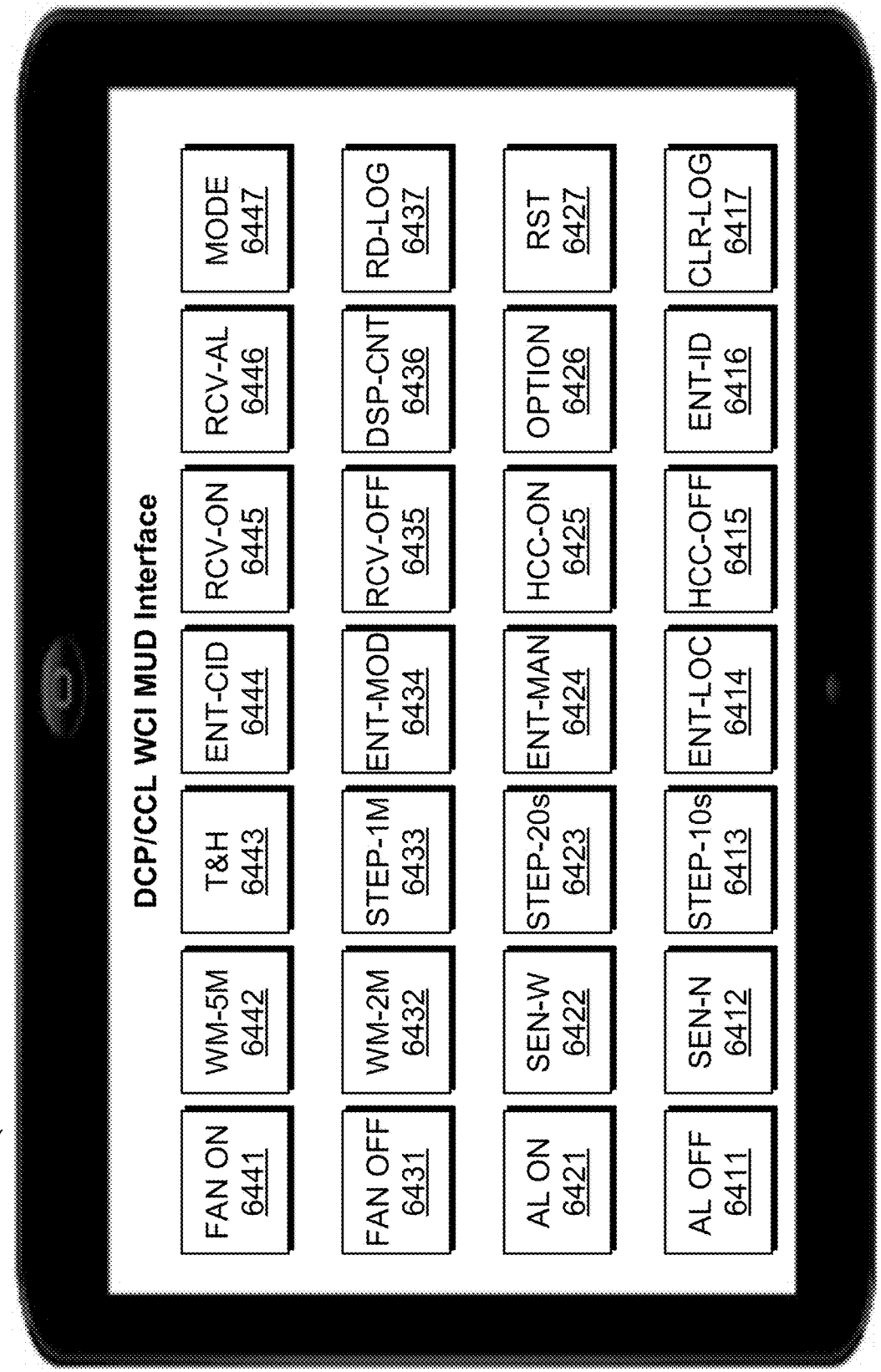
FIG. 64 illustrates a typical DCP/CCL mobile user device (MUD) status and control tablet interface useful in some preferred invention embodiments.

The following discussion implements a CCL between the DCP and the SSC with respect to hardware depicted and described in detail in FIG. 25 (2500)-FIG. 64 (6400).

Warming State (1800)

Figure 18:
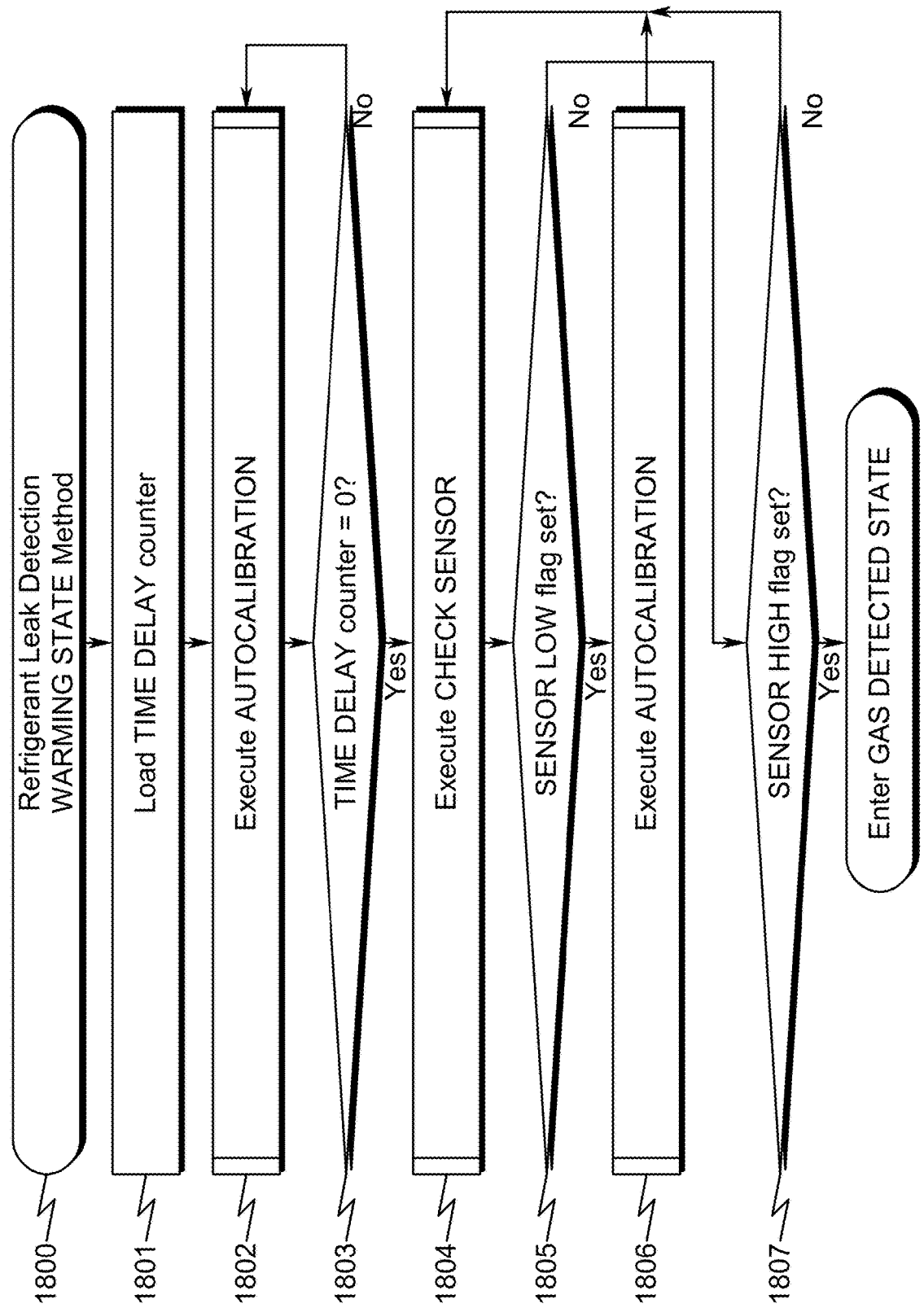
FIG. 18 illustrates a flowchart depicting a refrigerant leak detection method (warming state)
Figure 19:
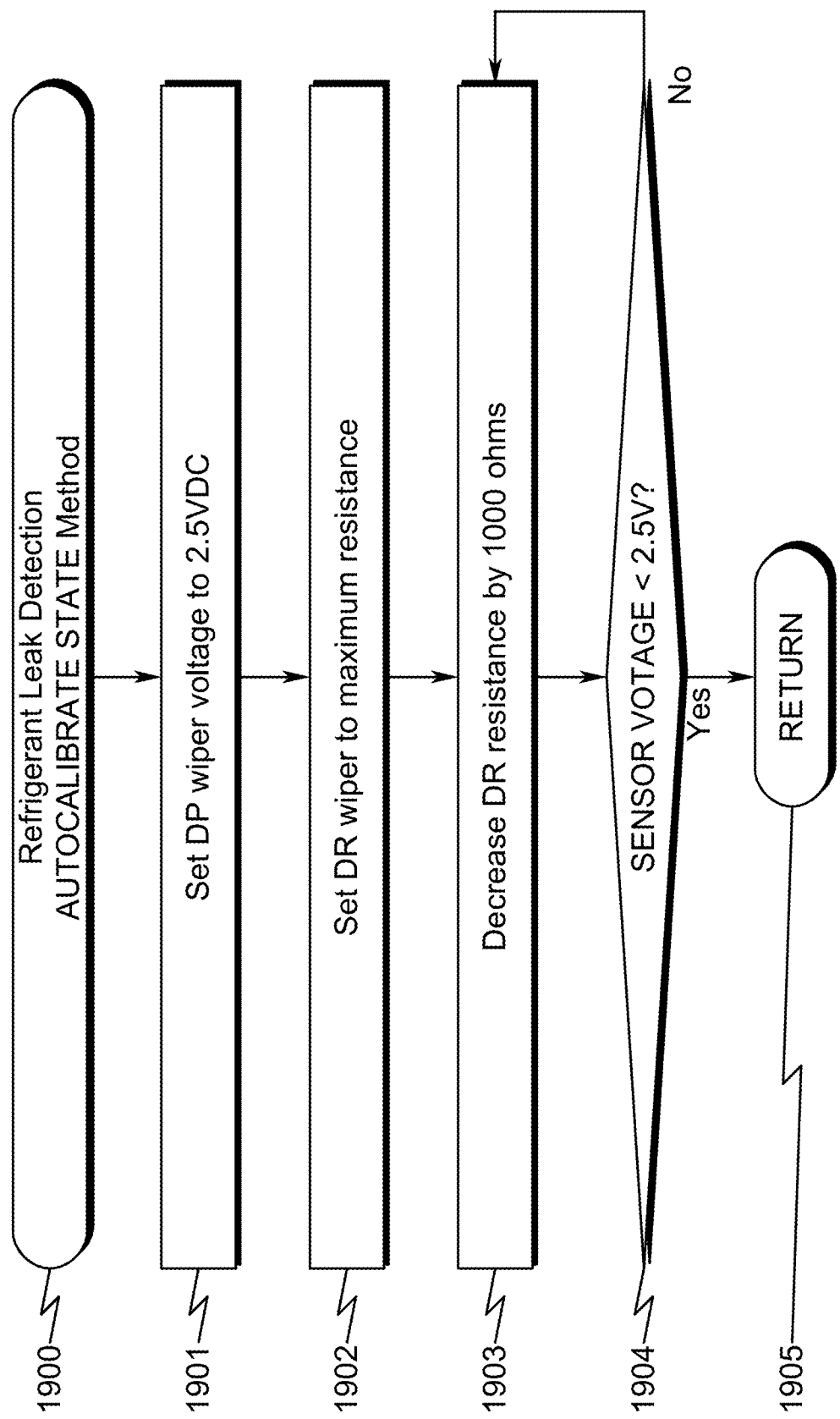
FIG. 19 illustrates a flowchart depicting a refrigerant leak detection method (autocalibrate state)

Referencing FIG. 18 (1800), the WARMING STATE typically incorporates the following control logic method:
(1) Loading a TIME DELAY counter with a timeout value (1801);
(2) Executing an AUTOCALIBRATION routine (as generally depicted in FIG. 19 (1900)) (1802);
(3) Determining if the TIME DELAY counter is zero, and if not, proceeding to step (2) (1803);
(4) Executing a CHECK SENSOR routine (as generally depicted in FIG. 20 (2000)) (1804);
(5) Determining if the SENSOR LOW flag is set, and if not, proceeding to step (7) (1805);
(6) Executing an AUTOCALIBRATION routine (as generally depicted in FIG. 19 (1900)) and proceeding to step (4) (1806);
(7) Determining if the SENSOR HIGH flag is set, and if not, proceeding to step (7) (1807); and
(8) Invoking the GAS DETECTION STATE (1808).

One skilled in the art will recognize that these process steps are exemplary and may be rearranged, augmented, or redacted and will by necessity be adjusted based on application context and the hardware implementation of the system.

Auto Calibration State (1900)

Referencing FIG. 19 (1900), the AUTO CALIBRATION STATE typically incorporates the following control logic method:
(1) Setting the digital potentiometer (DP) voltage to approximately a supply midpoint (typically 2.5 VDC) (1901);
(2) Setting the digital rheostat (DP) wiper to maximum resistance (1902);
(3) Decreasing the digital rheostat (DR) resistance by one step (typically 1000 ohms for a 100,000 ohm rheostat configuration) (1903);
(4) Determining if the detected RGS sensor voltage is less than the supply midpoint set in step (1), and if not, proceeding to step (3) (1904); and
(5) Returning to the process caller (1905).

One skilled in the art will recognize that these process steps are exemplary and may be rearranged, augmented, or redacted and will by necessity be adjusted based on application context and the hardware implementation of the system.

Check Sensor State (2000)

Referencing FIG. 20 (2000), the CHECK SENSOR STATE typically incorporates the following control logic method:

(1) Determining if the detected sensor voltage is less than a lower threshold value (LTV), and if not, proceeding to step (3) (2001);
(2) Setting a SENSOR LOW flag and proceeding to step (5) (2002);
(3) Determining if the detected sensor voltage is greater than an upper threshold value (UTV), and if not, proceeding to step (5) (2003);
(4) Setting a SENSOR HIGH flag (2004); and
(5) Returning to the process caller (2005).

One skilled in the art will recognize that these process steps are exemplary and may be rearranged, augmented, or redacted and will by necessity be adjusted based on application context and the hardware implementation of the system.

It can be seen from this exemplary process flow that the system attempts to track the detected sensor voltage between a lower threshold voltage (LTV) and an upper threshold voltage (UTV). Deviation above this window triggers an adjustment of the Vref detection threshold voltage and/or an adjustment of the LEVEL COUNTER that determines if repeated measurements indicate a true refrigerant leak as compared to an intermittent detection of an excursion of the RGS sensor value from the nominal ambient non-leak conditions.

Alarm Status Indicator (ASI) Operation (1700), (2100)-(2400)

The present invention describes a hardware system that may be utilized for refrigerant leak detection (RLD) and/or refrigerant leak mitigation (RLM). The difference between the application contexts for these two configurations generally revolves around whether the system is permanently or semi-permanently installed in the HVAC system and whether the system is configured to isolate at least a part of the HVAC refrigerant loop if a refrigerant leak is detected. The alternative to this "installed" HVAC RLM system is the use of a "portable" RLD system that is typically configured with battery power and suitable for placement near a portion of a HVAC system experiencing a leak that has been undiagnosed and has yet to be located. In this manner, one or more portable RLD systems may be placed around a number of refrigerant coils within a suspect HVAC system and then interrogated using a MUD or via the ASI interface to determine if a refrigerant leak has been detected.

The following discussion addresses situations in which the RLD is configured in a very modest configuration with the ADI constituting only a single indicator LED that may be flashed at varying rates or duty cycles in order to indicate which STATE the RLD is operating. In this fashion, the RLD may be portably placed within a suspect HVAC system, activated, and the ASI LED pulse rate and/or duty cycle inspected to determine if a refrigerant leak has been detected.

ASI State Overview (1700)

An overview of the states for the ASI is generally depicted in FIG. 17 (1700) where it can be seen that provisions for separate alarms are provided for in the WARMING STATE (1711), MONITOR STATE (1713), and GAS DETECTION STATE (1715)/ALARM STATE (1716). These alarm conditions will now be discussed in detail in terms of a preferred exemplary ASI operation method.

ASI Operation Method (2100)-(2400)

Figure 21:
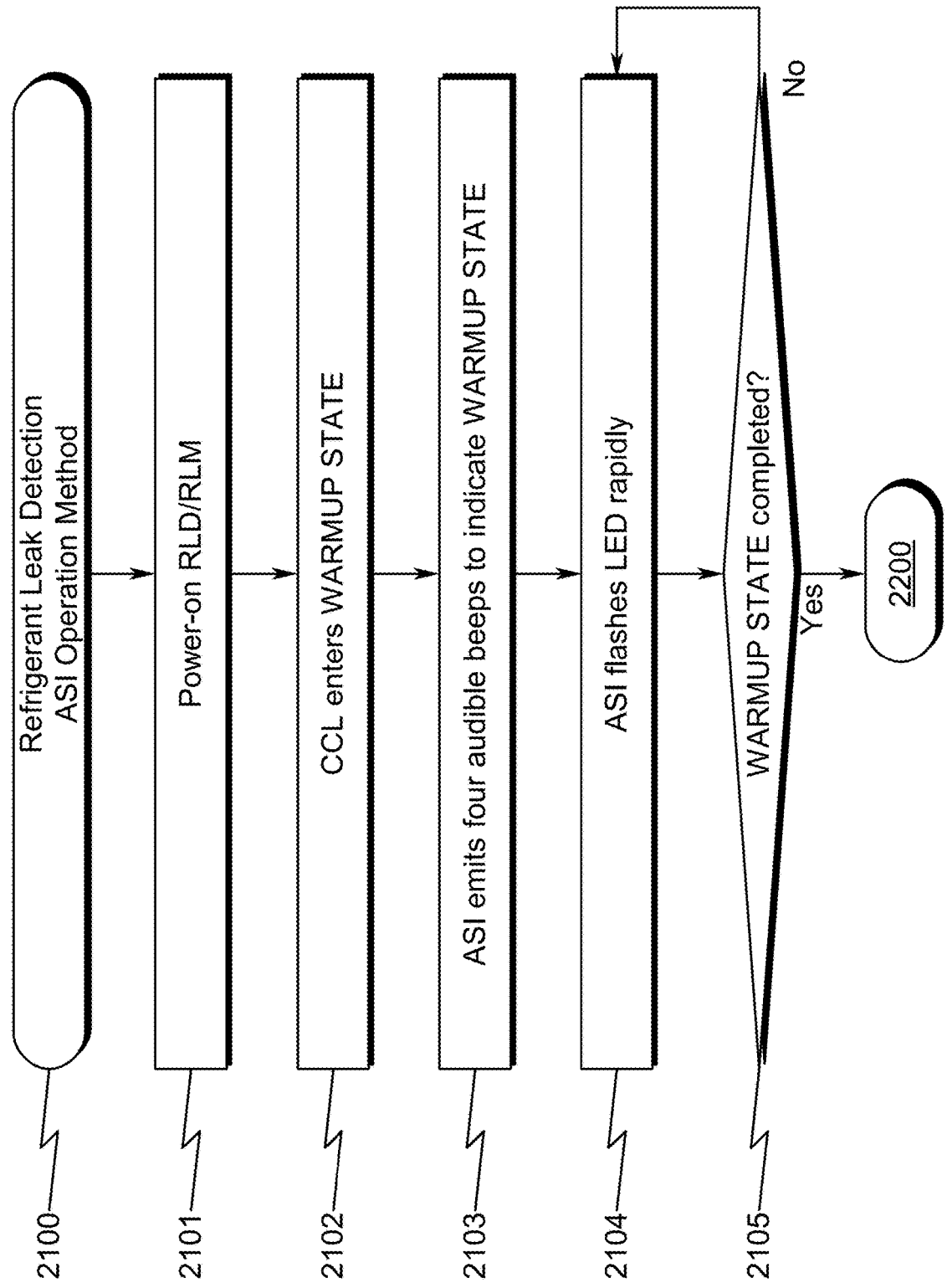
FIG. 21 illustrates a flowchart depicting a refrigerant leak detection ASI operation method (1 of 4)
Figure 22:
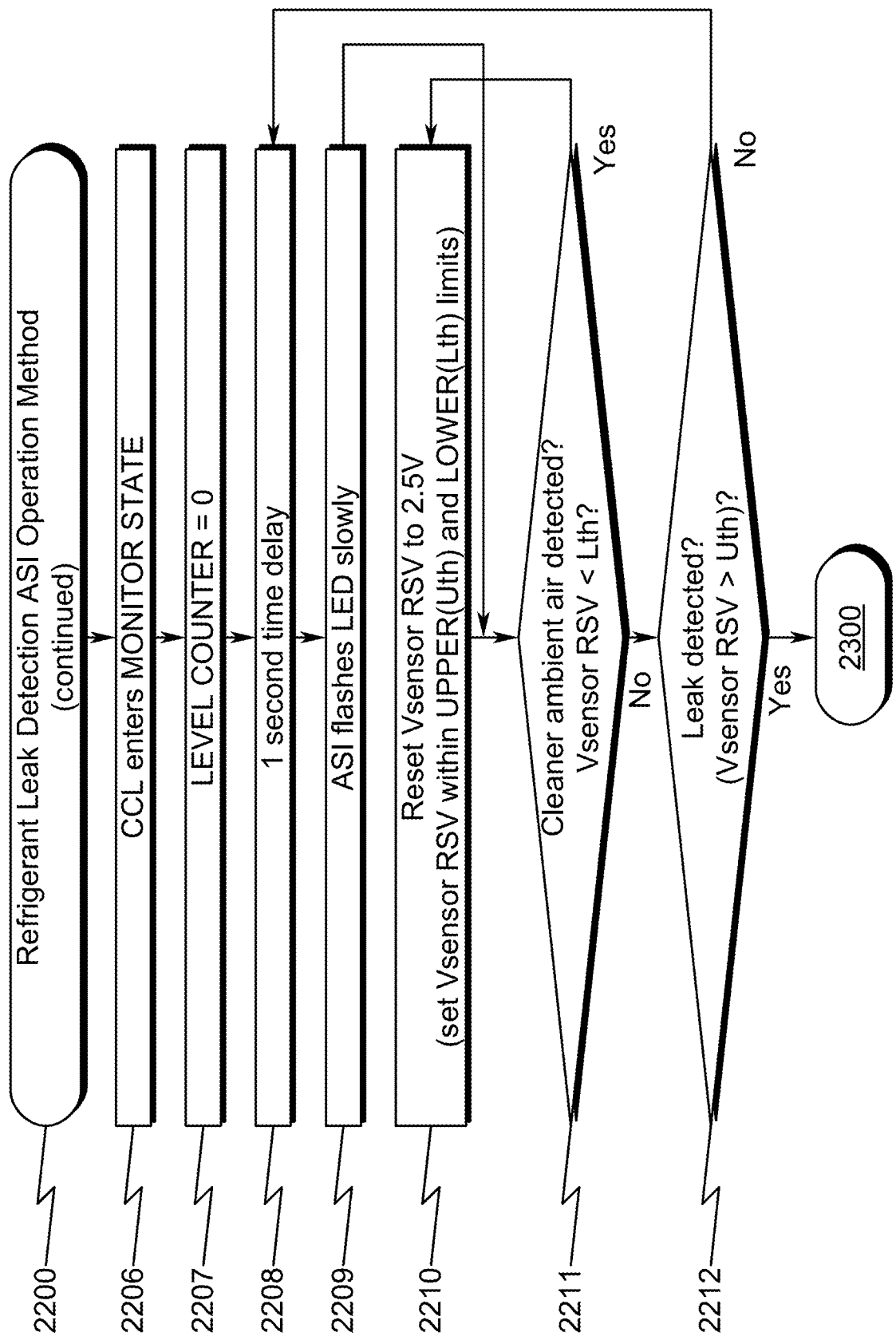
FIG. 22 illustrates a flowchart depicting a refrigerant leak detection ASI operation method (2 of 4)
Figure 23:
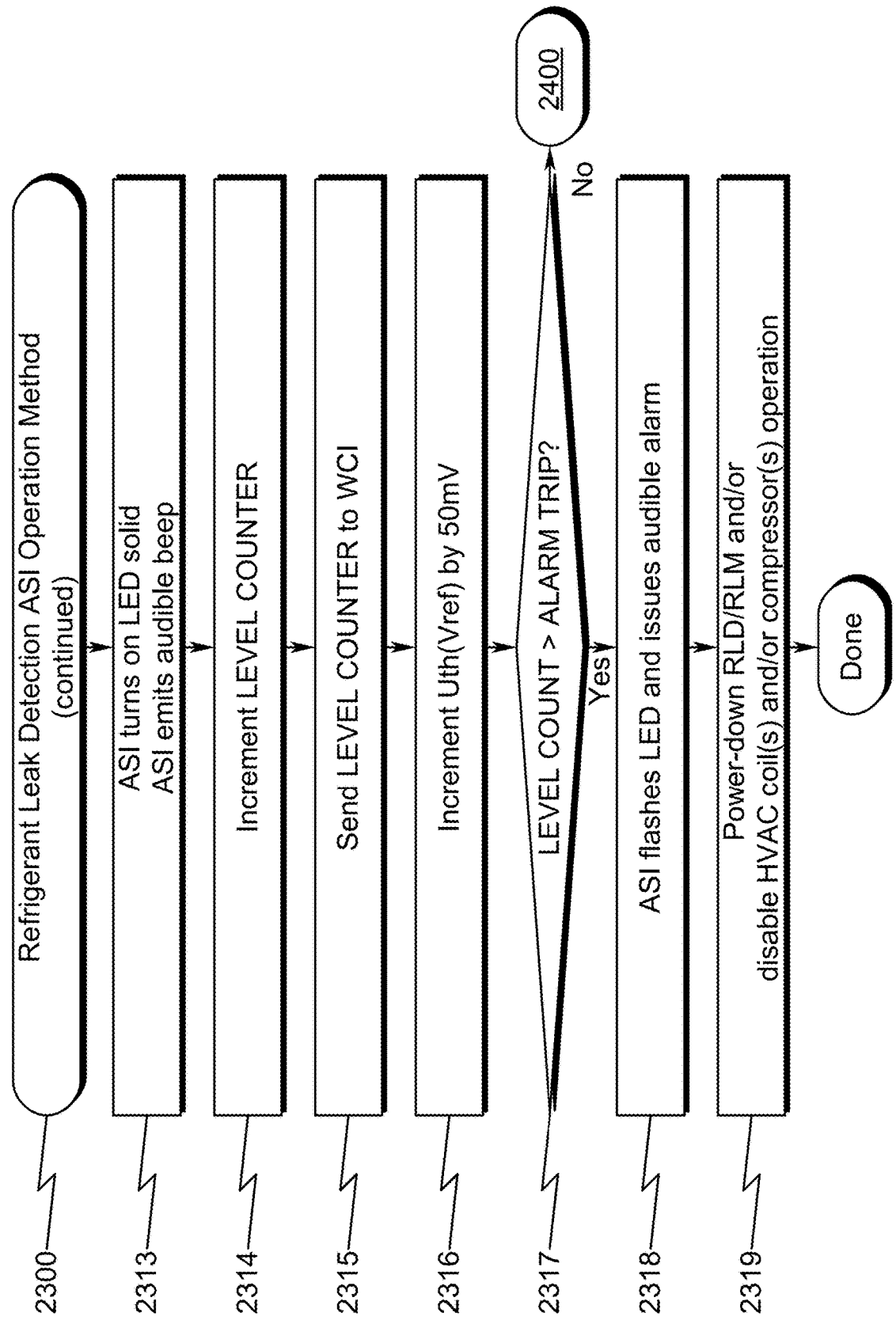
FIG. 23 illustrates a flowchart depicting a refrigerant leak detection ASI operation method (3 of 4)
Figure 24:
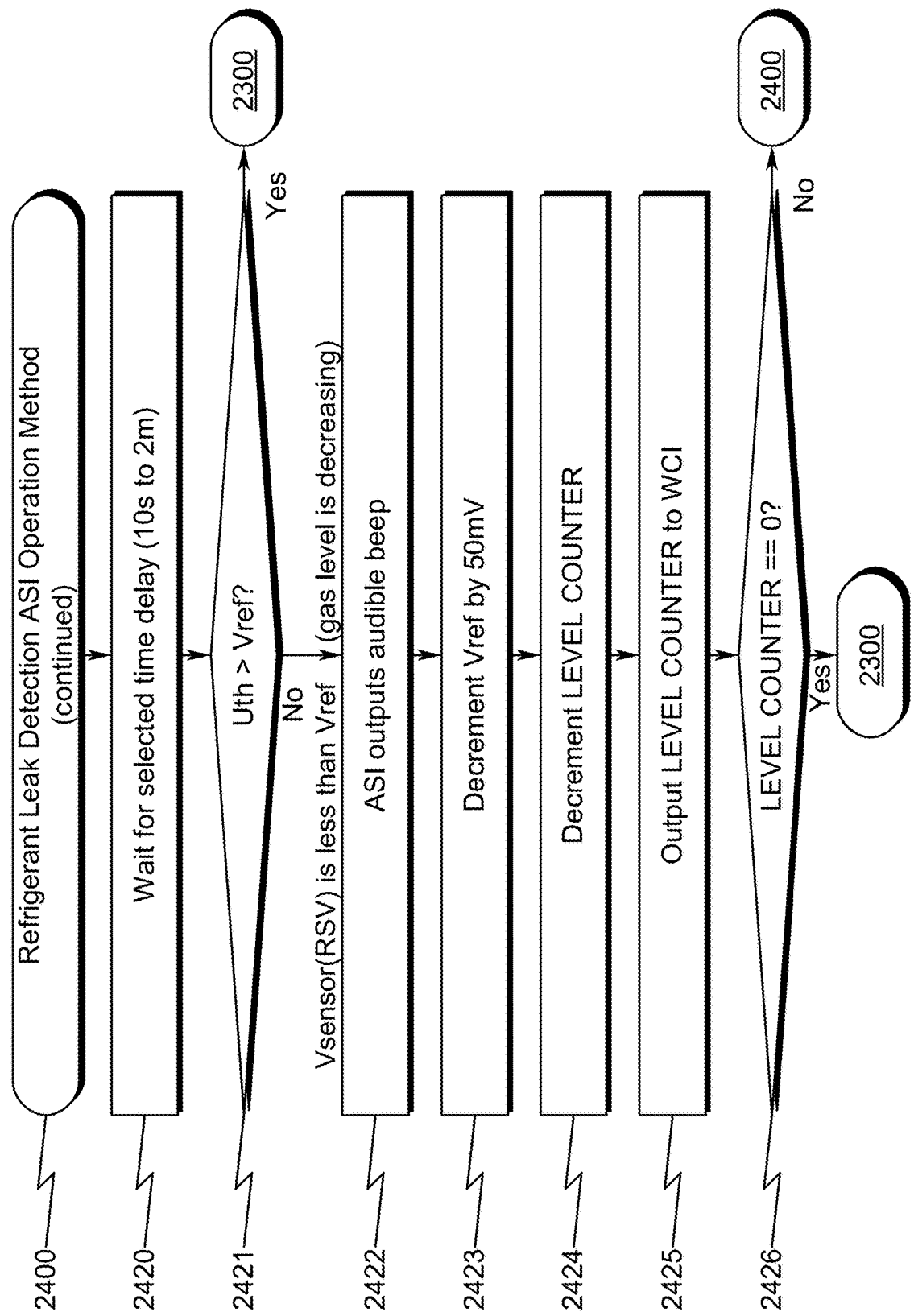
FIG. 24 illustrates a flowchart depicting a refrigerant leak detection ASI operation method (4 of 4)

Referencing FIG. 21 (2100)-FIG. 24 (2400), the ASI operation method typically incorporates the following control logic method:

(1) powering on the RLD/RLM (2201);
(2) with the DCP and the SSC, entering a CCL WARMUP STATE (2202);
(3) ASI emits four audible beeps to indicate WARMUP STATE operation (2203);
(4) ASI flashes LED rapidly (2204);
(5) with the DCP, determining if the WARMUP STATE is completed, and if not, proceeding to step (4) (2205);
(6) with the DCP and the SSC, entering a MONITOR STATE (2306);
(7) with the DCP, initializing the LEVEL COUNTER to 0 (2307);
(8) ASI flashes LED slowly (2308);
(9) with the DCP and the SSC, determining if a refrigerant leak is detected, and if not, proceeding to step (8) (2309);
(10) ASI turns on LED solid (2410);
(11) with the DCP, adjusting the LEVEL COUNTER UP/DOWN depending on the detected refrigerant level from the RGS (2411);
(12) ASI emits audible beep for every INCREASE in the LEVEL COUNTER towards the ALARM STATE (2412);
(13) with the DCP, determining if the LEVEL COUNTER is greater than a selected ALARM THRESHOLD, and if so, proceeding to step (15) (2413);
(14) with the DCP, determining if the LEVEL COUNTER is 0, and if not, proceeding to step (10), otherwise proceeding to the MONITOR STATE in step (6) (2414);
(15) ASI turns on LED solid and issues audible alarm (2415); and
(16) with the DCP, powering-down the RLD/RLM and/or disabling the HVAC coil(s) and/or compressor(s) operation (2416).

One skilled in the art will recognize that these process steps are exemplary and may be rearranged, augmented, or redacted and will by necessity be adjusted based on application context and the hardware implementation of the system.

Operational Example

Under normal circumstances the RLD operates to wirelessly inform a MUD of a detected refrigerant leak and is able to provide information as to the severity of the detected refrigerant leak.

However, there are circumstances in which a MUD is not available to receive these leak detection messages and in these circumstances the RLD may operate independently of the MUD and allow detection of the refrigerant leak. In these circumstances, all that is necessary is to turn on power to the RLD, wait until the WARMUP MODE was complete, and when in MONITOR MODE take and install the RLD on the HVAC indoor coils and if there is a leak the RLD will go into GAS DETECTION MODE and the ASI LED light will be on solid and at every increase in the LEVEL COUNTER detected by the RGS the ASI will emit a indicating another steps towards ALARM MODE.

As seen from the ASI operational flowcharts of FIG. 21 (2100)-FIG. 24 (2400), by watching the ASI LED light output on the RLD the operator/technician can perform a VISUAL TEST ONLY with the RLD with no need for a MUD to display leak detection data. Thus, a significant amount of HVAC leak detection analysis may be performed by watching the RLD ADI LED and listening for the ASI annunciator to determine what mode of operation the RLD is operating and thus if a refrigerant leak has been detected.

Overview of Leak Detection Testing (LDT)

The present invention has many application contexts, but one preferred application context is the detection and mitigation of refrigerant leaks in Variable Refrigerant Flow (VRF) climate control heating, ventilation, and air conditioning (HVAC) systems. VRF systems are widely used in large buildings such as hotels, dormitories, and retirement facilities.

A single compressor driving multiple parallel evaporators in multiple locations presents some unique and difficult scenarios when a system begins to develop a leak and decreases in cooling and heating capability thus requiring service. In a hotel scenario, system failure and down time will cost hotel operators many thousands of dollars, as one failure may force a block of rooms to be unavailable for guest use.

Step one in the troubleshooting process is provide a good visual inspection of the compressor condenser and related piping and repair as needed. If no leaks are found the next step would be provide a partial system recharge and the testing of each indoor air handler for possible leaks. In the past locating indoor air handler leaks (coil leaks in most cases) would require time from several days to as much as a month. The procedure was to open each air handler housing and inspect units for the presence of compressor oil in the condensate pan, coil area, and piping. This arbitrary method of locating leaks can take several minutes to hours per unit, with no guarantee of finding the leak on the first or fifteenth unit.

The idea of a portable refrigerant leak detector (RLD) designed to be mounted and powered within the air handler and used for the sole purpose of locating and recording leaks is novel within the industry and the focus of the present invention.

The LDT is a modification of the LCS design described herein, minus valve/solenoid/contactor controls and the requirement for AC power. Major sections of LDT consist of:
(1) Gas Sensor & signal conditioning
(2) Visual and audible status indicators
(3) BlueTooth communication capability
(4) Intake fan with enable/disable control
(5) Microcontroller
(6) Battery power
(7) Temperature and Humidity Sensor Troubleshooting Procedure Using the LDT The following procedure describes a typical refrigerant leak troubleshooting procedure using the LDT described herein:
(1) Begin by selecting a clean air location within the facility away from areas to be tested such as hallways, lobbies, and stairways. Do not power LDT if located on the floor, as refrigerant is heavier than air and will collect in this area.
(2) When a suitable location is found, turn on the LDT device (LED fast flash) and allow to self-calibrate for 2, 5, or 30 minutes (selectable).
(3) During warm-up, pair the device with a smartphone or tablet application and select suitable options.

(4) Execute operational options (alarm on/off, step time, fan on/off, clear gas log, add service data, room location etc.)
(5) After the WARMUP STATE, the system enters the MONITOR STATE (LED slow flash) and is ready to be moved to test location.
(6) Hang device on grill of the air handler such that air is forced into the enclosure. Intake fan can be enabled if necessary.
(7) If LDT remains in the MONITOR STATE for 5 minutes signifying no leak detected, it is then relocated to next available air handlers to be checked. This check and relocate methodology saves a tremendous amount of time and expense in the overall leak detection process.
(8) When a leak is detected, the LED status indicator will change from a slow flash to solid, an audible alarm beep will be heard for each change in gas level and the LDT records and stores the step count (1-21), dependent on severity of gas leak.
(9) When a leak is detected, the operator may verify the leak with a visual inspection as previously described.
(10) The intake fan on the LDT serves as two functions: (a) it allows the leak detector to test an area where piping and junctions are located and no forced air is available, and (b) the fan can be used to push clean air across the sensor in a unit that has previously detected a leak, so it can be relocated quicker to the next test location.
(11) Based on experimental field data using the LDT to detect refrigerant leaks, it typically takes about an hour to check 20 air handlers with 5 LDTs, compared to previous procedures that would take days, weeks, or months.
(12) To check for small leaks at the outdoor condenser, first locate the LDT at the lowest point of the condenser, disconnect power to the refrigerant compressor and outdoor cooling fan. Then enable the intake fan on the LDT to draw air across the sensor. This procedure works well to detect leaks because refrigerant is heavier than air and locating the LDT as low as possible with respect to the outdoor condenser will ensure the best chance of sensing leaking refrigerant from the outdoor condenser.

One skilled in the art will recognize that the above leak detection procedure may be modified by adding or removing steps and that the order of the above steps may be rearranged in some circumstances without limiting the scope of the claimed invention.

Sensor Signal Conditioner (SSC) Description (2500)-(2600)

A preferred exemplary embodiment of the sensor signal conditioner (SSC) is detailed in FIG. 25 (2500) wherein the SSC (2520) conditions signals from the RGS (2510) before they are presented to the DCP (2530) for interpretation. In this context the SSC (2520) and DCP (2530) form a controlled feedback loop in which the electrical characteristics of the SSC (2520) are dynamically adjusted by the DCP (2530) so as to account for a wide variety of operational ranges and variations in the RGS (2510). These operational ranges may encompass a number of factors, including but not limited to background refrigerant gas levels, changes in ambient air conditions, RGS manufacturing tolerances, and/or other field-specific operational conditions that impact the RGS detection capabilities.

The DCP (2530) in this configuration is illustrated as a conventional 8051 class microcontroller and may take many forms and one skilled in the art will recognize that the functions embodied in this element may be implemented using a wide variety of digital circuits including but not limited to microcontrollers, digital state machines, and in some cases analog computational circuitry such as translinear loops and the like.

The SSC (2520) operates as follows. A 10 kΩ digital potentiometer (DS1804-010) (2522) is used to generate a VTRIP (2523) voltage reference ranging from 0 VDC to +5 VDC as determined by the wiper W position that is digitally set using the UP/DOWN (U/D) (2533), INCREMENT (INC) (2534), and DP CHIP SELECT (CS) (2535) inputs emitted from the DCP (2530). This digital potentiometer (2522) is used to generate a VTRIP (2523) voltage reference and is used as the baseline reference for an internal analog comparator (2529) that is contained within the DCP (2530) (but in some preferred embodiments may be embodied as an analog comparator separate from the DCP (2530)). The LEAK DETECTED output (2539) of this internal analog comparator (2529) is an indication that the conditioned output of the RGS (2510) is above a threshold indicating a detected refrigerant leak. Internal logic within the DCP (2530) will then determine what state machine steps to invoke when this condition occurs.

The RGS (2510) may take many forms in this exemplary embodiment but in many preferred embodiments the RGS (2510) is a Zhengzhou Winsen Electronics Technology Co., Ltd. (No. 299, Jinsuo Road, National Hi-Tech Zone, Zhengzhou 450001 China, Tel: +86-371-67169097/ 67169670, www.winsen-sensor.com) Model WPS-5110 Refrigerant Detection Gas Sensor. This particular sensor requires two voltage inputs: a heater voltage (VH) and circuit voltage (VC). As illustrated in the drawing inset, VH is used to supply standard working temperature to the sensor and it can adopt DC or AC power, while VRL is the voltage of load resistance RL which is in series with sensor. VC supplies the detection voltage to load resistance RL and it requires DC power.

Within this exemplary embodiment, a 100 kΩ digital rheostat (DS1804-100) (2524) is used as RL to form a voltage divider with respect to the RGS internal resistance RS. The resistance of this digital rheostat (2524) is digitally set using the UP/DOWN (U/D) (2533), INCREMENT (INC) (2534), and DR CHIP SELECT (CS) (2536) inputs emitted from the DCP (2530). This RS/RL voltage divider produces a voltage from 0 VDC to 5 VDC that is then amplified by the operational amplifier (2525) having a gain determined by input resistor RI (2526) (10 kΩ) and feedback resistor RF (2727) (20 kΩ) of (1+RF/RI)=(1+20 kΩ/10 kΩ)=3. One skilled in the art will recognize that this gain may vary based on the specific type of RGS used in the system and the characteristics of the analog leak detection comparator (2529). Many preferred invention embodiments provide for a gain of in the range of 1 to 10 in this operational amplifier (2525) configuration.

In some circumstances the DCP (2530) may be configured with an additional gain digital potentiometer (GDP) (not shown) that allows the DCP (2530) to dynamically adjust the gain of the operational amplifier (2525). In these configurations the wiper W of the GDP is connected to the inverting input of the operational amplifier (2525) with the remaining GDP resistor connections connected to analog ground and the VRGS (2528) output of the operational amplifier (2525). In this way the DCP (2530) may change the wiper position of the GDP to adjust the gain of the operational amplifier (2525) and thus the sensitivity of the overall RGS (2510).

Operation of the SSC (2520) includes adjustment of the DP (2522) and DR (2524) based on detected comparisons of VTRIP (2523) and VRGS (2528) as monitored by the analog comparator (2529) to generate the refrigerant detection signal (2539) within the DCP (2530).

An optional air intake fan (AIF) (2512) may be incorporated into the SSC (2520) operation to allow a forced air flow of ambient air across the RGS (2510) in order to obtain a more real-time measurement of the actual refrigerant leak as opposed to a settling of the refrigerant from a leak prior in time. Note that this AIF (2512) may be under control of the DCP (2530) so as to allow dynamic purging of the RGS (2510) during measurement and/or dynamic recalibration operations.

Figure 26:
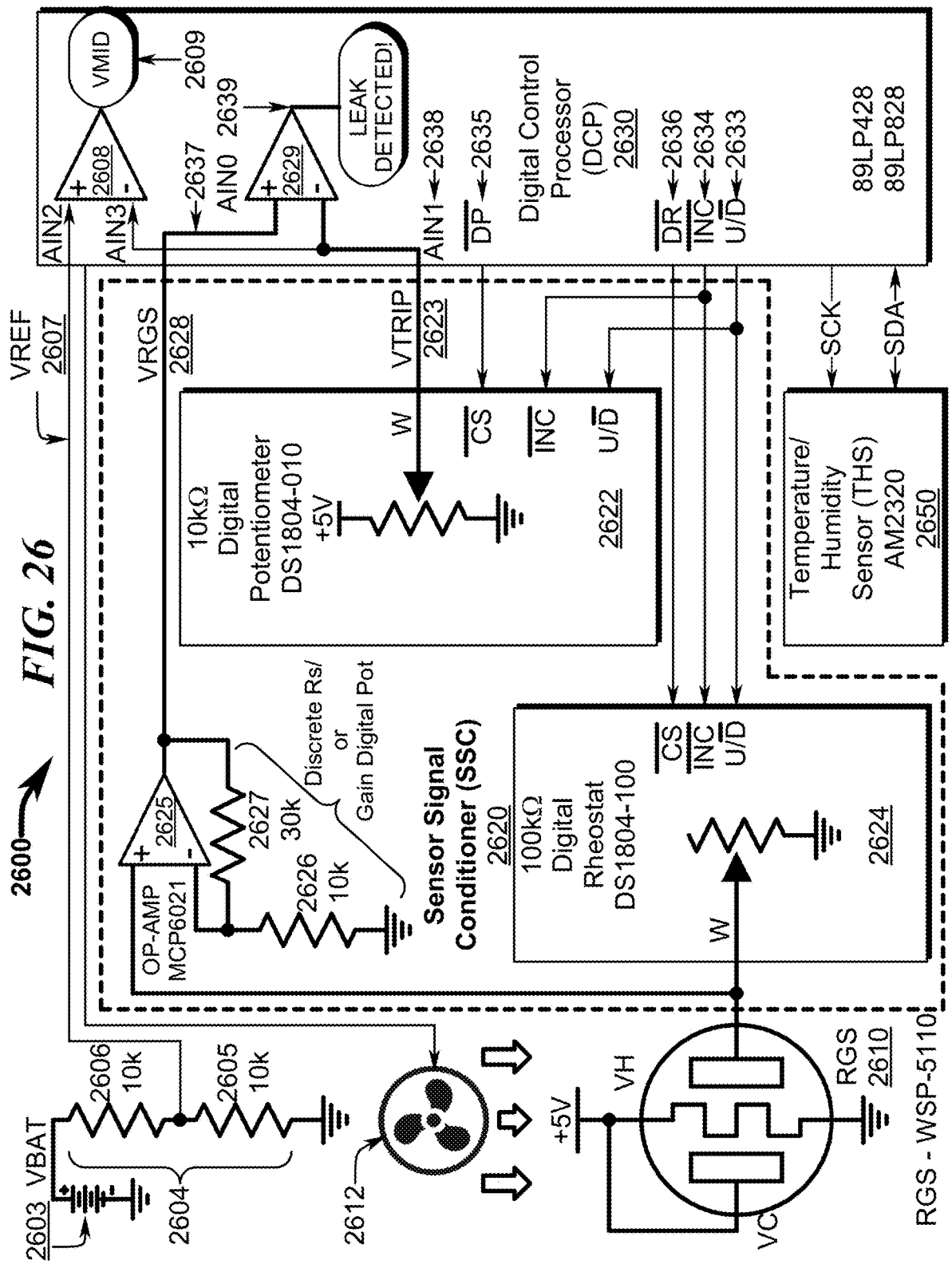
FIG. 26 illustrates a schematic depicting a preferred exemplary sensor signal conditioner (SSC) embodiment augmented with a temperature/humidity sensor (THS) and midpoint voltage reference.

FIG. 26 (2600) depicts another preferred exemplary embodiment of the SSC (2620) in which the CCL is augmented with an ambient temperature/humidity sensor (THS) (2640) that may be read by the DCP (2630) using an industry standard SPI serial interface (SCK/SDA) when performing the dynamic recalibration operations or as a means to determine if a refrigerant coil is operating properly. While an AOSONG ELECTRONICS model AM2320 digital temperature and humidity sensor is illustrated in this preferred exemplary embodiment, one skilled in the art will recognize that a wide variety of temperature and/or humidity sensors may be applicable in this application context.

This schematic depicts a method by which the DCP (2630) may determine the state of the battery (2603) supplying power to the overall system when implemented in a portable context. Here it is seen that a voltage divider (2604) comprising a first (2605) and second (2606) resistor generates a VBAT battery midpoint voltage reference (2607) that is compared by the DCP (2630) analog comparator (2608) to the VTRIP (2623) voltage generated by the digitally adjustable potentiometer (2622). Since the VTRIP voltage is generated using the +5V supply reference, it can be then used to compare the wiper voltage value of the digitally adjustable potentiometer (2622) to that of the VREF (2607) signal to determine the overall voltage of the battery (2603), since VREF represents a midpoint VBAT voltage. In circumstances where the battery (2603) voltage drops below a selected threshold, the DCP (2630) may issue an alarm via the ASI or otherwise modify operation to account for a depleted battery condition.

This schematic also depicts another method by which the DCP (2630) may determine the midpoint voltage of the digital potentiometer (2622). In this configuration the battery (2603) voltage VBAT is replaced by an electrical connection to the +5V regulated supply or some other regulated supply voltage. Here it is seen that a voltage divider (2604) comprising a first (2605) and second (2606) resistor generates a midpoint voltage reference (2607) that is compared by the DCP (2630) analog comparator (2608) to the VTRIP (2623) voltage generated by the digitally adjustable potentiometer (2622). When the digitally adjustable potentiometer (2622) wiper W generates a voltage greater than the VREF (2607) voltage, the analog comparator (2608) is tripped and a VMID signal (2609) is activated internal to the DCP (2630) indicating that the digitally adjustable potentiometer (2622) is positioned at the midpoint of operation. This midpoint reference voltage VREF (2607) is then used as a starting point for analysis of the adjustment of the adjustable rheostat (2624) to determine a proper trip point for the leak detection analog comparator (2629) during the dynamic recalibration process for the RGS (2610).

RGS Sensor Characteristics (2700)-(3200)

While the present invention may operate using a variety of refrigerant gas sensors (RGS), the model WSP-5110 is used in many preferred embodiments. FIG. 27 (2700)-FIG. 32 (3200) illustrate the electrical and performance characteristics of this device. Of particular note is the wide variation in output characteristics of this device as exhibited by the graphs in FIG. 28 (2800)-FIG. 32 (3200). Here it can be seen that ambient operating conditions and gas concentrations will cause the RGS to output widely varying voltage levels. For this reason this RGS cannot be calibrated at manufacturing of the overall leak detection system but must rather be dynamically recalibrated in the field using the CCL SSC/DCP combination described herein. In this manner both the environmental and gas detection variances in the RGS may be compensated for and a true indication of a refrigerant leak will be indicated for the operator/technician.

Figure 28:
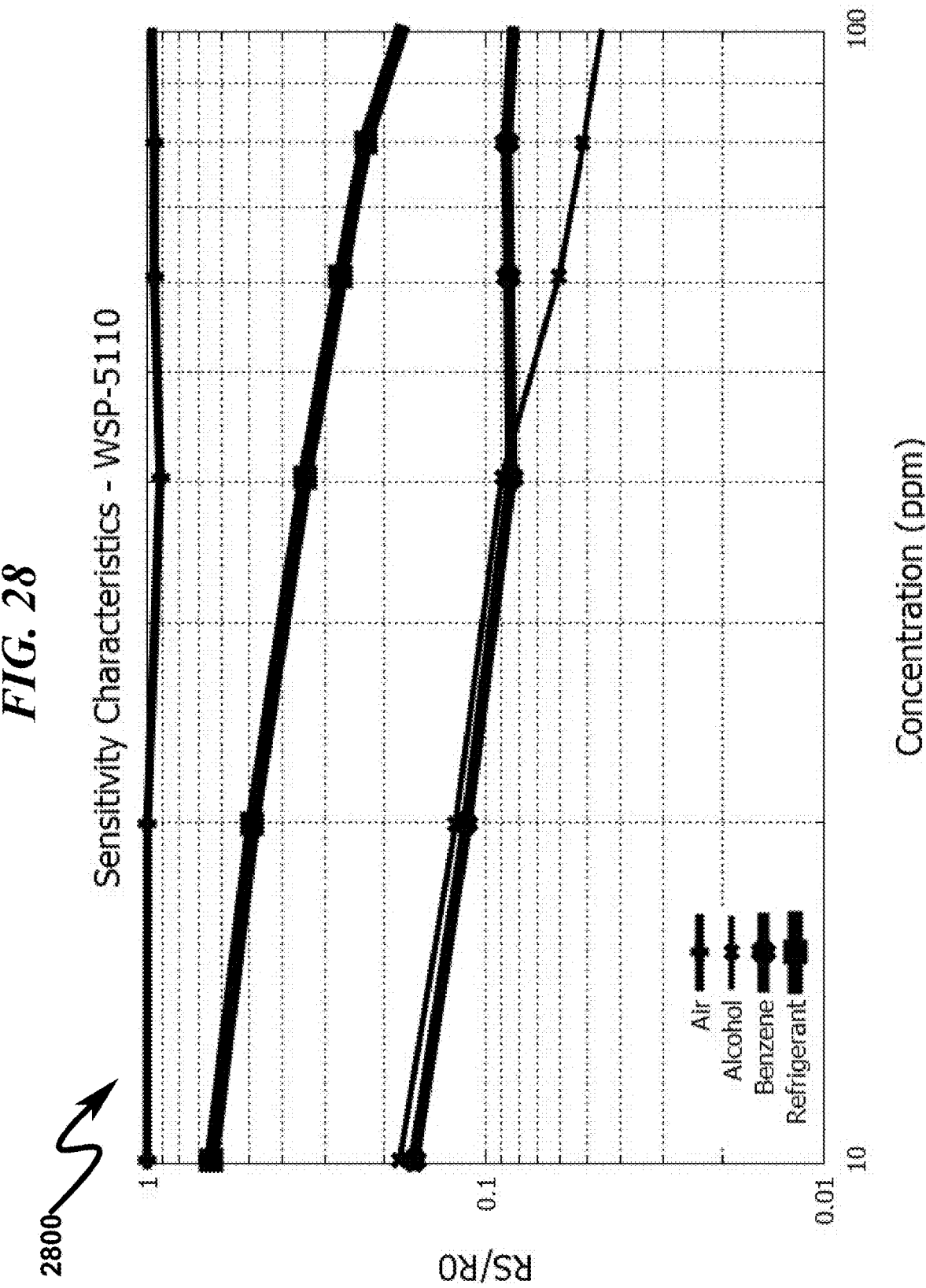
FIG. 28 illustrates a graph depicting an exemplary model WSP-5110 RGS sensitivity characteristic to a variety of gasses.
Figure 29:
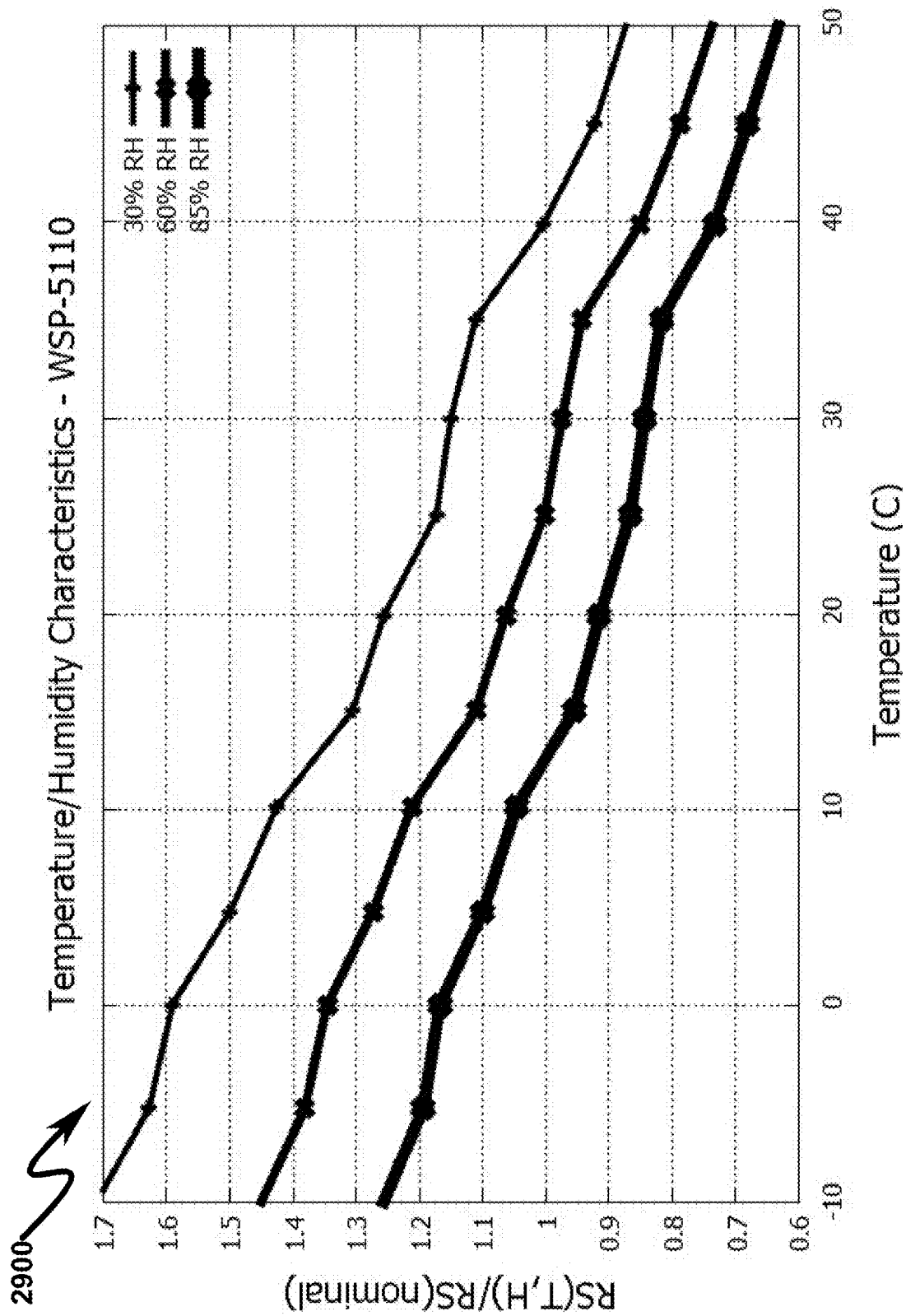
FIG. 29 illustrates a graph depicting an exemplary model WSP-5110 RGS temperature/humidity characteristic.
Figure 30:
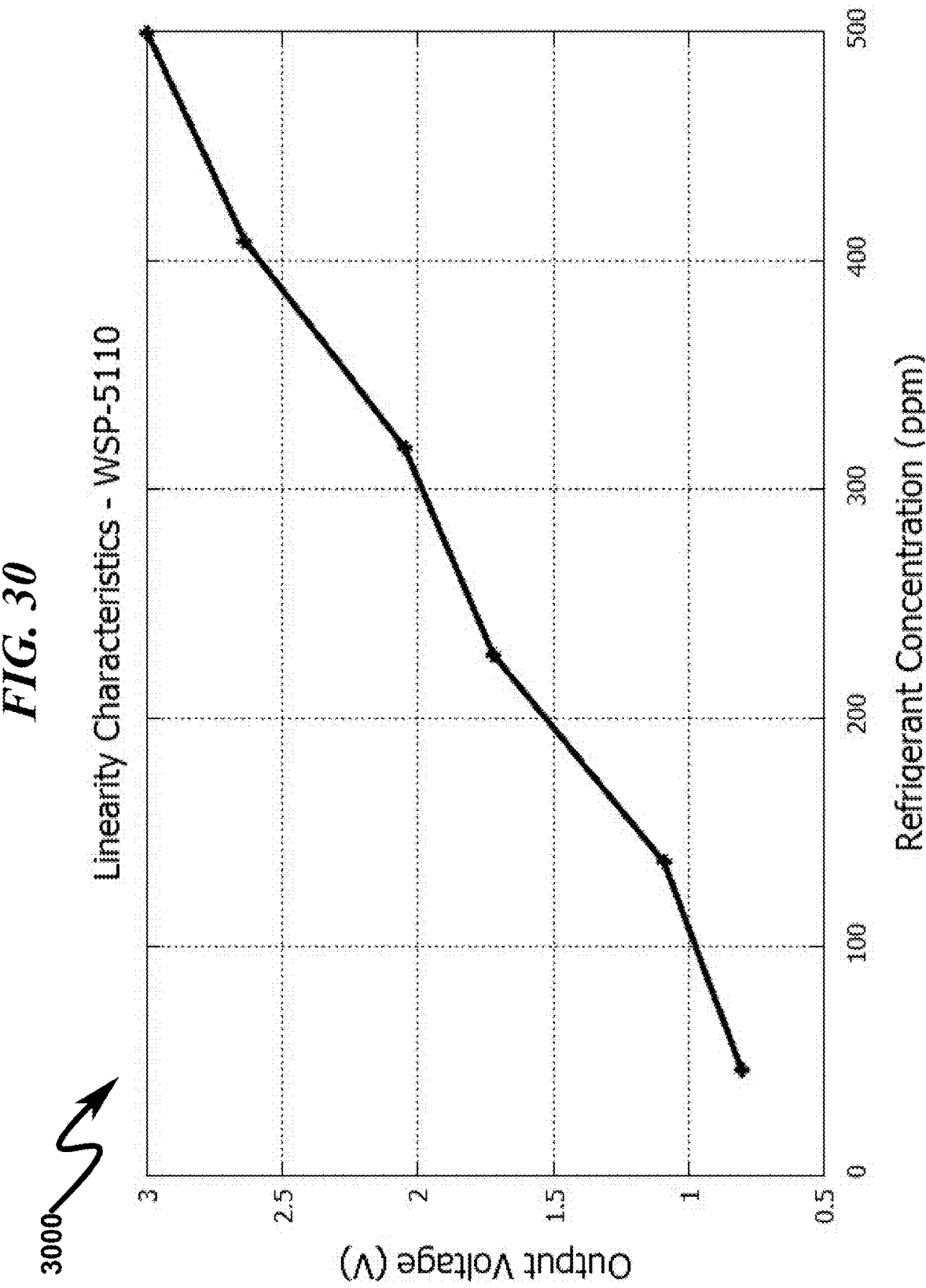
FIG. 30 illustrates a graph depicting an exemplary model WSP-5110 RGS linearity characteristic.
Figure 31:
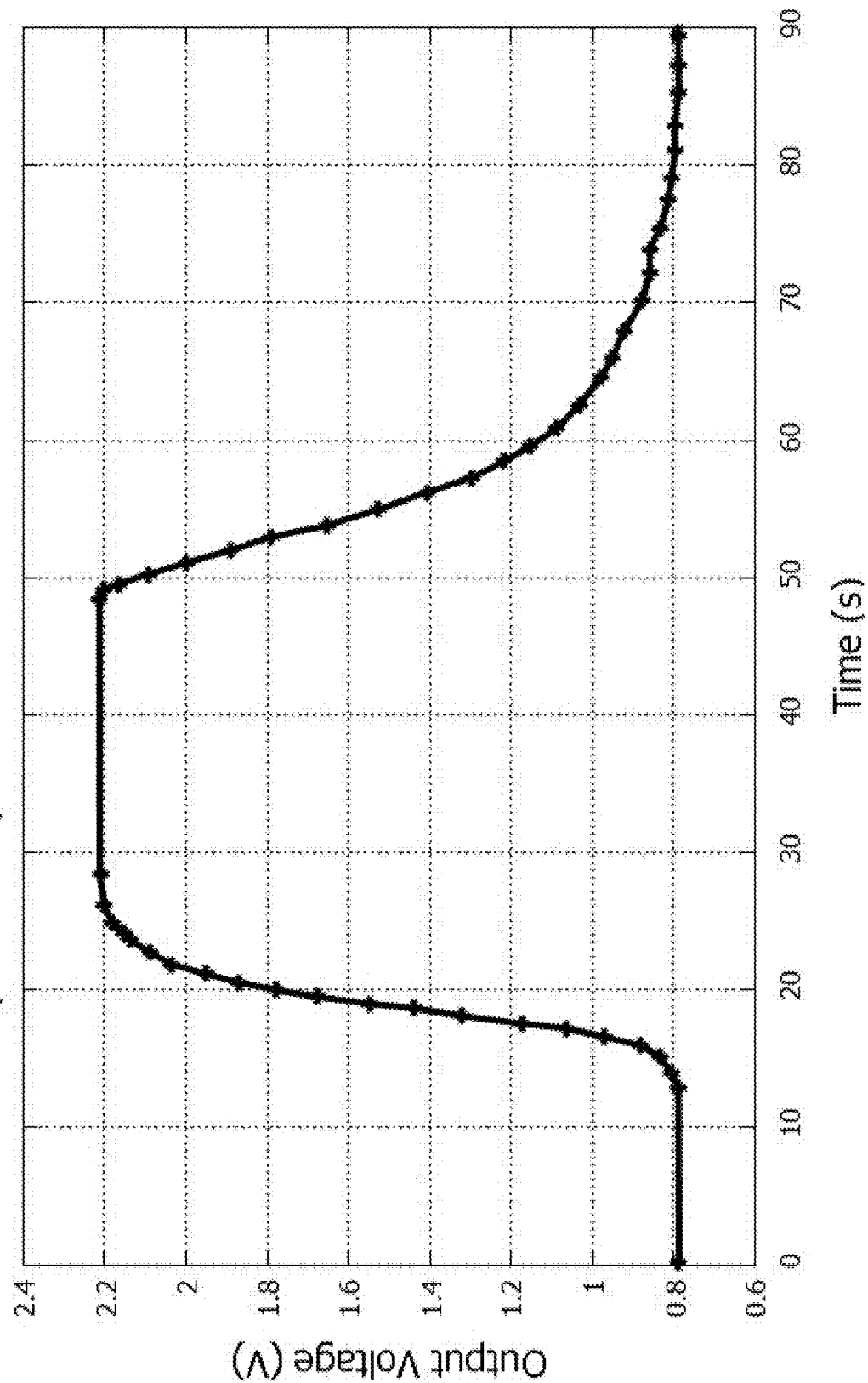
FIG. 31 illustrates a graph depicting an exemplary model WSP-5110 RGS dynamic response characteristic.
Figure 32:
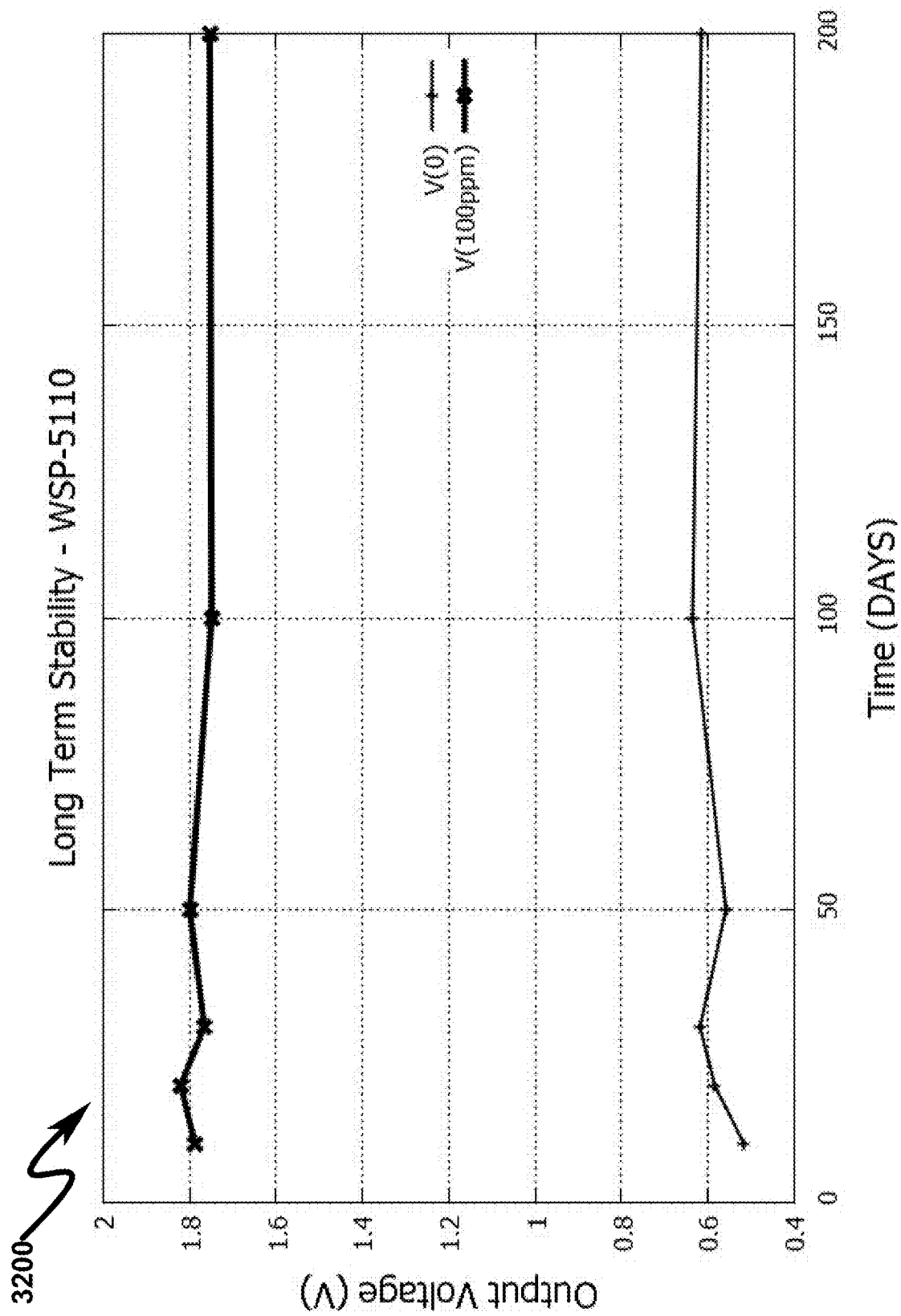
FIG. 32 illustrates a graph depicting an exemplary model WSP-5110 RGS long-term stability characteristic.

It is also important to note as depicted in FIG. 28 (2800) that the RGS is sensitive to not only refrigerant but other hydrocarbons, including cleaning solutions that may be used in a commercial building. For this reason there is a need to allow some background level of these materials to be ignored by the recalibration CCL so as to not cause false refrigerant leak alarms. As indicated in FIG. 29 (2900), the RGS is highly sensitive to variations in temperature/humidity. This may be accounted for in some preferred embodiments via the use of a temperature/humidity sensor (THS) as depicted in FIG. 26 (2600), or in some embodiments this may be simply be adjusted for in the overall dynamic recalibration of the RGS within the CCL. As indicated by FIG. 31 (3100) the dynamic response of the RGS may require some delays to be built into the CCL to allow for dissipation of intermittent false hydrocarbon readings such as may occur during commercial cleaning operations in the vicinity of the HVAC system. Finally, as indicated in FIG. 32 (3200), the RGS may experience long-term stability drift. This is also another reason the CCL implemented by the SSC/DCP is necessary to compensate for changes in the RGS as it ages in the field.

Exemplary Operational Waveform Displays (3300)-(4000)

Figure 33:
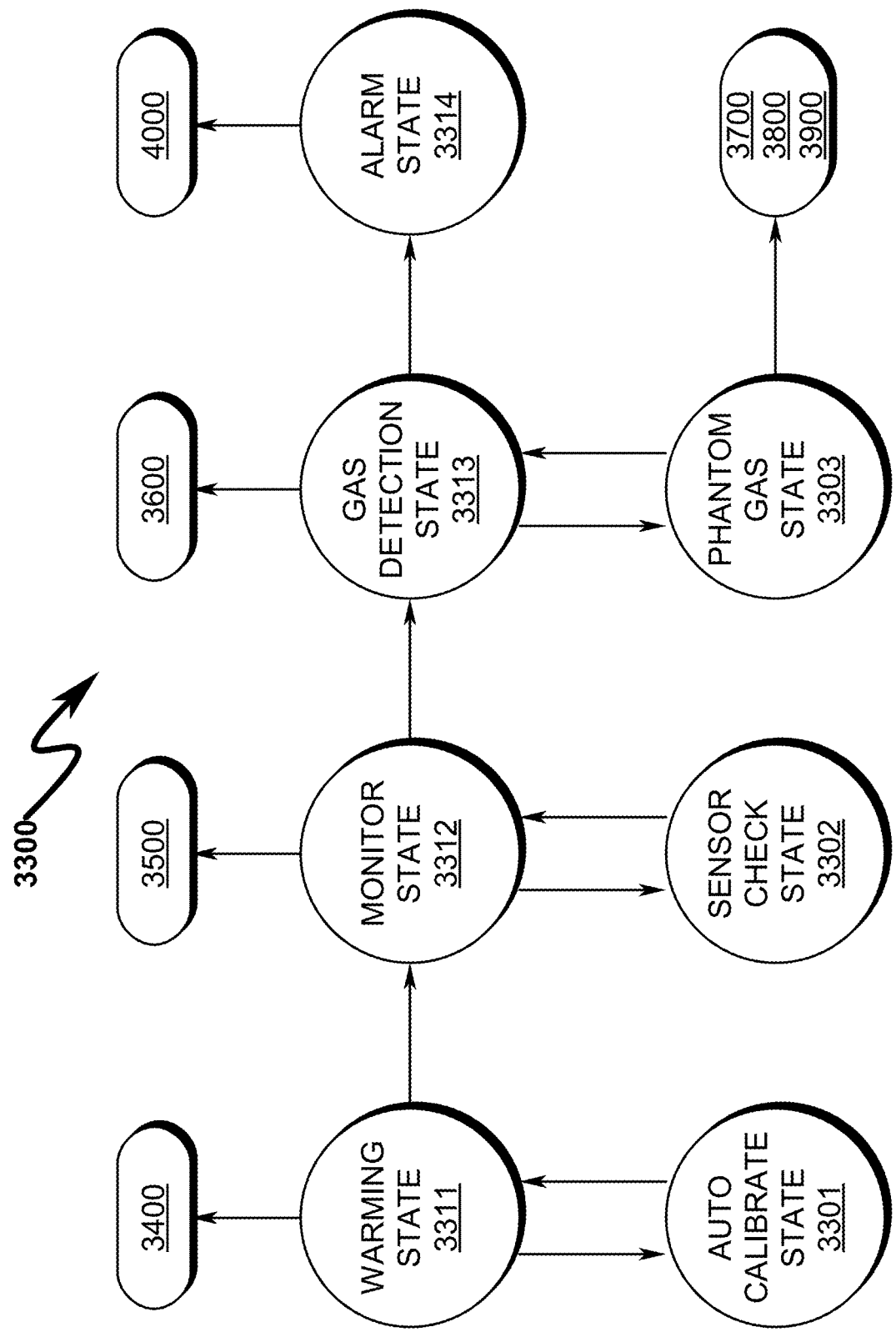
FIG. 33 illustrates an exemplary CCL state diagram with oscilloscope figure references depicting typical operating characteristics of a preferred exemplary invention system embodiment.
Figure 40:
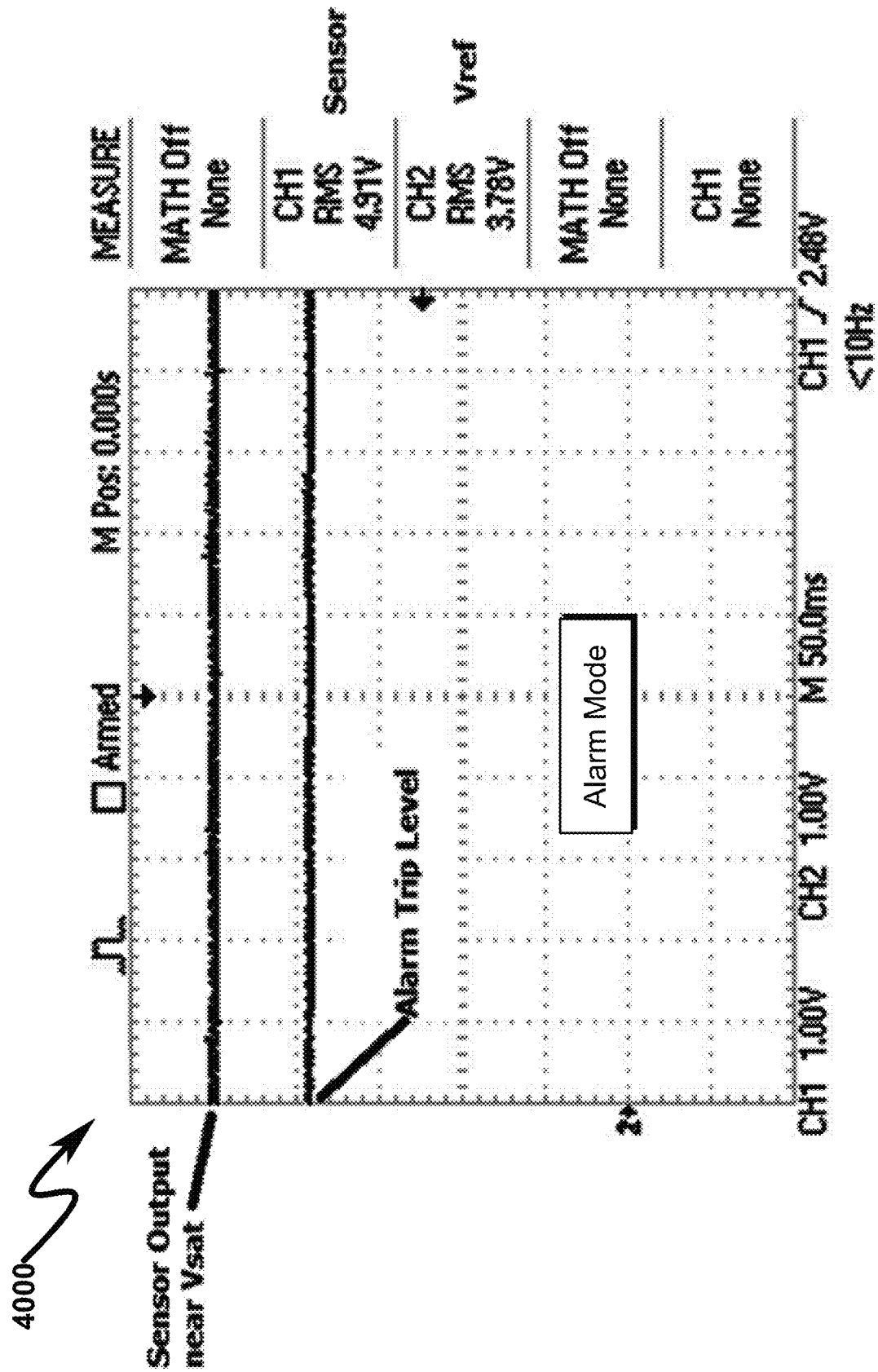
FIG. 40 illustrates an oscilloscope waveform graph depicting operation of a preferred exemplary system embodiment in the ALARM STATE.

As an aid in understanding the operation of the CCL interaction between the SSC and DCP, exemplary waveform displays are presented in FIG. 33 (3300)-FIG. 40 (4000). FIG. 33 (3300) depicts various CCL states described in more detail in the waveform diagrams of FIG. 34 (3400)-FIG. 40 (4000), including the WARMING STATE (3311, 3400), MONITOR STATE (3312, 3500), GAS DETECTION STATE (3313, 3600), PHANTOM GAS STATE (3303, 3700, 3800, 3900) (a sub-state of the GAS DETECTION STATE (3313)), and ALARM STATE (3314, 4000).

Warmup State (3400)

Figure 34:
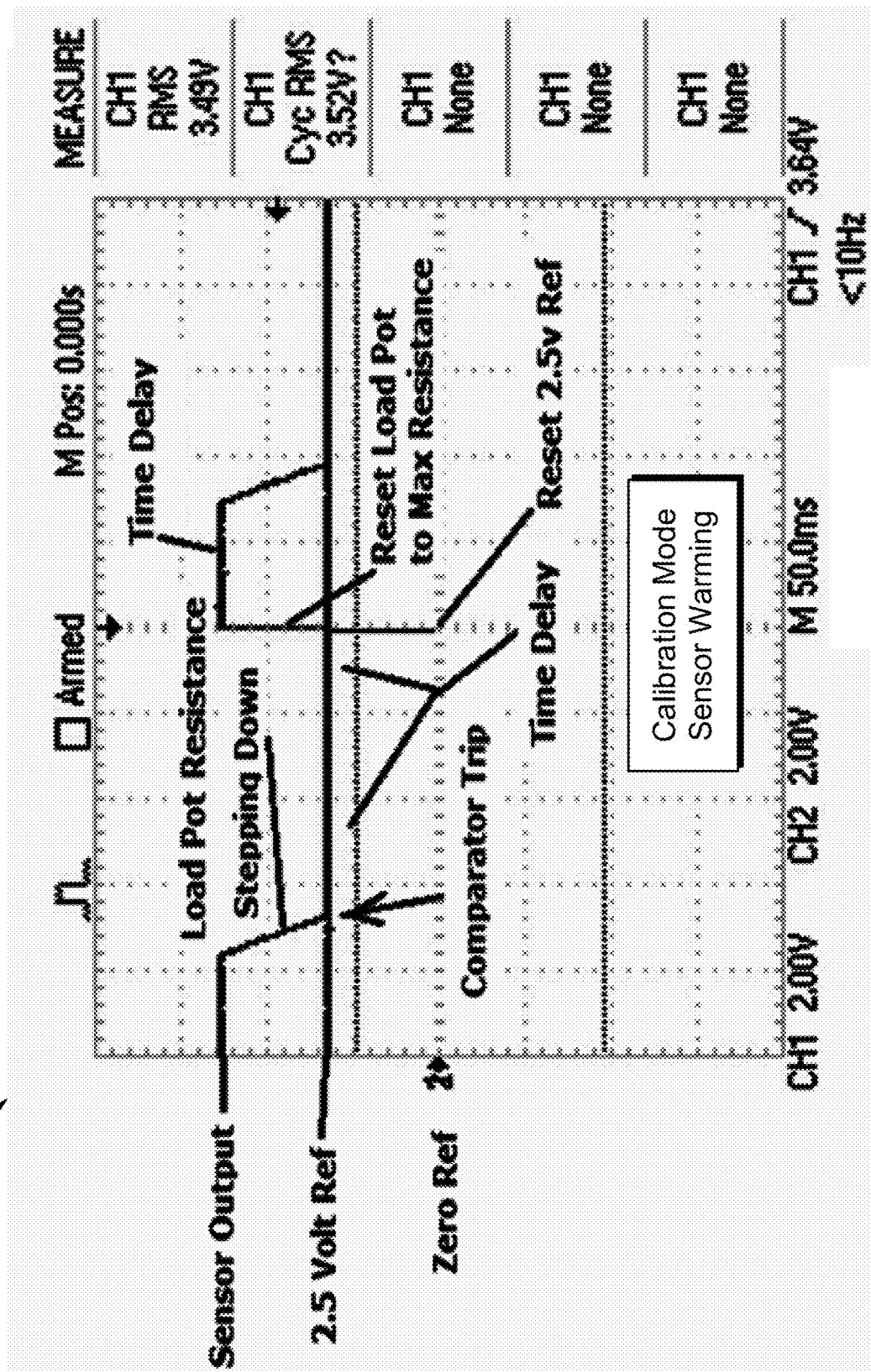
FIG. 34 illustrates an oscilloscope waveform graph depicting operation of a preferred exemplary system embodiment in the WARMUP STATE.

As generally depicted in FIG. 34 (3400), at power up or reset, the system enters CALIBRATION MODE for a selected time period (typically user selectable from 2 minutes to 1 hour). ASI LED is in fast flash mode during this state.

Monitor State (3500)

Figure 35:
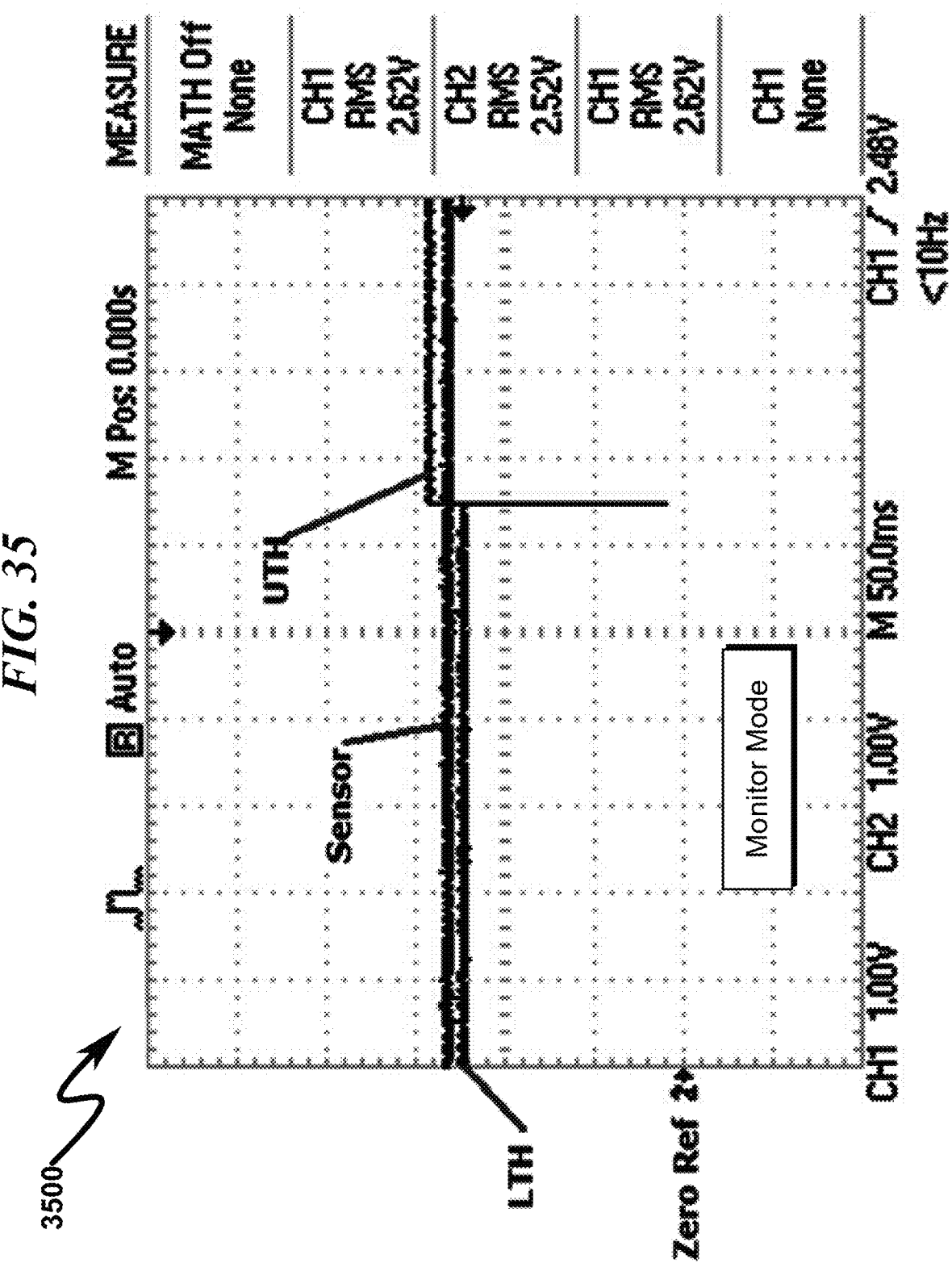
FIG. 35 illustrates an oscilloscope waveform graph depicting operation of a preferred exemplary system embodiment in the MONITOR STATE.

As generally depicted in FIG. 35 (3500), after calibration/warming mode, the system enters the MONITOR STATE. A stabile sensor output will remain between the upper and lower threshold voltages.

The ASI LED in this mode is in slow flash operation.

If the sensor output drifts below the lower threshold voltage (LTH) due to cleaner ambient air, the system will recalibrate the sensor output between LTH and UTH (~2.5V).

If the sensor output moves above LTH gas has been detected, and the system now switches off auto calibrate mode and the V reference will now step in 50 mV increments at a selectable time delay from 10 seconds to 2 minutes.

Gas Detection State (3600)

Figure 36:
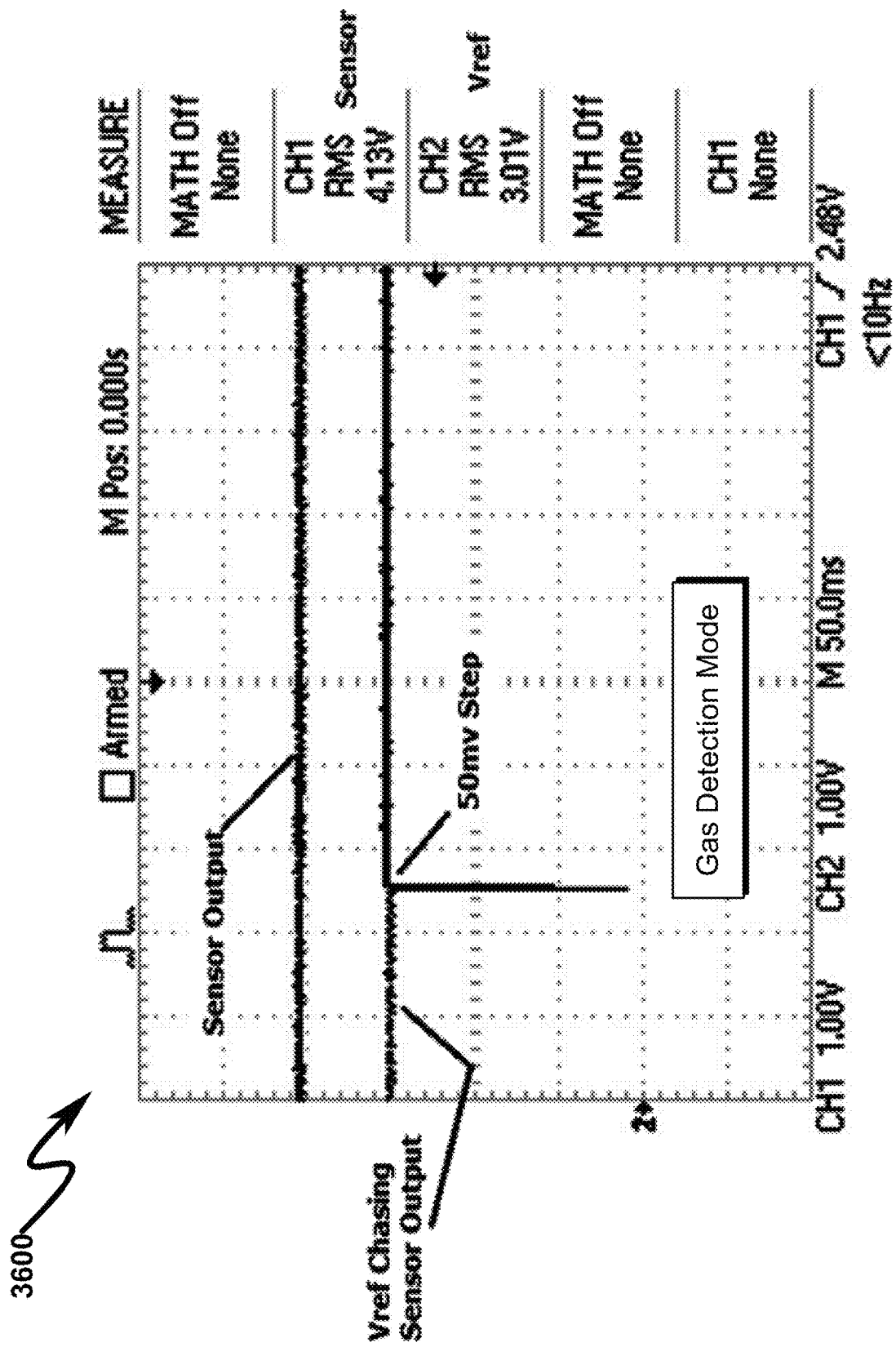
FIG. 36 illustrates an oscilloscope waveform graph depicting operation of a preferred exemplary system embodiment in the GAS DETECTION STATE.

As generally depicted in FIG. 36 (3600), in the GAS DETECTION STATE the sensor output rises above UTH, and Vref begins to move upward toward the sensor output in 50 mV increments and a variable sample time from 10 seconds to 2 minutes is established. The longer sample time requires about 42-45 minutes before the alarm threshold voltage is reached and is used to allow phantom gases to dissipate causing the sensor output to decrease below the alarm threshold.

In this state the ASI LED is consistently on. Each time Vref is increased, the ASI audible alarm outputs a short 2 kHz burst. The STEP COUNTER will be incremented for each Vref step increase.

Phantom Gas Level Decreasing Operation (3700)

Figure 37:
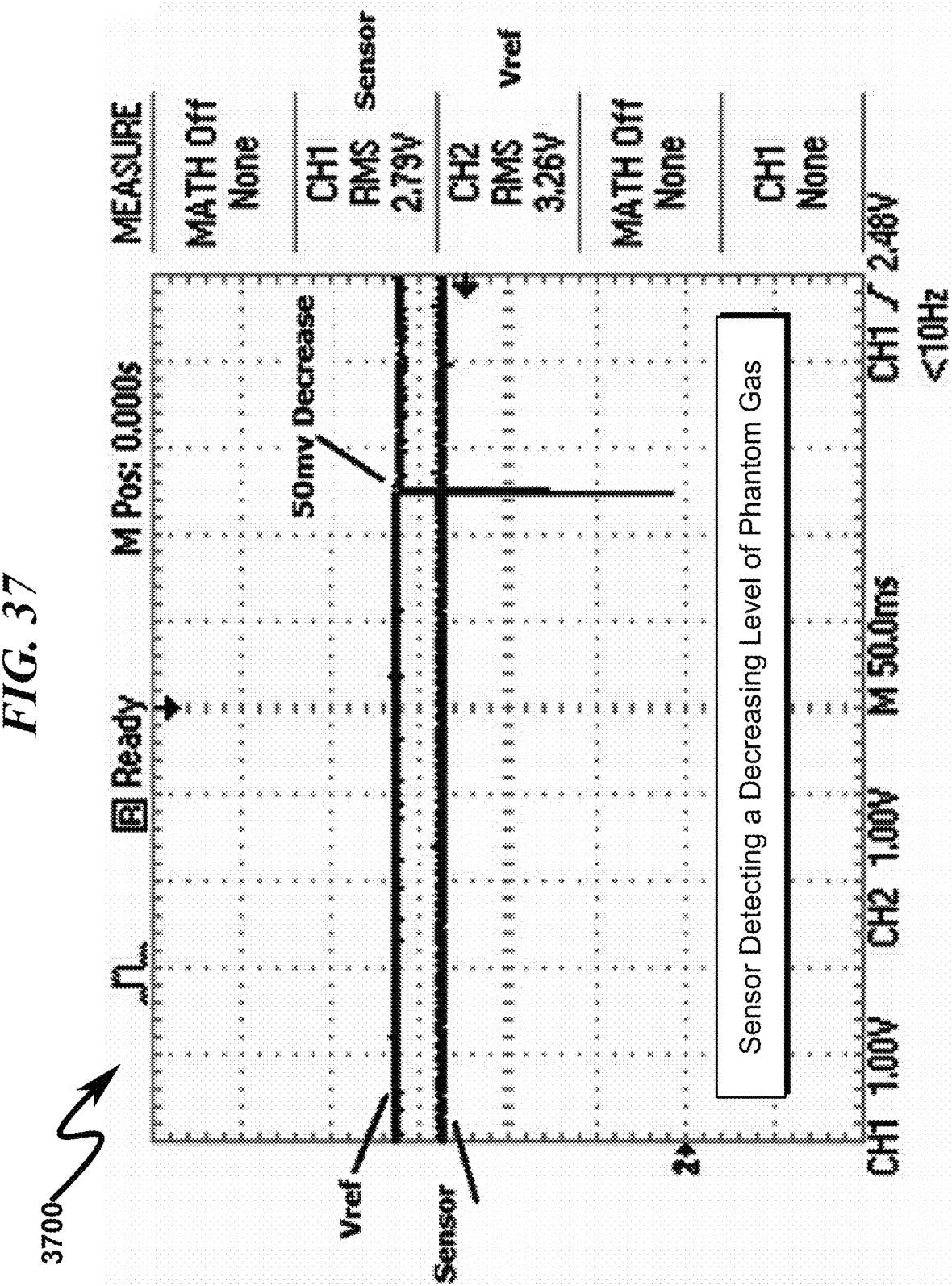
FIG. 37 illustrates an oscilloscope waveform graph depicting operation of a preferred exemplary system embodiment in the GAS DETECTION PHANTOM GAS LEVEL DECREASING STATE.

As generally depicted in FIG. 37 (3700), system operation in the presence of a phantom gas is displayed. This example depicts the phantom gas level decreasing. Vref will follow Vsensor downward every 10 seconds.

The ASI LED remains consistently on in this mode. The ASI audible alarm outputs a frequency lower than 2 khz to indicate Vref is decreasing.

The STEP COUNTER will be decremented for each Vref step decrease.

Phantom Gas Level Increasing Operation (3800)

Figure 38:
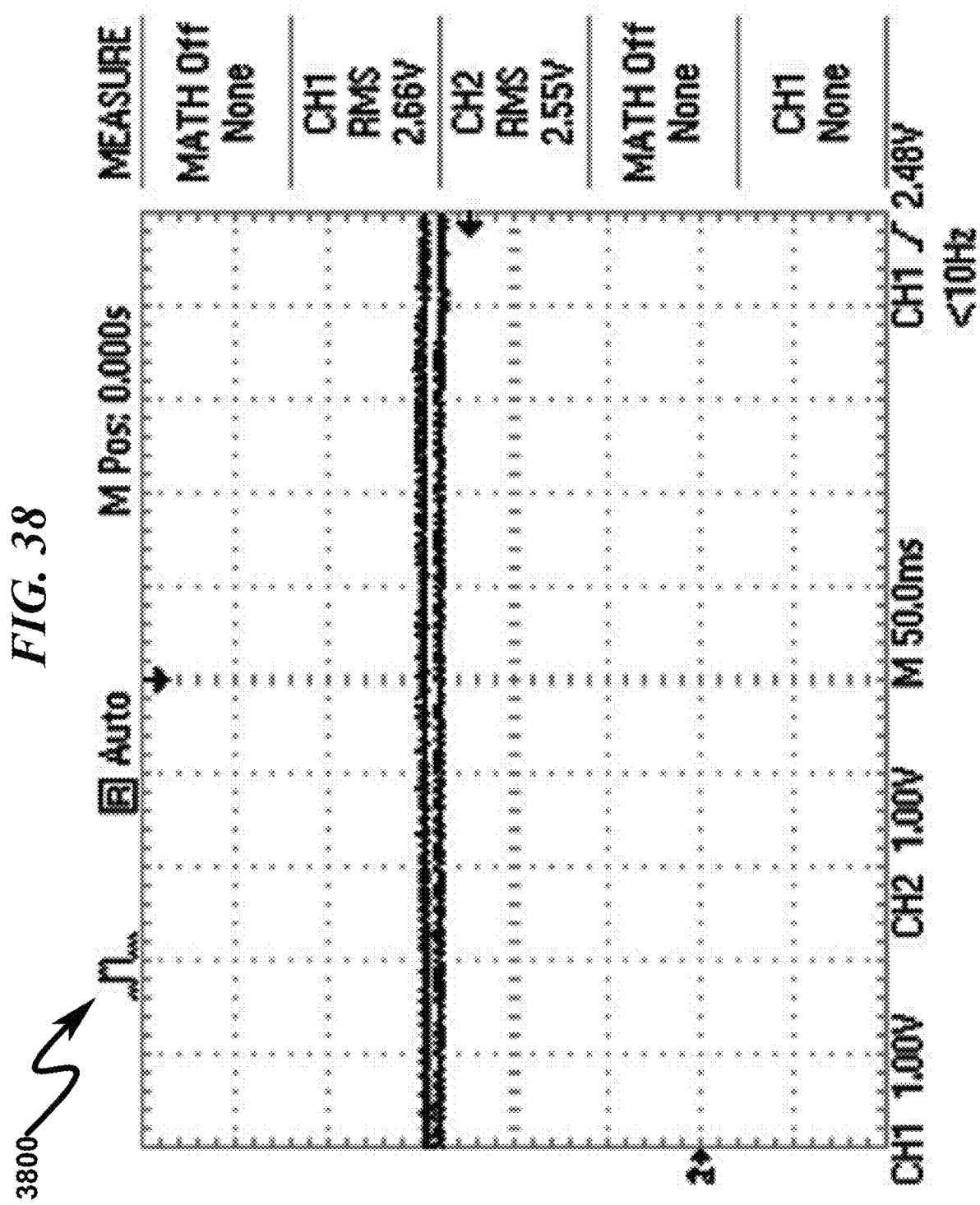
FIG. 38 illustrates an oscilloscope waveform graph depicting operation of a preferred exemplary system embodiment in the GAS DETECTION PHANTOM GAS LEVEL INCREASING STATE.

As generally depicted in FIG. 38 (3800), system operation in the presence of a phantom gas is displayed. In this example Vref is increasing toward Vsensor.

Phantom Gas Level Continues Increasing Operation (3900)

Figure 39:
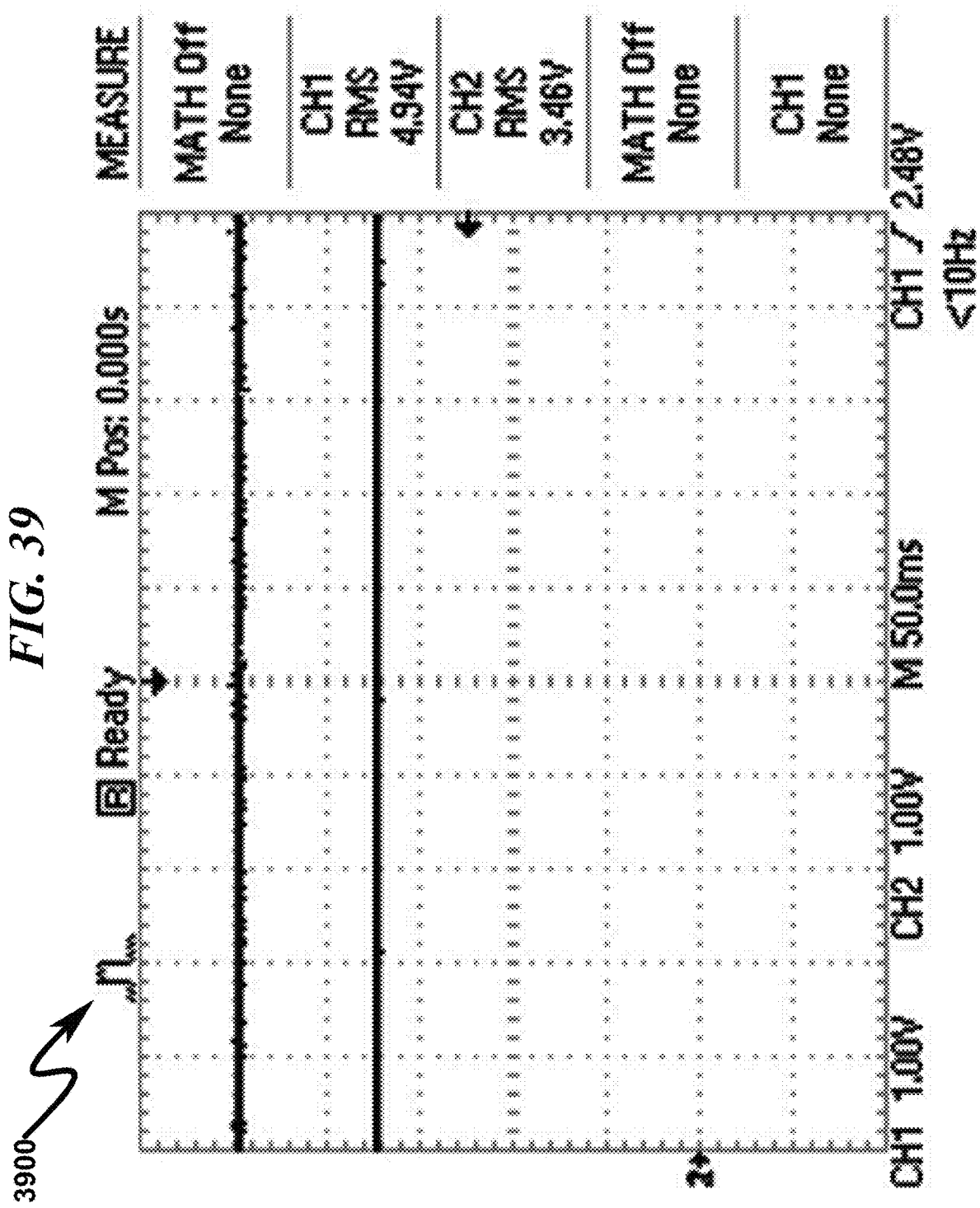
FIG. 39 illustrates an oscilloscope waveform graph depicting operation of a preferred exemplary system embodiment in the GAS DETECTION PHANTOM GAS LEVEL CONTINUES INCREASING STATE.

As generally depicted in FIG. 39 (3900), system operation in the presence of a phantom gas is displayed. In this example Vref continues to increase toward Vsensor.

Alarm State (4000)

As generally depicted in FIG. 40 (4000), system operation in the presence of an alarm condition is displayed. In this example when Vref reaches a voltage of 3.78v the ALARM STATE is triggered and system shuts down power to both solenoid valves, opens T1 & T2 contacts, ASI LED flashes 5 times fast followed by a pause while the ASI audible alarms outputs a 2 khz burst. In this state the system must be manually reset by pressing manual reset switch, cycling system power, or issuing a remote reset via BLUETOOTH® communication application operating on a mobile user device (MUD).

Description of Monitor Loop

For the purpose of clarifying operation of the MONITOR STATE with respect to the RLD/RLM, an exemplary RLD system will now be discussed in detail. For this example a 1 hour warm up and 2 minute step time will be assumed.

Exemplary RLD Operation

After a one hour warm up, system now enters the Monitor mode:
(1) If Vsensor is stable and remains between Lth (2.4V) & Uth (2.63V), no action is taken.
(2) If ambient air becomes cleaner than initial warm up mode, sensor output will drop below Lth (2.4V), and sensor is then recalibrated to midpoint (2.5V) of Uth & Lth.
(3) If refrigerant or phantom gas is detected, sensor output will increase above Uth (2.62V). System now enters gas detected mode and sensor recalibration is disabled. Depending upon gas concentration, Vsensor output will increase limited only by Vsat of +5V. A gas concentration of approximately 100 ppm is usually adequate for sensor output to rise above Uth.
(4) One of three scenarios are now possible (see FIG. 35 (3500)-FIG. 40 (4000):
   (a) Vsensor increases above Uth but stabilizes below the alarm trip voltage of 3.78V. This indicates a small gas leak that is sustained but not adequate to trip alarm. Vref will step above and below the stabilized voltage of Vsensor. The LEVEL COUNTER will show maximum step level reached and is an indicator of gas leak severity.
   (b) Vsensor increases above Uth and initially at a level above the alarm trip voltage of 3.78V. This indicates a large gas concentration caused by refrigerant leakage or phantom gas. The program will step Vref in 50 mV increments starting at Uth with a time delay of 2 minutes between each step which takes 42 minutes to reach alarm trip point. Each time Vref is incremented, the LEVEL COUNTER will also be incremented and stored in flash memory.
   (c) If phantom gas is being detected, Vsensor will begin a gradual decline (before the alarm trip voltage is reached), in which case Vref will overcome Vsensor at some voltage below the alarm trip voltage, Vref and step counter will be decremented in 10 second intervals until Vsensor drops below Uth and system returns to monitor mode.
   (d) If a severe refrigerant leak is being detected, Vsensor will remain above the alarm trip voltage of 3.78 for a time period that allows Vref to be incremented in 50 mV steps. It would take approximately 21 steps times 2 minutes or 42 minutes to reach alarm trip point.

Optional Operations

There are a couple of options that may be changed via the WCI to provide adaptation to extreme environments, including but not limited to the following:
(a) Alarm trip voltage can be switch between a normal value of 3.78 and higher value of 4.25V. This changes the maximum step counter from 21 to about 30, thus changing the alarm detection time from 42 to 60 minutes or any value of our choosing.
(b) The deadband voltage between Lth and Uth can be changed to allow an increase or decrease in sensor drift sensitivity.

One skilled in the art will recognize that theses options may be expanded in some application contexts.

SUMMARY

When system enters monitor mode, Vsensor is stable (no gas detected), Vsensor decreases below Lth, Vsensor is recalibrated to 2.5V (cleaner ambient air) or Vsensor rises above Uth and system enters gas detected mode.

In gas detected mode Vref starts at Uth and is incremented in 50 mV steps along with step counter. Vsensor could be sensing a minor refrigerant gas leak no alarm would trip, a phantom gas where gas levels decrease over time until system returns to monitor mode, or a major refrigerant leak which results in an alarm trip.

RLM Exemplary System Embodiment (4100)- (4800)

Figure 41:
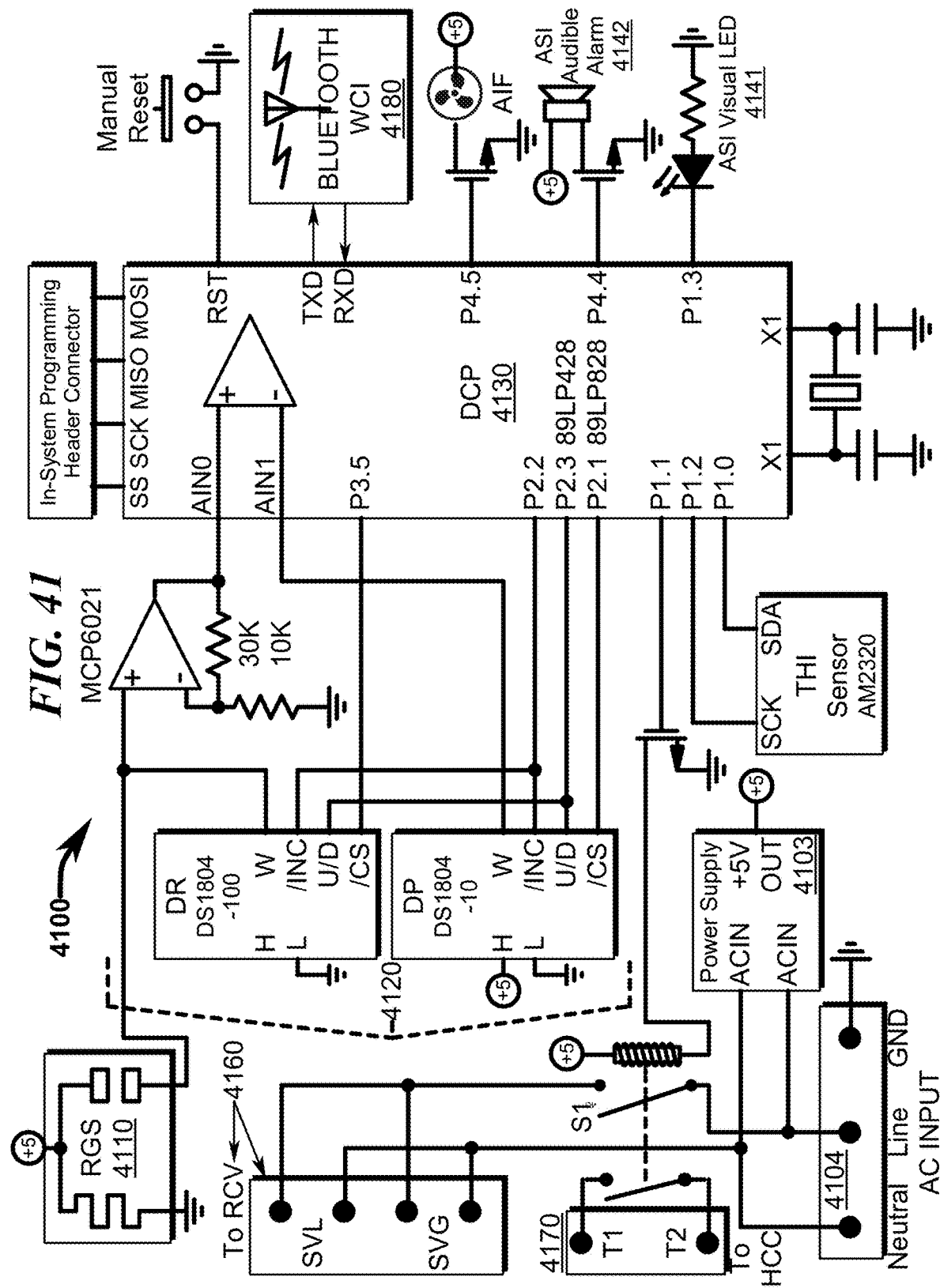
FIG. 41 illustrates an exemplary schematic of a preferred exemplary invention RLM system embodiment.
Figure 48:
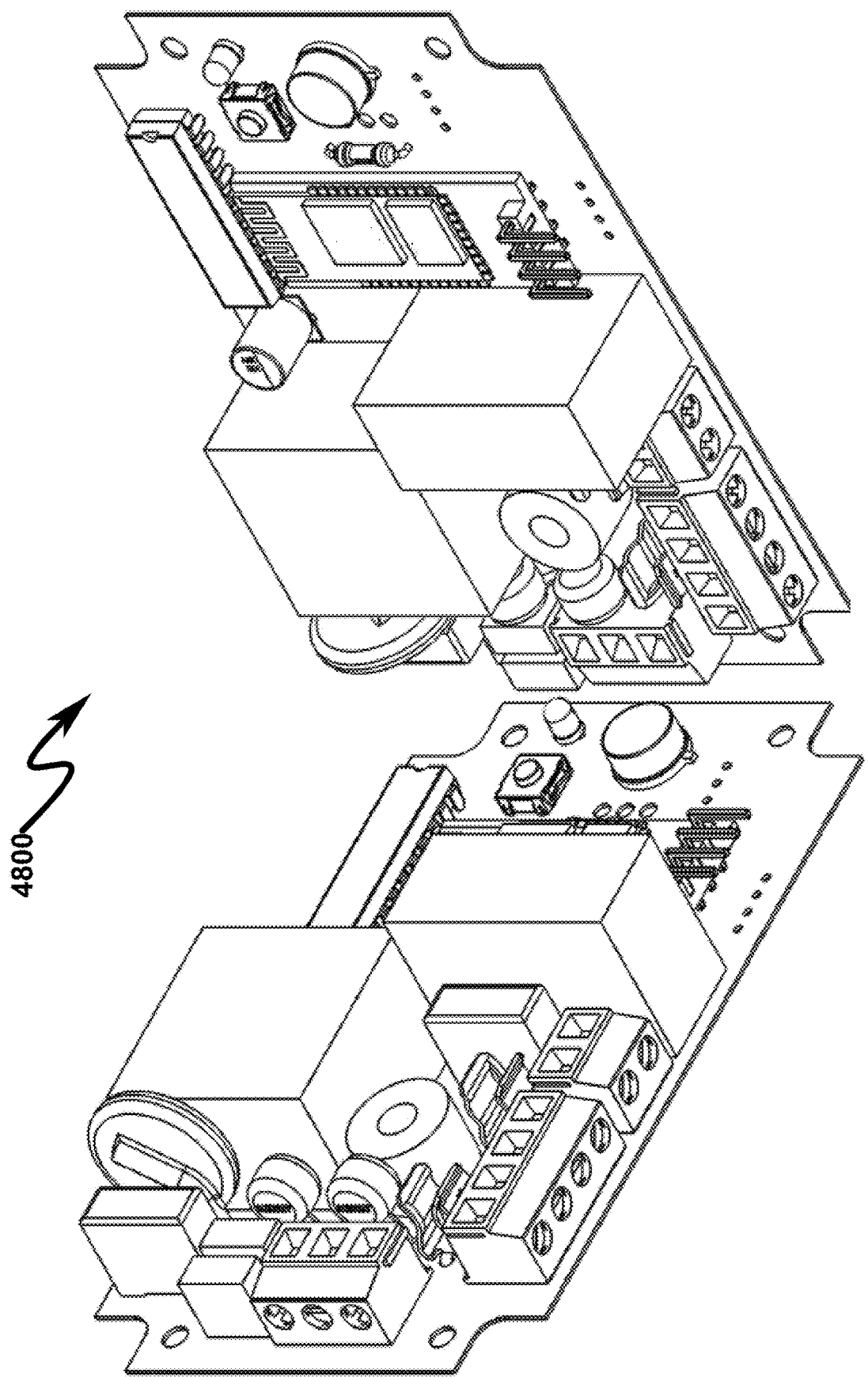
FIG. 48 illustrates bottom left side and bottom right side perspective views of a printed circuit board (PCB) hardware implementation of a preferred exemplary invention RLM system embodiment corresponding to the schematic of FIG. 41.

A preferred exemplary embodiment of a RLD system is generally depicted in FIG. 41 (4100)-FIG. 48 (4800). As generally depicted in the schematic of FIG. 41 (4100) it can be seen that the system may operate to control a variety of RCVs (4160) and T1/T2 HVAC compressor contactors (HCC) (4170) based on detection of a refrigerant leak by the RGS (4110).

The system as depicted is designed to operate using an AC power supply (4103) with AC power derived from the HVAC system and provides for Line/Neutral/Ground (LNG) (4104) power connections, SVL/SVG contactors (4160) that allow for activation of the refrigerant control valves (RCVs) in the HVAC refrigerant flow loop and T1/T2 contacts (4170) that control the HVAC compressor via the HCC.

Figure 42:
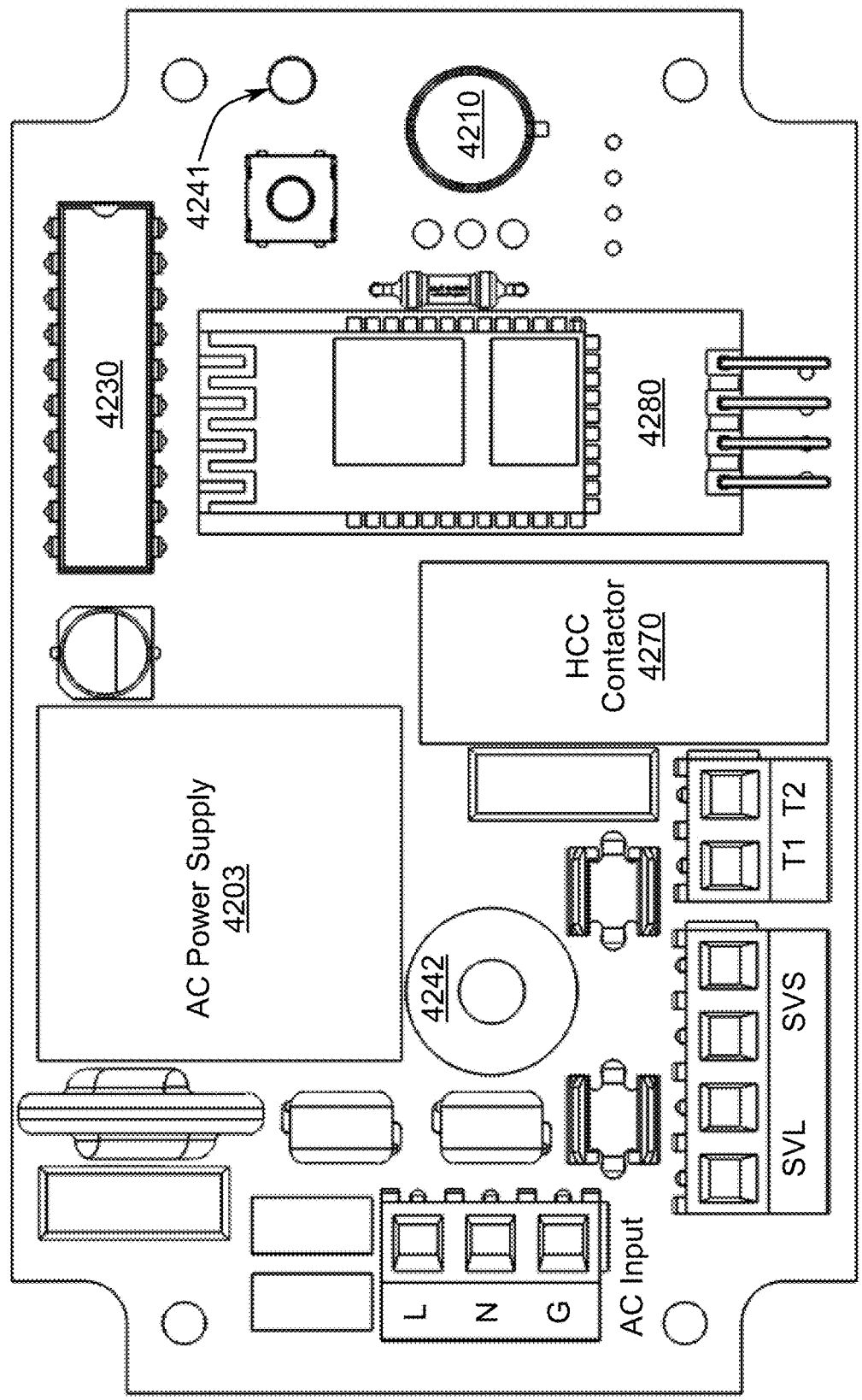
FIG. 42 illustrates a front view of a printed circuit board (PCB) hardware implementation of a preferred exemplary invention RLM system embodiment corresponding to the schematic of FIG. 41.
Figure 43:
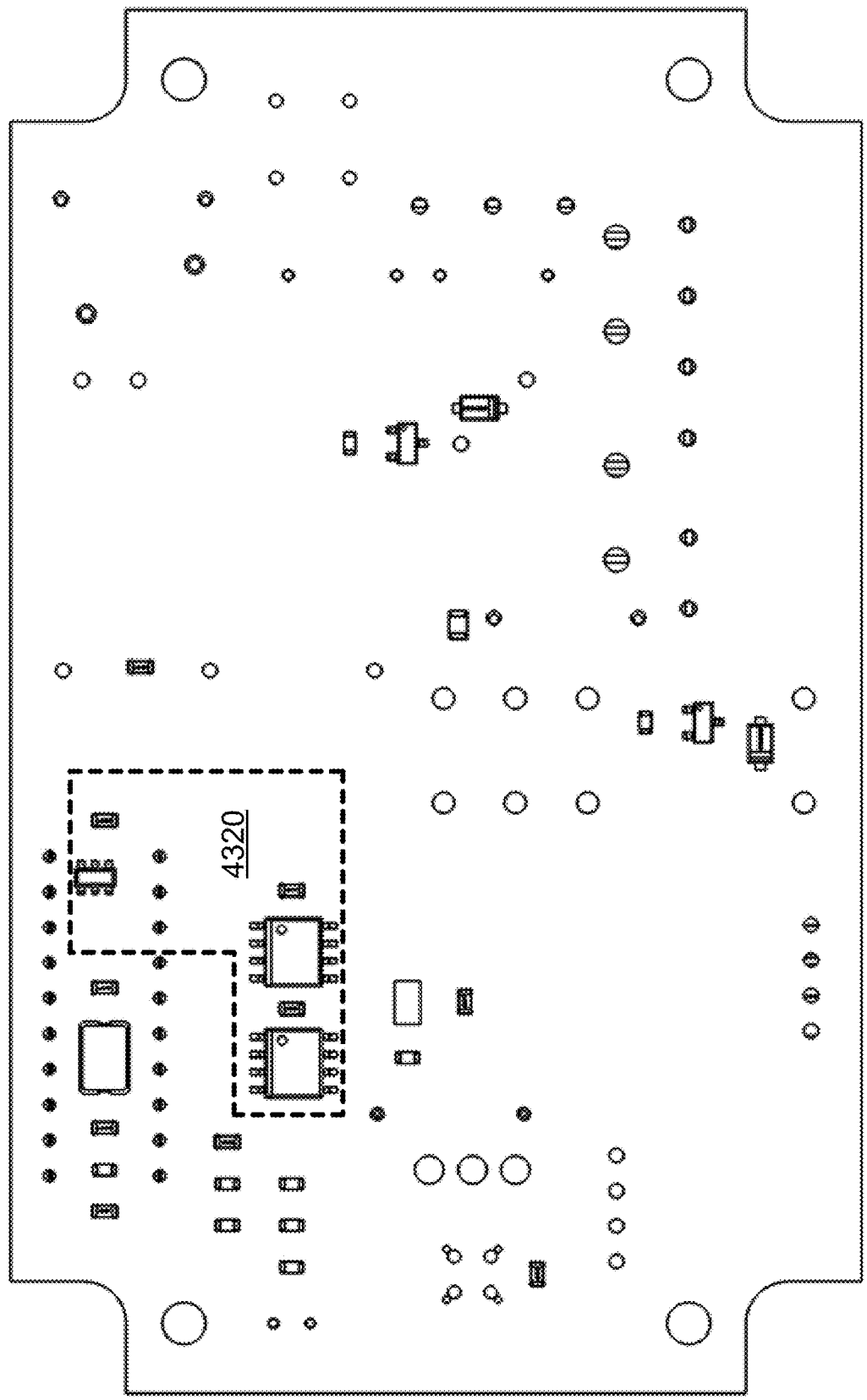
FIG. 43 illustrates a rear view of a printed circuit board (PCB) hardware implementation of a preferred exemplary invention RLM system embodiment corresponding to the schematic of FIG. 41.
Figure 44:
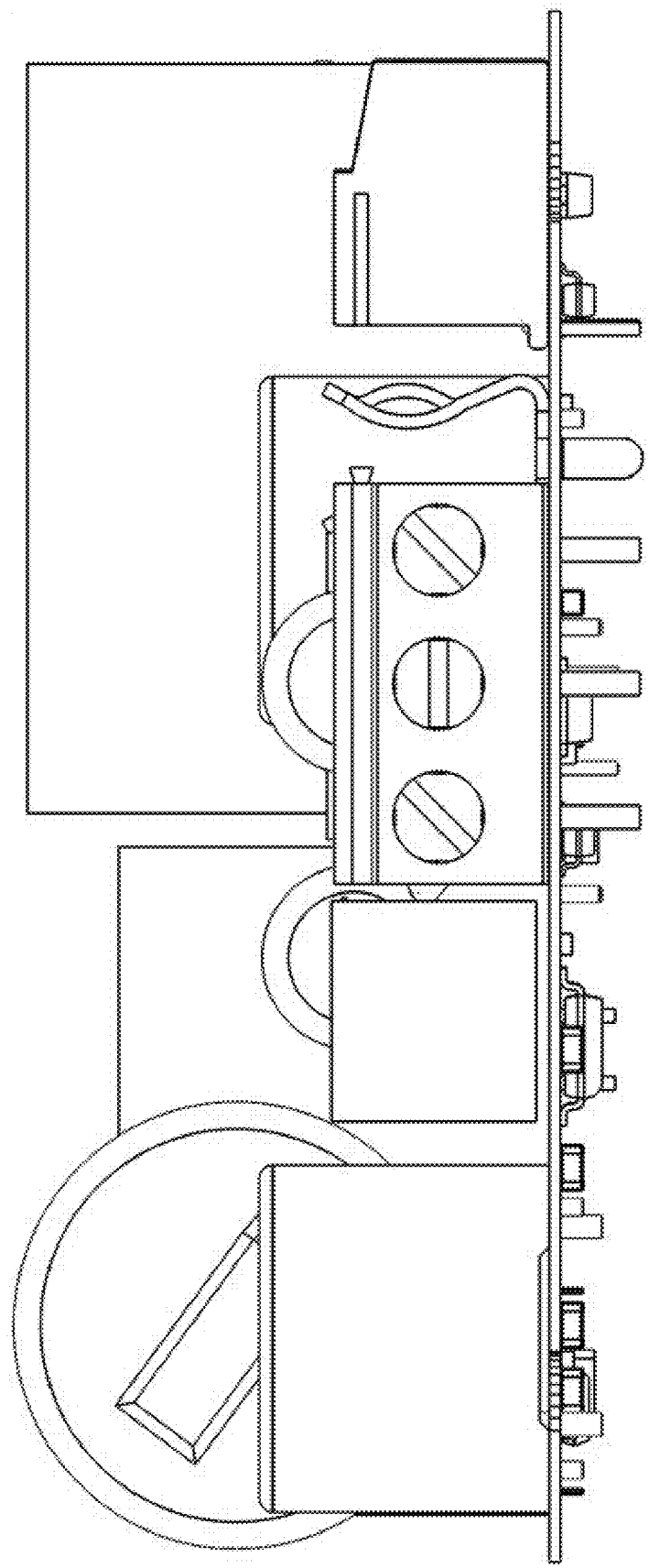
FIG. 44 illustrates a left side view of a printed circuit board (PCB) hardware implementation of a preferred exemplary invention RLM system embodiment corresponding to the schematic of FIG. 41.
Figure 45:
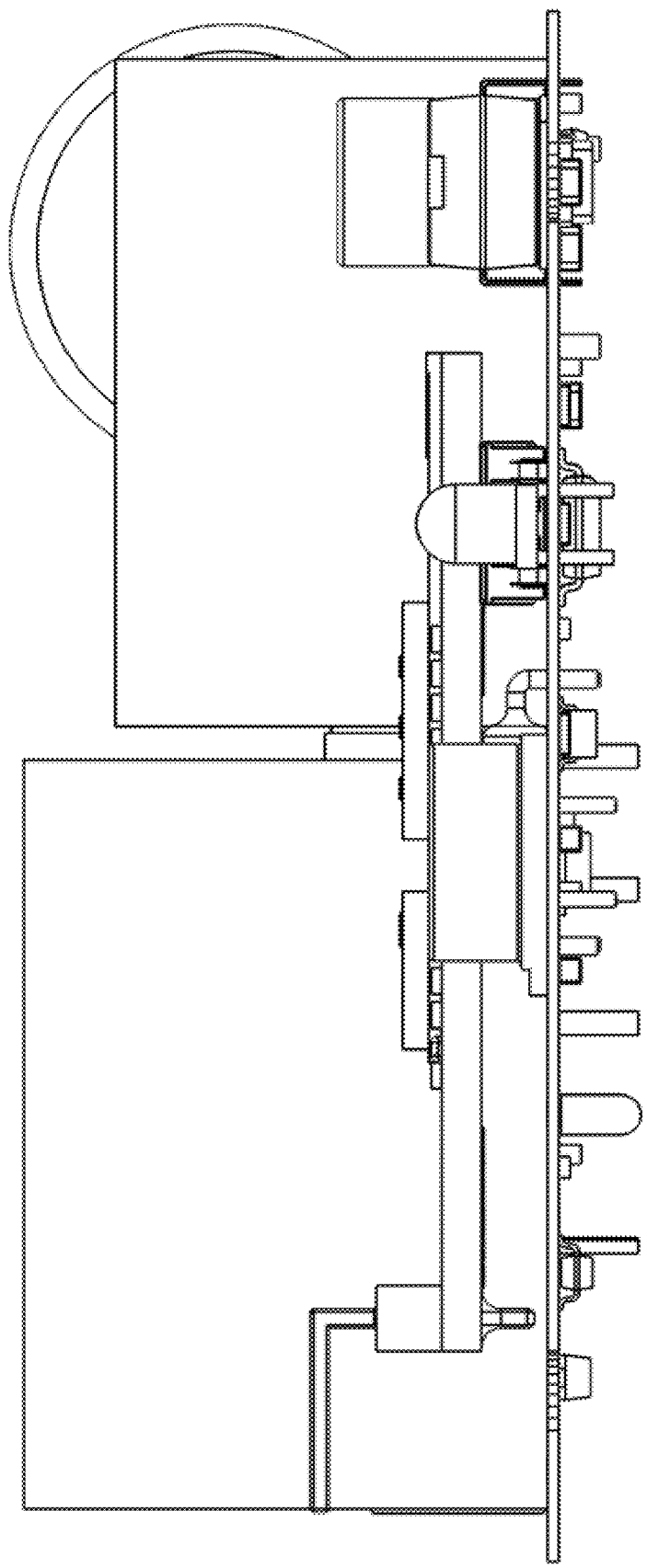
FIG. 45 illustrates a right side view of a printed circuit board (PCB) hardware implementation of a preferred exemplary invention RLM system embodiment corresponding to the schematic of FIG. 41.
Figure 46:
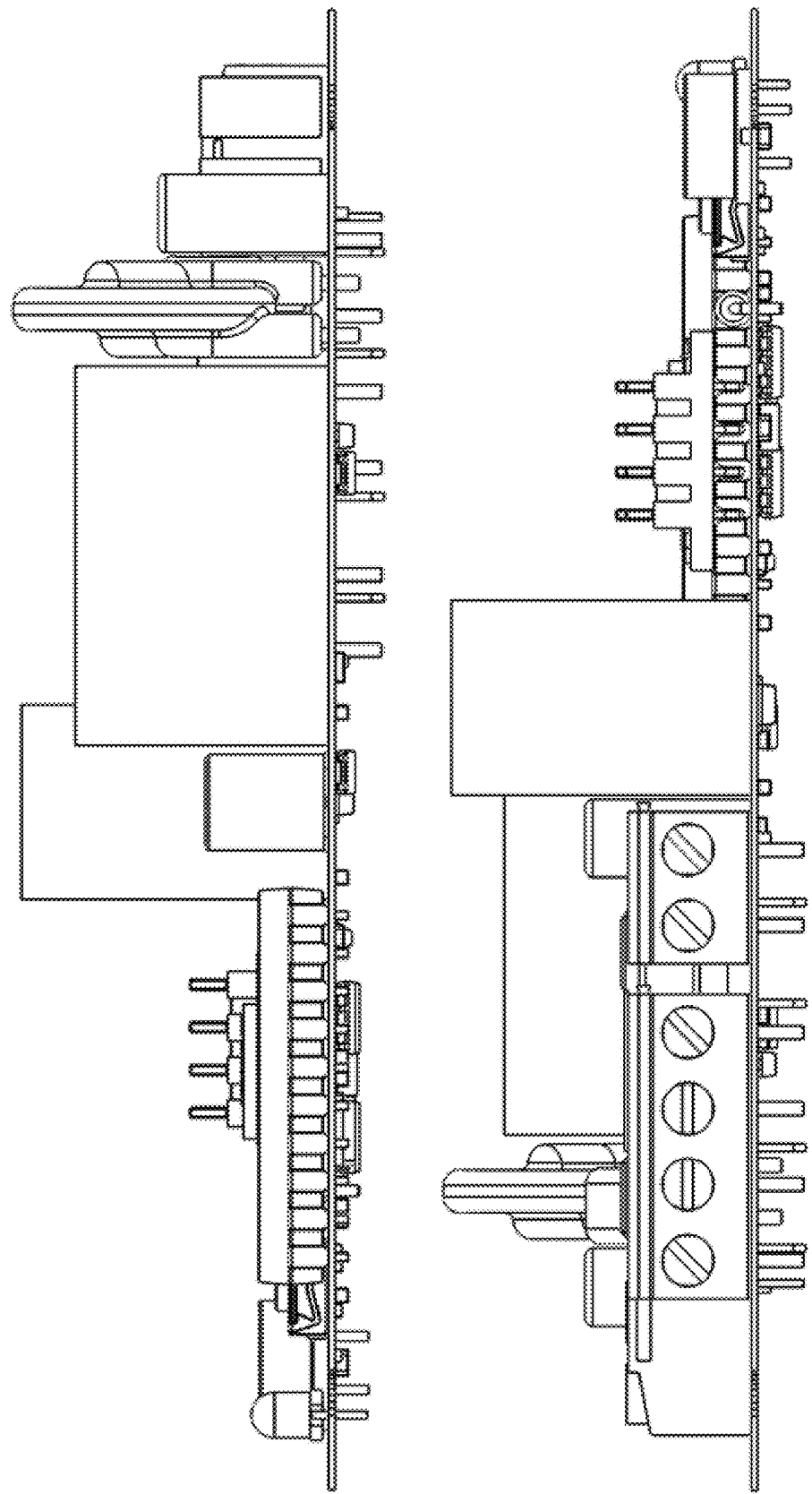
FIG. 46 illustrates top and bottom side views of a printed circuit board (PCB) hardware implementation of a preferred exemplary invention RLM system embodiment corresponding to the schematic of FIG. 41.
Figure 47:
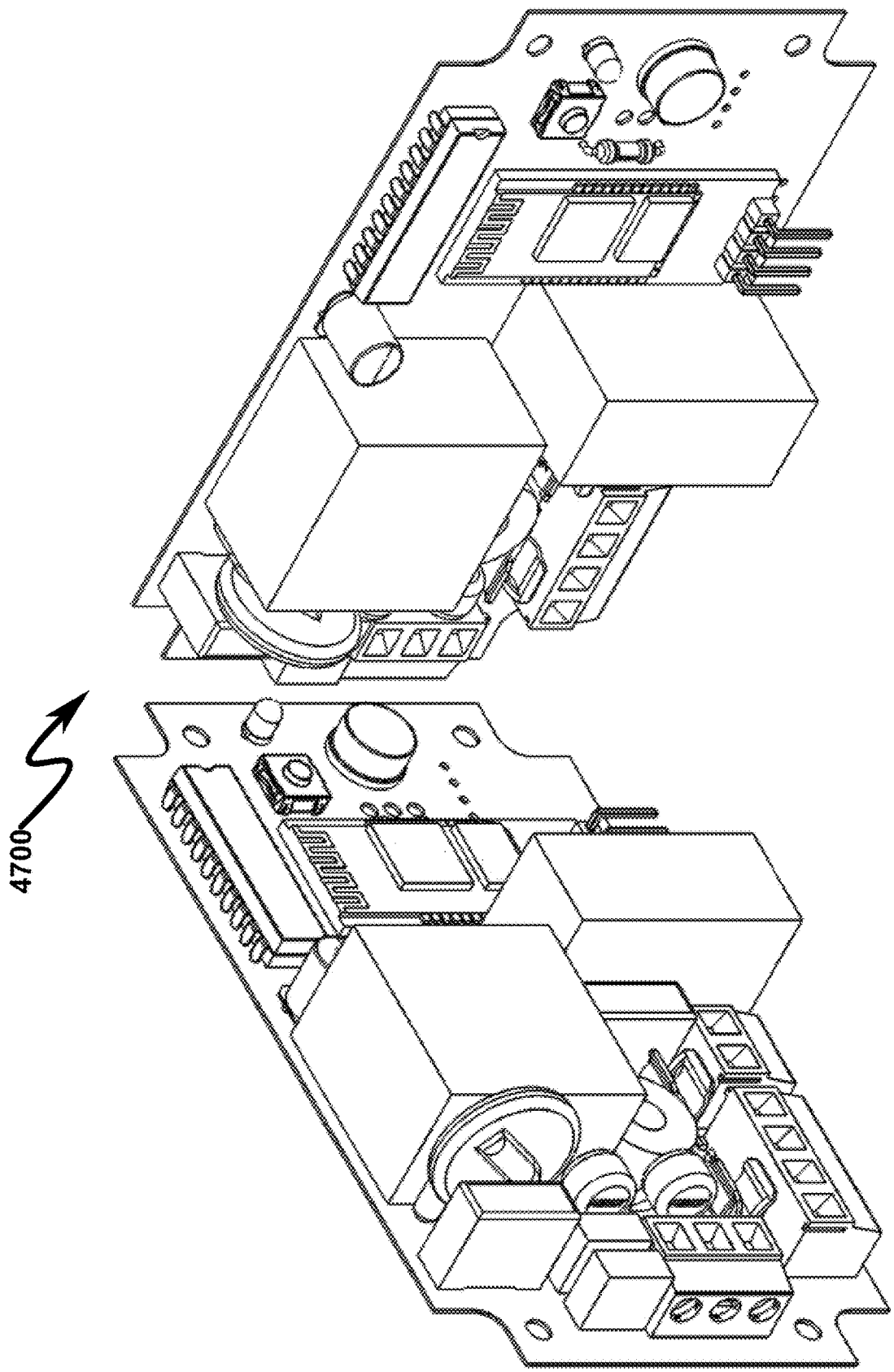
FIG. 47 illustrates top left side and top right side perspective views of a printed circuit board (PCB) hardware implementation of a preferred exemplary invention RLM system embodiment corresponding to the schematic of FIG. 41.

Provisions for the DCP (4130, 4230) is included on the top surface of the PCB depicted in FIG. 42 (4200)-FIG. 48 (4800) while the SSC components (4120, 4320) are provided for on the bottom surface of the PCB (FIG. 43 (4300)). ASI indicators are provided for visual (4141, 4241) and audible (4142, 4242) indicators.

Figure 50:
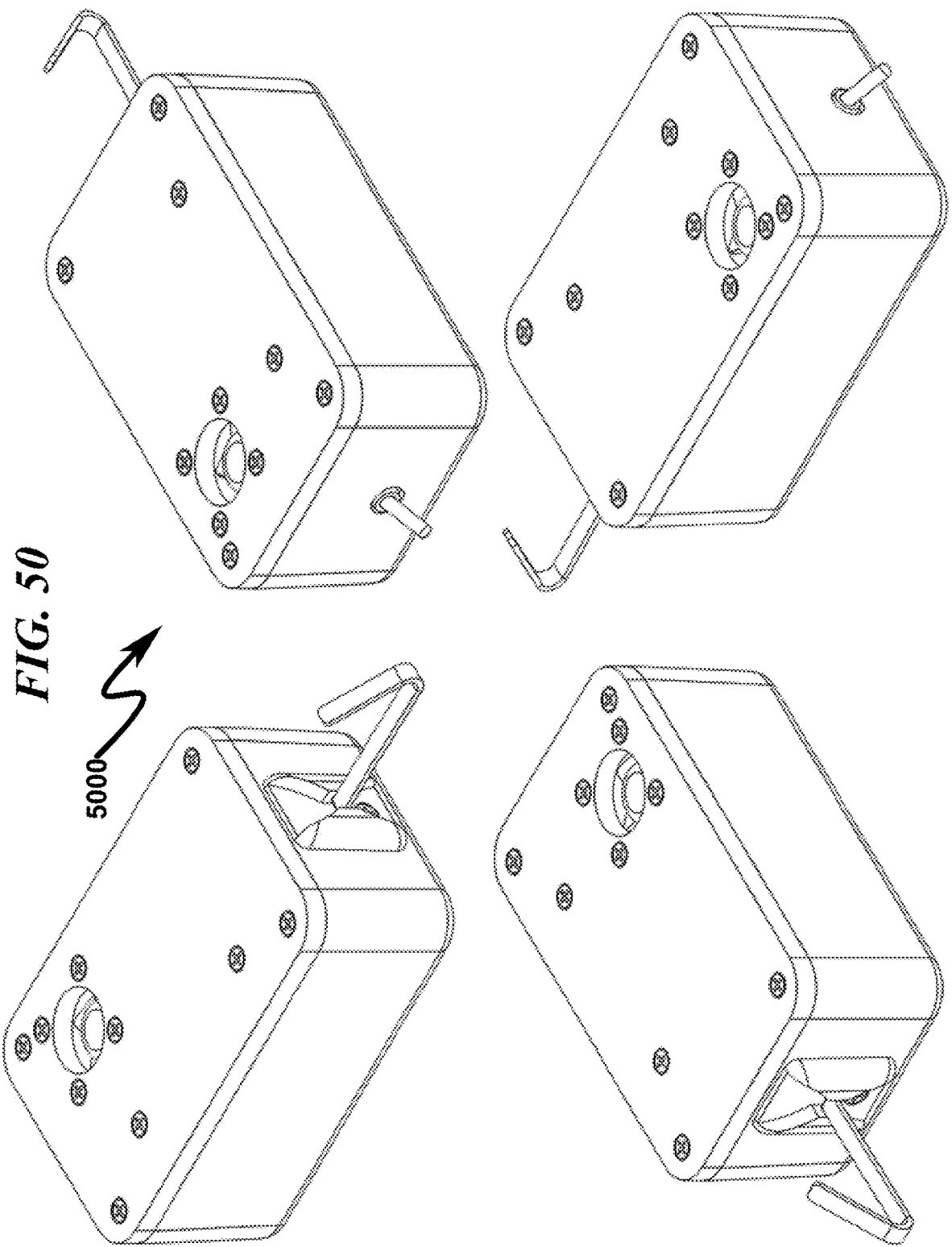
FIG. 50 illustrates various top perspective views of a preferred exemplary RLD system embodiment.
Figure 51:
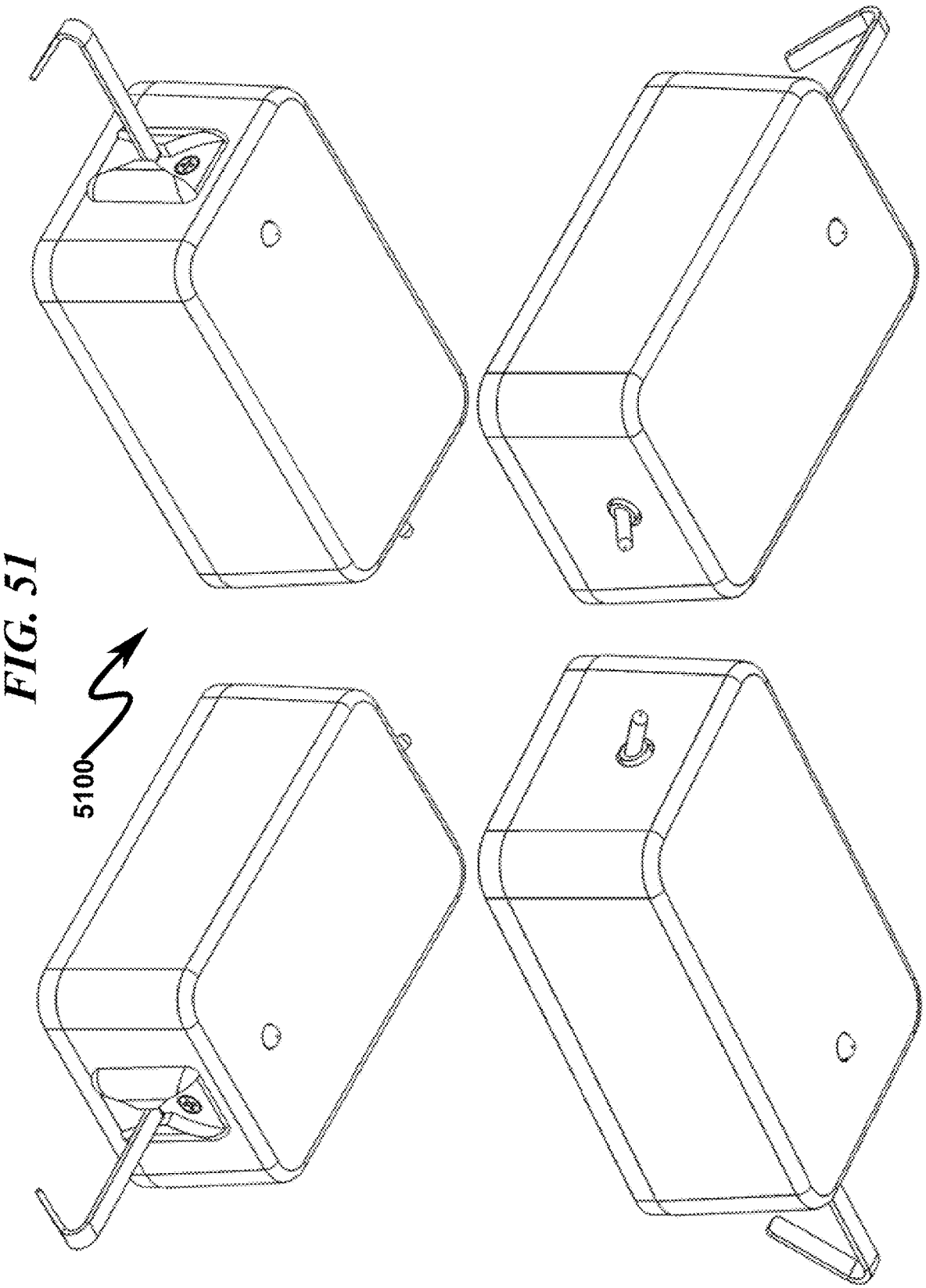
FIG. 51 illustrates various bottom perspective views of a preferred exemplary RLD system embodiment.

Exemplary PCB construction for this preferred exemplary RLM system embodiment is generally depicted in FIG. 42 (4200)-FIG. 48 (4800) but may vary widely based on application context. Note that commonly included miscellaneous components such as resistors, capacitors, surge suppression devices, and other similar components are not show in these figures for clarity and will be well known to those skilled in the art. A typical enclosure for this RLM is generally depicted in FIG. 50 (5000)-FIG. 51 (5100) and may encompass a form factor similar if not identical to that of a battery-powered RLD as described below.

RLD Exemplary System Embodiment (4900)- (5600)

Figure 49:
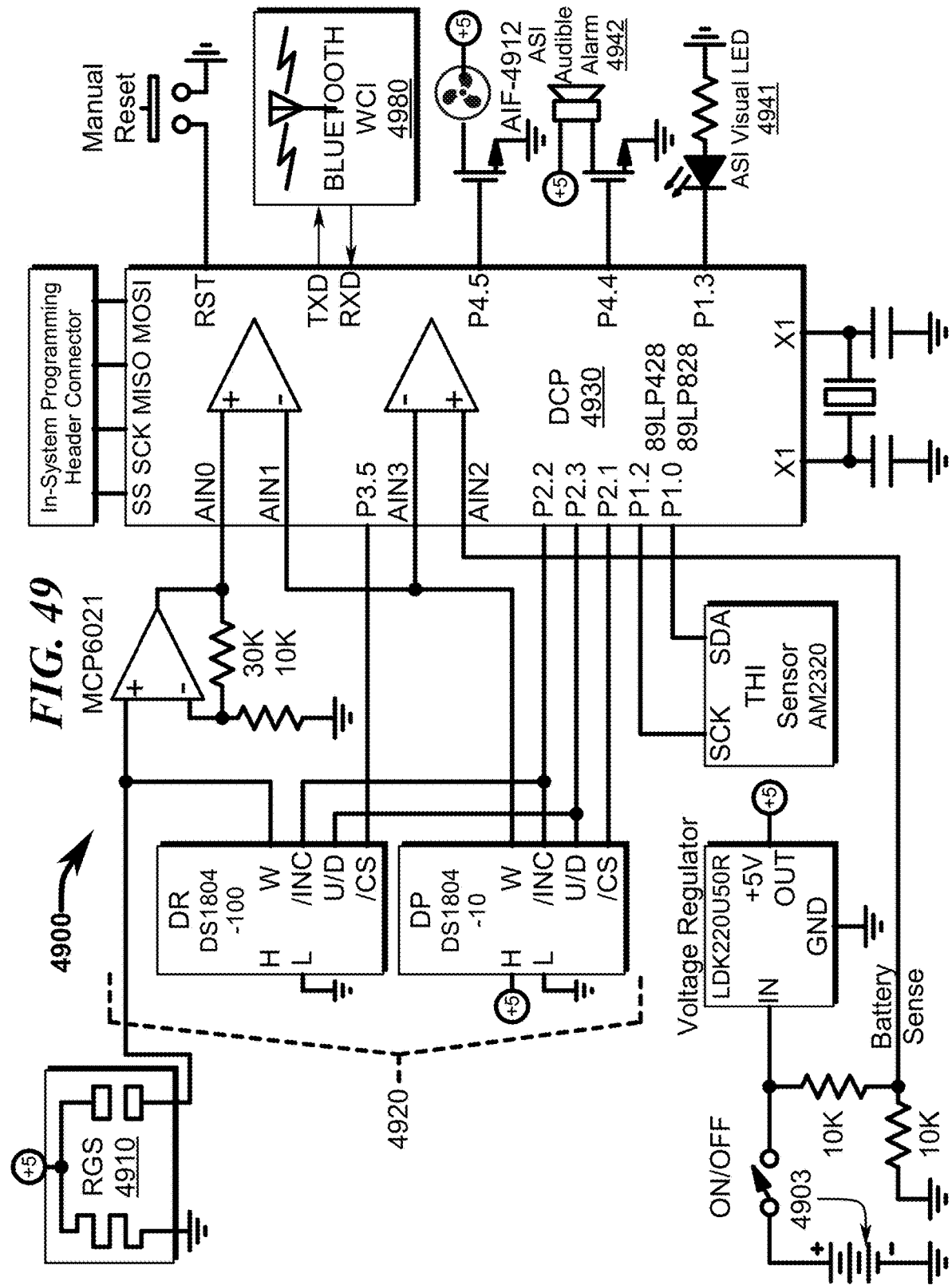
FIG. 49 illustrates a schematic depicting a preferred exemplary RLD system embodiment.
Figure 56:
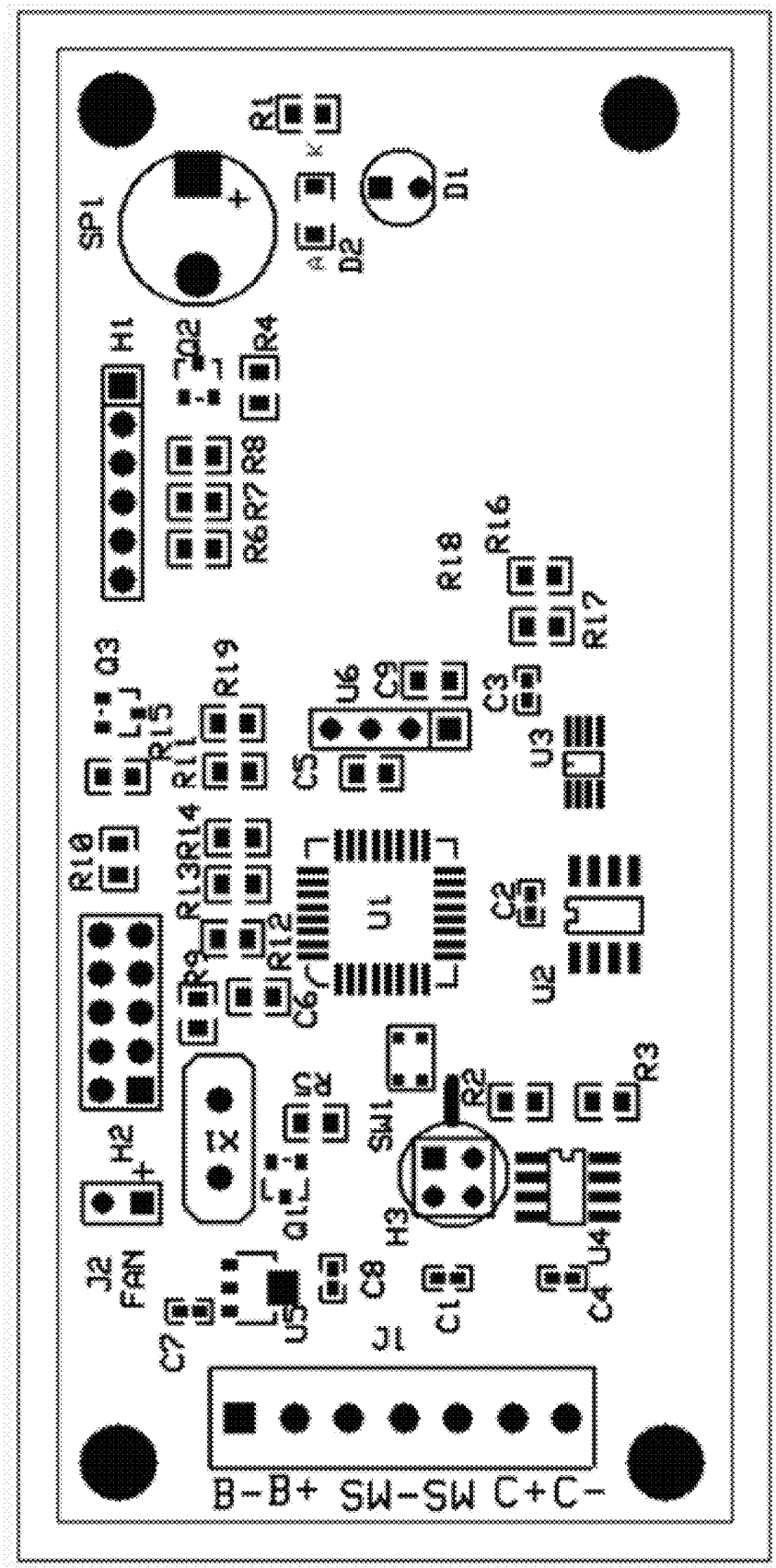
FIG. 56 illustrates a top view of a preferred exemplary PCB layout useful in some preferred exemplary RLD invention embodiments.

A preferred exemplary embodiment of a RLD system is generally depicted in FIG. 49 (4900)-FIG. 56 (5600). As generally depicted in the schematic of FIG. 49 (4900) it can be seen that the system is configured for portable battery (4903, 5203) operation and provides only for ASI visual (4941, 5341) and ASI audible (4942, 5242) alarms. Communication of ASI alarm status may also be transmitted using the indicated BLUETOOTH® WCI network (4980, 5280). This WCI (4980, 5280) may also provide for retrieval of a historical log of leak detection data stored by the DCP (4930, 5230) as well as control of the SSC (4920) and DCP (4930, 5230) operation, including but not limited to inhibition of the ASI audible alarm (4942, 5242). Additional information regarding these control functions is illustrated in FIG. 64 (6400) and accompanying descriptive text herein.

This preferred exemplary embodiment incorporates support for low battery detection as well as activation of an air intake fan (AIF) (4912, 5212) that may be controlled by the DCP (4930, 5230) to allow intake of ambient air to flood the system enclosure with an air flow that may contain indications of a refrigerant leak.

Figure 52:
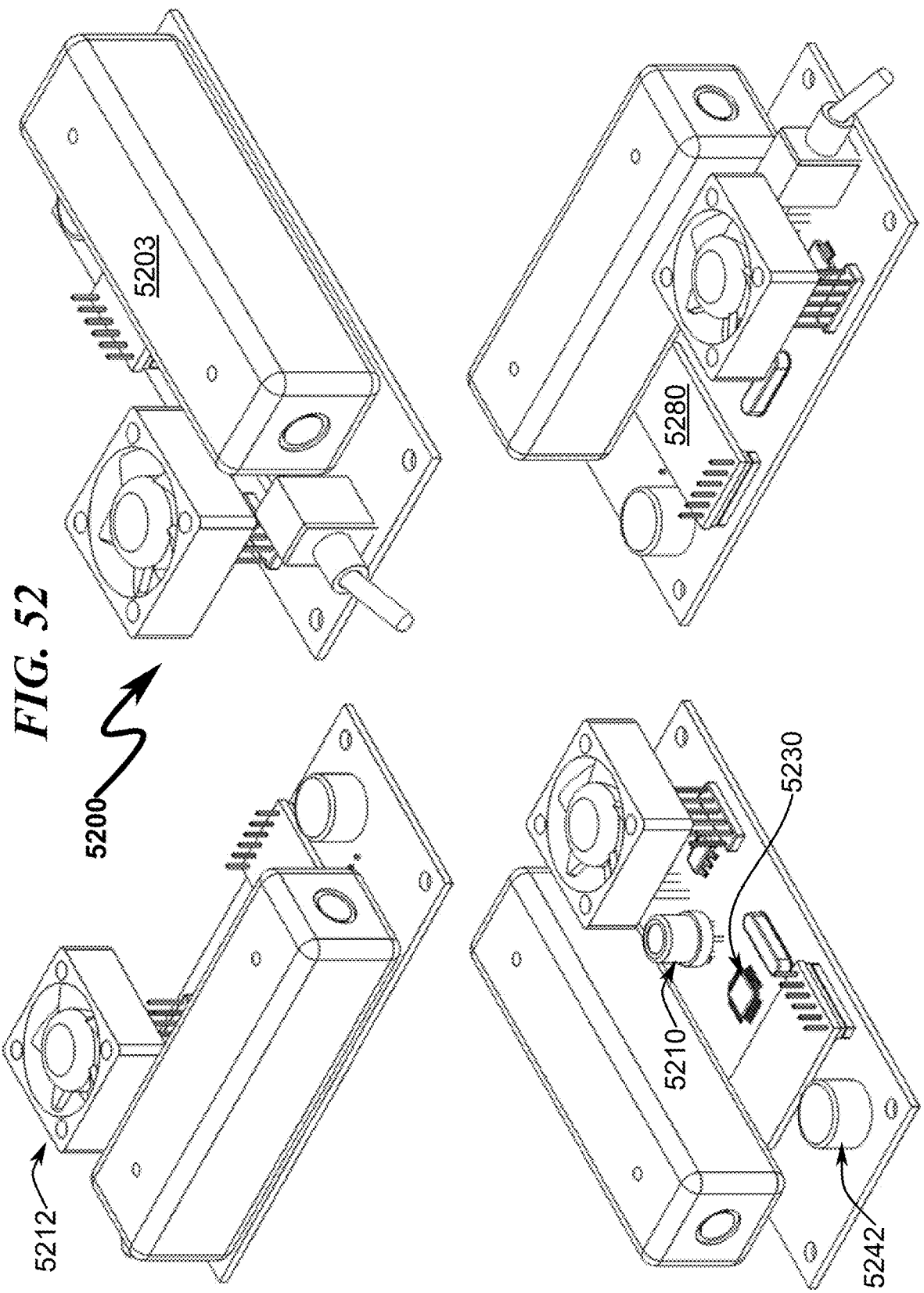
FIG. 52 illustrates various top internal perspective views of a preferred exemplary RLD system embodiment with enclosure, fasteners, and mounting hook omitted for clarity.
Figure 53:
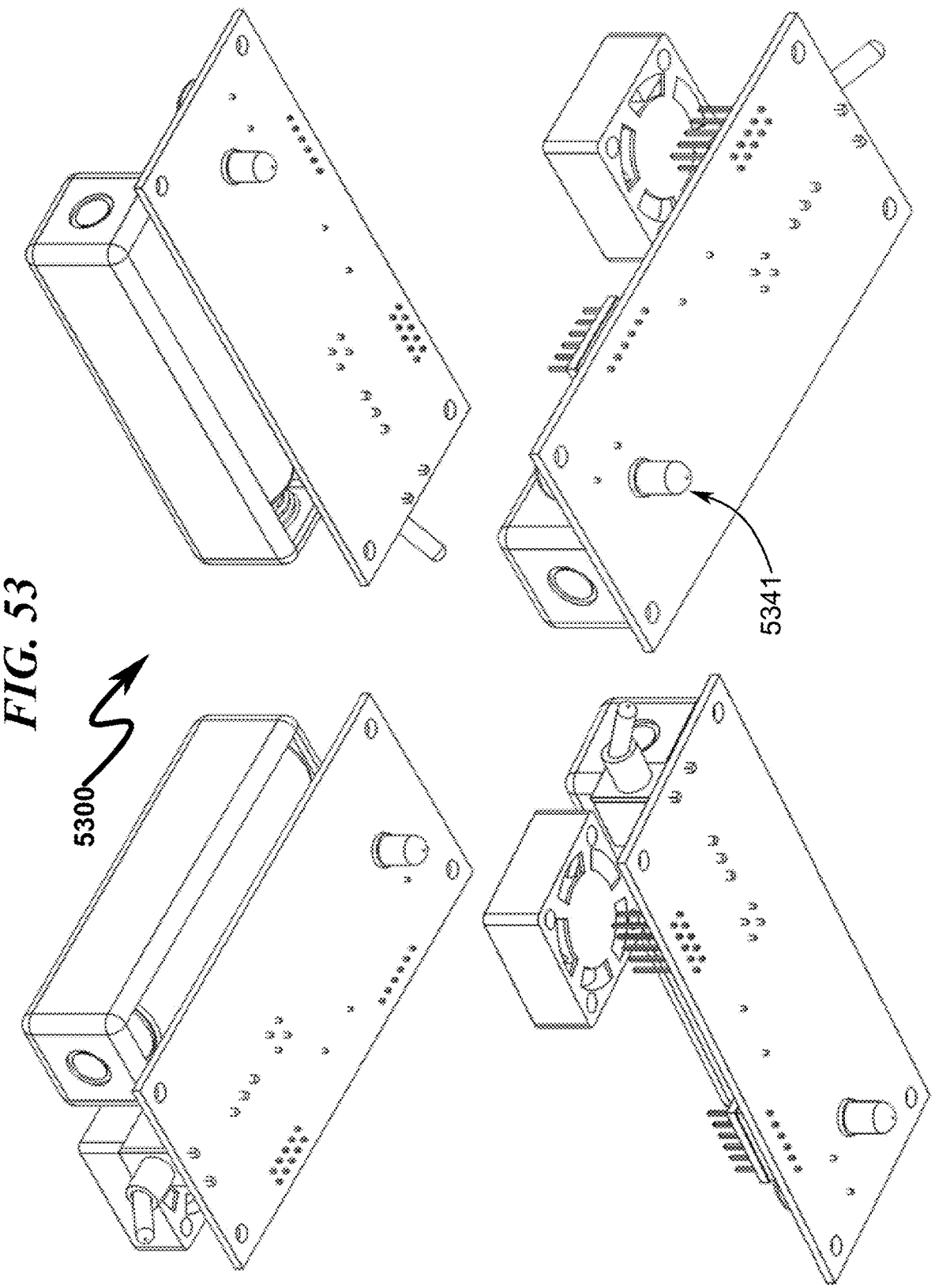
FIG. 53 illustrates various bottom internal perspective views of a preferred exemplary RLD system embodiment with enclosure, fasteners, and mounting hook omitted for clarity.
Figure 54:
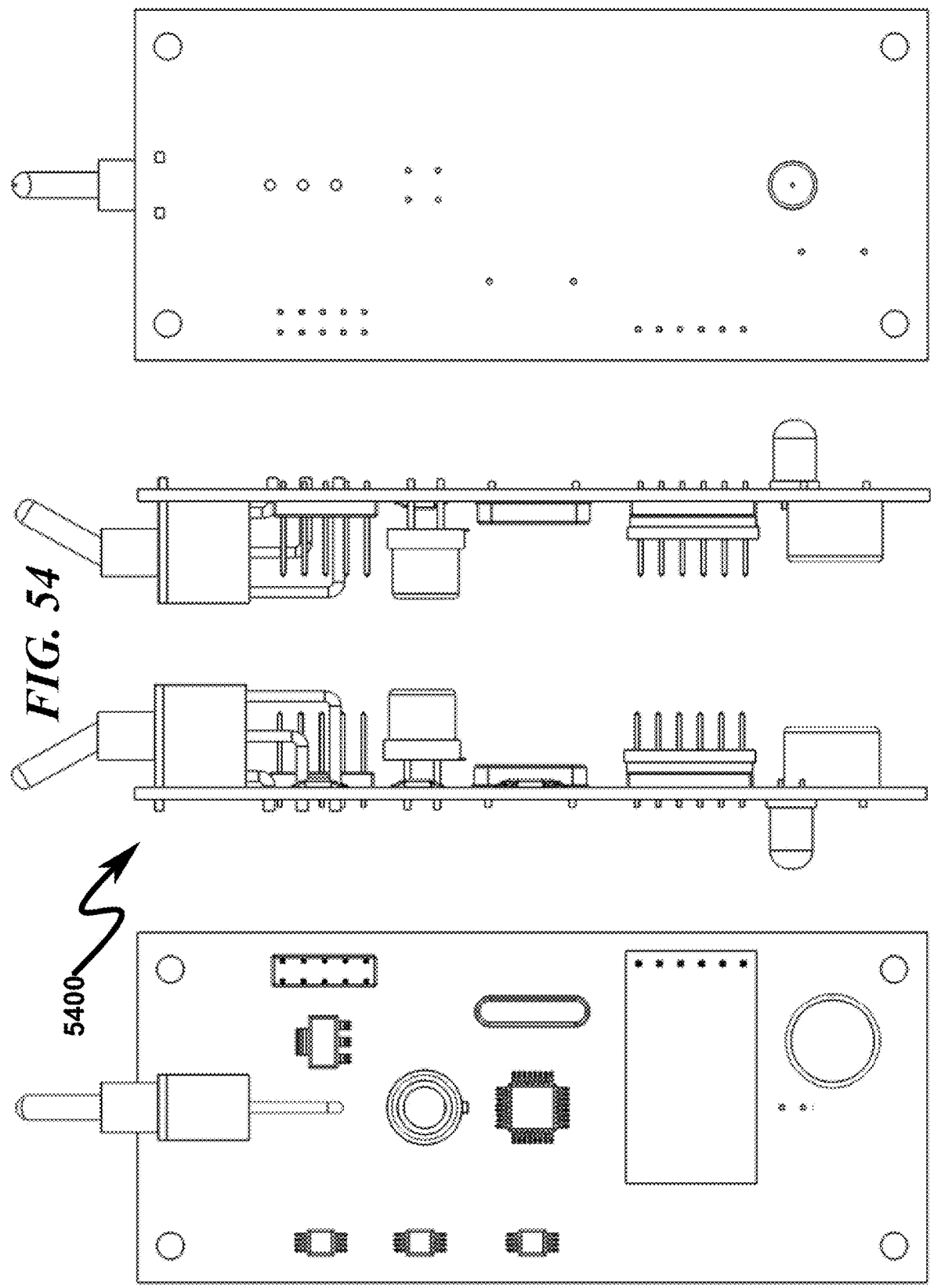
FIG. 54 illustrates top, side, and bottom views of a preferred exemplary RLD system PCB embodiment.
Figure 55:
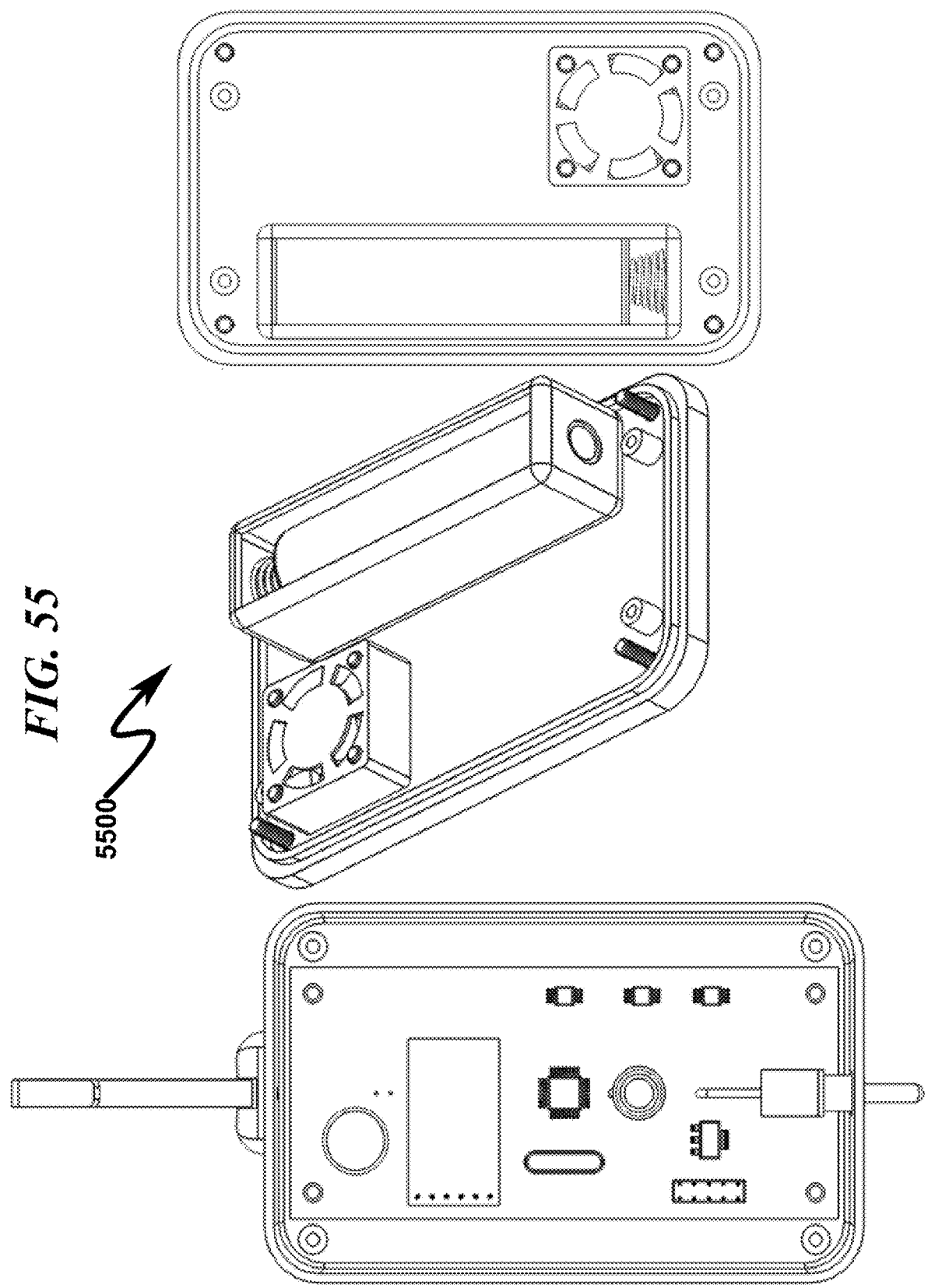
FIG. 55 illustrates top internal views of a preferred exemplary RLD system embodiment showing the base enclosure with PCB and support hanger and various views of the enclosure lid with AIF and battery holder/battery.

Physical construction of this preferred embodiment may vary widely, but one potential example is depicted in FIG. 50 (5000)-FIG. 56 (5600), wherein a box enclosure contains a printed circuit board (PCB) comprising analog and digital components from FIG. 49 (4900), and also serves as an enclosure for the battery, AIF, and RGS. One skilled in the art will recognize that the component placement depicted in FIG. 52 (5200)-FIG. 55 (5500) may vary widely based on a particular application context. While only exemplary, the PCB layout of FIG. 56 (5600) indicates one possible layout of components on the PCB. Within these illustrations cable assemblies have been omitted for clarity in depicting the positioning of components and other assemblies.

Typical Application Context (5700)

Figure 57:
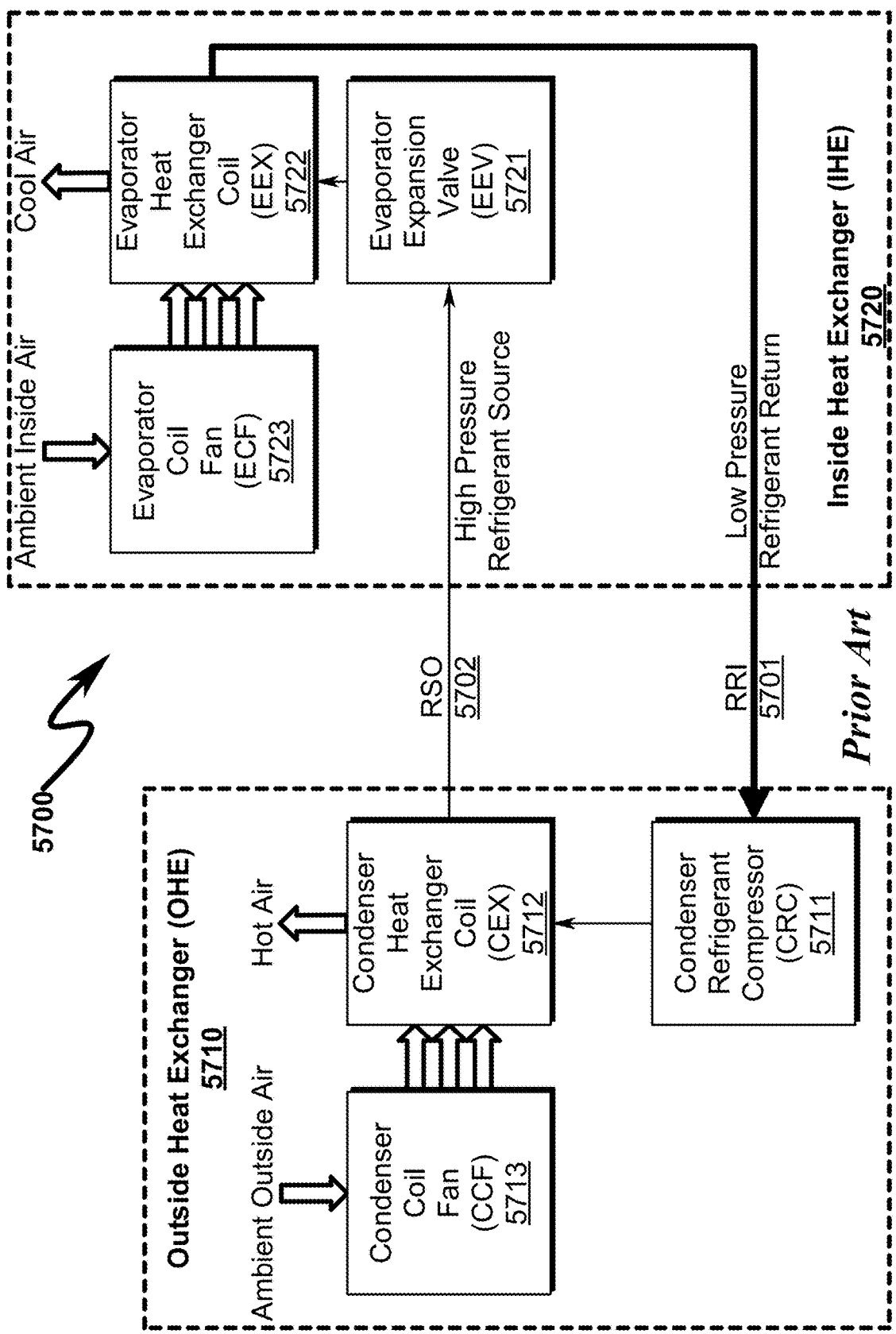
FIG. 57 illustrates a schematic of a prior art HVAC system showing major components and refrigerant flow loop.

A typical prior art application context in which the present invention may be employed is depicted in FIG. 57 (5700) wherein a heat exchanger system incorporating an outside heat exchanger (OHE) (5710) and an inside heat exchanger (IHE) (5720) is generally depicted.

Here it can be seen that the OHE (5710) is configured with a condenser refrigerant compressor (CRC) (5711) that compresses gaseous low pressure refrigerant (GLP) from a low pressure refrigerant return refrigerant return input (RRI) (5701) to a liquefied high pressure refrigerant (LHP) and passes the LHP through a condenser heat exchanger coil (CEX) (5712). A condenser coil fan (CCF) (5713) is configured to blow ambient outside air through the coils of the CEX (5712) and remove heat from the LHP.

After heat removal from the LPF by the CCF (5713), the LPF is transmitted via piping through a refrigerant source output (RSO) (5702) to the IHE (5720) and an evaporator expansion valve (EEV) (5721) that allows expansion of the LHP into a GLP that is then passed through an evaporator heat exchanger coil (EEX) (5722). An evaporator coil fan (ECF) (5723) is configured to blow ambient inside air through the coils of the EEX (5722) and transfer heat from the inside ambient air to the GLP and produce cool air. The GLP with accumulated heat from the ambient inside air is then transferred back to the CRC (5711) to complete the refrigeration cycle.

As indicated in this diagram, any leak or failure of plumbing in the IHE (5720) will result in contamination of the IHE (5720) and the surrounding inside building environment with refrigerant. In typical failure scenarios, the EEX (5722) will fail with one or more pinhole leaks that result in minor and eventual catastrophic refrigerant loss within the building structure containing the IHE (5720). Since refrigerant can displace air and result in a number of health related injuries to humans, mitigation of refrigerant loss is a safety issue inherent in all compressor/evaporator heat exchangers as generally depicted in FIG. 57 (5700).

RLC System Summary (5800)

Figure 58:
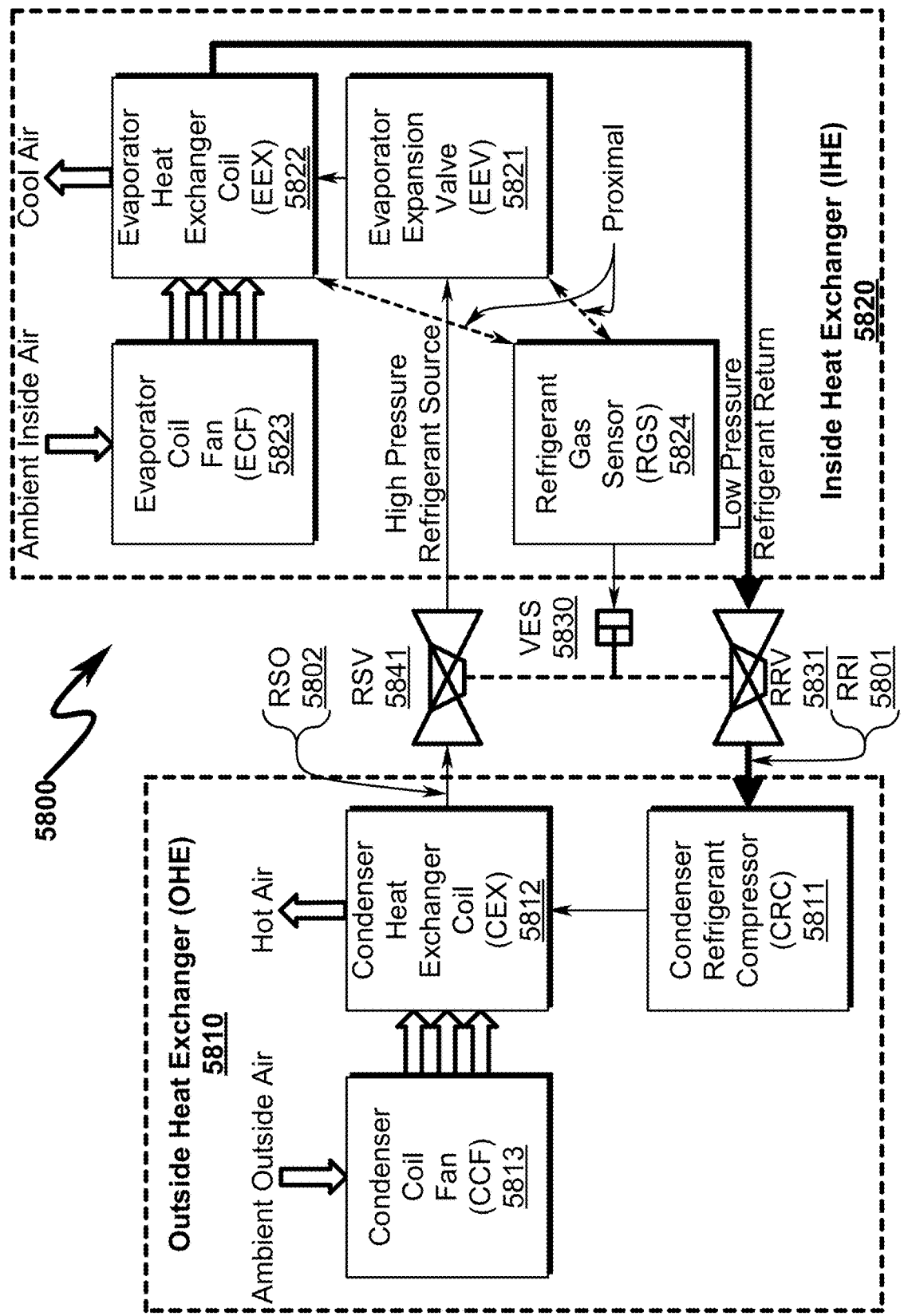
FIG. 58 illustrates a schematic depicting a preferred exemplary embodiment of a present invention refrigerant leak mitigation (RLM) system.

An exemplary preferred invention system embodiment is generally depicted in FIG. 58 (5800) wherein a heat exchanger system incorporating an outside heat exchanger (OHE) (5810) and an inside heat exchanger (IHE) (5820) is generally depicted.

Here it can be seen that the OHE (5810) is configured with a condenser refrigerant compressor (CRC) (5811) that compresses gaseous low pressure refrigerant (GLP) from a low pressure refrigerant return refrigerant return input (RRI) (5801) to a liquefied high pressure refrigerant (LHP) and passes the LHP through a condenser heat exchanger coil (CEX) (5812). The low pressure refrigerant return refrigerant return input (RRI) (5801) is gated by a refrigerant return valve (RRV) (5831) that is controlled by a valve electrical solenoid (VES) (5830). A condenser coil fan (CCF) (5813) is configured to blow ambient outside air through the coils of the CEX (5812) and remove heat from the LHP.

After heat removal from the LPF by the CCF (5813), the LPF is transmitted via piping through a refrigerant source output (RSO) (5802) and gated by a refrigerant source valve (RSV) (5841) controlled by the VES (5830) to the IHE (5820) and an evaporator expansion valve (EEV) (5821) that allows expansion of the LHP into a GLP that is then passed through an evaporator heat exchanger coil (EEX) (5822). An evaporator coil fan (ECF) (5823) is configured to blow ambient inside air through the coils of the EEX (5822) and transfer heat from the inside ambient air to the GLP and produce cool air. The GLP with accumulated heat from the ambient inside air is then transferred back to the CRC (5811) to complete the refrigeration cycle.

As indicated in this diagram, any leak or failure of plumbing in the IHE (5820) will result in contamination of the IHE (5820) and the surrounding inside building environment with refrigerant. In typical failure scenarios, the EEX (5822) will fail with one or more pinhole leaks that result in minor and eventual catastrophic refrigerant loss within the building structure containing the IHE (5820). To prevent this refrigerant leak contamination scenario, a refrigerant gas sensor (RGS) (5824) continuously senses for the presence of a refrigerant leak proximal to the EEV (5821) and/or EEX (5822) and upon detection of a refrigerant leak, activates the VES (5830) to close the RRV (5831) and RSV (5841) thus isolating the refrigerant leak to the IHE (5820) and preventing a catastrophic refrigerant leak from fully evacuating both the OHE (5810) and IHE (5820) to the enclosed building structure serviced by the IHE (5820). As shown in the block diagram of FIG. 58 (5800), the VES (5830) may be configured to simultaneously mechanically close the RRV (5831) and RSV (5841) or in some other preferred embodiments separate VES (5830) actuators may be utilized to separately close the RRV (5831) and RSV (5841) upon detection of a refrigerant leak by the RGS (5824).

RLC Method Summary (5900)

Figure 59:
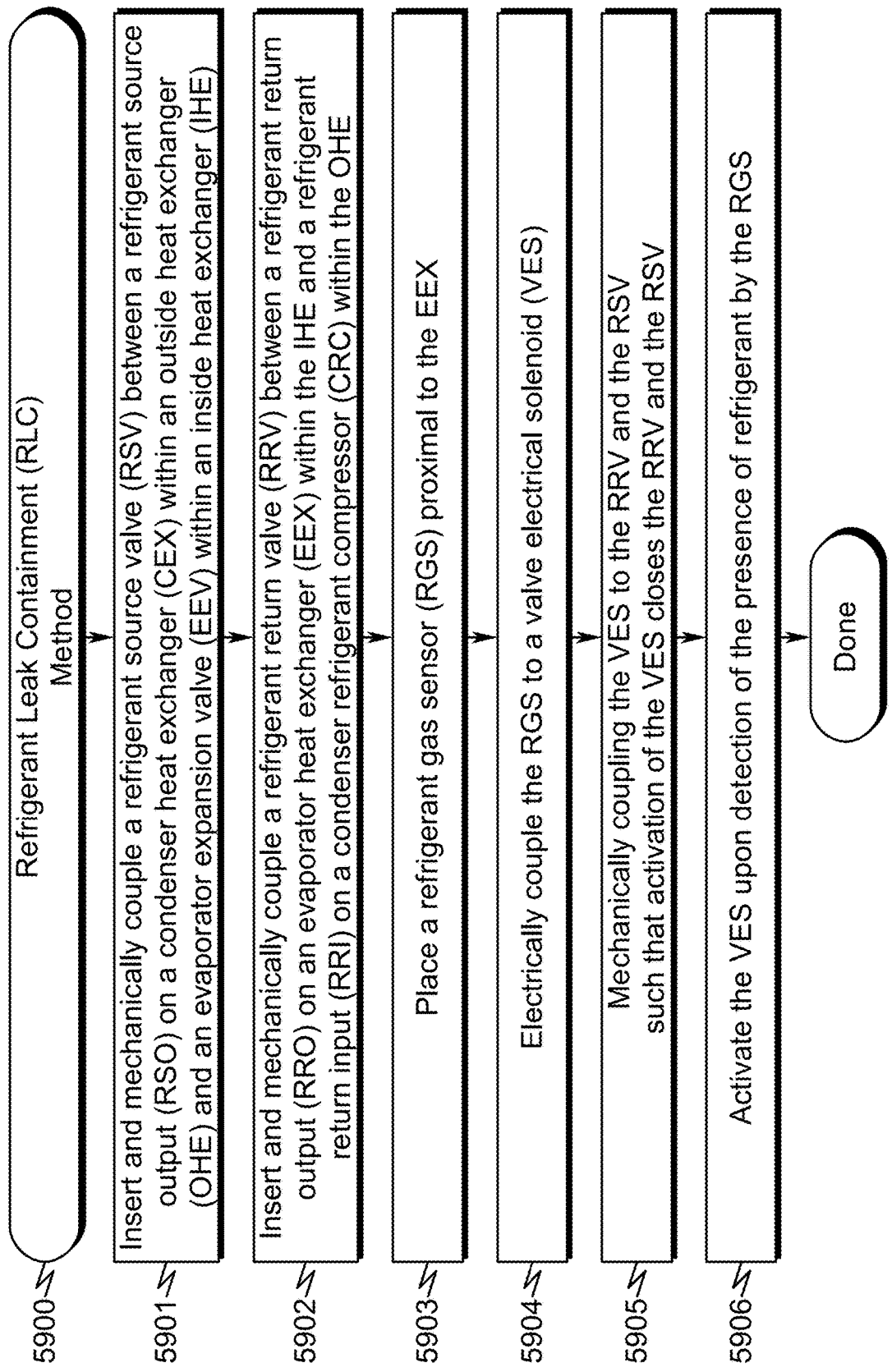
FIG. 59 illustrates a flowchart depicting a preferred exemplary embodiment of a present invention refrigerant leak mitigation (RLM) method.

The system depicted in FIG. 58 (5800) may be associated with a retrofit or OEM refrigerant leak containment (RLC) method as generally depicted in the flowchart of FIG. 59 (5900) comprising the following steps:
(1) inserting and mechanically coupling a refrigerant source valve (RSV) between a refrigerant source output (RSO) on a condenser heat exchanger (CEX) within an outside heat exchanger (OHE) and an evaporator expansion valve (EEV) within an inside heat exchanger (IHE) (5901);
(2) inserting and mechanically coupling a refrigerant return valve (RRV) between a refrigerant return output (RRO) on an evaporator heat exchanger (EEX) within the IHE and a refrigerant return input (RRI) on a condenser refrigerant compressor (CRC) within the OHE (5902);
(3) placing a refrigerant gas sensor (RGS) proximal to the EEX (5903);
(4) electrically coupling the RGS to a valve electrical solenoid (VES) (5904);
(5) mechanically coupling the VES to the RRV and the RSV such that activation of the VES closes the RRV and the RSV (5905); and
(6) activating the VES upon detection of the presence of refrigerant by the RGS (5906).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Cycled Shutoff System Summary (6000)

Figure 60:
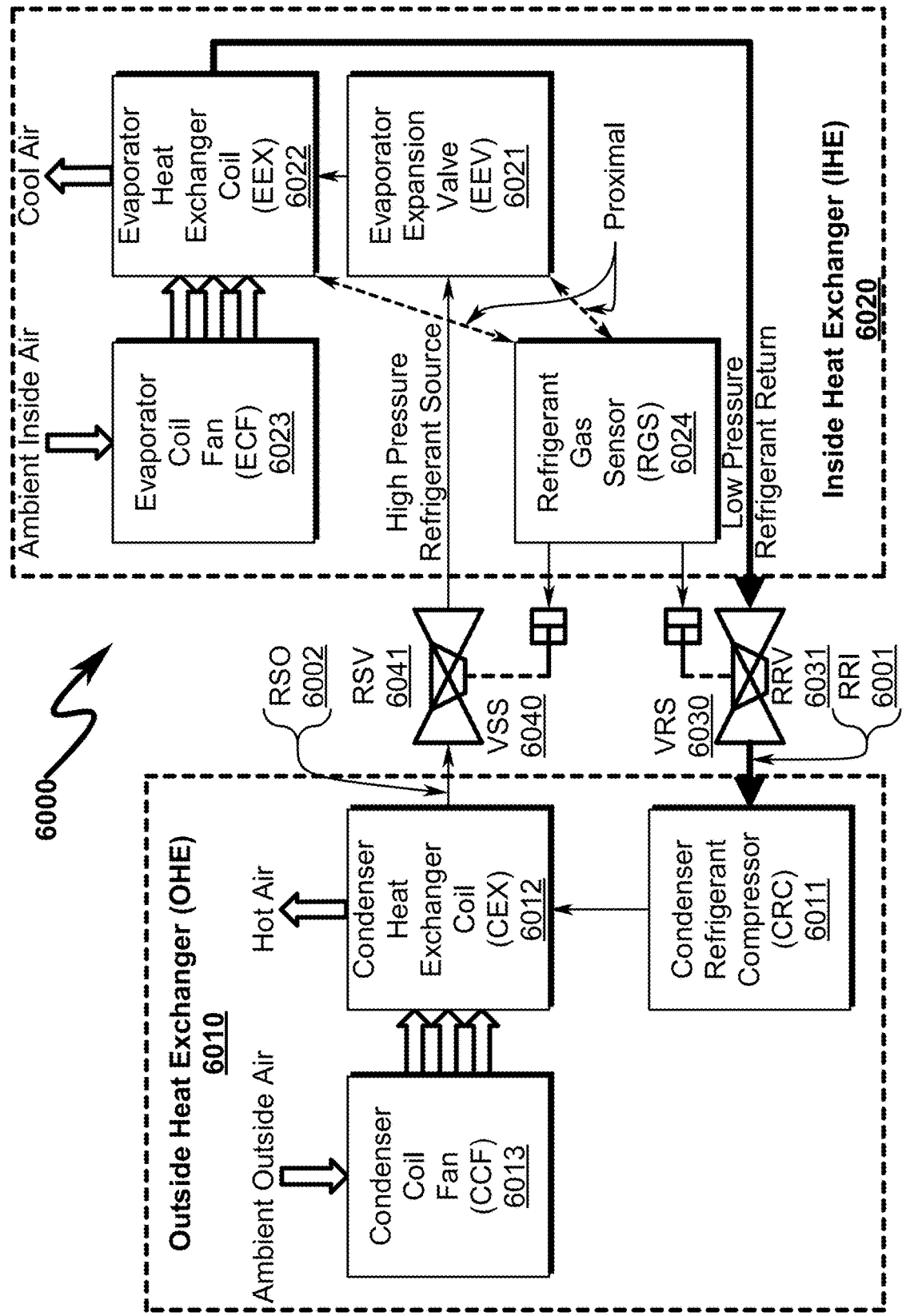
FIG. 60 illustrates a schematic depicting a preferred exemplary embodiment of a present invention refrigerant leak mitigation (RLM) system with independent refrigerant control valve (RCV) activation.

As mentioned previously the VES may be implemented as separate controls to independently cycle the shutoff of high and low pressure refrigerant in the system. An exemplary preferred invention system cycled shutoff embodiment is generally depicted in FIG. 60 (6000) wherein a heat exchanger system incorporating an outside heat exchanger (OHE) (6010) and an inside heat exchanger (IHE) (6020) is generally depicted.

Here it can be seen that the OHE (6010) is configured with a condenser refrigerant compressor (CRC) (6011) that compresses gaseous low pressure refrigerant (GLP) from a low pressure refrigerant return refrigerant return input (RRI) (6001) to a liquefied high pressure refrigerant (LHP) and passes the LHP through a condenser heat exchanger coil (CEX) (6012). The low pressure refrigerant return refrigerant return input (RRI) (6001) is gated by a refrigerant return valve (RRV) (6031) that is controlled by a valve return electrical solenoid (VRS) (6030). A condenser coil fan (CCF) (6013) is configured to blow ambient outside air through the coils of the CEX (6012) and remove heat from the LHP.

After heat removal from the LPF by the CCF (6013), the LPF is transmitted via piping through a refrigerant source output (RSO) (6002) and gated by a refrigerant source valve (RSV) (6041) controlled by valve source electrical solenoid (VSS) (6040) to the IHE (6020) and an evaporator expansion valve (EEV) (6021) that allows expansion of the LHP into a GLP that is then passed through an evaporator heat exchanger coil (EEX) (6022). An evaporator coil fan (ECF) (6023) is configured to blow ambient inside air through the coils of the EEX (6022) and transfer heat from the inside ambient air to the GLP and produce cool air. The GLP with accumulated heat from the ambient inside air is then transferred back to the CRC (6011) to complete the refrigeration cycle.

As indicated in this diagram, any leak or failure of plumbing in the IHE (6020) will result in contamination of the IHE (6020) and the surrounding inside building environment with refrigerant. In typical failure scenarios, the EEX (6022) will fail with one or more pinhole leaks that result in minor and eventual catastrophic refrigerant loss within the building structure containing the IHE (6020). To prevent this refrigerant leak contamination scenario, a refrigerant gas sensor (RGS) (6024) continuously senses for the presence of a refrigerant leak proximal to the EEV (6021) and/or EEX (6022) and upon detection of a refrigerant leak, activates the VRS (6030) and VSS (6040) to close the RRV (6031) and RSV (6041) thus isolating the refrigerant leak to the IHE (6020) and preventing a catastrophic refrigerant leak from fully evacuating both the OHE (6010) and IHE (6020) to the enclosed building structure serviced by the IHE (6020). As shown in the block diagram of FIG.

60 (6000), the VRS (6030) and VSS (6040) may be configured to simultaneously mechanically close the RRV (6031) and RSV (6041) or in some other preferred embodiments these solenoids may be sequentially cycled to separately close the RRV (6031) and RSV (6041) upon detection of a refrigerant leak by the RGS (6024).

Cycled Shutoff Method Summary (6100)

Figure 61:
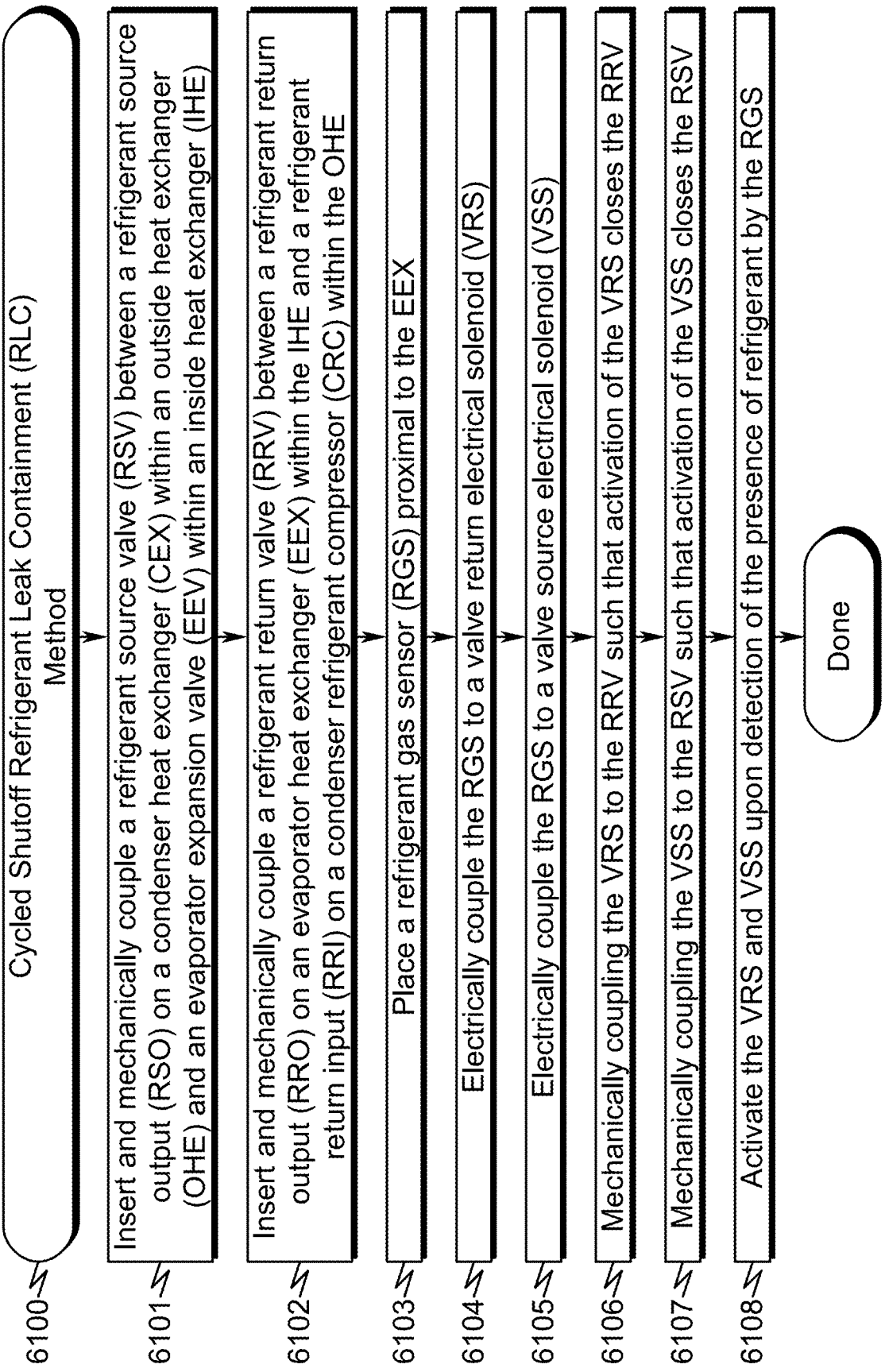
FIG. 61 illustrates a flowchart depicting a preferred exemplary embodiment of a present invention refrigerant leak mitigation (RLM) method with independent refrigerant control valve (RCV) activation.

The system depicted in FIG. 60 (6000) may be associated with a retrofit or OEM refrigerant leak containment (RLC) method as generally depicted in the flowcharts of FIG. 61 (6100) comprising the following steps:
(1) inserting and mechanically coupling a refrigerant source valve (RSV) between a refrigerant source output (RSO) on a condenser heat exchanger (CEX) within an outside heat exchanger (OHE) and an evaporator expansion valve (EEV) within an inside heat exchanger (IHE) (6101);
(2) inserting and mechanically coupling a refrigerant return valve (RRV) between a refrigerant return output (RRO) on an evaporator heat exchanger (EEX) within the IHE and a refrigerant return input (RRI) on a condenser refrigerant compressor (CRC) within the OHE (6102);
(3) placing a refrigerant gas sensor (RGS) proximal to the EEX (6103);
(4) electrically coupling the RGS to a valve return electrical solenoid (VRS) (6104);
(5) electrically coupling the RGS to a valve source electrical solenoid (VSS) (6105);
(6) mechanically coupling the VRS to the RRV such that activation of the VRS closes the RRV (6106);
(7) mechanically coupling the VSS to RSV such that activation of the VSS closes the RSV (6107); and
(8) activating the VRS and VSS upon detection of the presence of refrigerant by the RGS (6108).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

Computer Controlled Shutoff System Summary (6200)-(6300)

Figure 62:
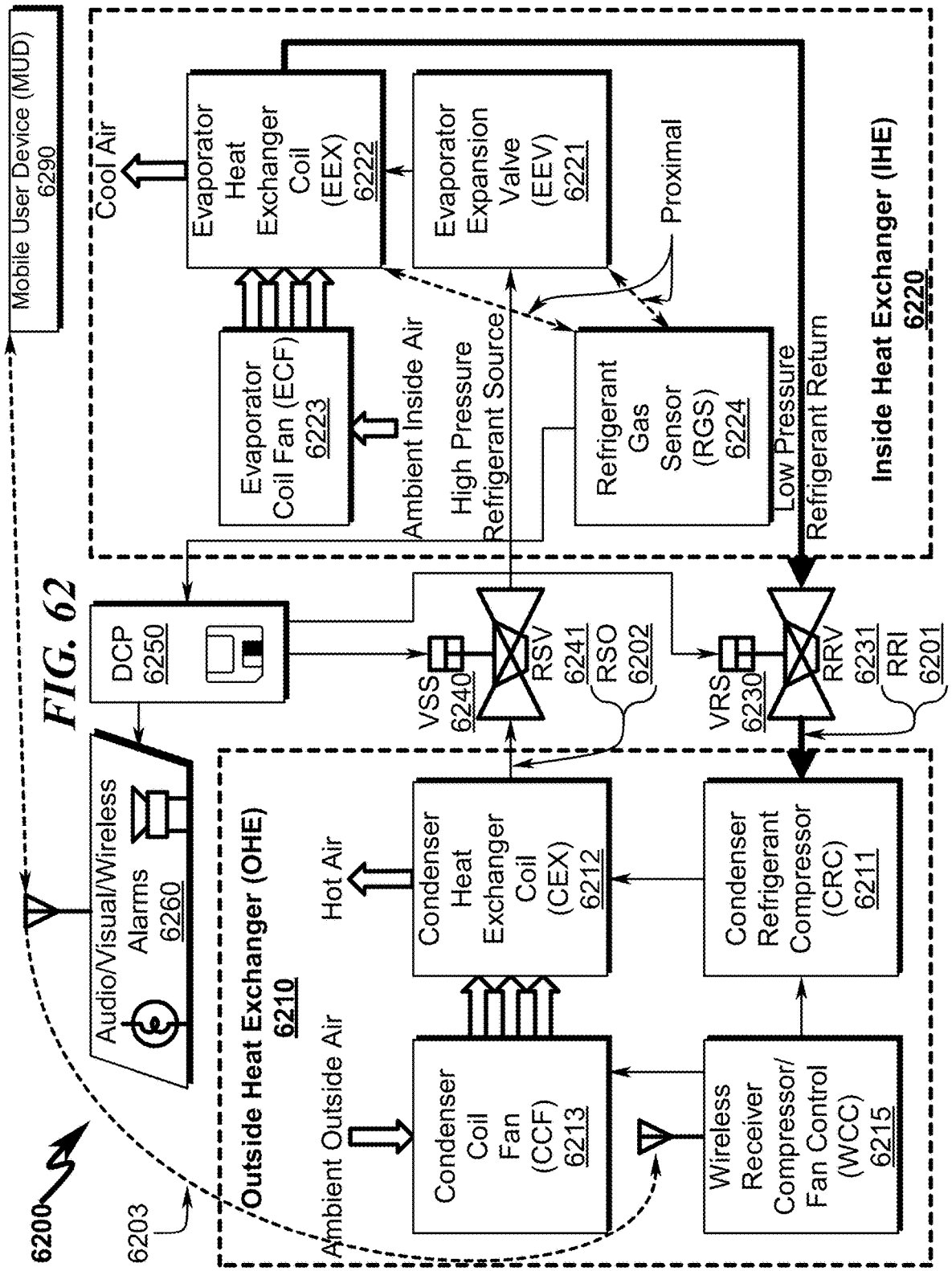
FIG. 62 illustrates a schematic depicting a preferred exemplary embodiment of a present invention refrigerant leak mitigation (RLM) system with wireless communication interface (WCI) status and compressor/fan control (WCC)

The systems and methods as described in FIG. 57 (5700)-FIG. 61 (6100) may be augmented with computerized controls as generally depicted in FIG. 62 (6200). In this exemplary preferred embodiment the VRS (6230) that controls the RRV (6231) and the VSS (6240) that controls the RSV (6241) may be sequentially controlled by a digital control processor (DCP) (6250) in response to detected refrigerant leak by the RGS (6224). The DCP (6250) may incorporate an integrated analog-to-digital converter (ADC) to interface with the RGS (6224) in sensing refrigerant leaks within the IHE (6220) and may incorporate machine instructions embedded within a computer readable medium to control sequential or simultaneous operation of the VRS (6230) and VSS (6240). In addition to activation of the VRS (6230) and VSS (6240) the DCP (6250) may activate a number of audio/visual/wireless alarms (6260) to indicate the presence of a refrigerant leak within the IHE (6220). The audio/visual/wireless alarms (6260) may incorporate a wireless communication link (6203) that communicates with a wireless receiver compressor control (WCC) (6215) that control operation of the CRC (6211) to force a shutdown of the CRC (6211) and/or the CCF (6213) if a refrigerant leak is detected within the IHE (6220).

Figure 63:
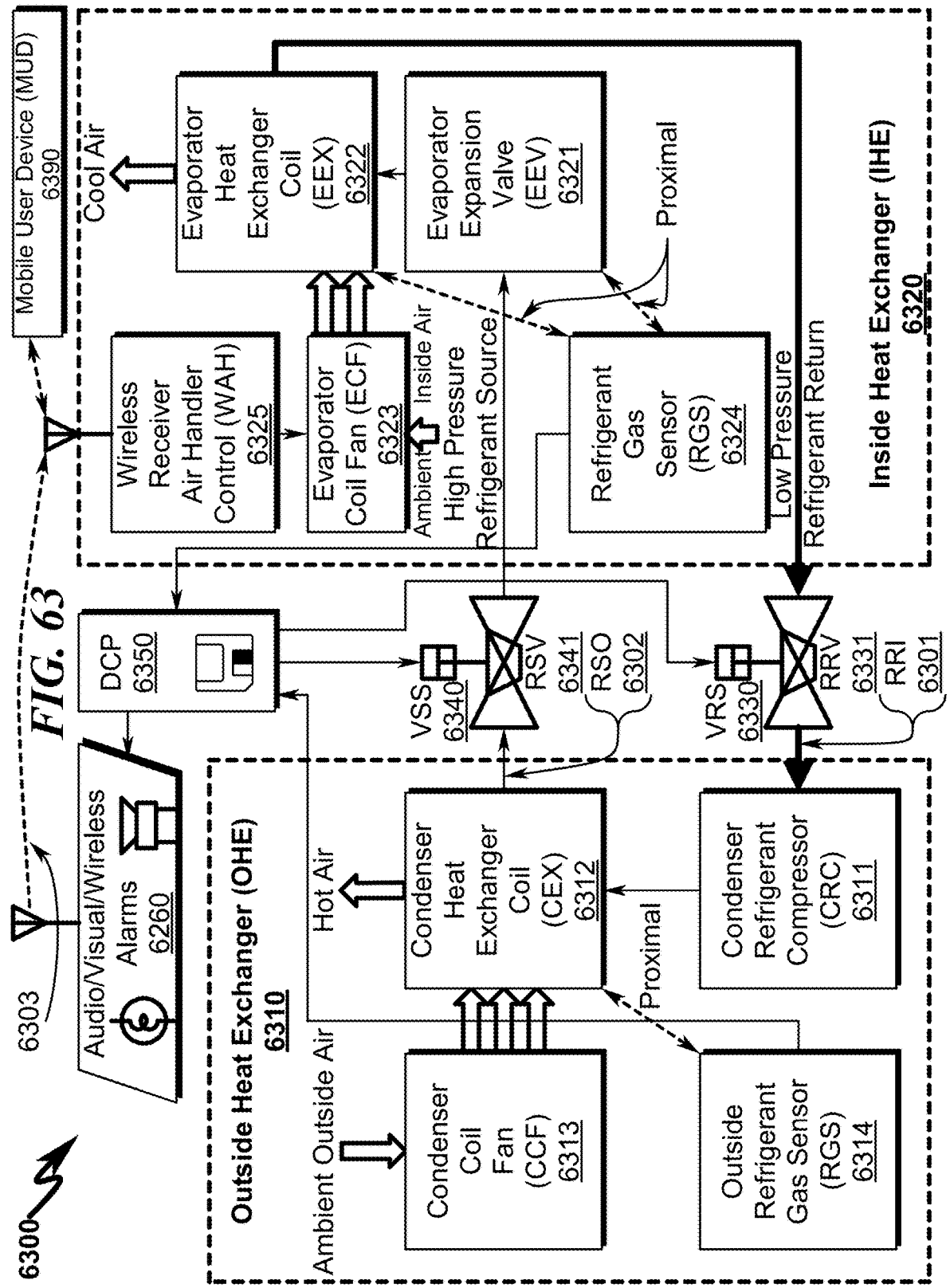
FIG. 63 illustrates a schematic depicting a preferred exemplary embodiment of a present invention refrigerant leak mitigation (RLM) system with wireless communication interface (WCI) status and air handler control (WAH)

The systems and methods as described in FIG. 57 (5700)-FIG. 61 (6100) may be augmented with computerized controls as generally depicted in FIG. 63 (6300). In this exemplary preferred embodiment the VRS (6330) that controls the RRV (6331) and the VSS (6340) that controls the RSV (6341) may be sequentially controlled by a digital control processor (DCP) (6350) in response to detected refrigerant leak by the RGS (6324). The DCP (6350) may incorporate an integrated analog-to-digital converter (ADC) to interface with the RGS (6324) in sensing refrigerant leaks within the IHE (6320) and may incorporate machine instructions embedded within a computer readable medium to control sequential or simultaneous operation of the VRS (6330) and VSS (6340). In addition to activation of the VRS (6330) and VSS (6340) the DCP (6350) may activate a number of audio/visual/wireless alarms (6360) to indicate the presence of a refrigerant leak within the IHE (6320). The audio/visual/wireless alarms (6360) may incorporate a wireless communication link (6303) that communicates with a wireless receiver air handler control (WAH) (6325) that control operation of the ECF (6323) to force a shutdown of the ECF (6323) and/or the RSV (6341)/RRV (6331) if a refrigerant leak is detected within the OHE (6310) or the IHE (6320).

In either of the scenarios discussed above, a mobile user device (MUD) (6290, 6390) may provide for a wireless interface and communication/control of the alarms (6260, 6360) and/or the WCC (6215) and/or the WAH (6325). In this manner the system may be temporarily or permanently installed within a HVAC system and monitored/controlled wirelessly via the MUD (6290, 6390).

Exemplary WCI/MUD User Interface (6400)

As discussed previously, the DCP may interface with a WCI to a MUD to allow DCP status information and/or control of the DCP and HVAC components to occur remotely.

While only an exemplary implementation, the display illustrated in FIG. 64 (6400) implements several monitoring and control functions including:
ALARM OFF (6411)—disables audible alarms;
ALARM ON (6421)—enables audible alarms;
FAN OFF (6431)—disables air intake fan (AIF) operation;
FAN ON (6441)—enables air intake fan (AIF) operation;
SEN-N (6412)—sensor drift band in NORMAL mode;
SEN-W (6422)—sensor drift band in WIDE mode;
WM-2M (6432)—sensor warmup 2 minutes;
WM-5M (6442)—sensor warmup 5 minutes;
STEP-10 s (6413)—STEP COUNT is completion in 10 seconds while in GAS DETECTION STATE;
STEP-20 s (6413)—STEP COUNT is completion in 20 seconds while in GAS DETECTION STATE;
STEP-1M (6413)—STEP COUNT is completion in 1 minute while in GAS DETECTION STATE;
T&H (6413)—interrogate temperature & humidity sensor;
T&H (6413)—interrogate temperature & humidity sensor;
ENT-LOC (6414)—allows entry of the location of the HVAC equipment stored in the DCP such as room number, office number, and room identification such as conference room, training room, etc.;

ENT-MAN (6424)—allows entry or display of the HVAC equipment manufacturer name stored in the DCP;

ENT-MOD (6434)—allows entry or display of the equipment manufacturer HVAC model number stored in the DCP;

ENT-CID (6444)—allows entry or display of the equipment manufacturer HVAC coil model number identification stored in the DCP (this helps the owner of the equipment to identify the coil number so he can contact his HVAC contractor and direct him to order the failing coil and avoid delays in obtaining replacement parts for the failing HVAC system);

HCC-OFF (6415)—disables the HVAC compressor via the HCC contactor;

HCC-ON (6425)—enables the HVAC compressor via the HCC contactor;

RCV-OFF (6435)—disables the refrigerant control valve (RCV) to isolate the refrigerant coil in the HVAC system;

RCV-ON (6445)—enables the refrigerant control valve (RCV) to allow refrigerant flow within the HVAC system;

ENT-ID (6416)—allows entry or display of a unique name for the DCP for identification purposes;

OPTION (6426)—displays DCP control settings;

DSP-CNT (6436)—display the current CCL STEP COUNTER;

RCV-AL (6446)—toggles ALARM STATE shutdown of the refrigerant control valve (RCV) in the event of a detected refrigerant leak;

CLR-LOG (6417)—clear refrigerant leak log and return system operation to WARMUP STATE;

RST (6427)—return system operation to WARMUP STATE;

RD-LOG (6437)—display refrigerant leak log;

MODE (6447)—displays current CCL STATE of operation (WARMUP, GAS DETECTION, CALIBRATION MODE ON/OFF, ALARM MODE ON/OFF, FAN ON/OFF);

One skilled in the art will recognize that the interrogation and control functions generally depicted in FIG. 64 (6400) are only exemplary and not limitive of the scope of the claimed invention.

Sensor Record Memory (SRM) Data Logging

The present invention anticipates that in many configurations it will make use of sensor record memory (SRM) to log detection of refrigerant leaks (or the absence thereof) in conjunction with the use of a real-time clock (RTC) to note the time of sensor logging. This information can be used to determine if a HVAC system is leaking refrigerant when stressed or at certain times of the day, indicating an intermittent failure that must be addressed. This logging feature may be interrogated wirelessly with the MUD as discussed above or in some circumstances the SRM data may be transmitted over another network such as the INTERNET or similar WiFI network to a central host computer. In this manner a deployment of a plurality of the RLD and/or RLM units within a commercial HVAC installation will be able to comply with the leak detection monitoring and logging requirements of the EPA as mandated by recent federal regulations on air quality.

Exemplary Use of MUD WCI

While there are many application contexts in which the RLD/RLM may be operated using a WCI connected MUD, one anticipated preferred scenario occurs when a refrigerant leak is to be isolated in a HVAC system incorporating multiple refrigerant coils in a commercial environment such as a hotel or other large building. In this scenario, the isolation of a refrigerant leak is important because failure of one refrigerant coil can cause a multiple number of rooms to be offline and unavailable for use due to the failure of a single refrigerant coil in the HVAC refrigerant loop.

One possible refrigerant leak scenario might include the following steps using the RLD via a WCI connected MUD:

(1) Connect to RLD WCI application through a computer tablet or other smartphone device.

(2) Turn on RLD and wait for warm-up mode. LEDs will flash fast. RGS sensor is calibrating at this time.

(3) Hit "terminal" icon click on "devices."

(4) Click on scan and inspect the RLD listed for the unit to interrogate.

(5) Select RLM and number for inspection on the MUD interface.

(6) Check "mode of operation." After warming mode the RLD will go into monitor mode, LEDs will flash slow in monitor mode (warmup mode can be selected as two minutes, five minutes, or one hour).

(7) Click on option button to display options, different options can be selected.

(8) Click on read log and verify log is empty if not, click on "clear log." Log must be clear, so that all previous data does not confuse the technician as to the possibility of a refrigerant leak.

(9) Activate the RLD in areas that are free of refrigerant so that the sensor does not calibrate to the refrigerant. Do not Power on the RLD on the floor, as refrigerant is heavier than air and will collect in this area. Hallways, lobbies, and stairways are a good place to turn on and apply power to the RLD.

(10) After RLD has calibrated and is in monitor mode take the RLD(s) and place them on the supply grills next to the air handler to check for refrigerant leaks.

(11) LED should flash slowly indicating that the RLD is in monitor mode.

(12) If refrigerant is detected RLD will beep every time it makes a step for increased refrigerant detection, LED will be on solid at this point every time a step is completed, and after 21 steps it will go into an alarm mode.

(13) When RLD hits the maximum step count it is permissible to turn off the alarm by hitting the button on the MUD labeled alarm off, or it is possible to cycle the power, or hit the RLD reset button, as this will cause the RLD to go back through calibration. Do not cycle power and turn the RLD back on and let it go through calibration on a leaking coil, as the RGS sensor will calibrate to the leak and the leak will not be detected at that stage, and the RLD will only detect the leak if it increases in discharge.

(14) The RLD has a fan function that performs two functions: it pulls refrigerant in the ambient air across the sensor and/or the RLD can be removed from an area that has refrigerant leakage in the ambient air, and the fan used to help push fresh air across the sensor. This will give the RLD a faster response time so the RLD can be used in a different area to detect leaks.

(15) Once the RLDs are set on on indoor supply grills after five minutes if they stay in monitor mode they can be moved to the next available air handlers to be checked. This saves a tremendous amount of time and money for the technician.

(16) This process is continued until all suspect air handlers are checked for refrigerant leaks. This process takes approximately one hour to check 20 air handlers with five (5) RLDs. In the past it would take days or even months to find a refrigerant leak using conventional methods. As an example of economic loss associated with the prior art methods, 20 indoor air handlers being down for eight weeks at $150 a night per hotel room would result in an economic loss of USD$168,000.

(17) Once the RLD leak evaluation is complete the RLD logs are cleared so that the RLDs are ready for the next leak detection job.

(18) There are other functions that can be applied in these situations, including but not limited to use for EPA evaluation or audits, selection of manufacturer, model, serial number, or coil number.

One skilled in the art will recognize that this example troubleshooting scenario is just one possibility when using the RLD with a WCI connected MUD.

Exemplary HVAC Implementations (6500)-(12800)

While the present invention may be implemented in a wide variety of application-specific configurations, several application sets are preferred. One application set involves the detection and/or mitigation of leaks in a refrigerant evaporator coil (REC) that may be in some circumstances be one REC of a plurality of RECs that are serviced by a central compressor and refrigerant condenser coil (RCC). This configuration set will now be discussed in detail in several application contexts.

Prior Art REC Configurations (6500)-(7200)

Figure 65:
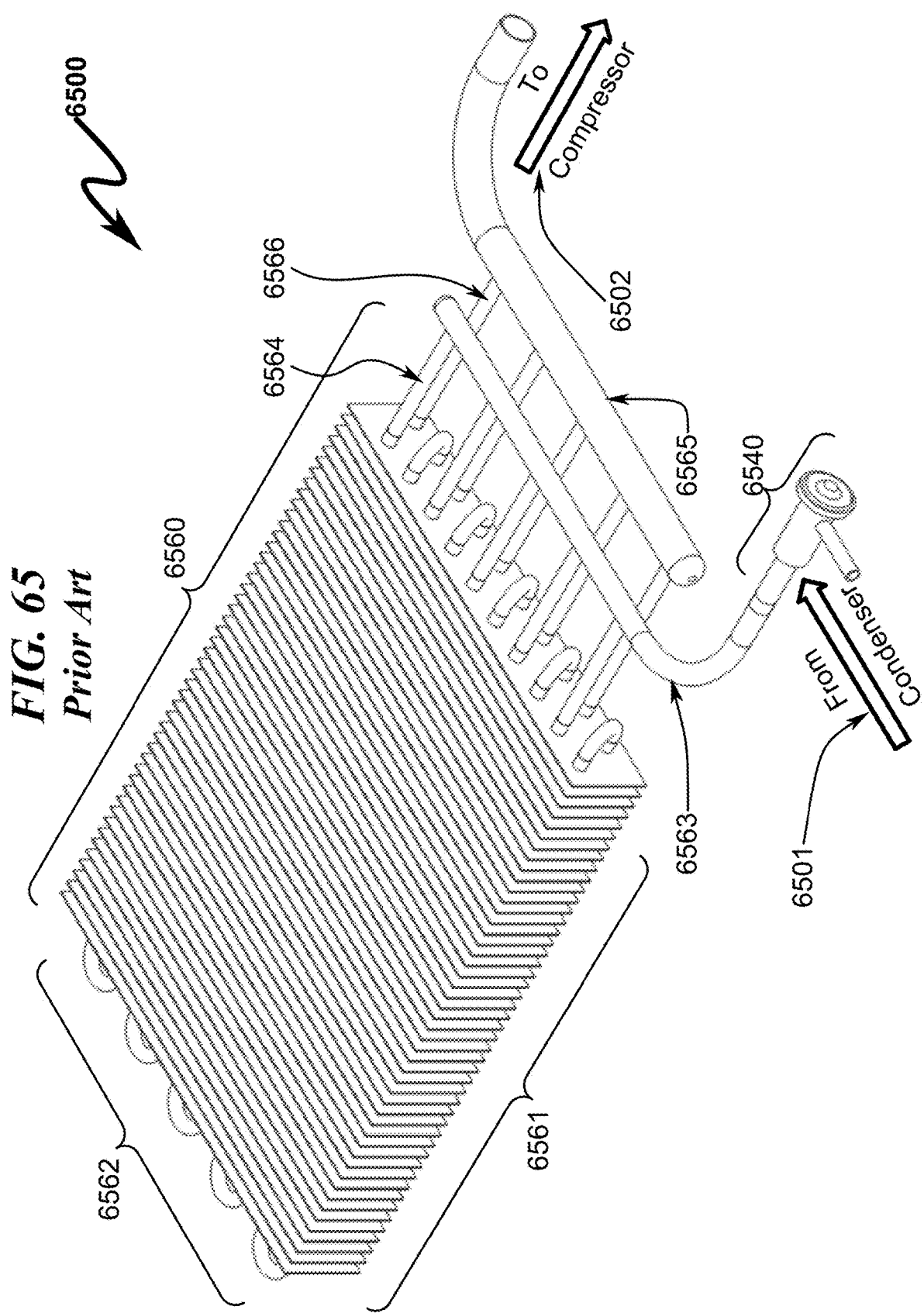
FIG. 65 illustrates a top left front perspective view of a prior art refrigerant evaporator coil (REC) and linear expansion valve (LEV) configuration indicating typical HVAC refrigerant flow.
Figure 66:
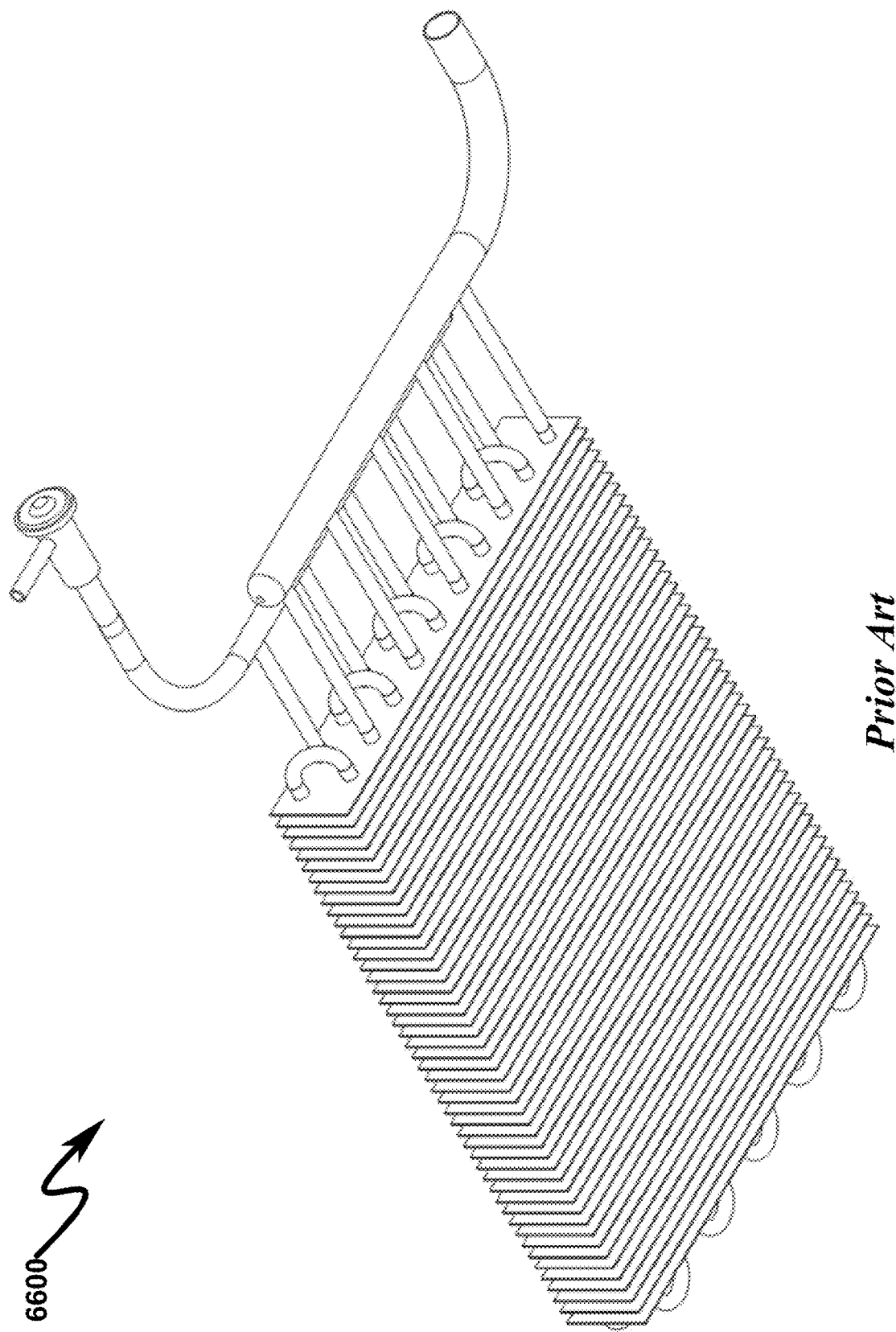
FIG. 66 illustrates a bottom left front perspective view of a prior art refrigerant evaporator coil (REC) and linear expansion valve (LEV) configuration indicating typical HVAC refrigerant flow.
Figure 67:
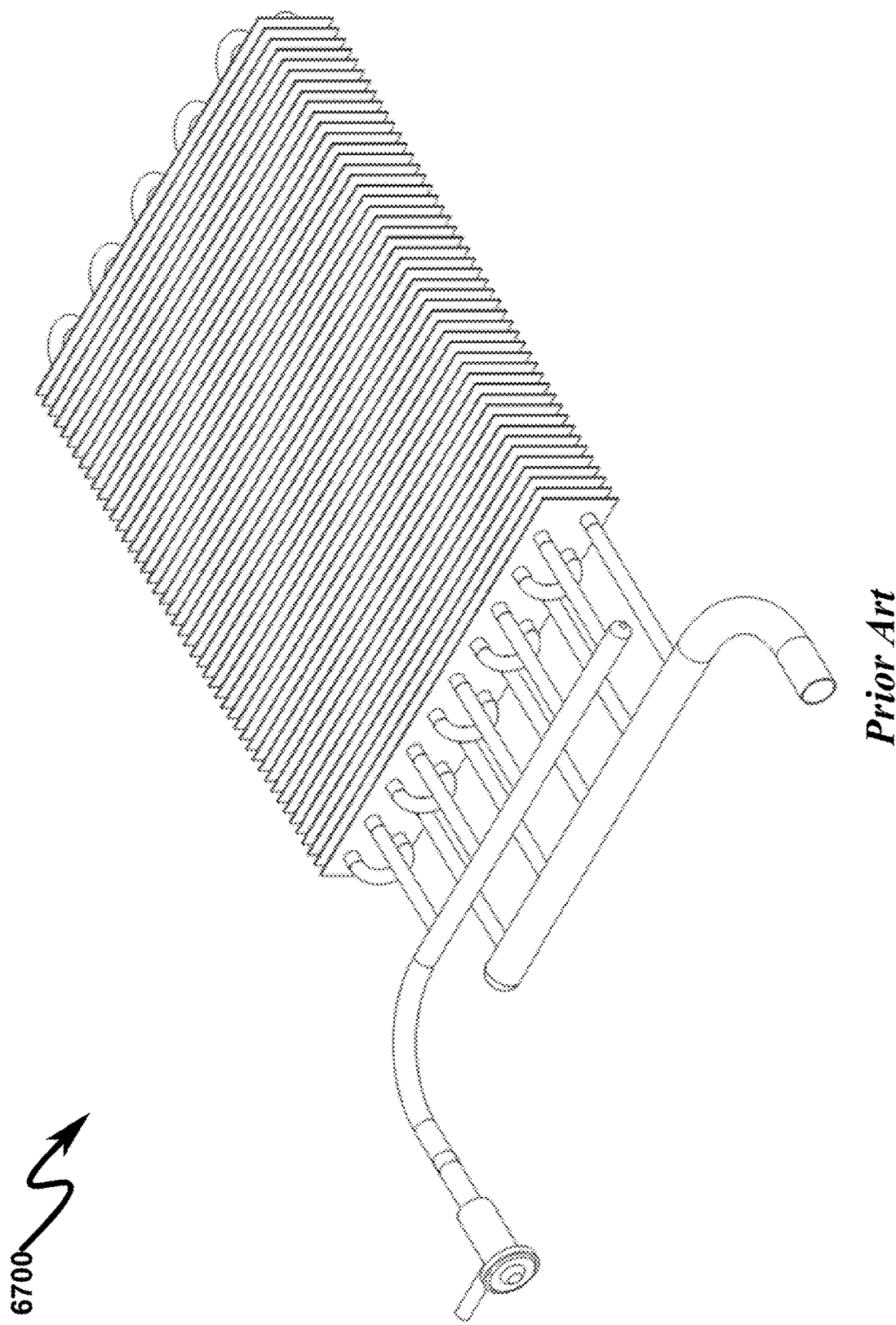
FIG. 67 illustrates a top right front perspective view of a prior art refrigerant evaporator coil (REC) and linear expansion valve (LEV) configuration indicating typical HVAC refrigerant flow.
Figure 68:
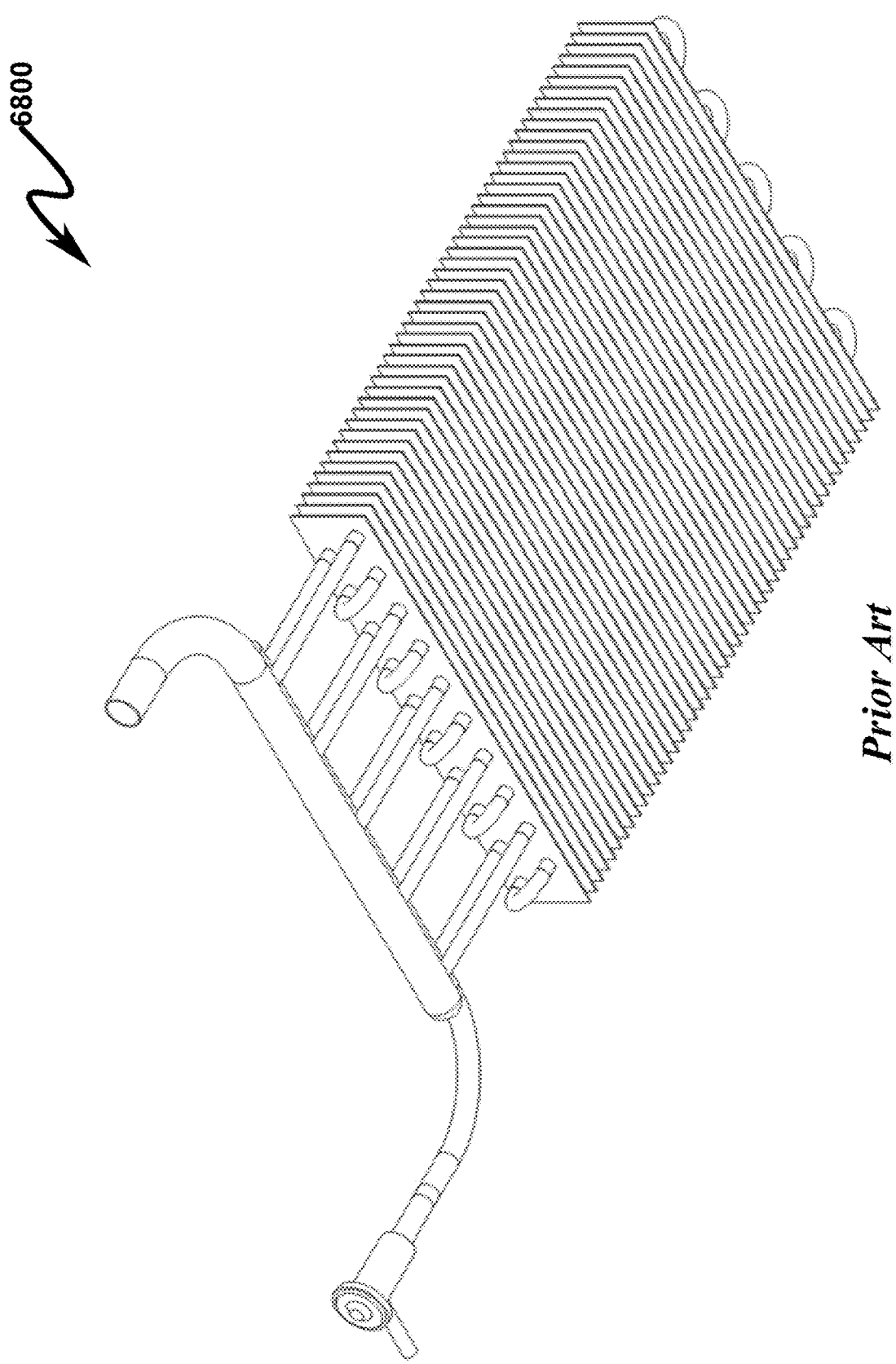
FIG. 68 illustrates a bottom right front perspective view of a prior art refrigerant evaporator coil (REC) and linear expansion valve (LEV) configuration indicating typical HVAC refrigerant flow.
Figure 69:
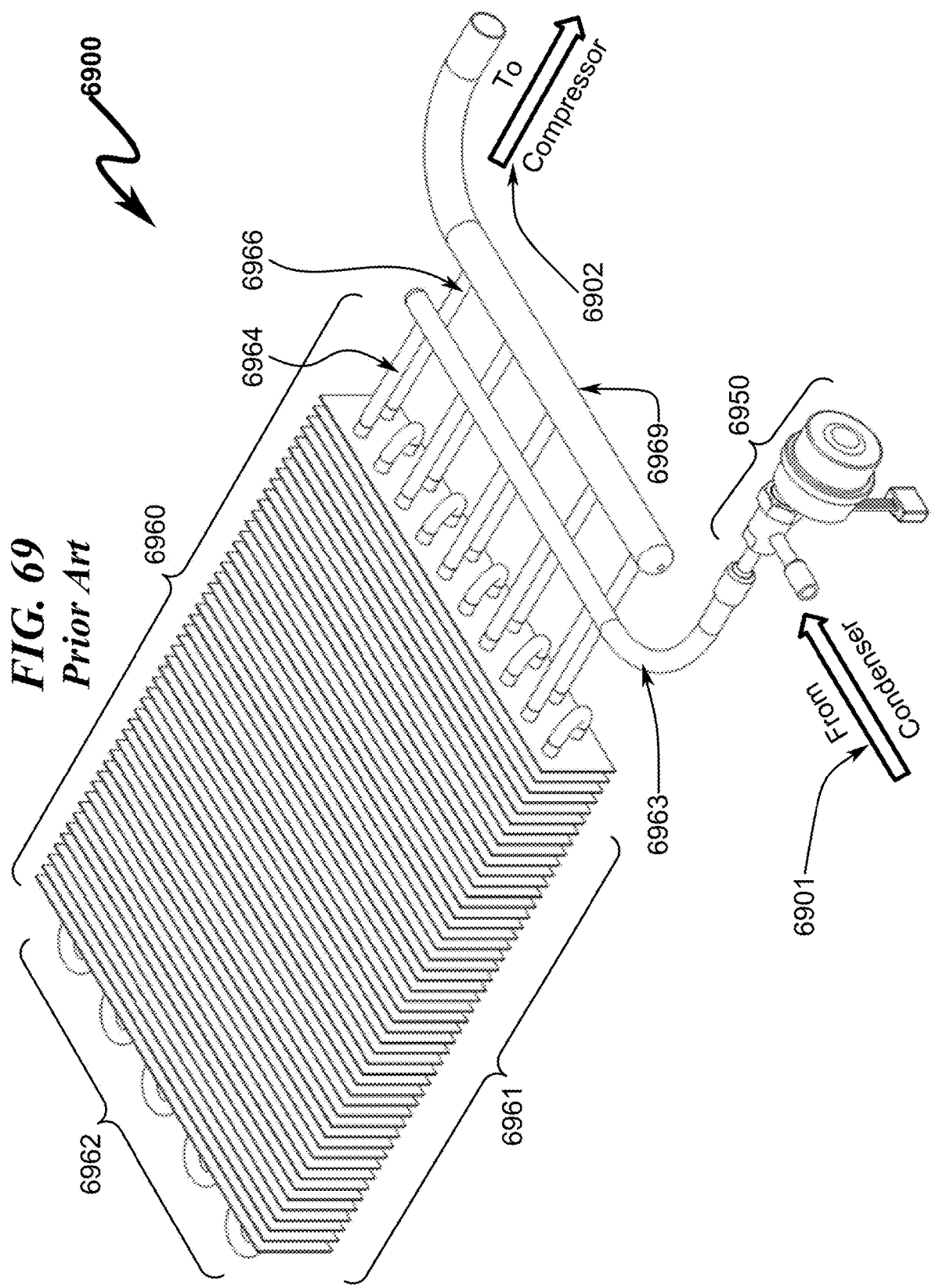
FIG. 69 illustrates a top left front perspective view of a prior art refrigerant evaporator coil (REC) and electronic expansion valve (EEV) configuration indicating typical HVAC refrigerant flow.
Figure 70:
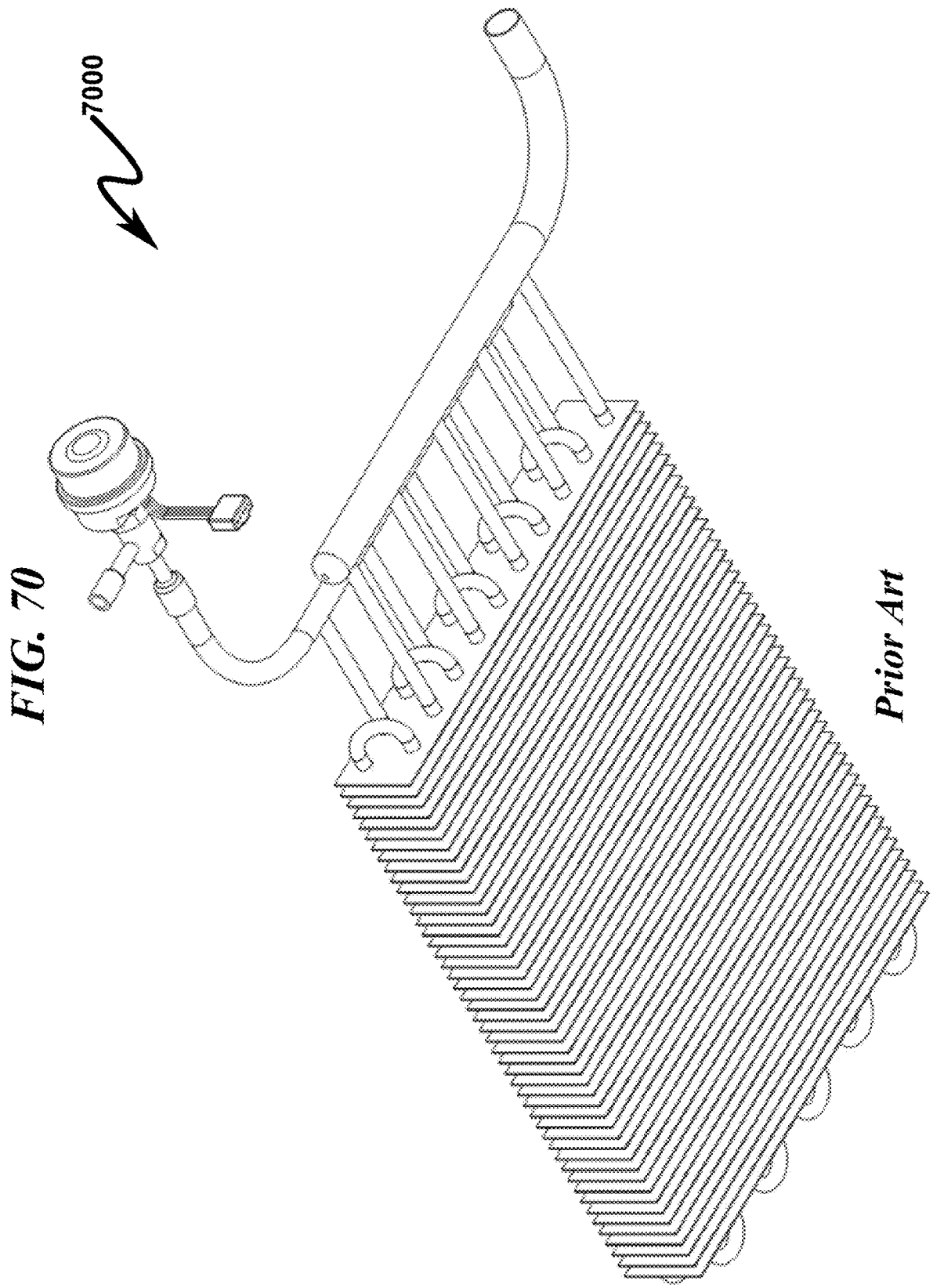
FIG. 70 illustrates a bottom left front perspective view of a prior art refrigerant evaporator coil (REC) and electronic expansion valve (EEV) configuration indicating typical HVAC refrigerant flow.
Figure 71:
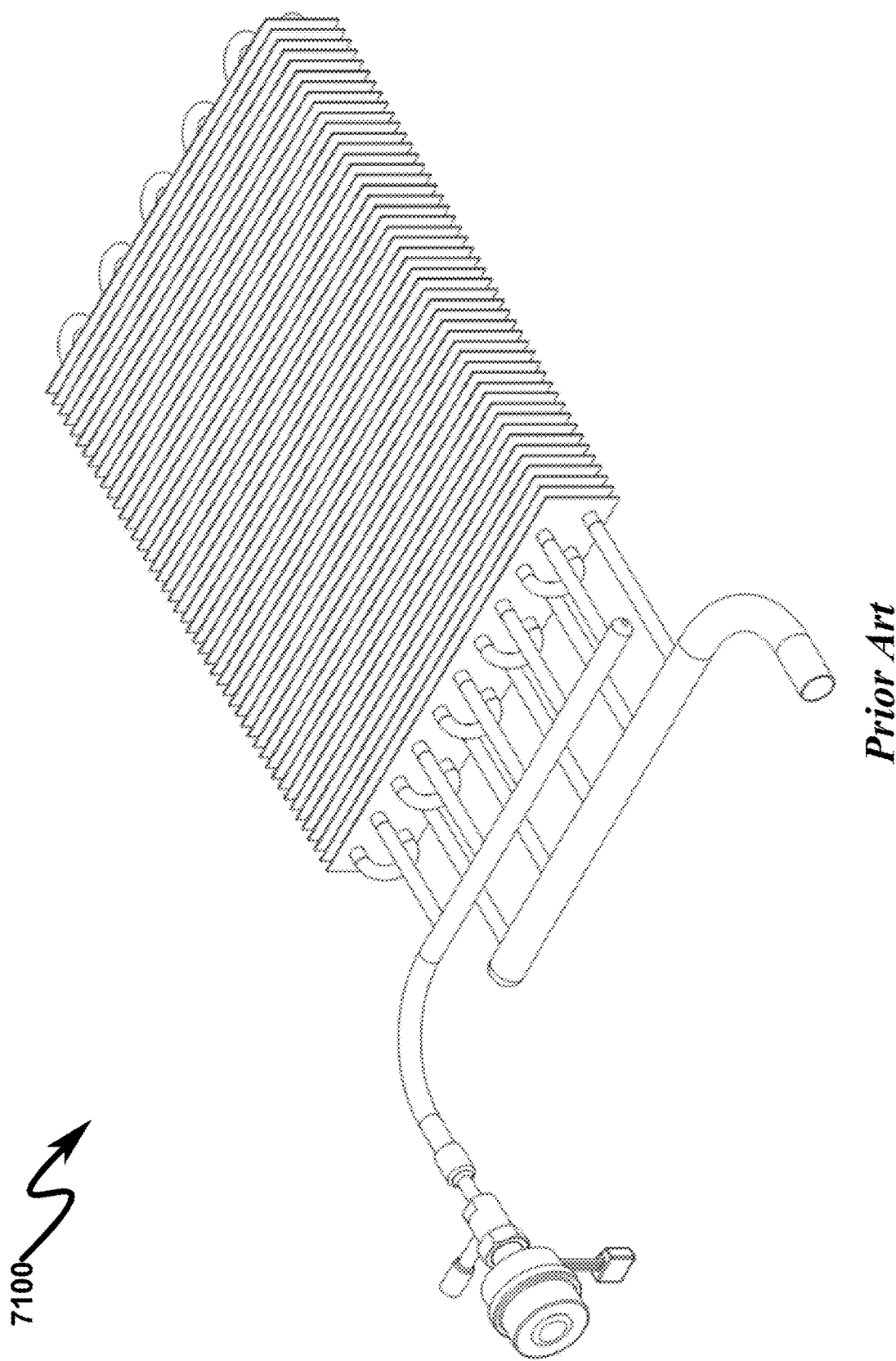
FIG. 71 illustrates a top right front perspective view of a prior art refrigerant evaporator coil (REC) and electronic expansion valve (EEV) configuration indicating typical HVAC refrigerant flow.

FIG. 65 (6500)-FIG. 68 (6800) depict a typical prior art refrigerant evaporator coil (REC) and linear expansion valve (LEV) configuration indicating typical HVAC refrigerant flow. FIG. 69 (6900)-FIG. 72 (7200) depict a typical prior art refrigerant evaporator coil (REC) and electronic expansion valve (EEV) configuration indicating typical HVAC refrigerant flow. In both of these configurations a leak in the REC will allow the entire HVAC system to be completely depleted of refrigerant with no check on the loss of refrigerant.

Figure 72:
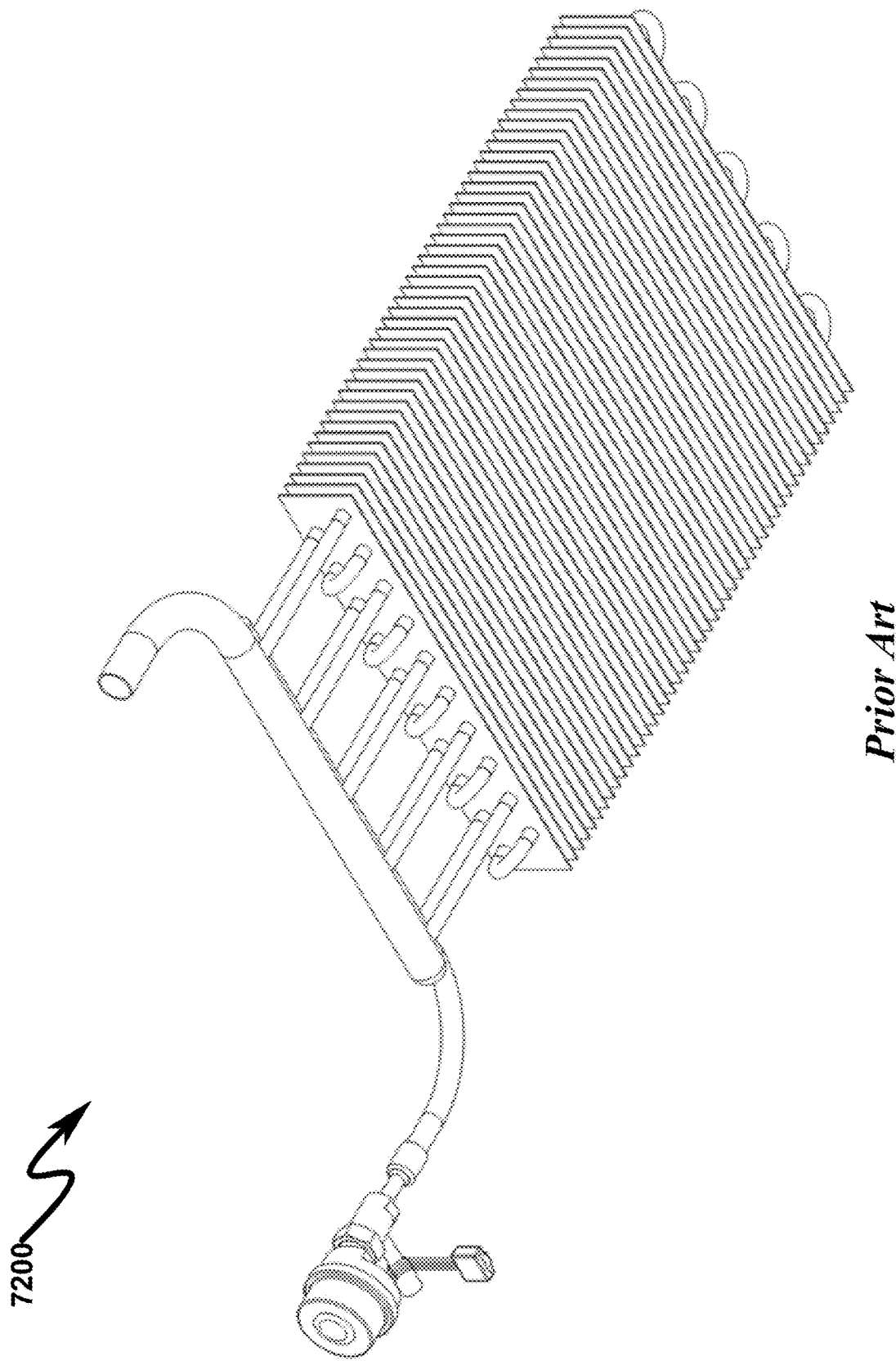
FIG. 72 illustrates a bottom right front perspective view of a prior art refrigerant evaporator coil (REC) evaporator coil (REC) and electronic expansion valve (EEV) configuration indicating typical HVAC refrigerant flow.

The typical prior system application context for the present invention is generally depicted in FIG. 65 (6500)-FIG. 72 (7200) in which a refrigerant evaporator coil (REC) assembly (6560, 6960) is shown having coil fins (6561, 6961) through which refrigerant lines are coiled (6562, 6962), refrigerant input manifold (6563, 6963) supplying refrigerant input lines (6564, 6964), and refrigerant output manifold (6565, 6965) retrieving refrigerant from refrigerant output lines (6566, 6966). Refrigerant flow in this evaporator system starts from the refrigerant condenser coil (RCC) (not shown) (6501, 6901), flows through the evaporator system (6560, 6960), and is then transported via the refrigerant output manifold (6565, 6965) and then taken up by the refrigerant compressor (RFC) (not shown) (6502, 6902).

As depicted in the drawings a linear expansion valve (LEV) (6540) is depicted in FIGS. 65 (6500)-68 (6800) and an electronic expansion valve (EEV) (6950) is depicted in FIG. 69 (6900)-FIG. 72 (7200). Neither of these components are capable of containing a refrigerant leak in the REC in these prior art HVAC configurations.

REC Isolated with EEV Augmented with RCV (7300)-(8000)

Figure 73:
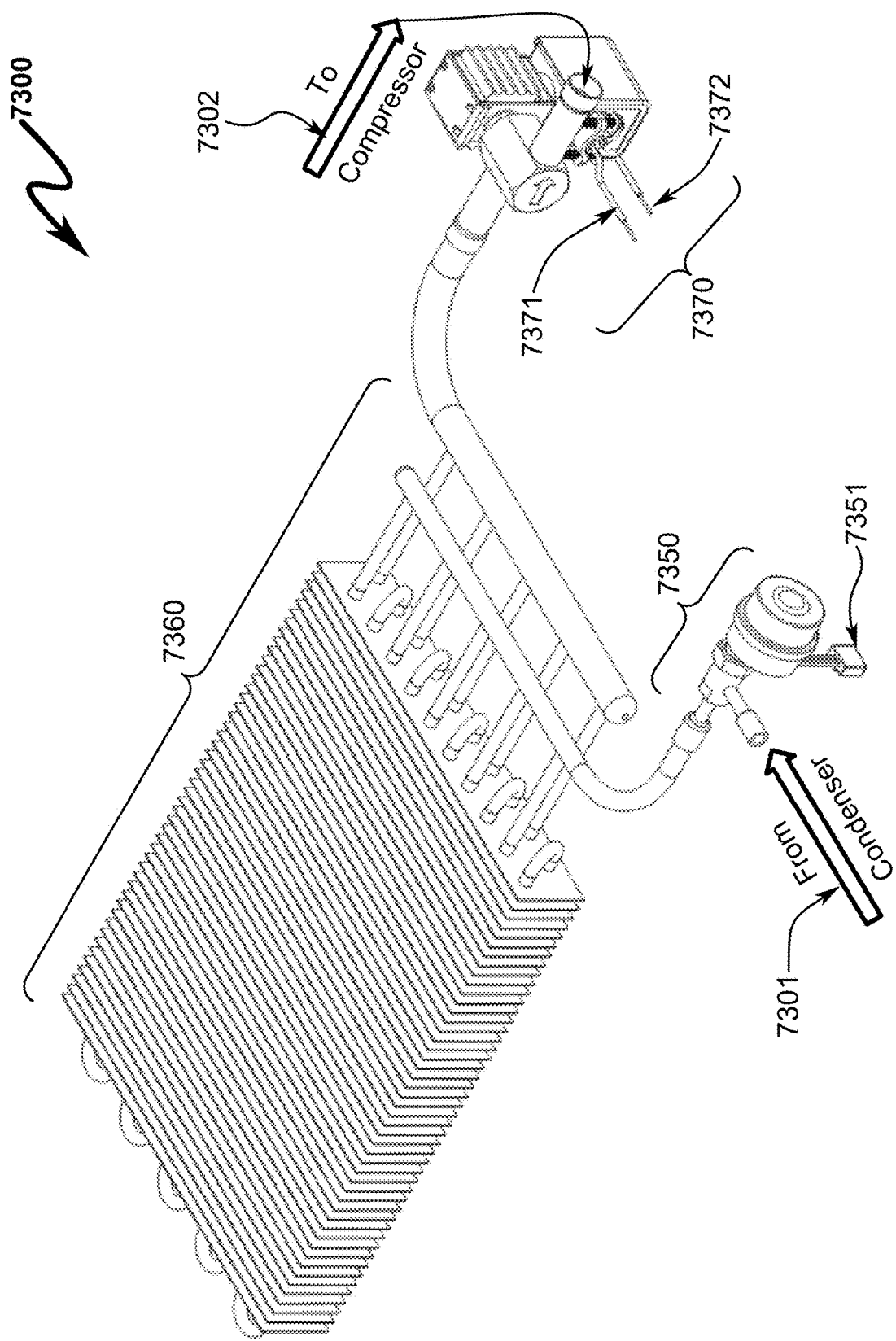
FIG. 73 illustrates a top left front perspective view of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 74:
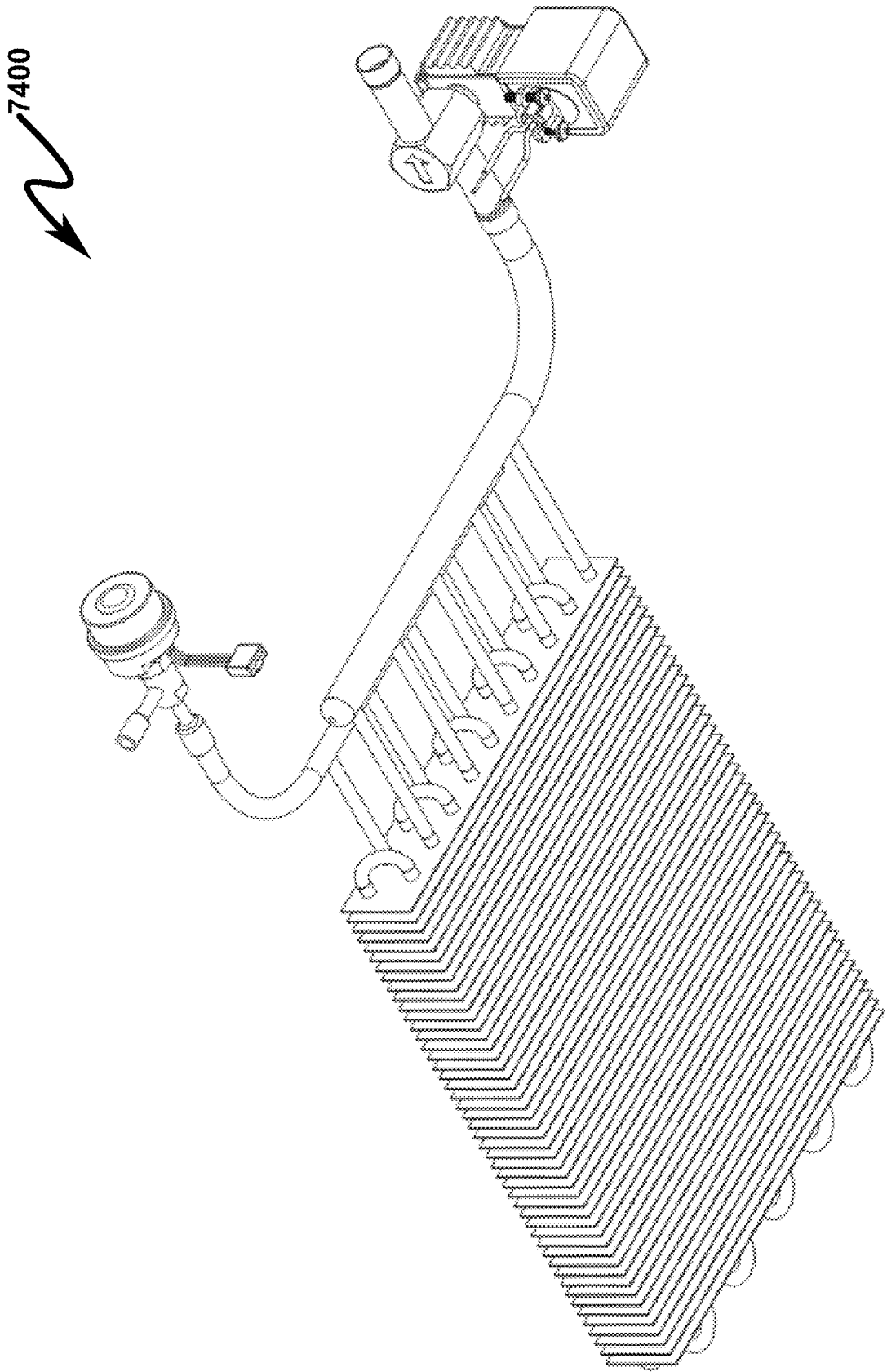
FIG. 74 illustrates a bottom left front perspective view of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 75:
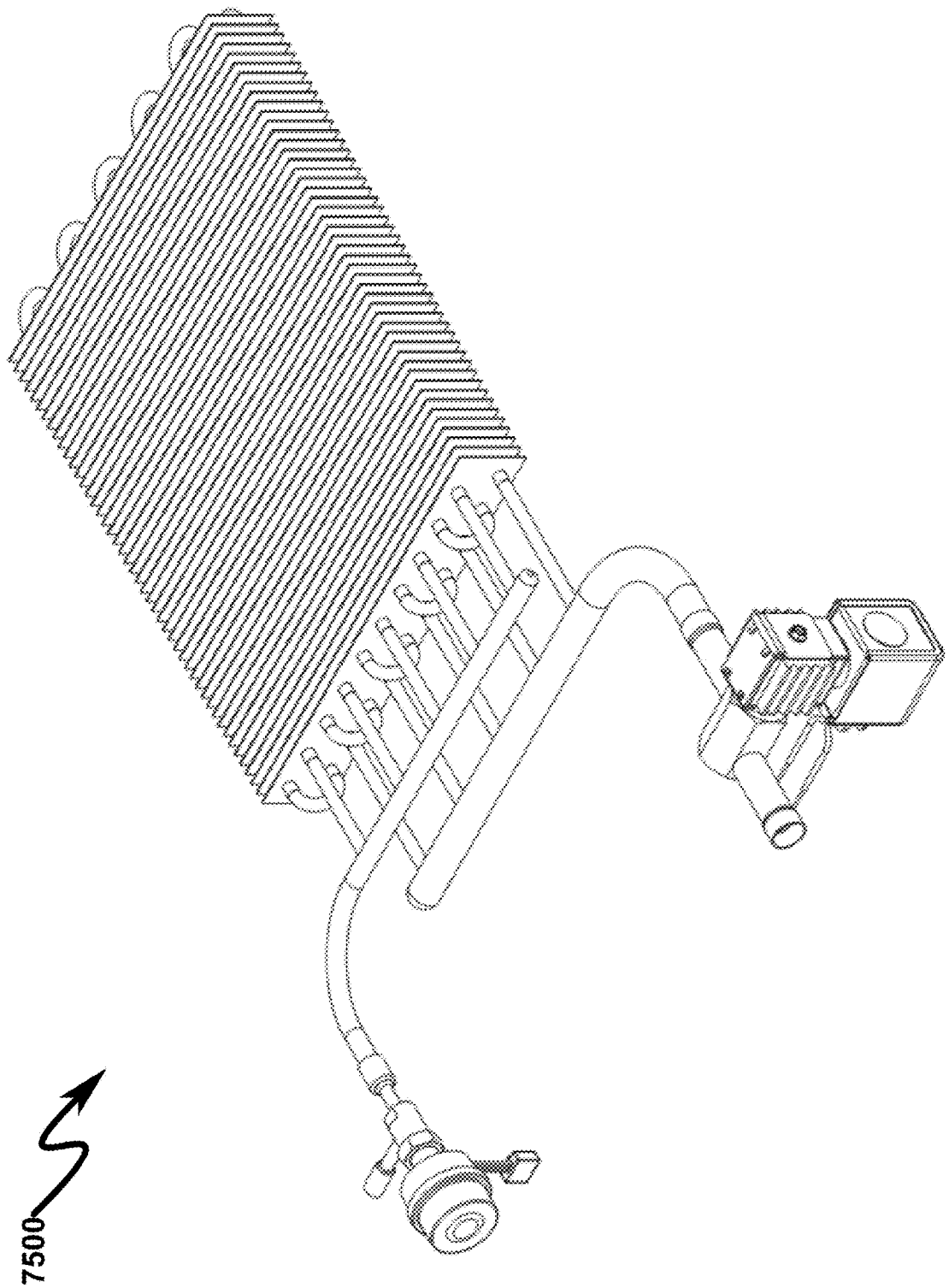
FIG. 75 illustrates a top right front perspective view of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 76:
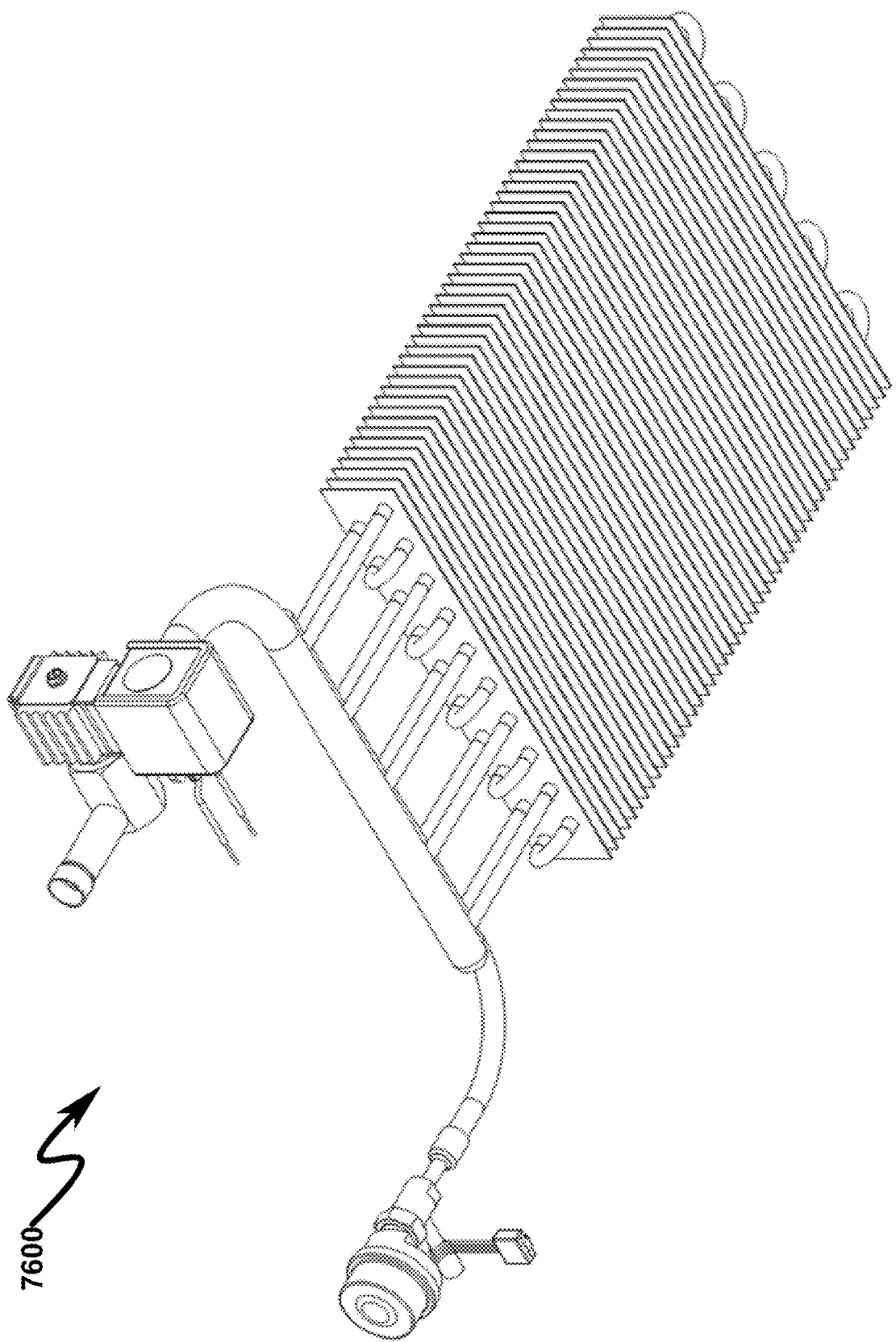
FIG. 76 illustrates a bottom right front perspective view of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 77:
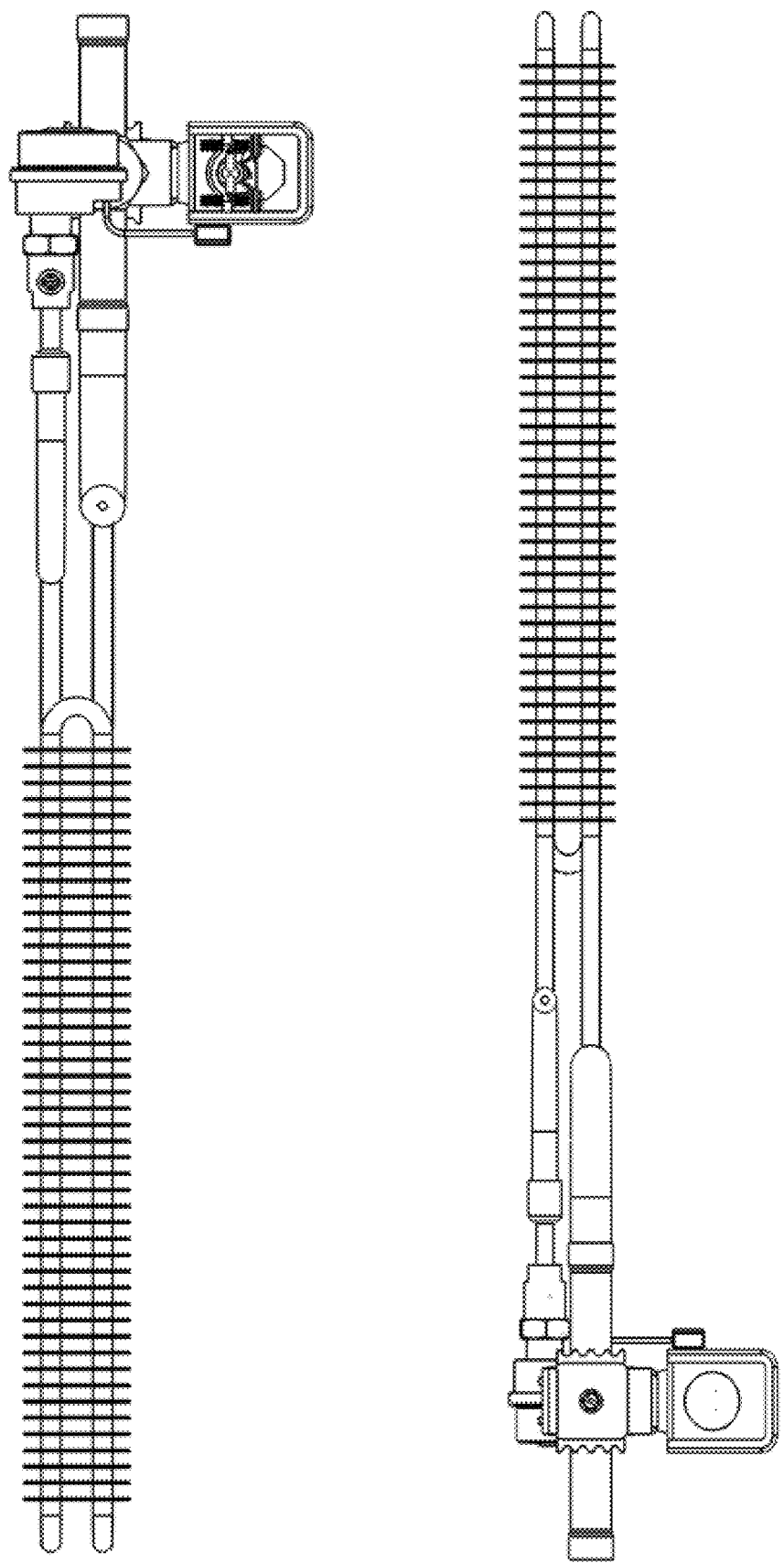
FIG. 77 illustrates left side and right side views of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 78:
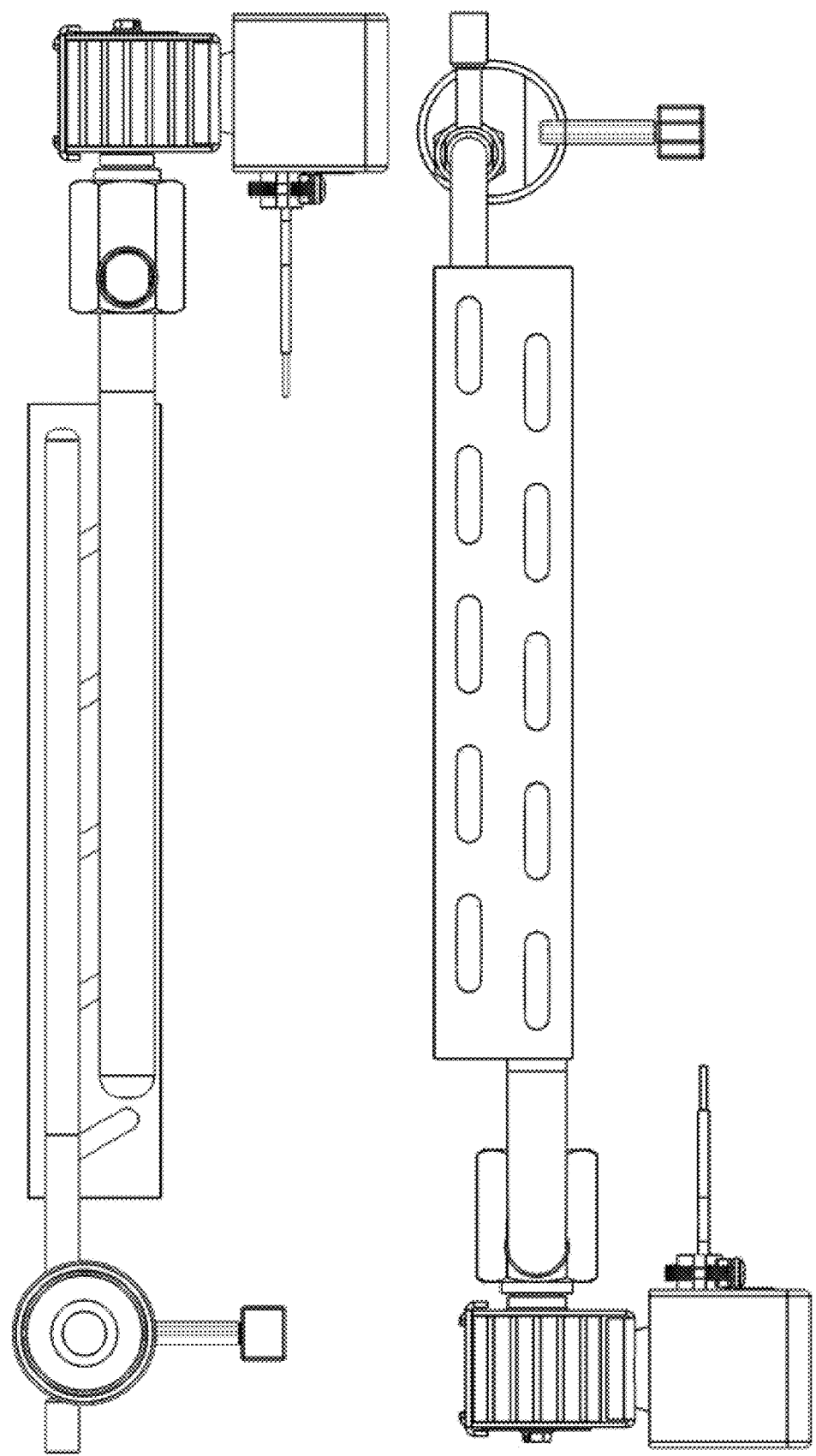
FIG. 78 illustrates front side and rear side views of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 79:
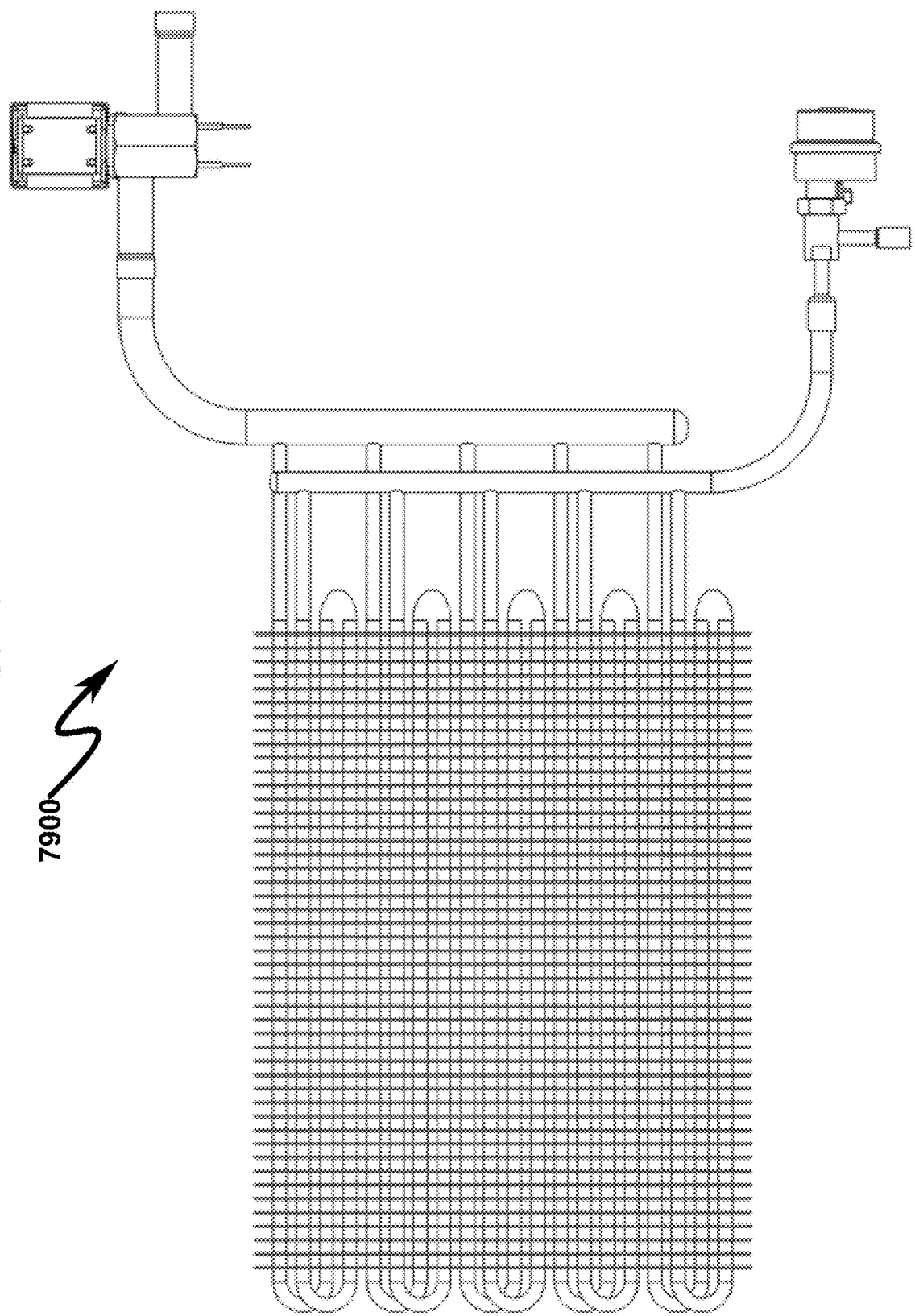
FIG. 79 illustrates a top view of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 80:
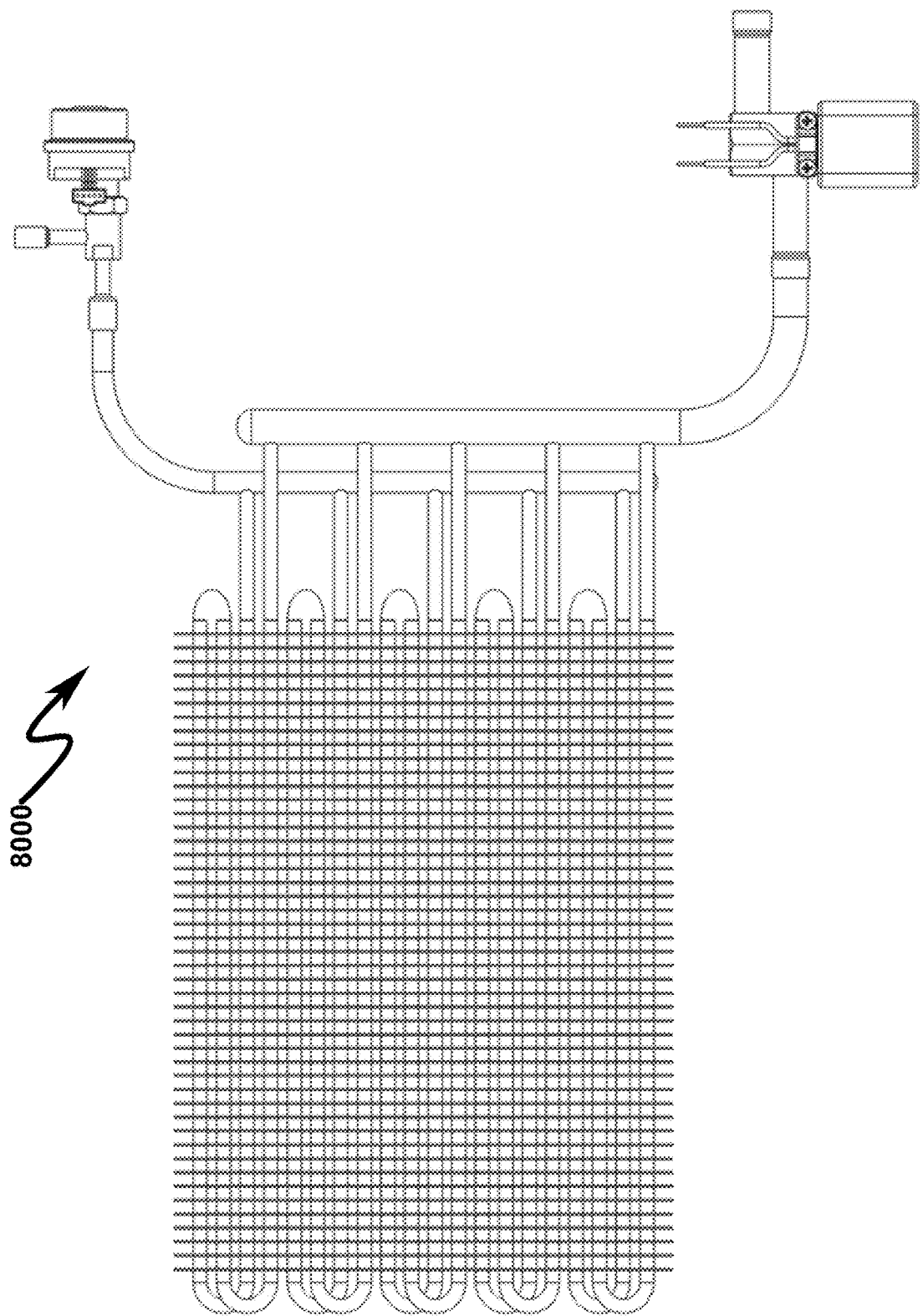
FIG. 80 illustrates a bottom view of a preferred exemplary embodiment of the present invention in which a refrigerant evaporator coil (REC) and electronic expansion valve (EEV) configuration are augmented with a refrigerant control valve (RCV) to allow isolation of the REC in the event of a refrigerant leak.
Figure 81:
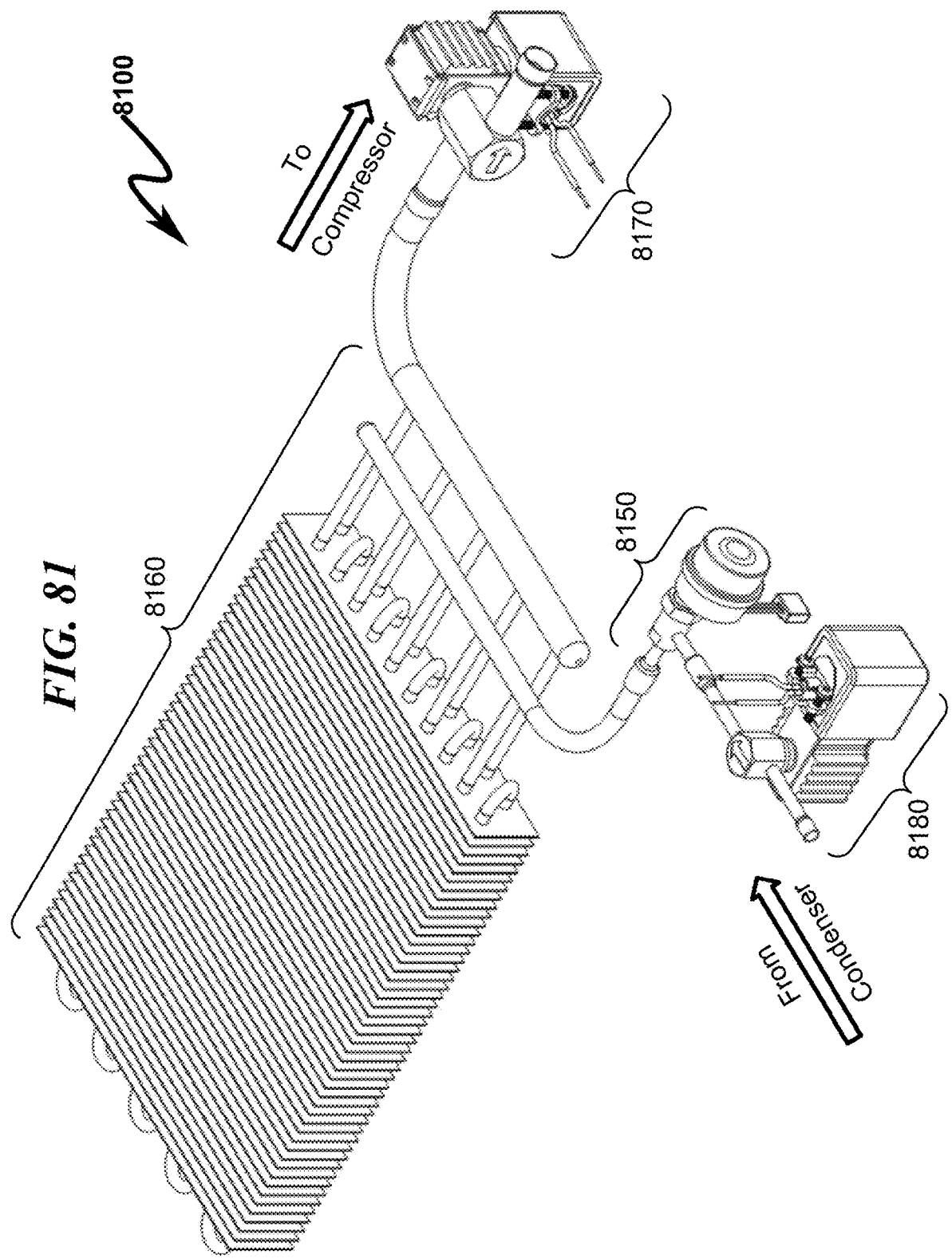
FIG. 81 illustrates a top left front perspective view of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.
Figure 82:
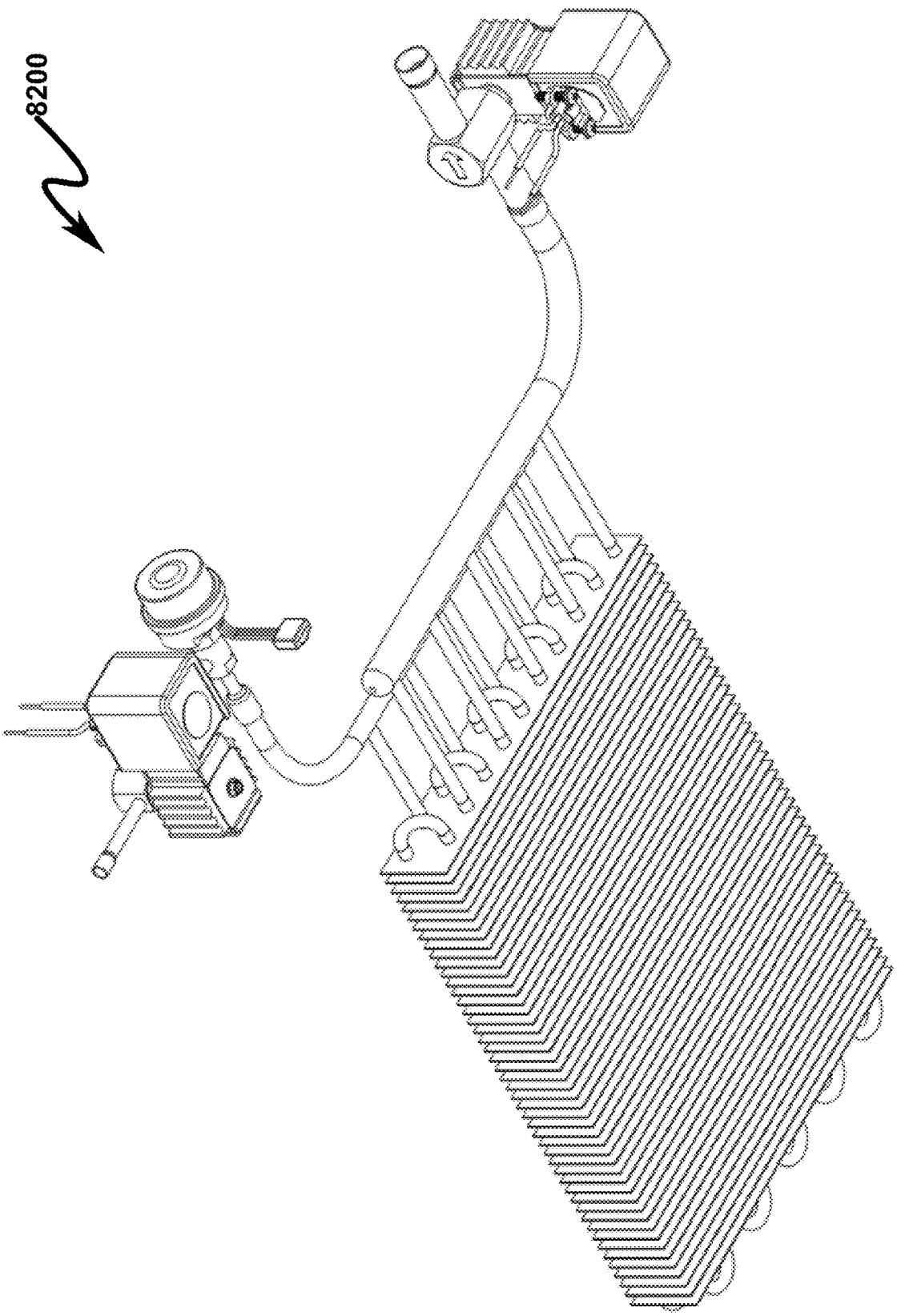
FIG. 82 illustrates a bottom left front perspective view of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.
Figure 83:
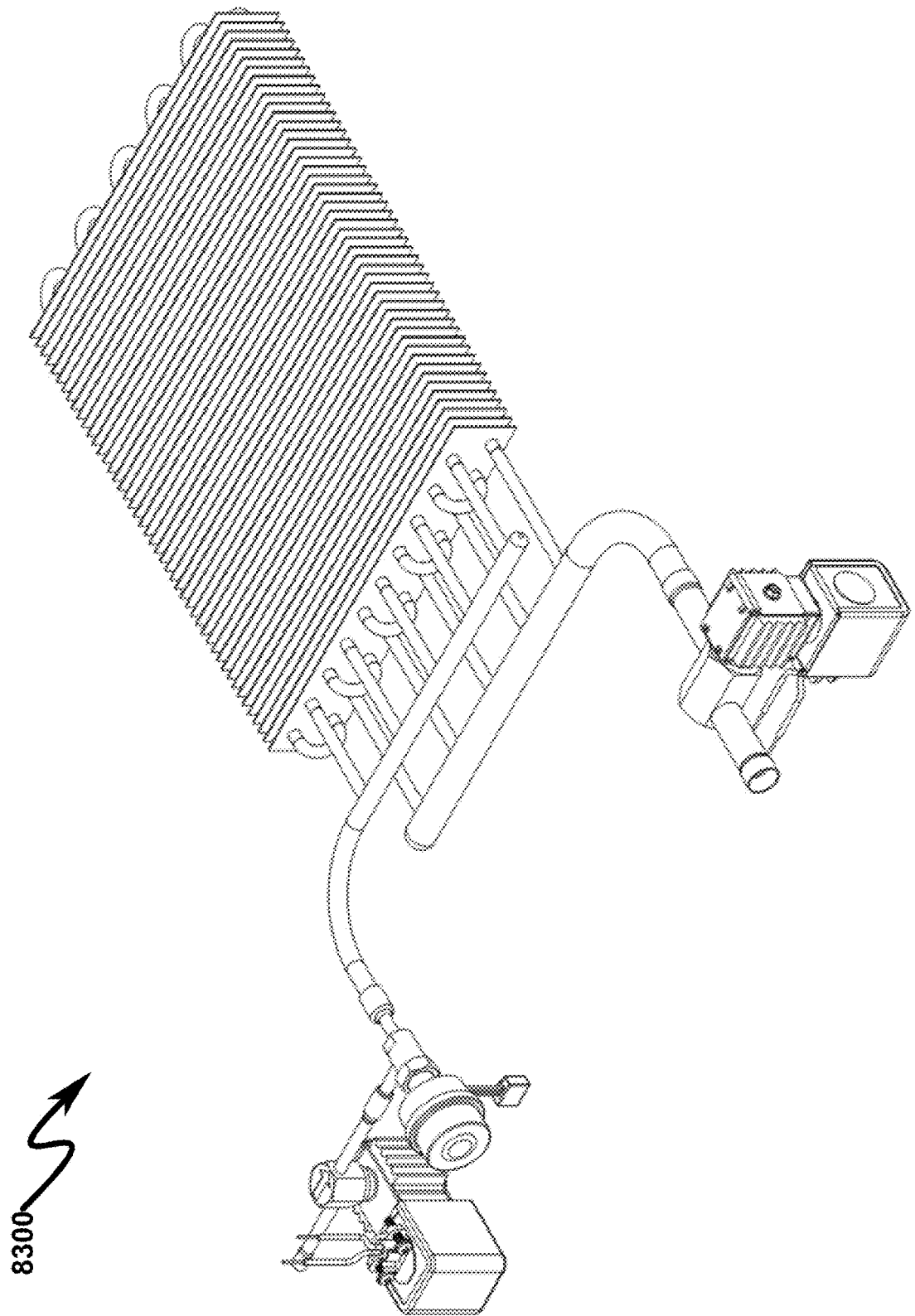
FIG. 83 illustrates a top right front perspective view of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.
Figure 84:
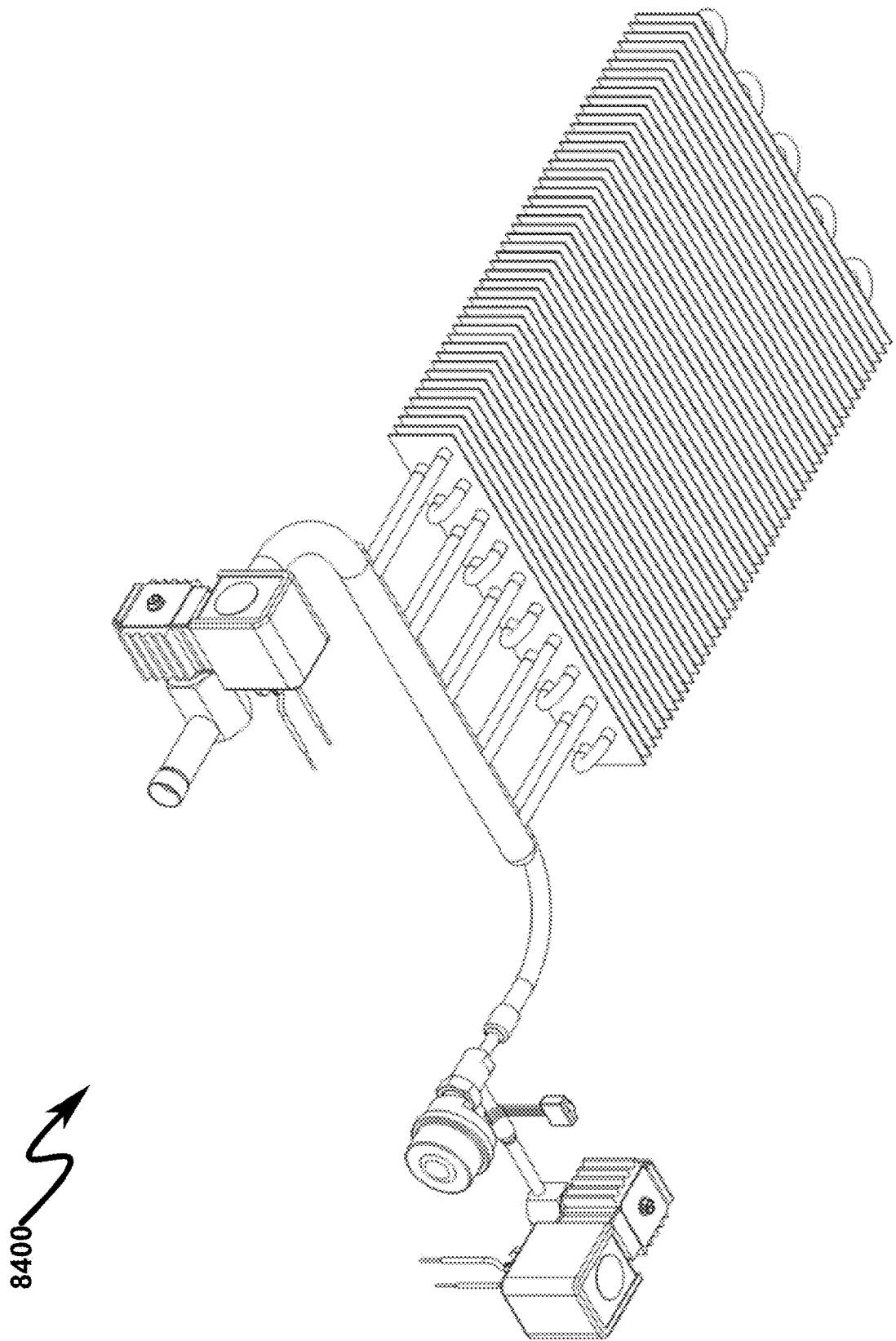
FIG. 84 illustrates a bottom right front perspective view of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.
Figure 85:
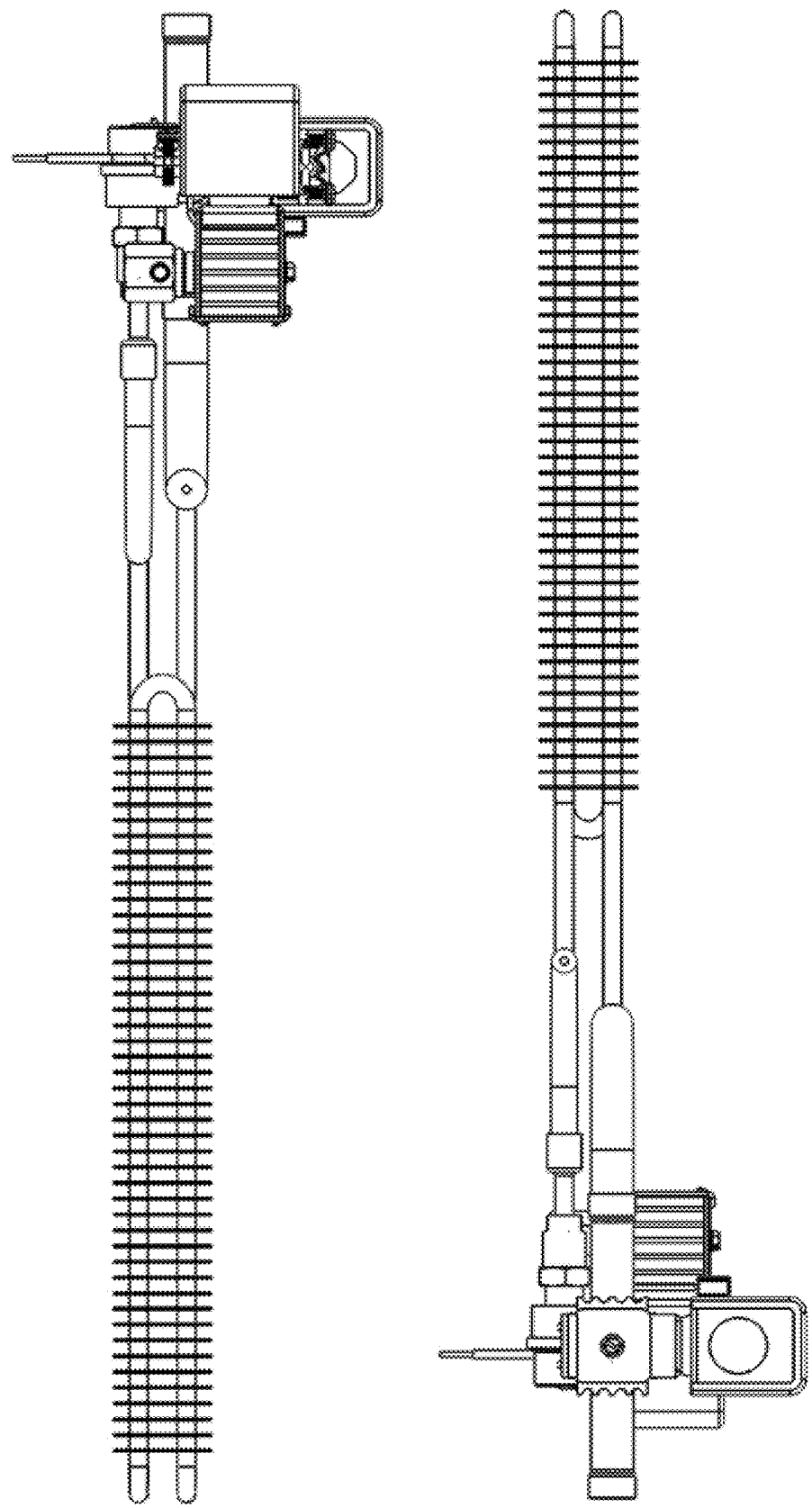
FIG. 85 illustrates left side and right side views of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.
Figure 86:
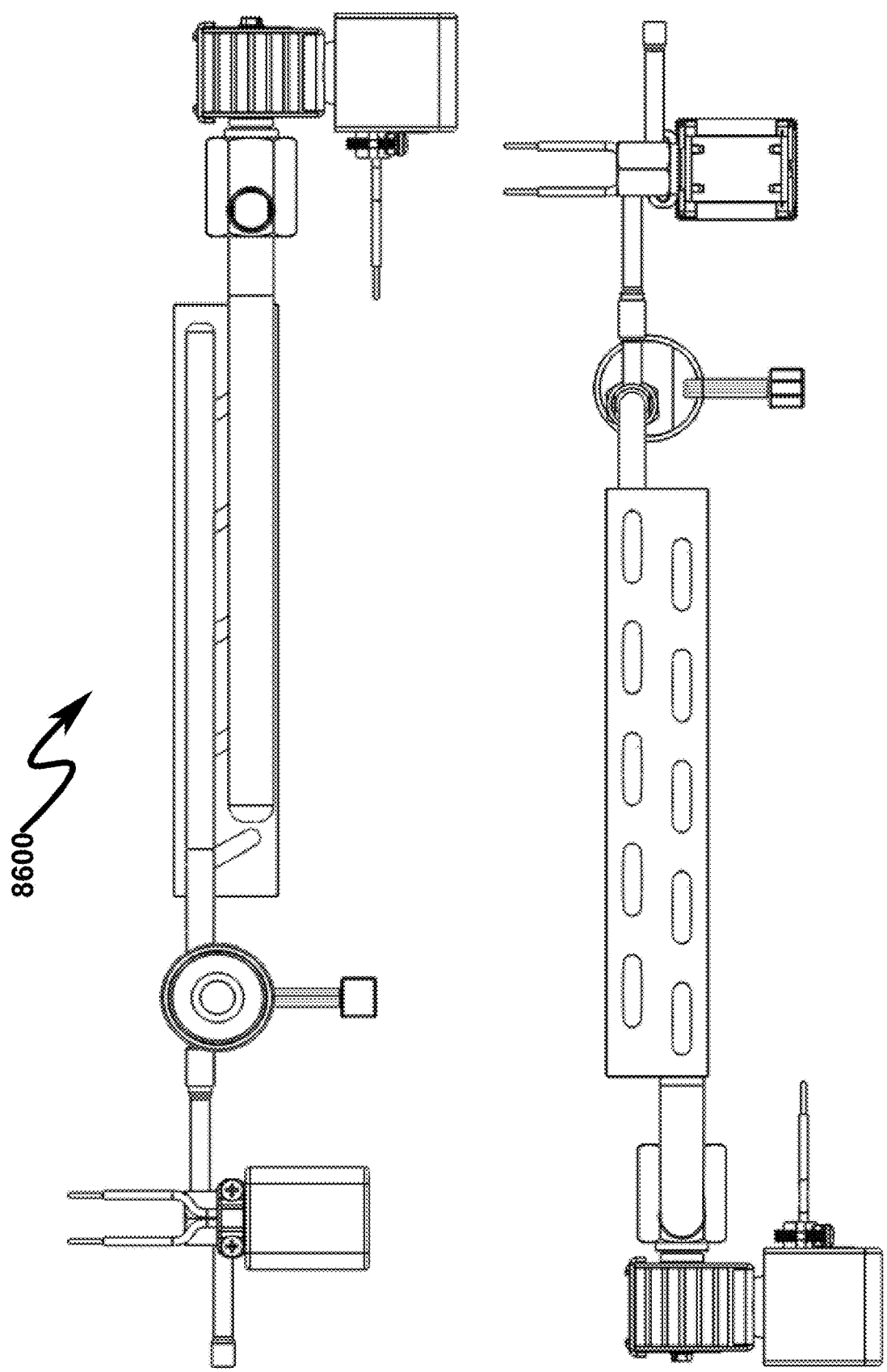
FIG. 86 illustrates front side and rear side views of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.
Figure 87:
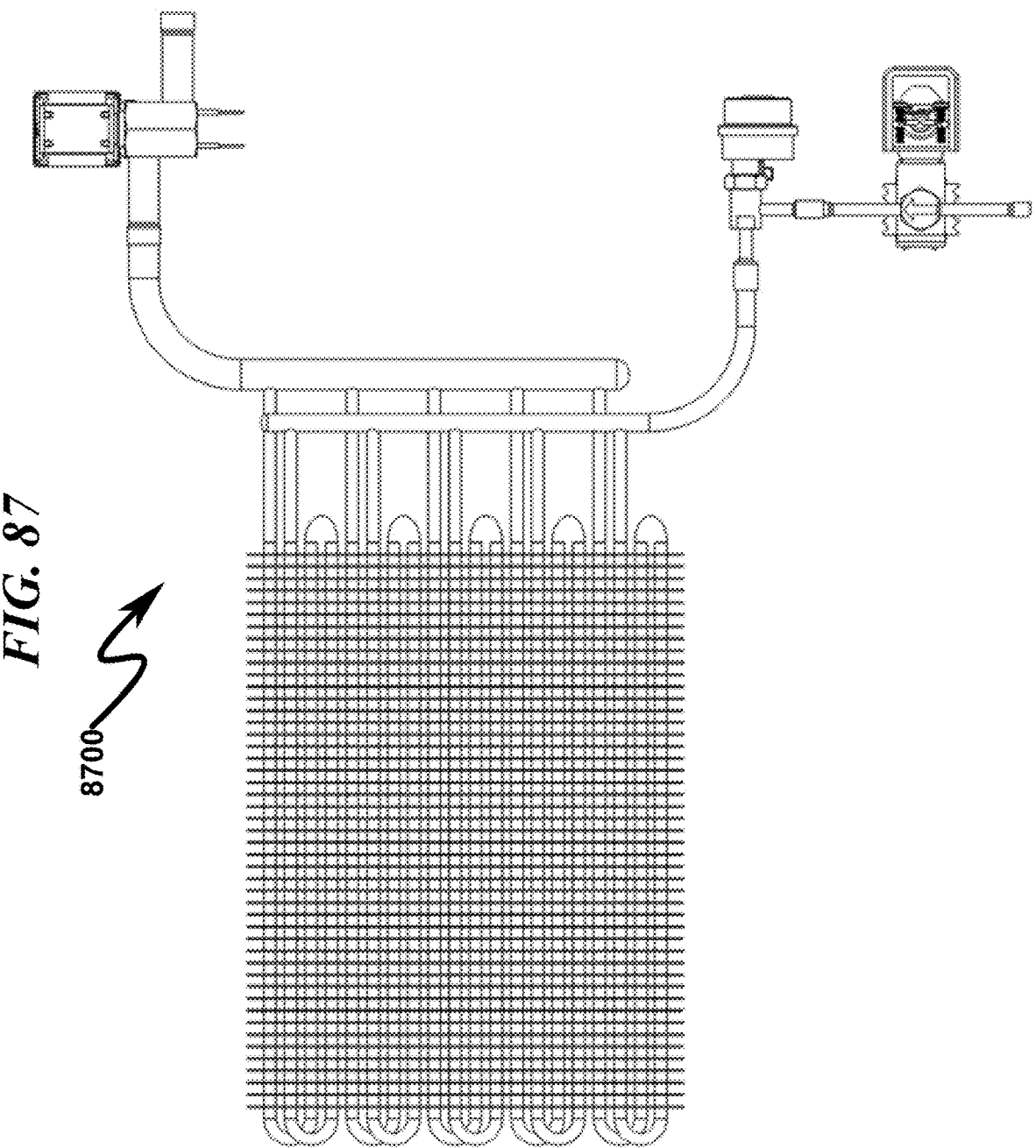
FIG. 87 illustrates a top view of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.

As generally depicted in FIG. 73 (7300)-FIG. 80 (8000), the present invention may be applied to the prior art by augmenting the HVAC system depicted in FIG. 64 (6400)-FIG. 72 (7200) with a refrigerant control valve (RCV) (7370) such that the DCP acts to deactivate both the EEV (7350) and the RCV (7370) when a refrigerant leak in the REC (7360) is detected. In this configuration the DCP is interfaced to the electrical controls (7351) of the EEV (7350) and the solenoid control wiring (7371, 7372) of the RCV (7370) such that the EEV (7350) is deactivated (allowing no refrigerant flow (7301) from the condenser) and the RCV (7370) is placed in a state in which it prohibits flow (7302) from the RCC to the compressor. This system configuration is minimally invasive to an existing HVAC system in that it only requires rewiring of the EEV (7350) and installation of the RCV (7370) at the output port of the REC (7360).

EEV+REC Isolated with RCV (8100)-(8800)

Figure 88:
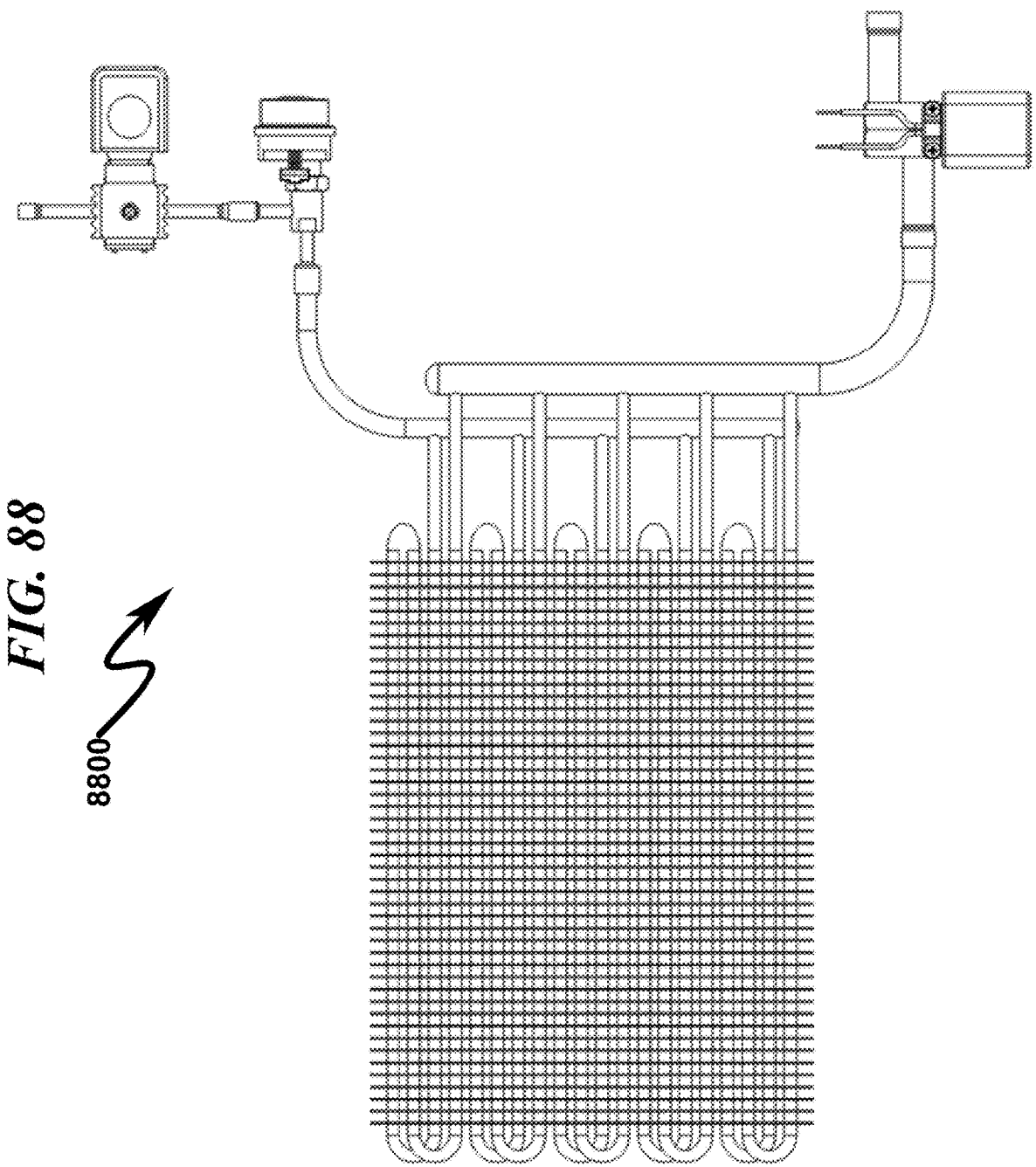
FIG. 88 illustrates a bottom view of a preferred exemplary embodiment of the present invention in which a refrigerant evaporator coil (REC) and electronic expansion valve (EEV) configuration are augmented with two refrigerant control valves (RCV) to allow isolation of the EEV and REC in the event of a refrigerant leak.

As generally depicted in FIG. 80 (8000)-FIG. 88 (8800), the present invention may be applied to the prior art by augmenting the HVAC system depicted in FIG. 64 (6400)-FIG. 72 (7200) with two refrigerant control valves (RCV) (8170, 8180) such that the DCP acts to deactivate both RCVs when a refrigerant leak in the REC (8160) is detected. In this configuration deactivation of the RCVs allows servicing of the REC (8160) and/or EEV (8150) isolated from the HVAC refrigerant loop.

REC Isolated with RCV (8900)-(9600)

Figure 89:
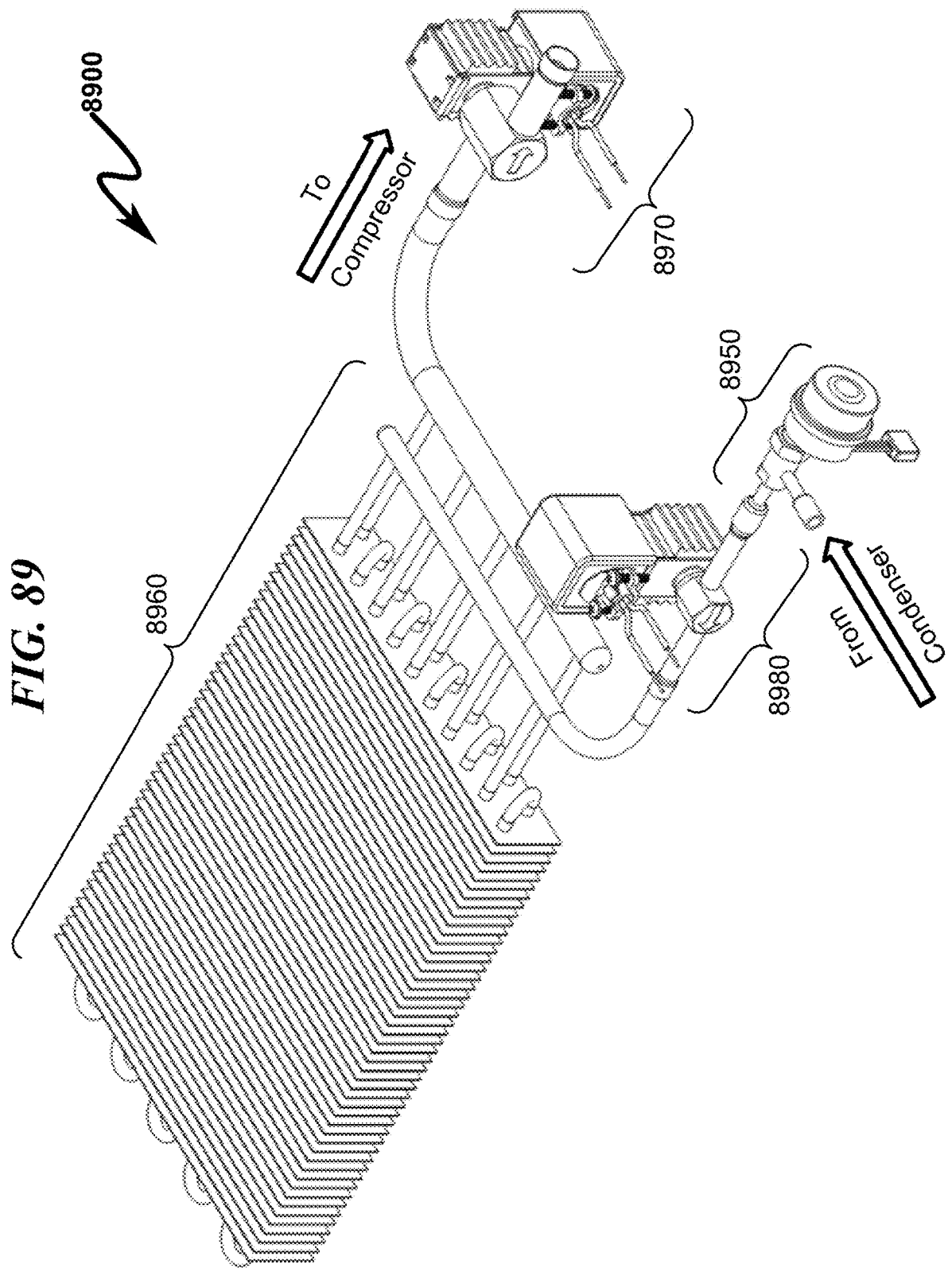
FIG. 89 illustrates a top left front perspective view of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 90:
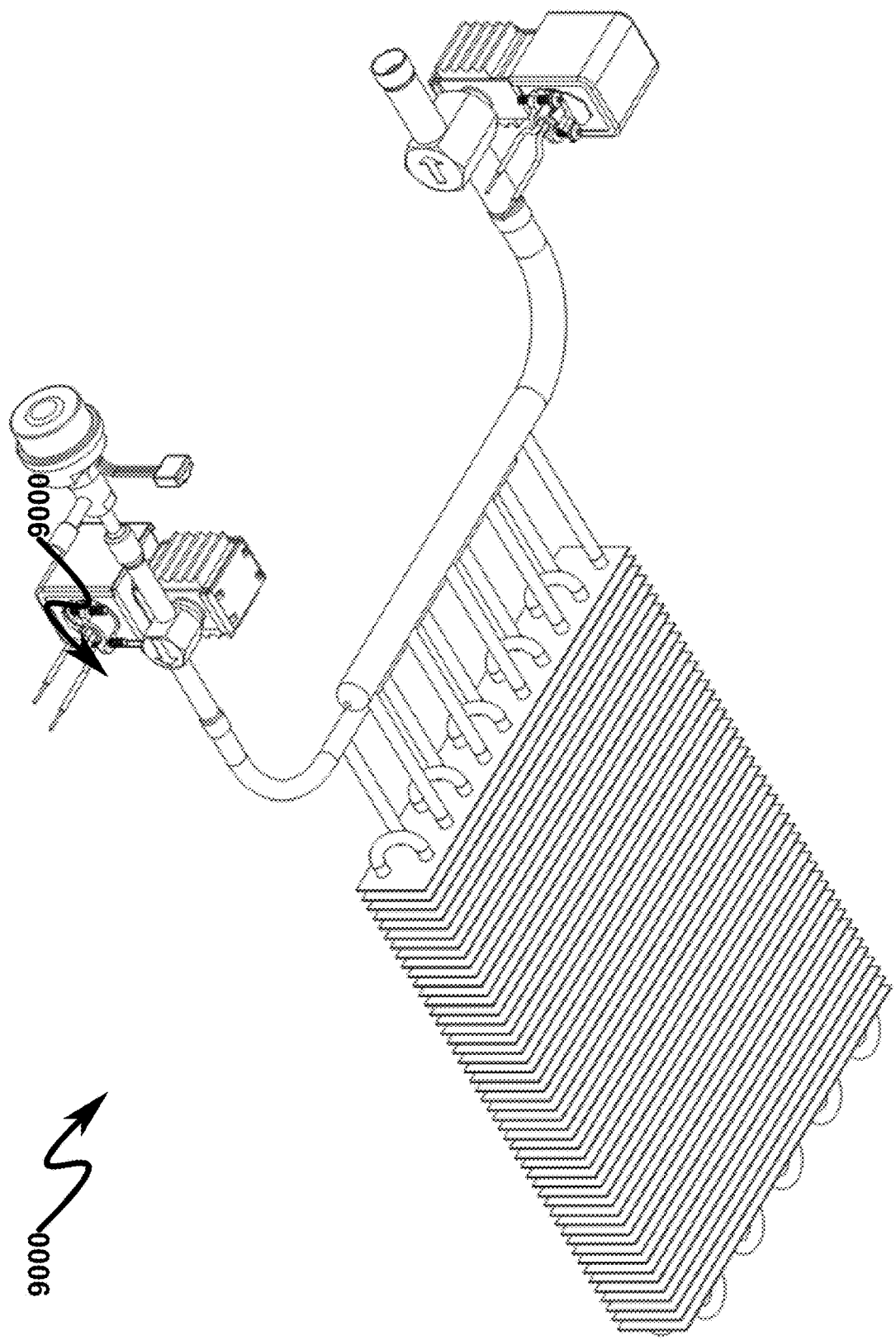
FIG. 90 illustrates a bottom left front perspective view of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 91:
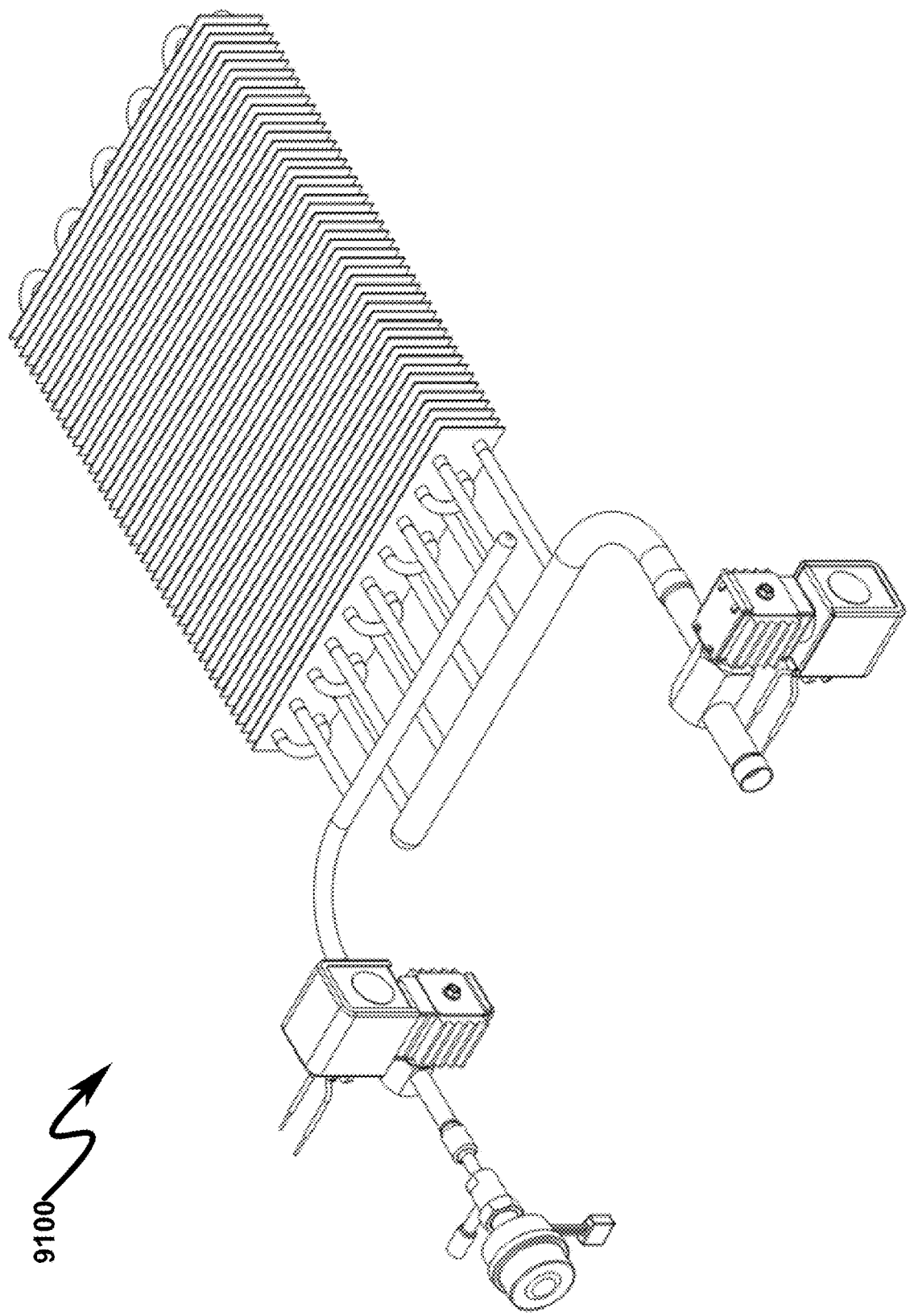
FIG. 91 illustrates a top right front perspective view of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 92:
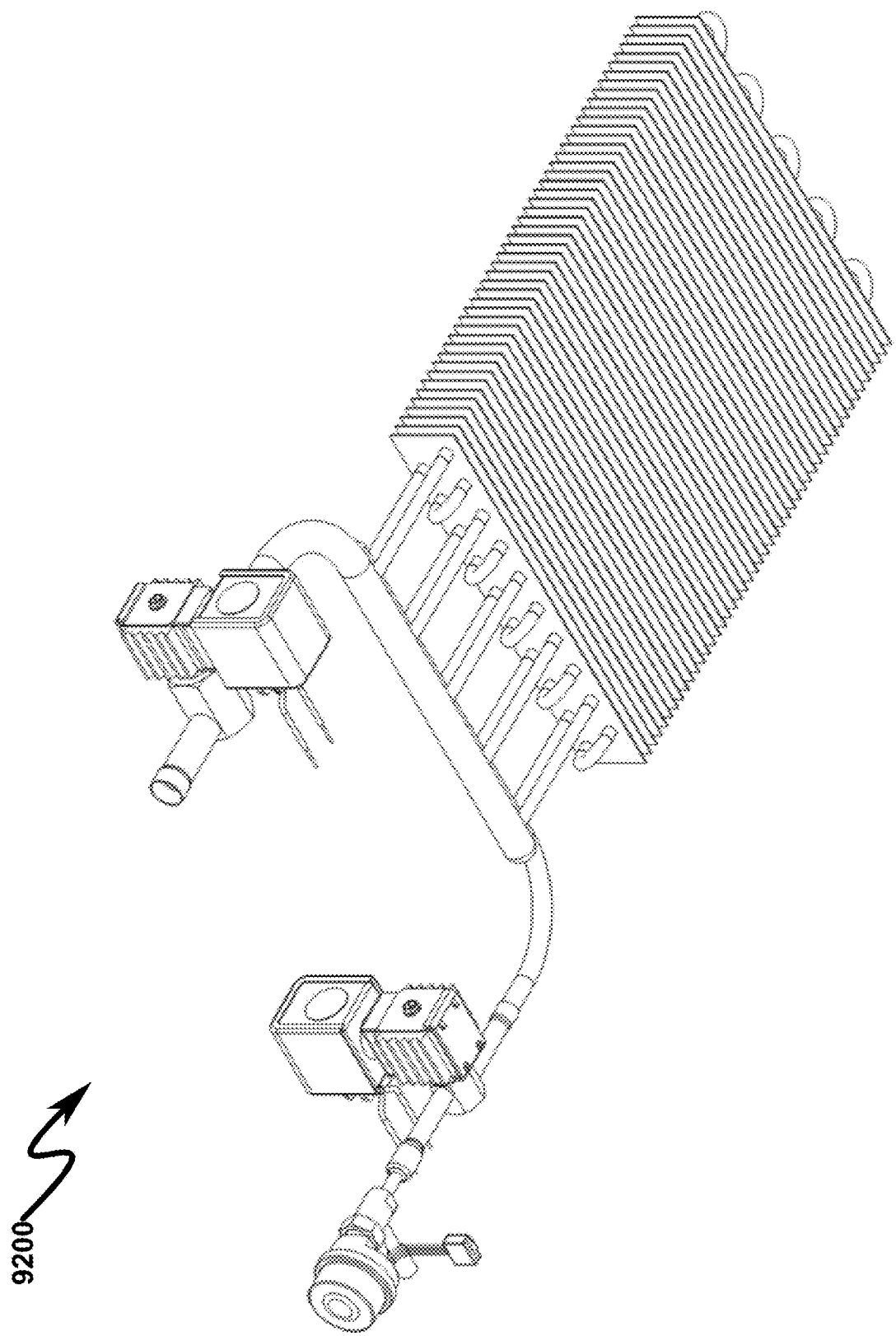
FIG. 92 illustrates a bottom right front perspective view of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 93:
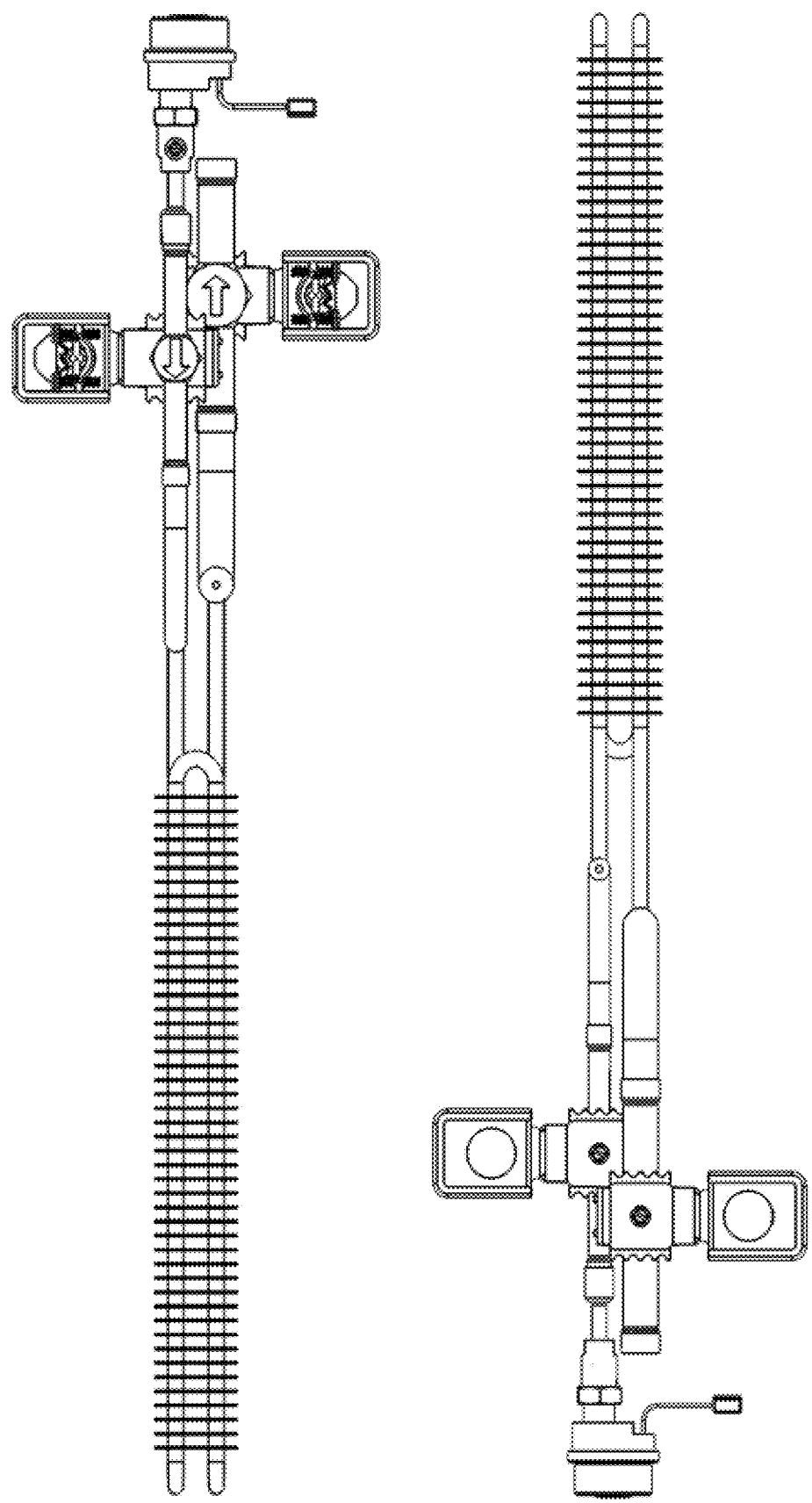
FIG. 93 illustrates left side and right side views of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 94:
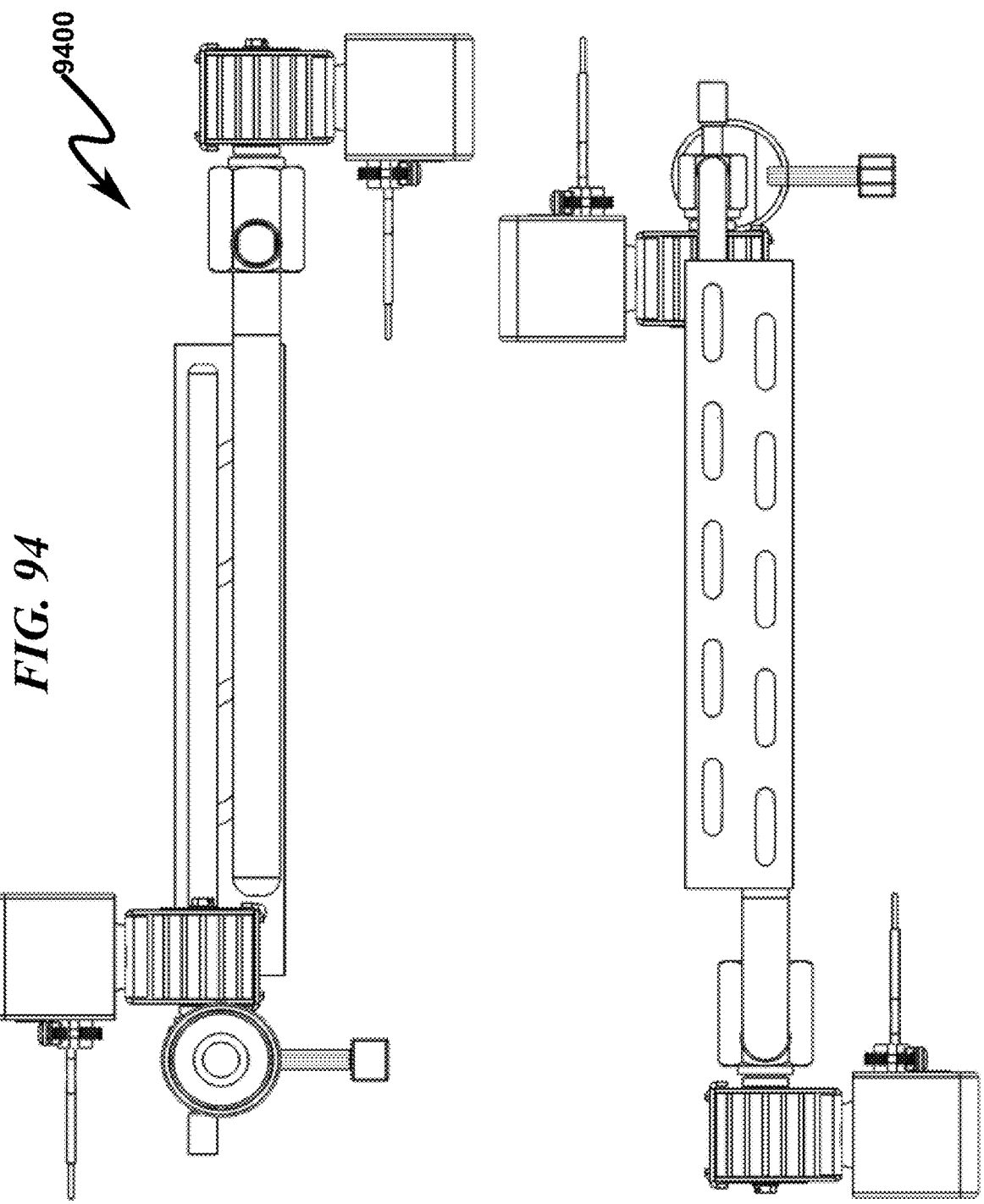
FIG. 94 illustrates front side and rear side views of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 95:
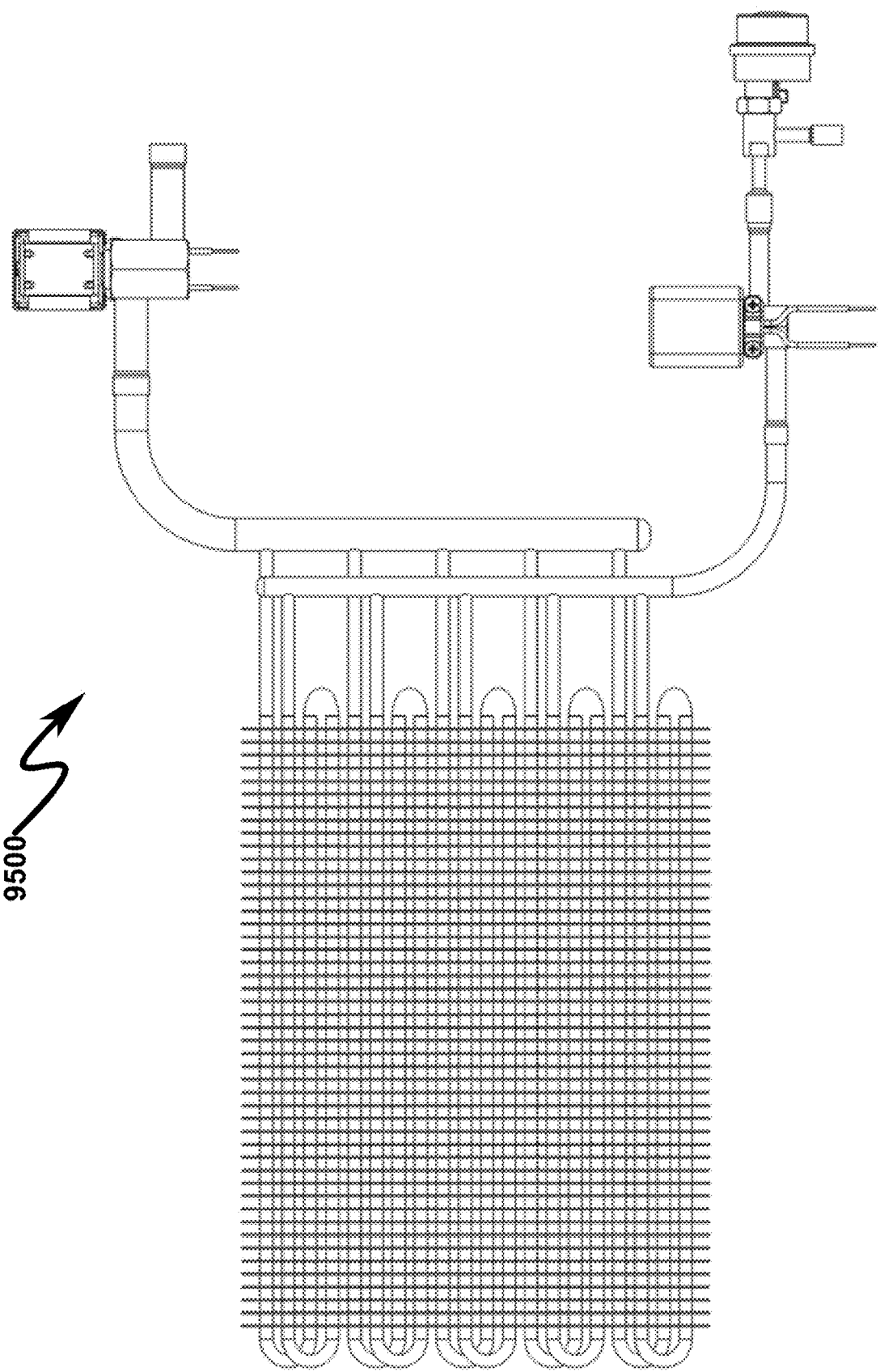
FIG. 95 illustrates a top view of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.
Figure 96:
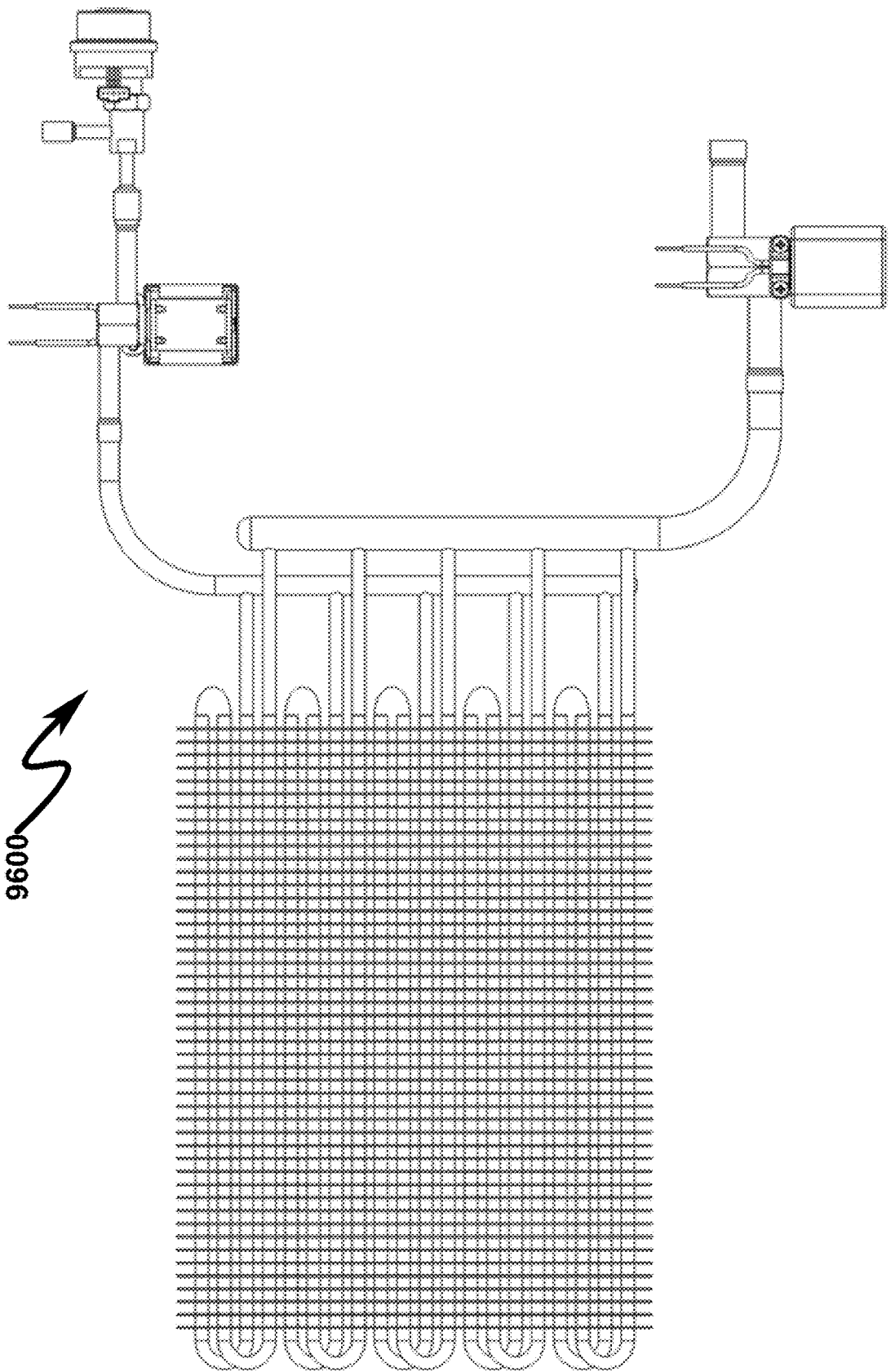
FIG. 96 illustrates a bottom view of a preferred exemplary embodiment of the present invention in which a refrigerant evaporator coil (REC) and electronic expansion valve (EEV) configuration are augmented with two refrigerant control valves (RCV) to allow positive isolation of the REC in the event of a refrigerant leak.

As generally depicted in FIG. 89 (8900)-FIG. 96 (9600), the present invention may be applied to the prior art by augmenting the HVAC system depicted in FIG. 64 (6400)-FIG. 72 (7200) with two refrigerant control valves (RCV) (8970, 8980) such that the DCP acts to deactivate both RCVs when a refrigerant leak in the REC (8960) is detected. In this configuration deactivation of the RCVs allows servicing of the REC (8960) in isolation from the EEV (8950).

LEV+REC Isolated with RCV (9700)-(10400)

Figure 97:
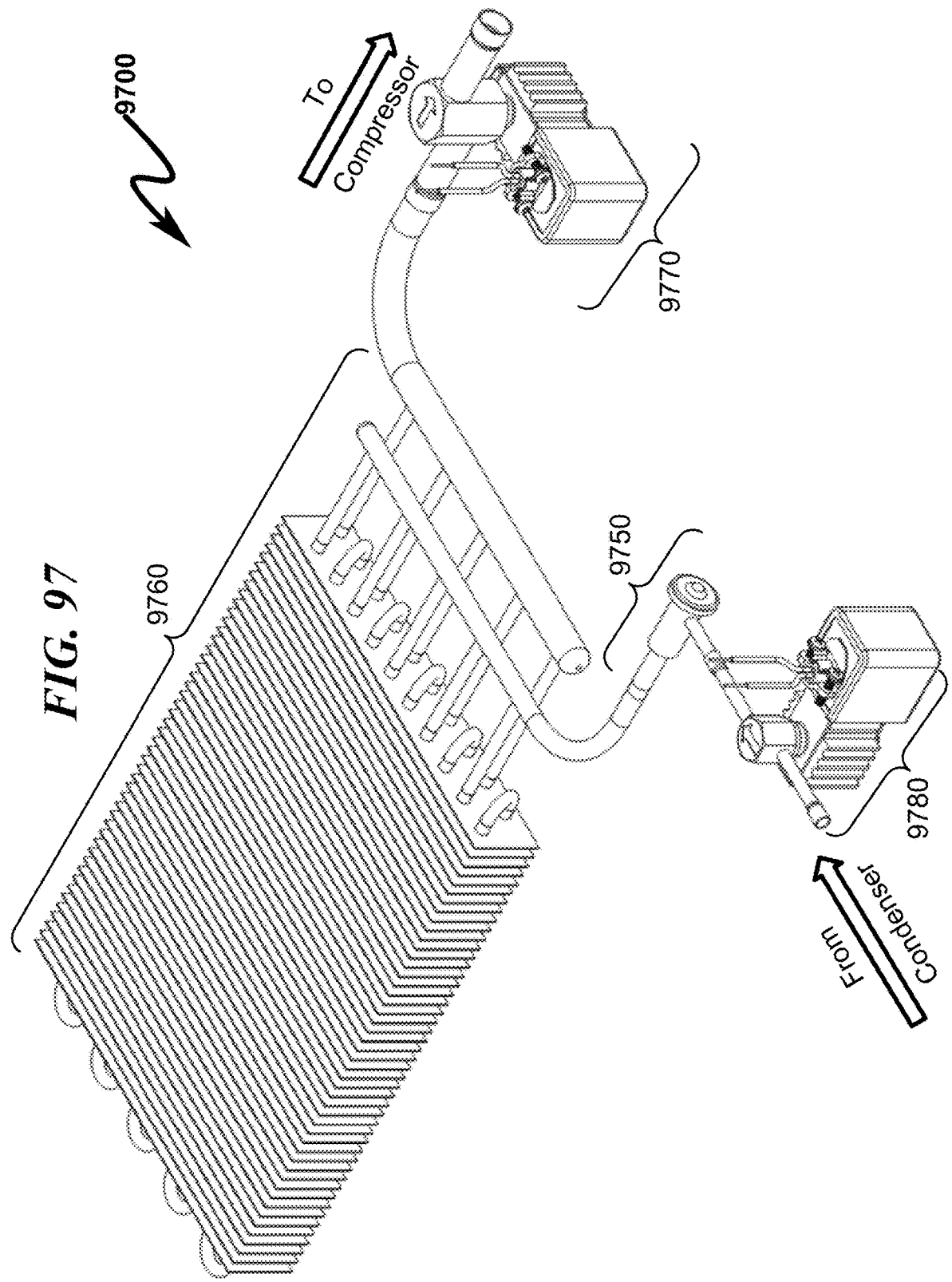
FIG. 97 illustrates a top left front perspective view of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 98:
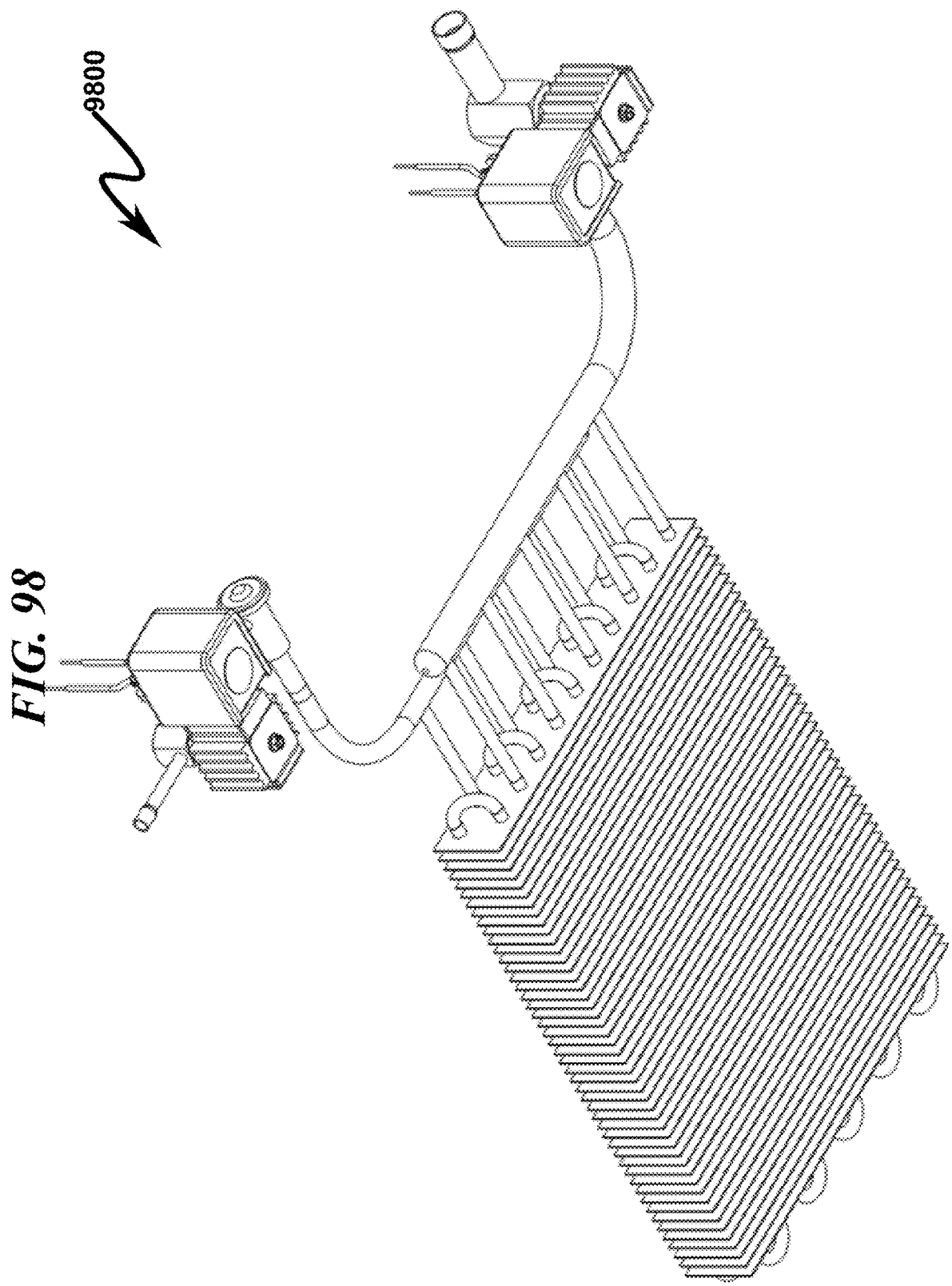
FIG. 98 illustrates a bottom left front perspective view of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 99:
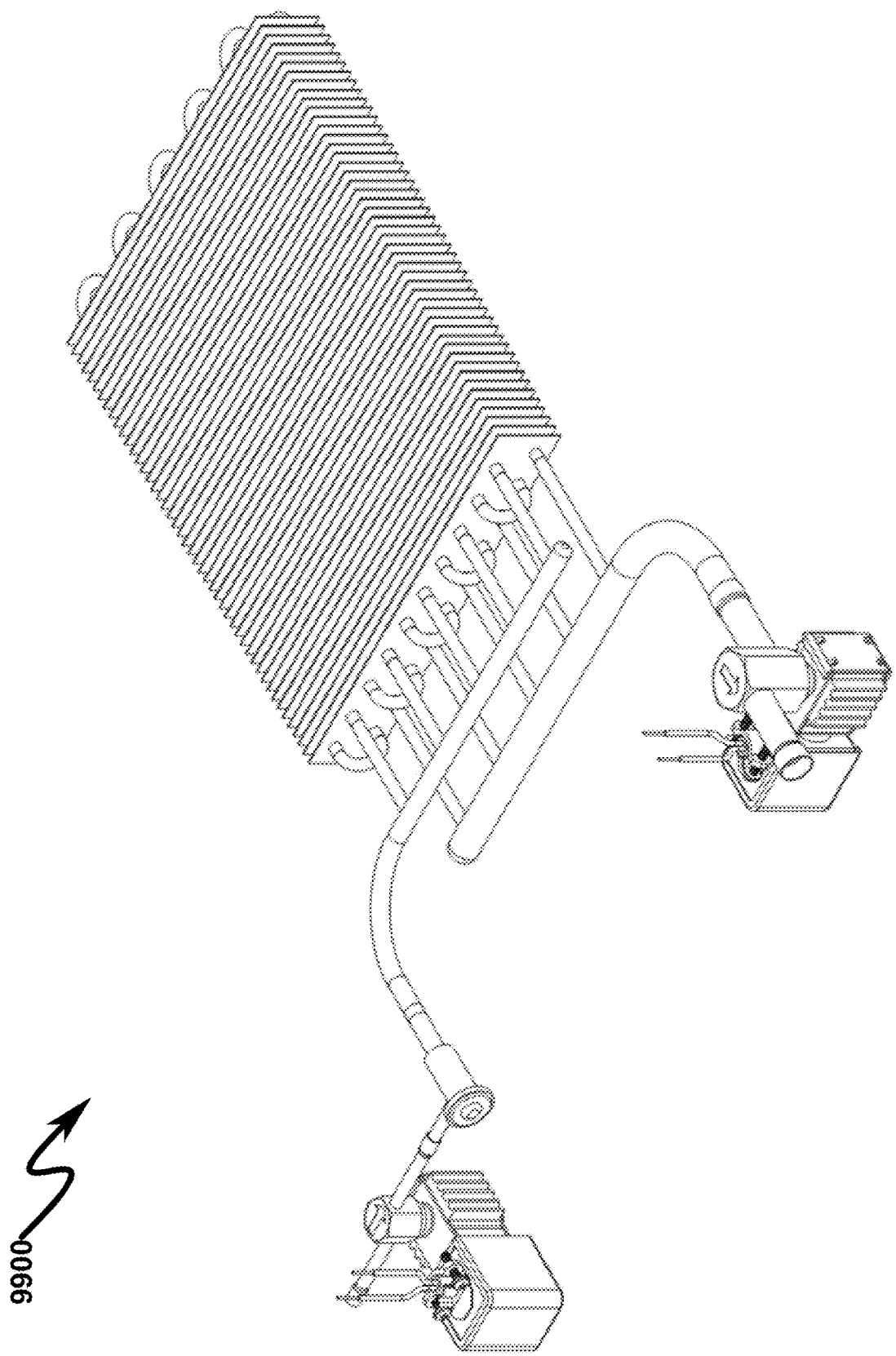
FIG. 99 illustrates a top right front perspective view of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 100:
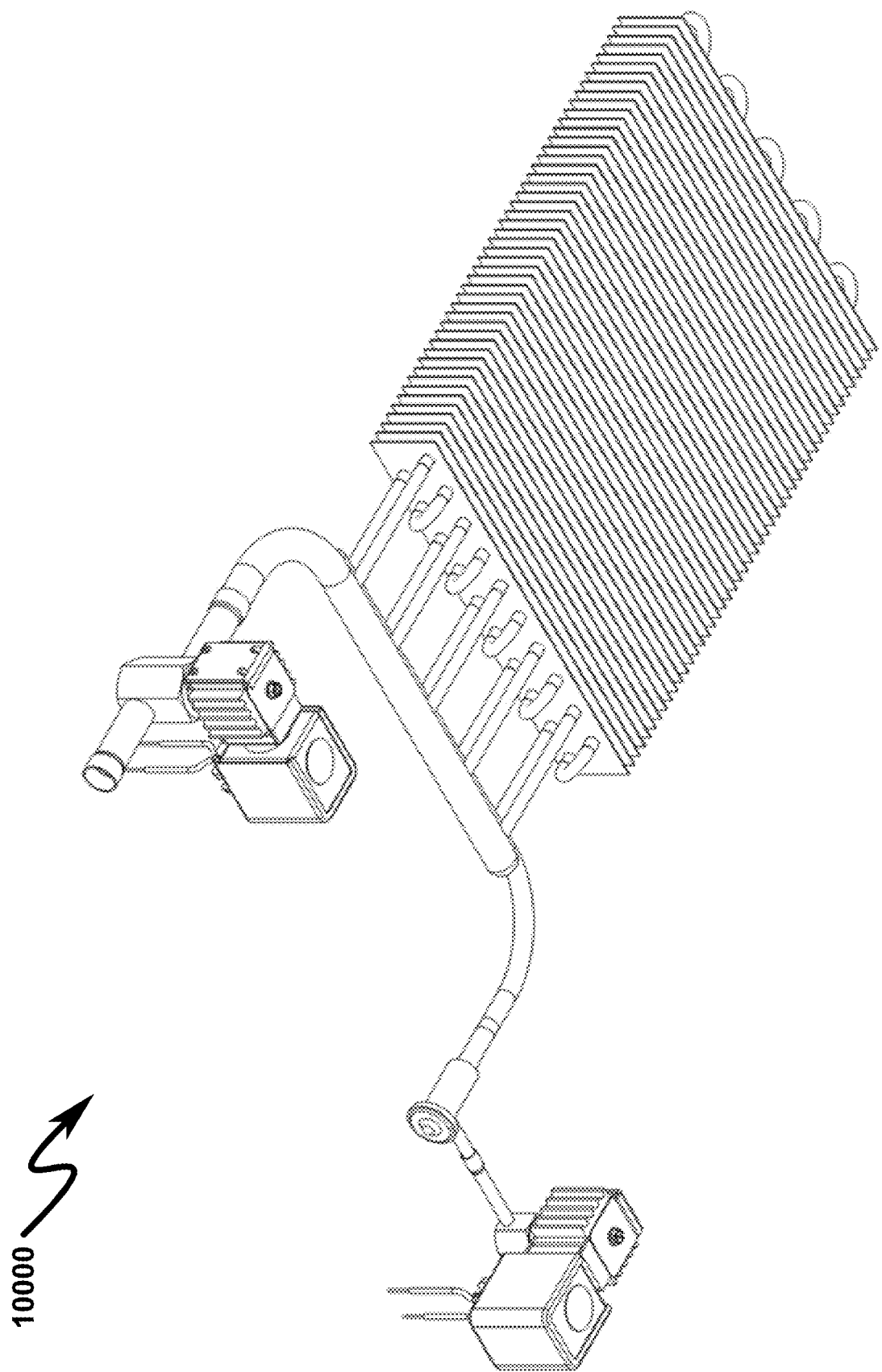
FIG. 100 illustrates a bottom right front perspective view of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 101:
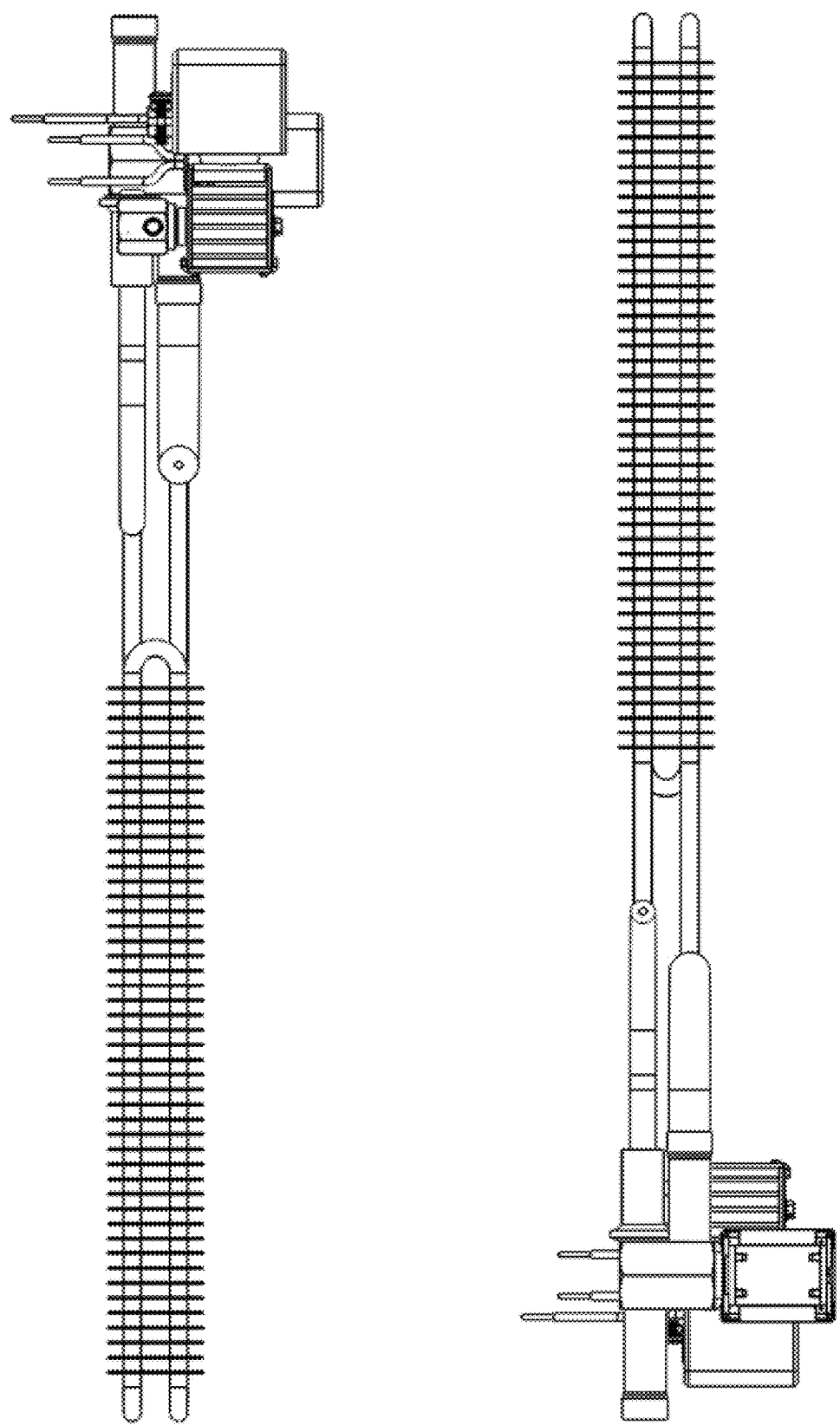
FIG. 101 illustrates left side and right side views of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 102:
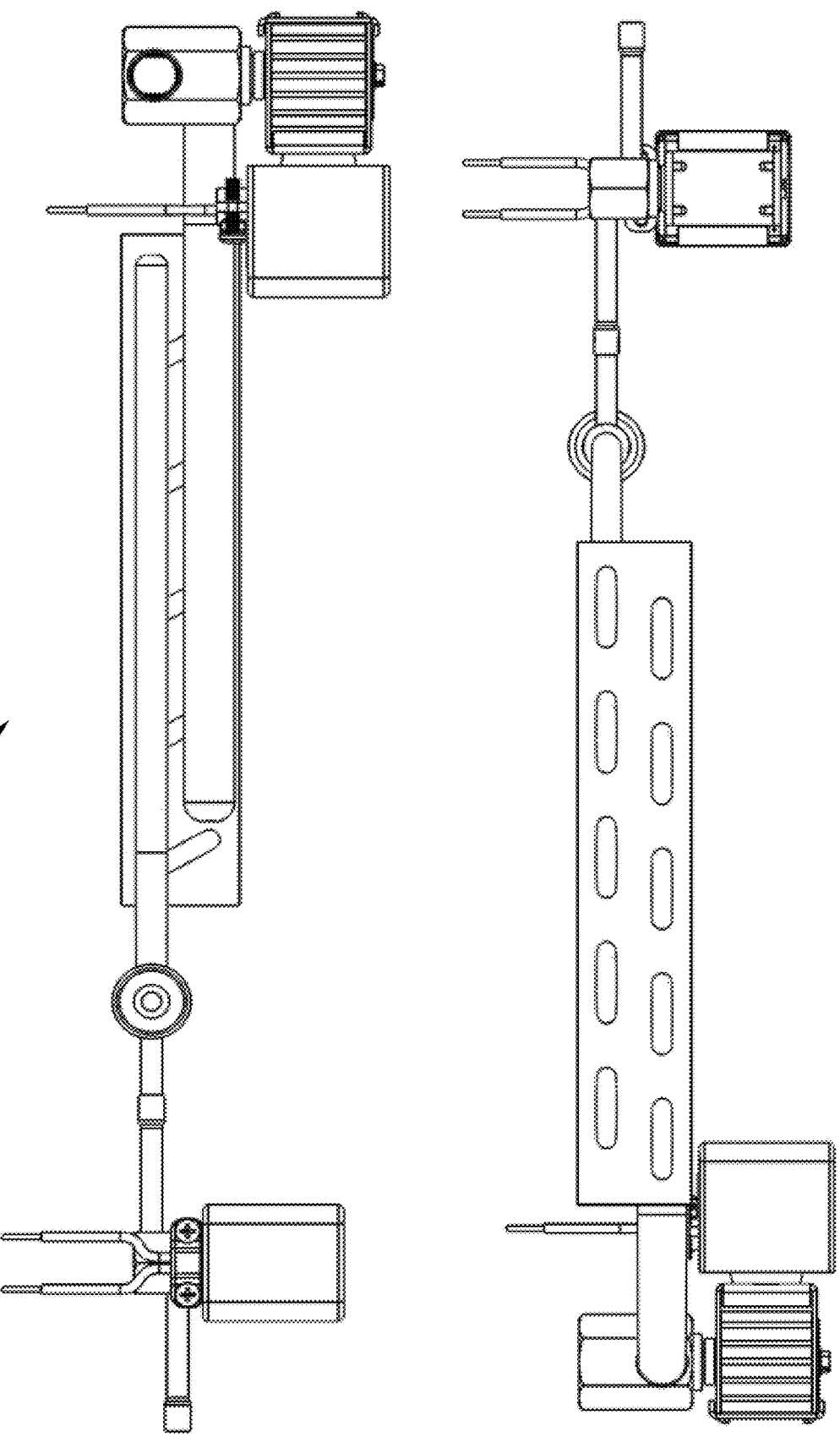
FIG. 102 illustrates front side and rear side views of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 103:
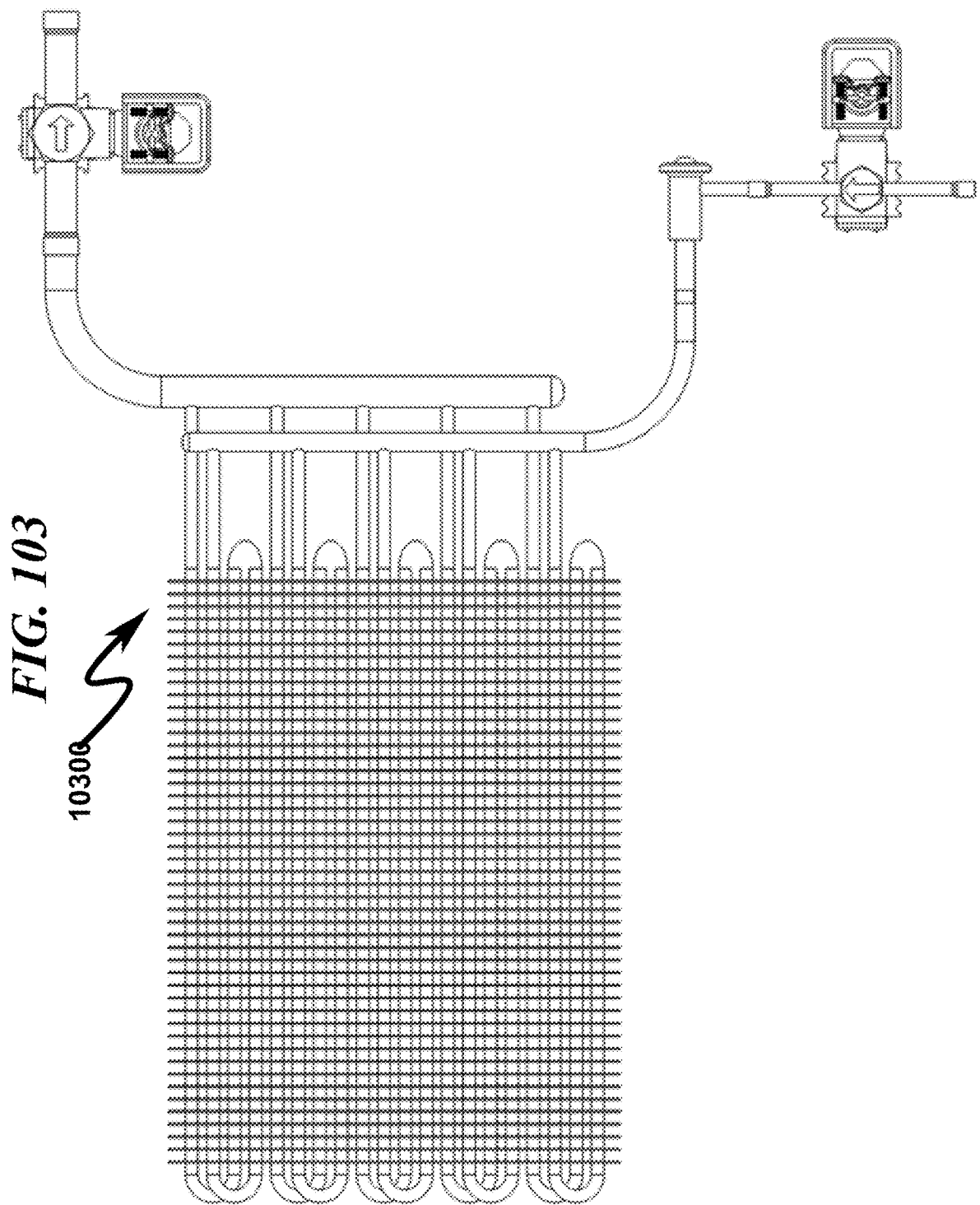
FIG. 103 illustrates a top view of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.
Figure 104:
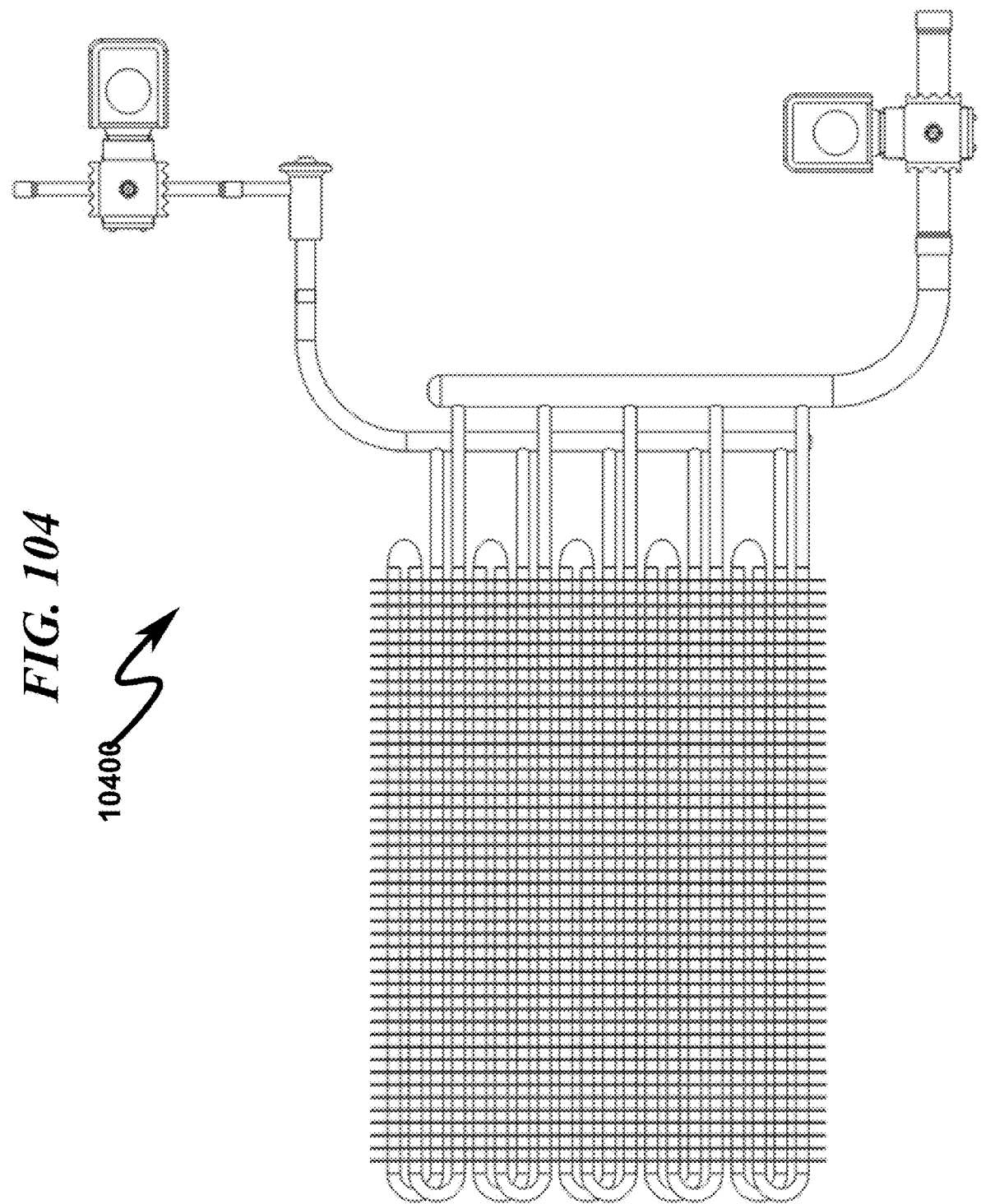
FIG. 104 illustrates a bottom view of a preferred exemplary embodiment of the present invention in which a refrigerant evaporator coil (REC) and linear expansion valve (LEV) configuration are augmented with two refrigerant control valves (RCV) to allow isolation of the LEV and REC in the event of a refrigerant leak.

As generally depicted in FIG. 97 (9700)-FIG. 104 (10400), the present invention may be applied to the prior art by augmenting the HVAC system depicted in FIG. 64 (6400)-FIG. 72 (7200) with two refrigerant control valves (RCV) such that the DCP acts to deactivate both RCVs when a refrigerant leak in the REC (9760) is detected. In this configuration deactivation of the RCVs allows servicing of the REC (9760) and/or LEV isolated from the HVAC refrigerant loop.

REC Isolated with RCV (10500)-(11200)

Figure 105:
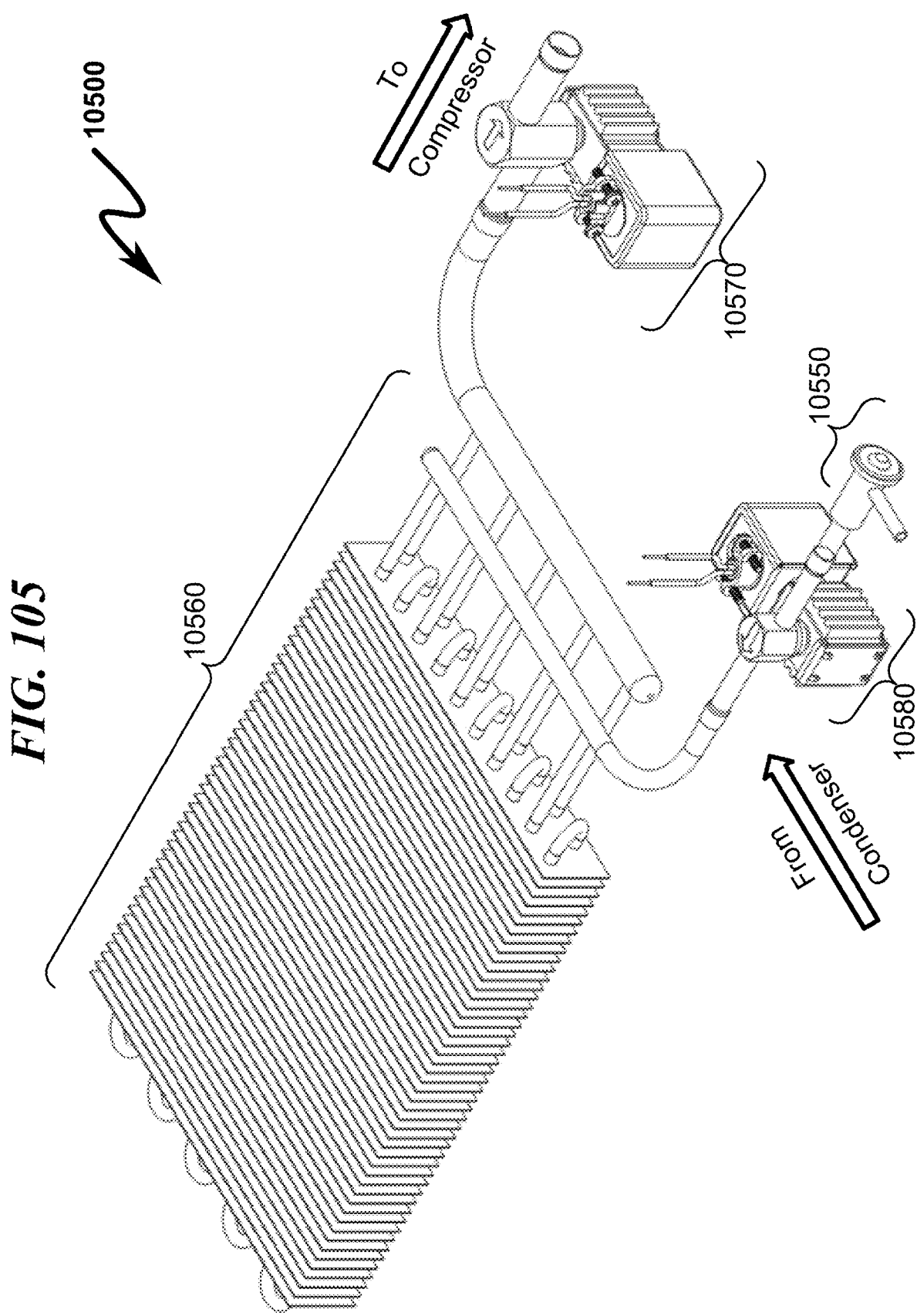
FIG. 105 illustrates a top left front perspective view of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 106:
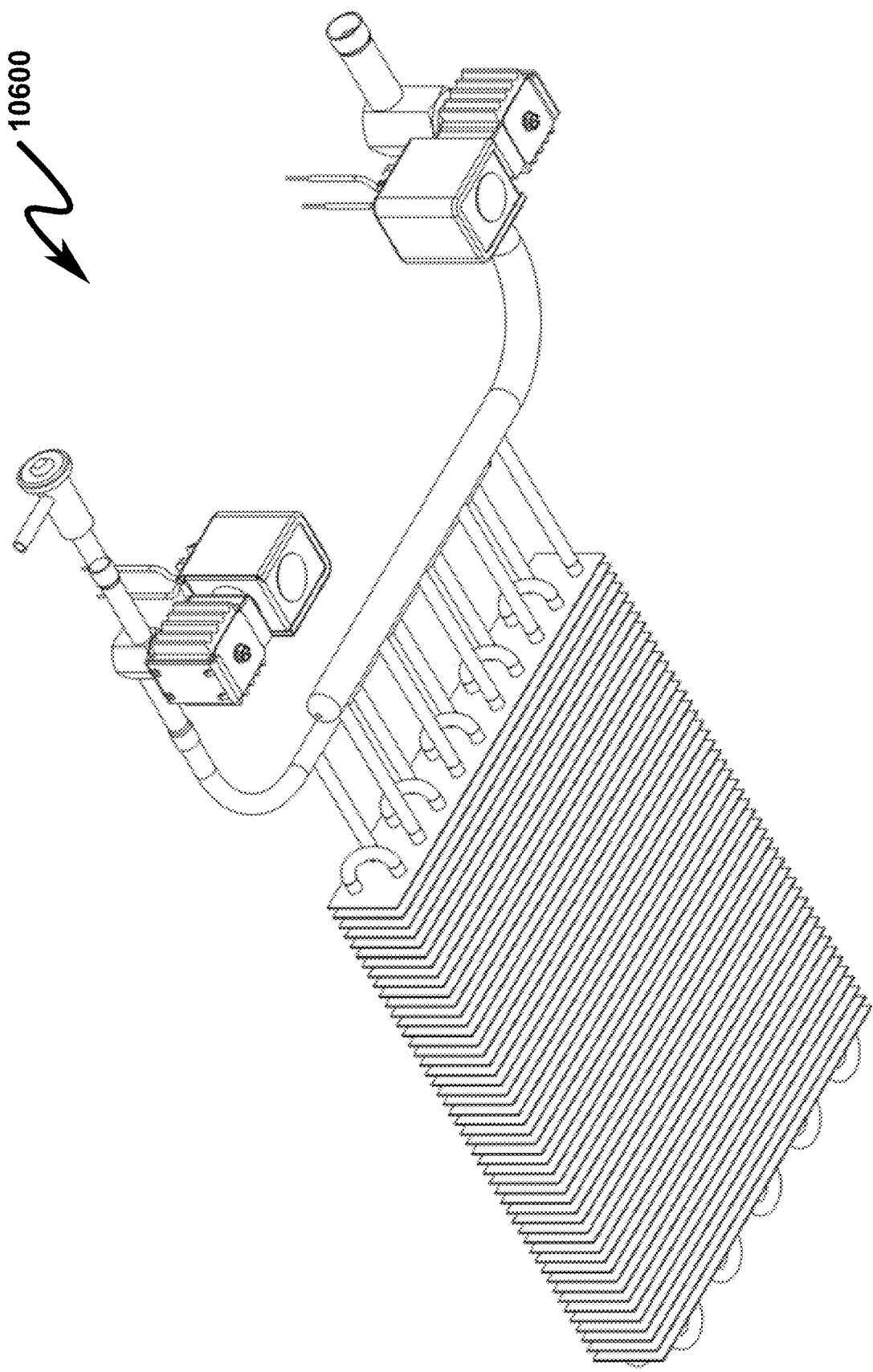
FIG. 106 illustrates a bottom left front perspective view of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 107:
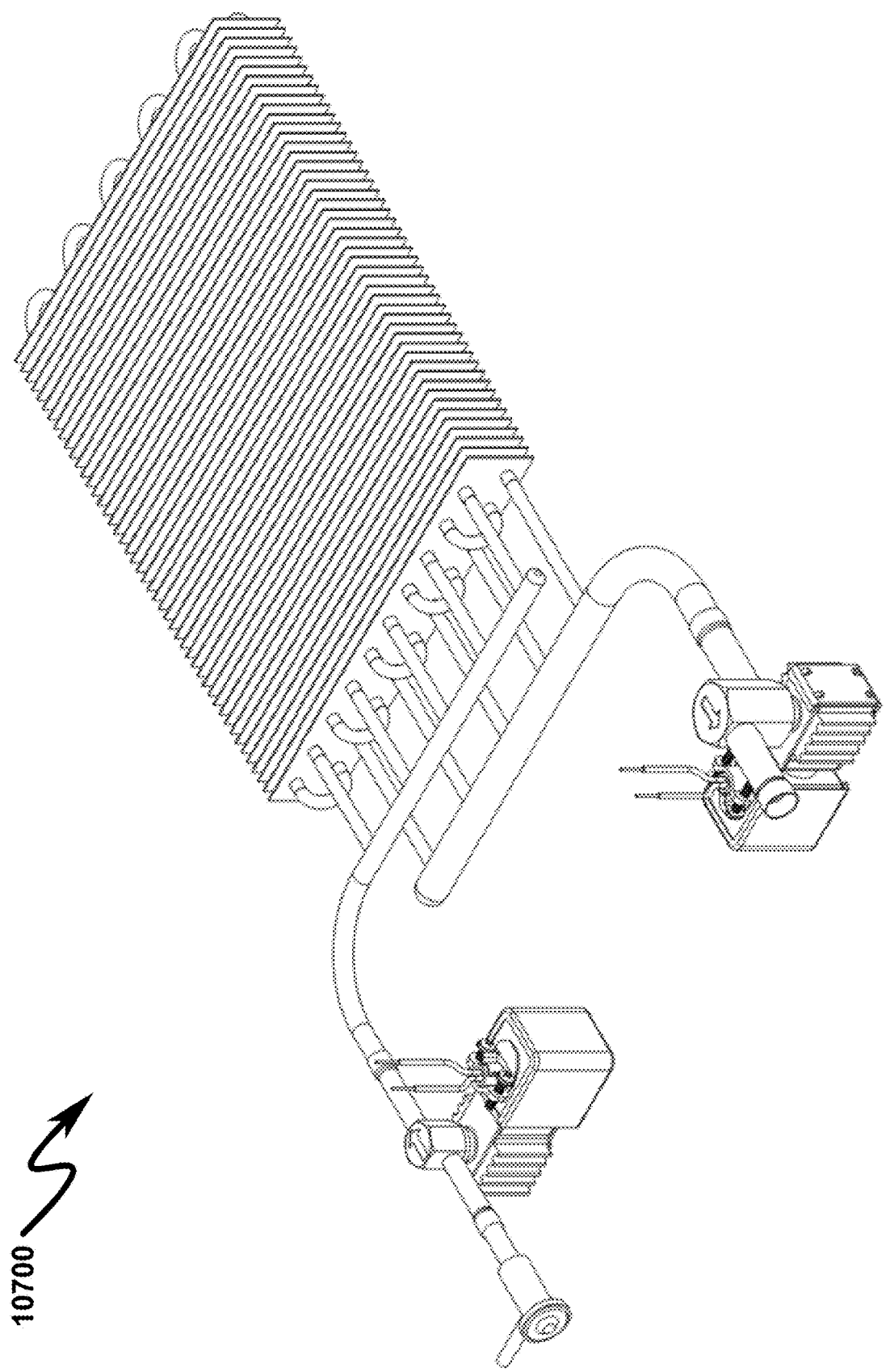
FIG. 107 illustrates a top right front perspective view of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 108:
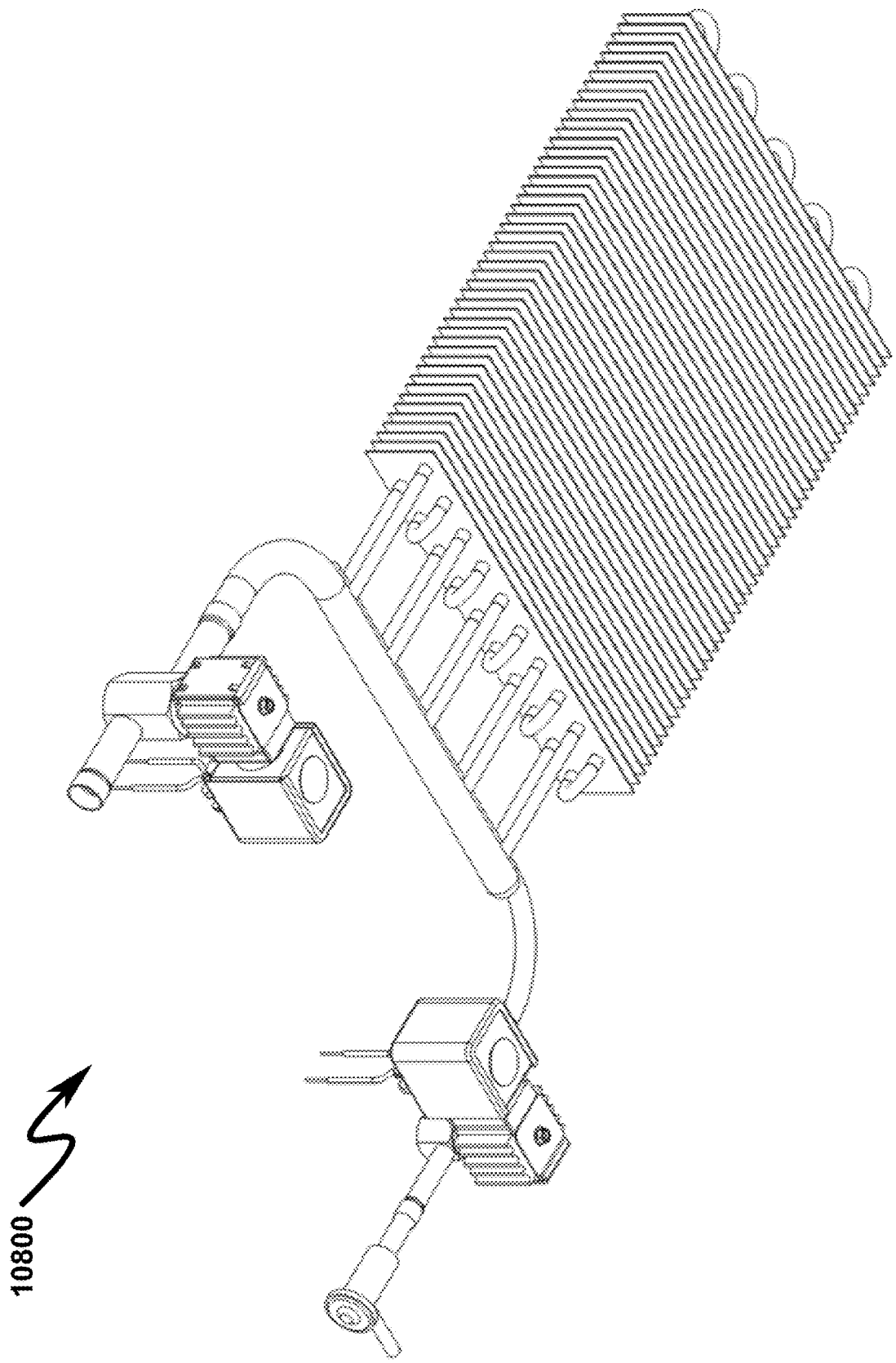
FIG. 108 illustrates a bottom right front perspective view of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 109:
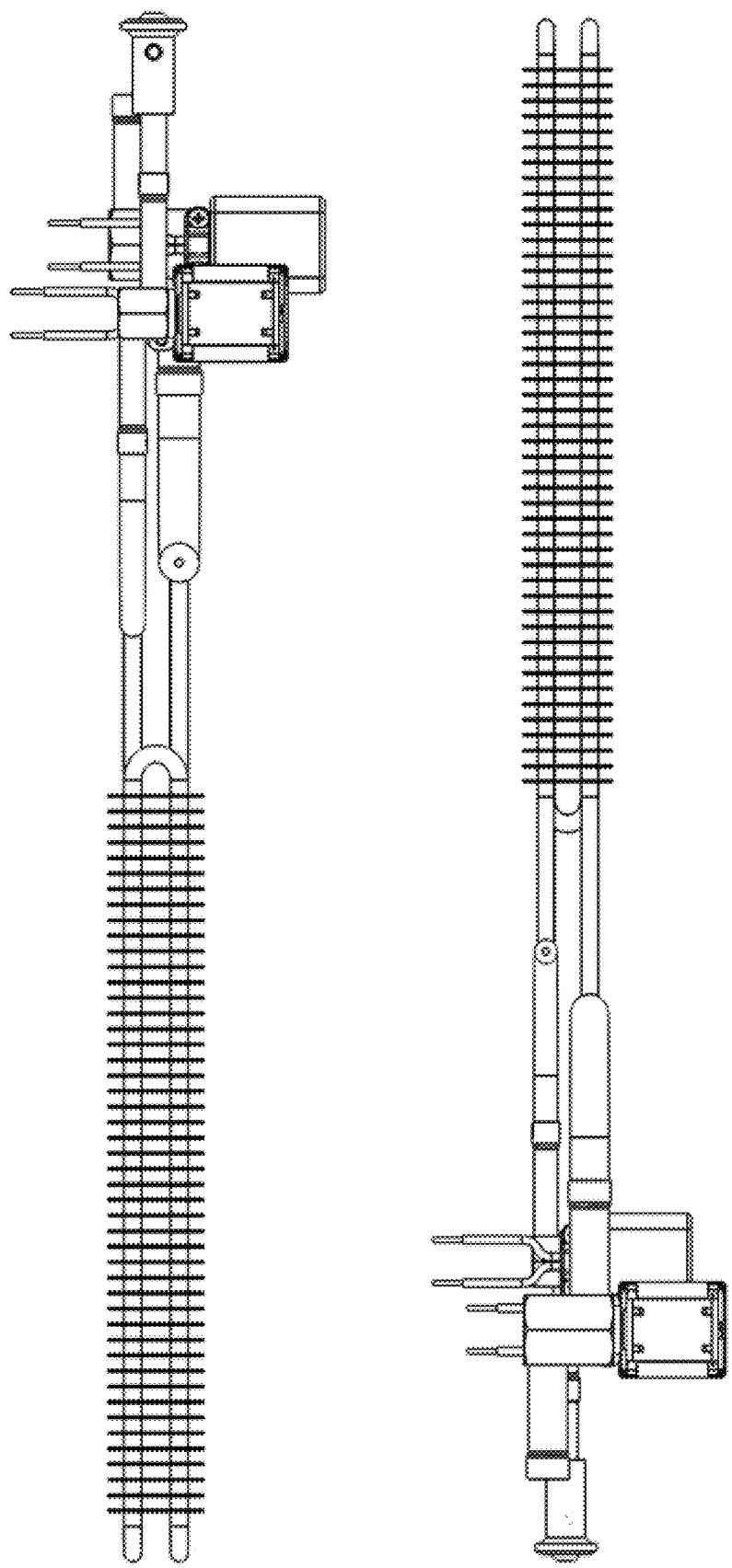
FIG. 109 illustrates left side and right side views of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 110:
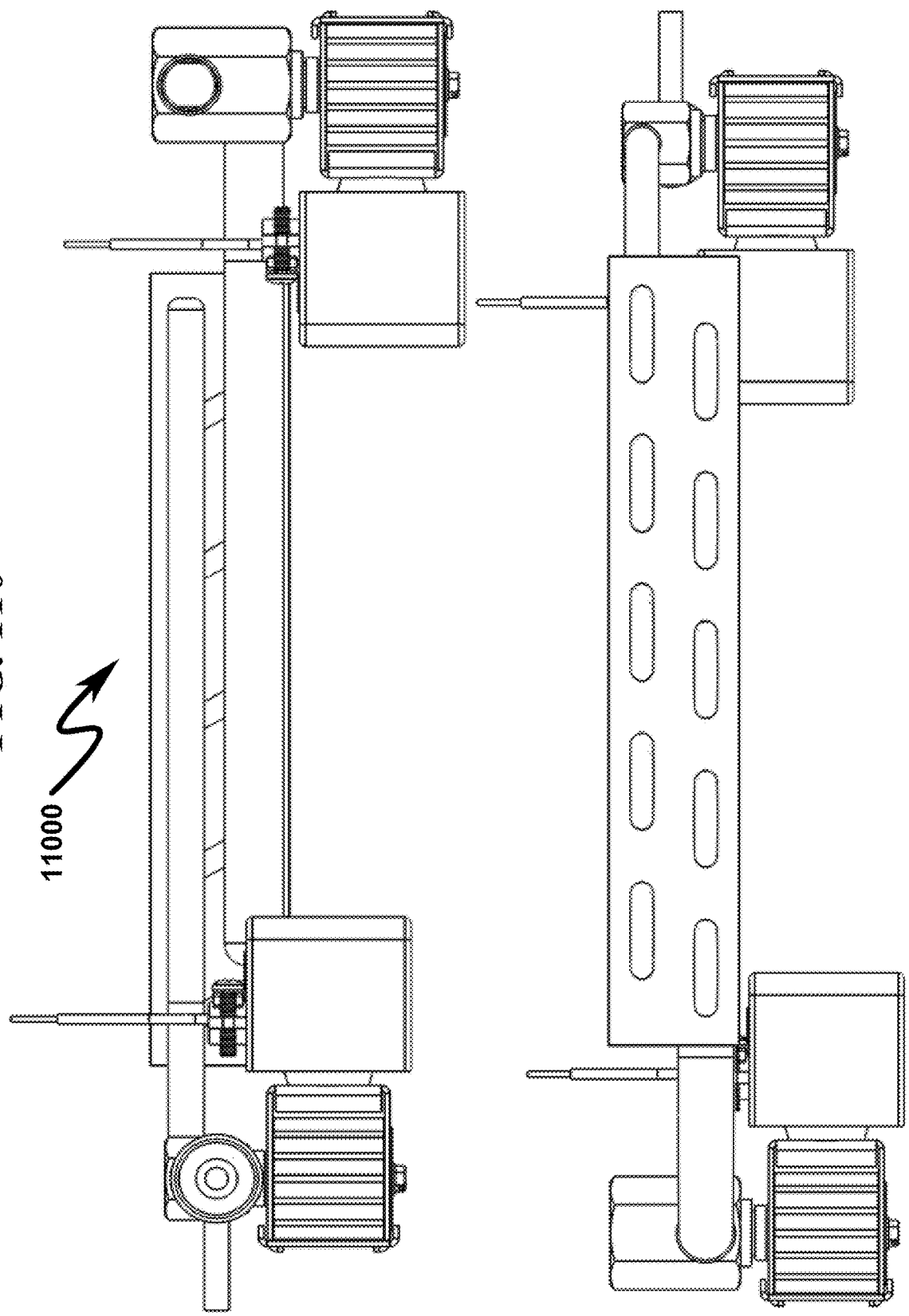
FIG. 110 illustrates front side and rear side views of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 111:
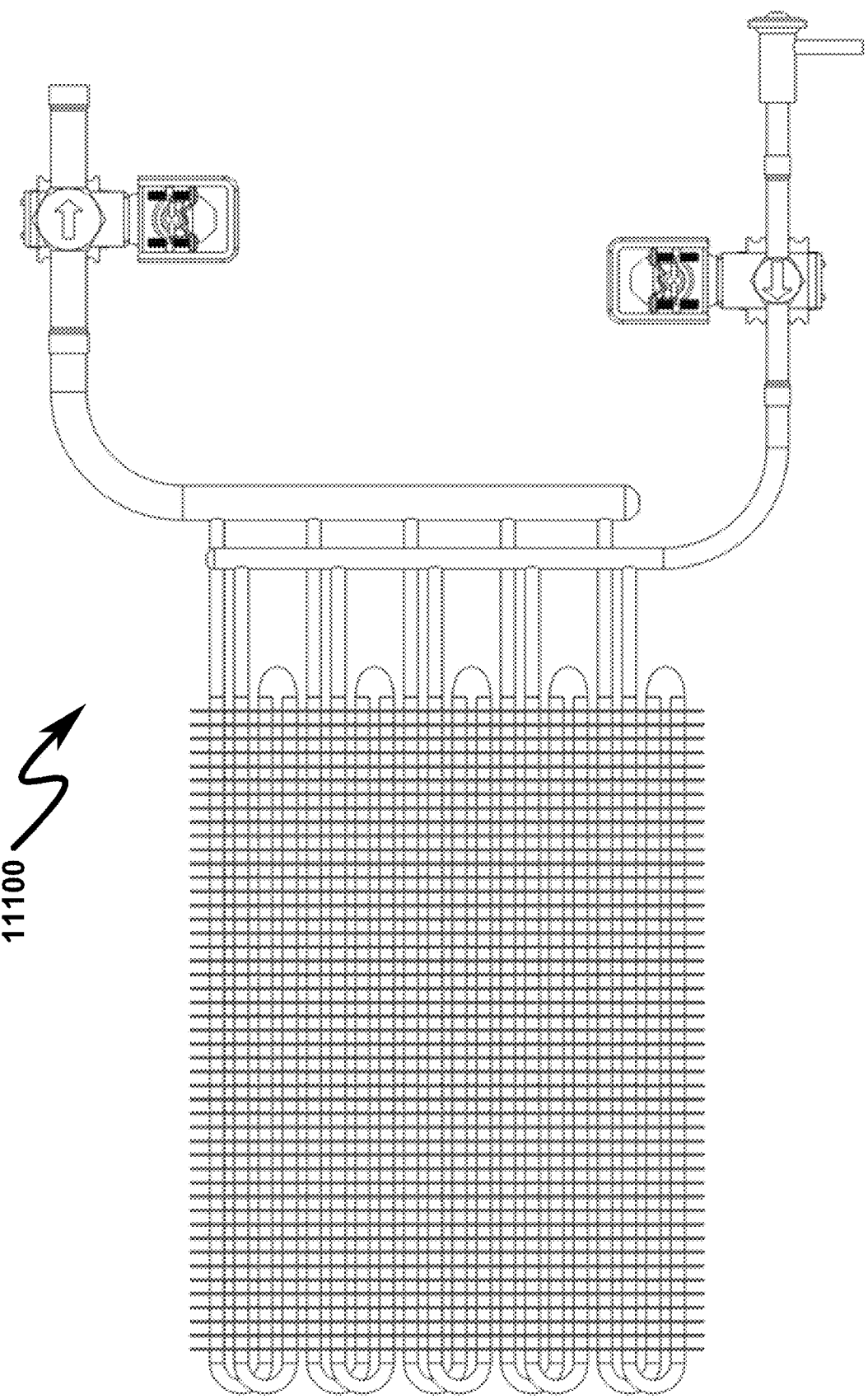
FIG. 111 illustrates a top view of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.
Figure 112:
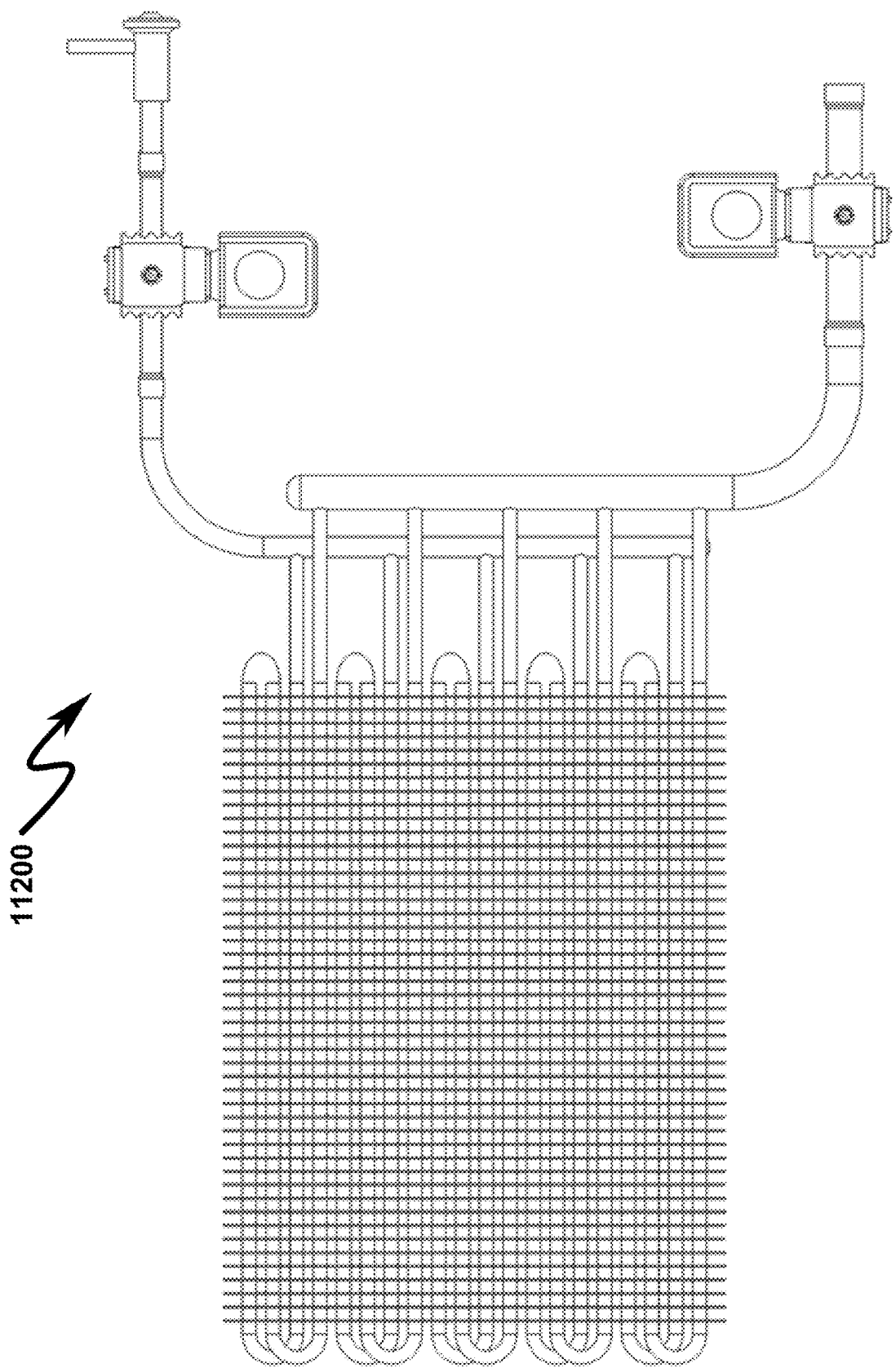
FIG. 112 illustrates a bottom view of a preferred exemplary embodiment of the present invention in which a refrigerant evaporator coil (REC) and linear expansion valve (LEV) configuration are augmented with two refrigerant control valves (RCV) to allow positive isolation of the REC in the event of a refrigerant leak.

As generally depicted in FIG. 105 (10500)-FIG. 112 (11200), the present invention may be applied to the prior art by augmenting the HVAC system depicted in FIG. 64 (6400)-FIG. 72 (7200) with two refrigerant control valves (RCV) such that the DCP acts to deactivate both RCVs when a refrigerant leak in the REC (10560) is detected. In this configuration deactivation of the RCVs allows servicing of the REC (10560) in isolation from the LEV.

REC Isolated with EEV+EIV (11300)-(12000)

Figure 113:
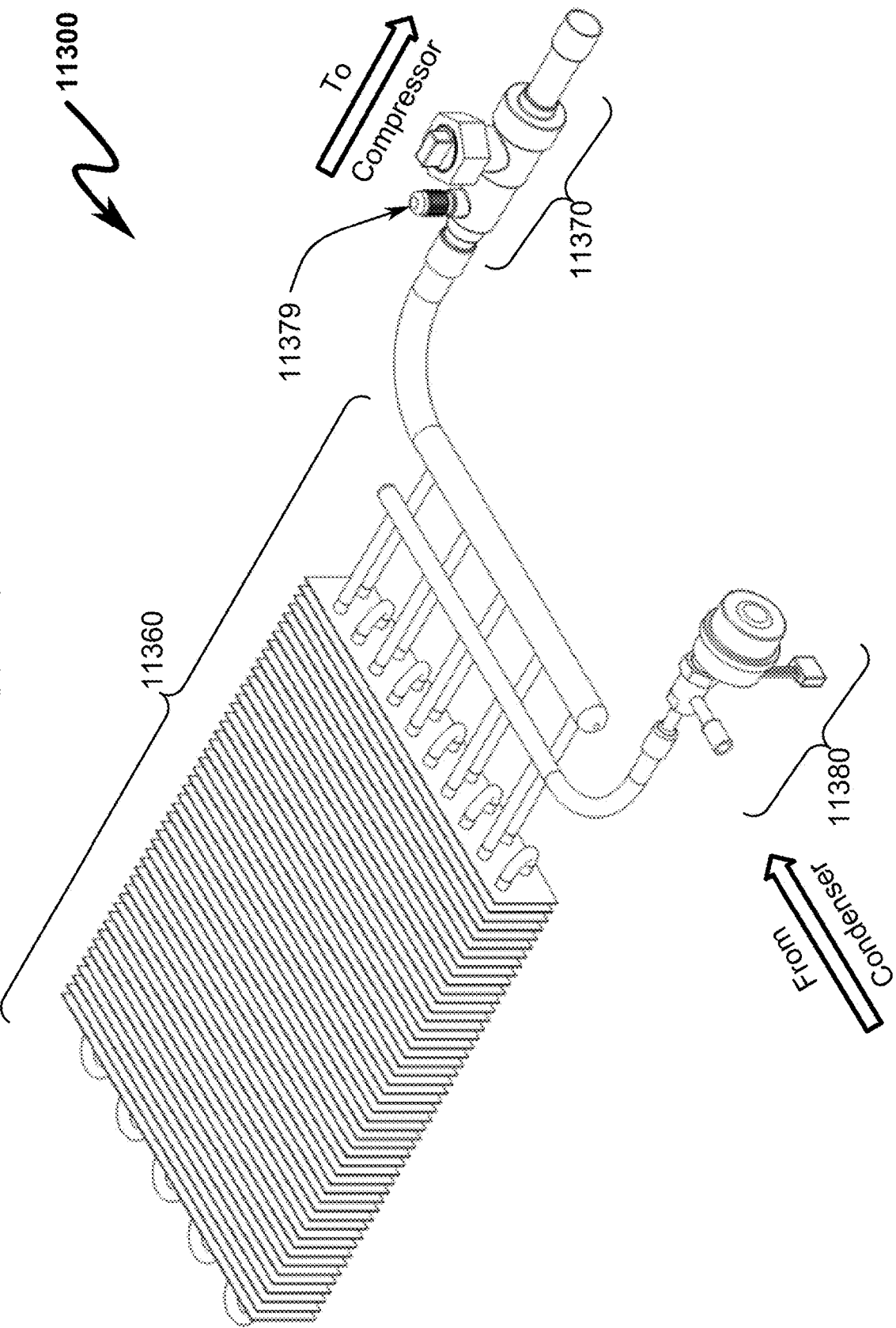
FIG. 113 illustrates a top left front perspective view of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak.
Figure 114:
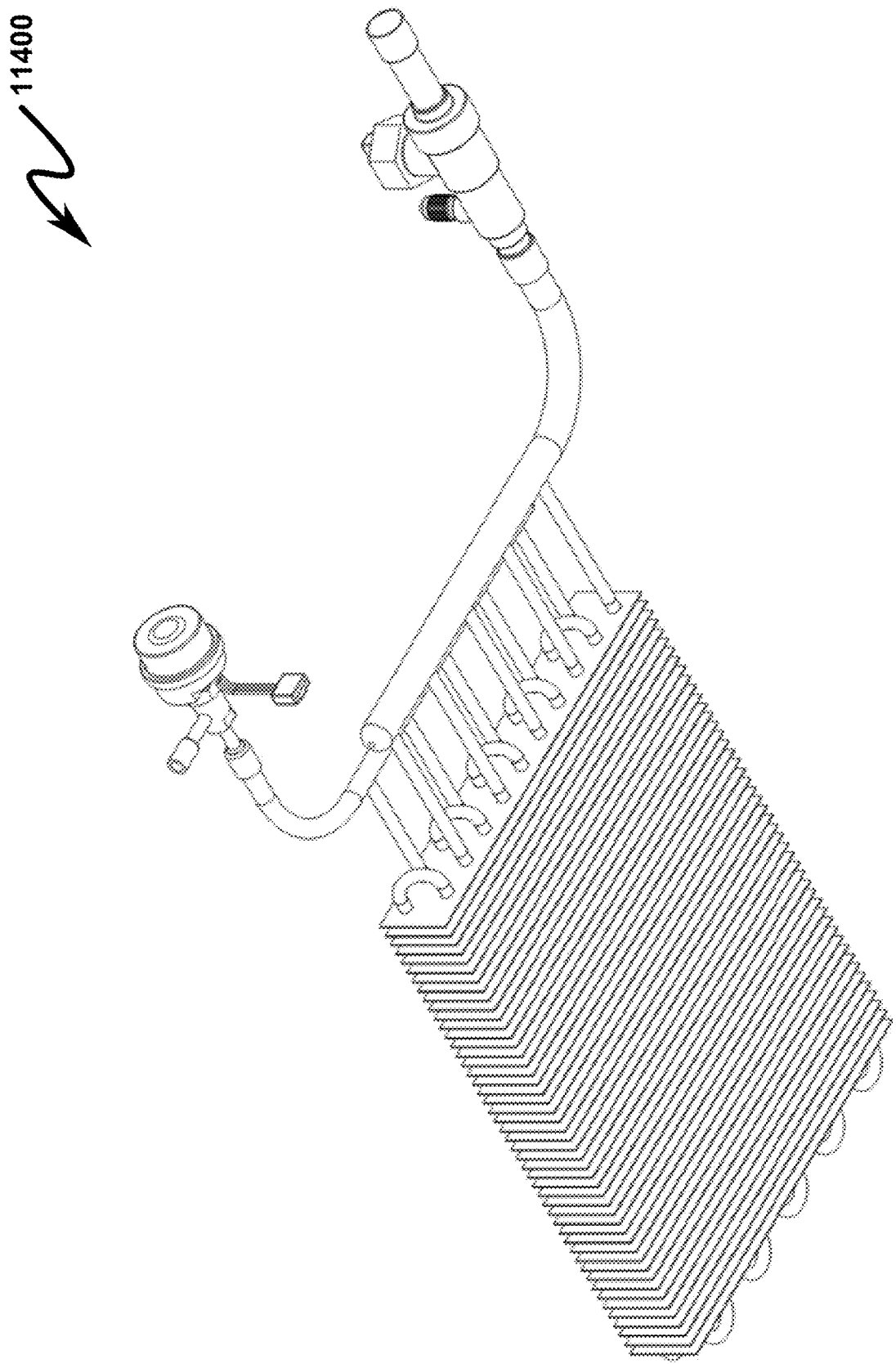
FIG. 114 illustrates a bottom left front perspective view of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak.
Figure 115:
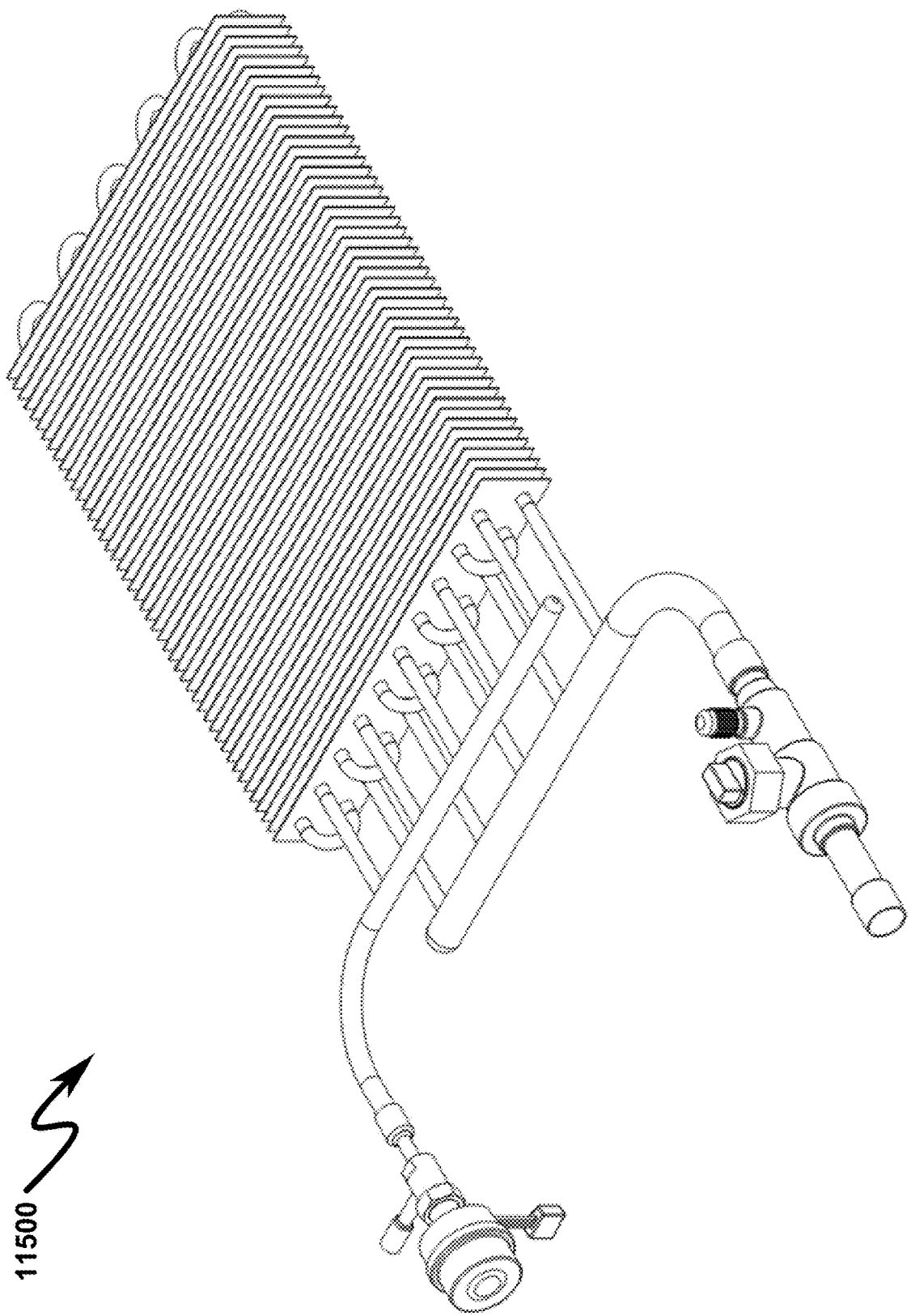
FIG. 115 illustrates a top right front perspective view of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak.
Figure 116:
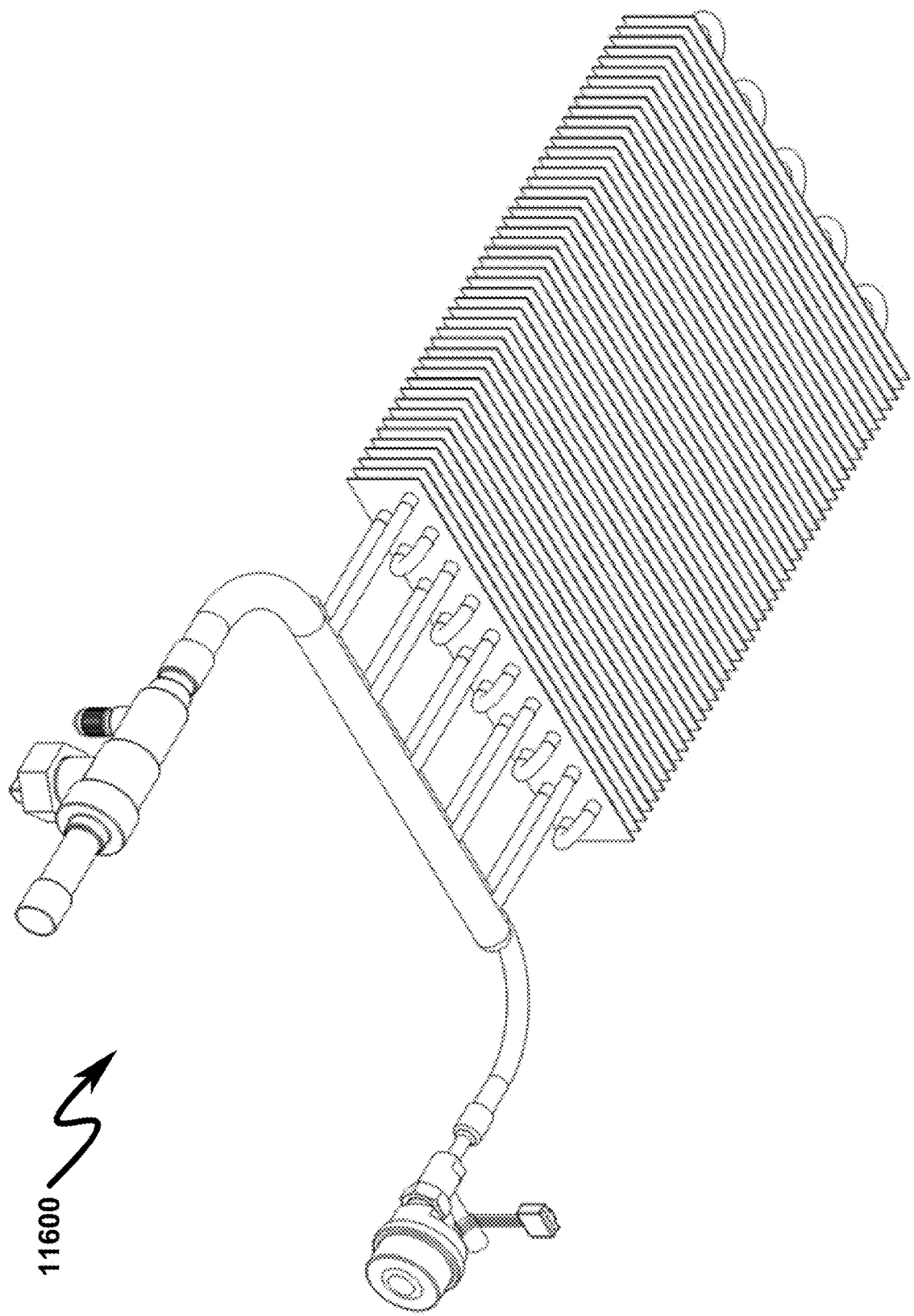
FIG. 116 illustrates a bottom right front perspective view of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak.
Figure 117:
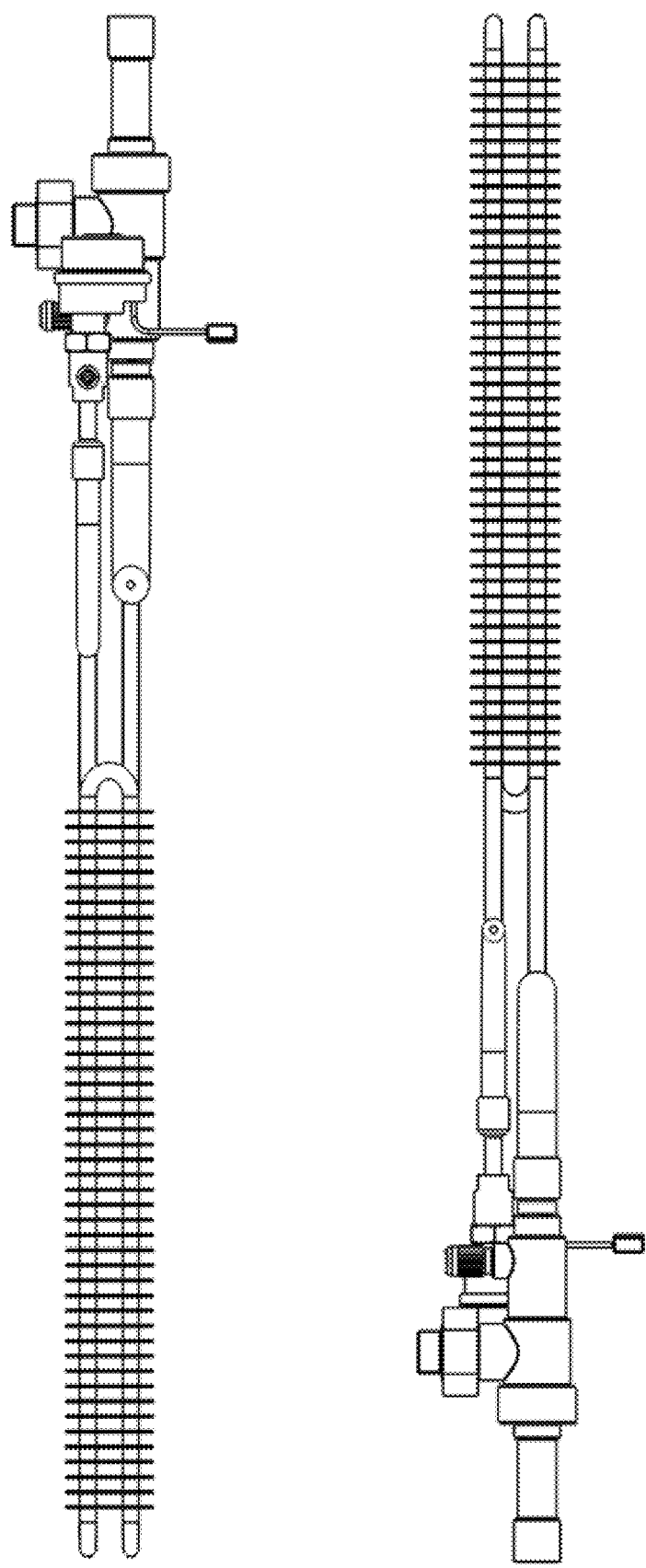
FIG. 117 illustrates left side and right side views of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak.
Figure 118:
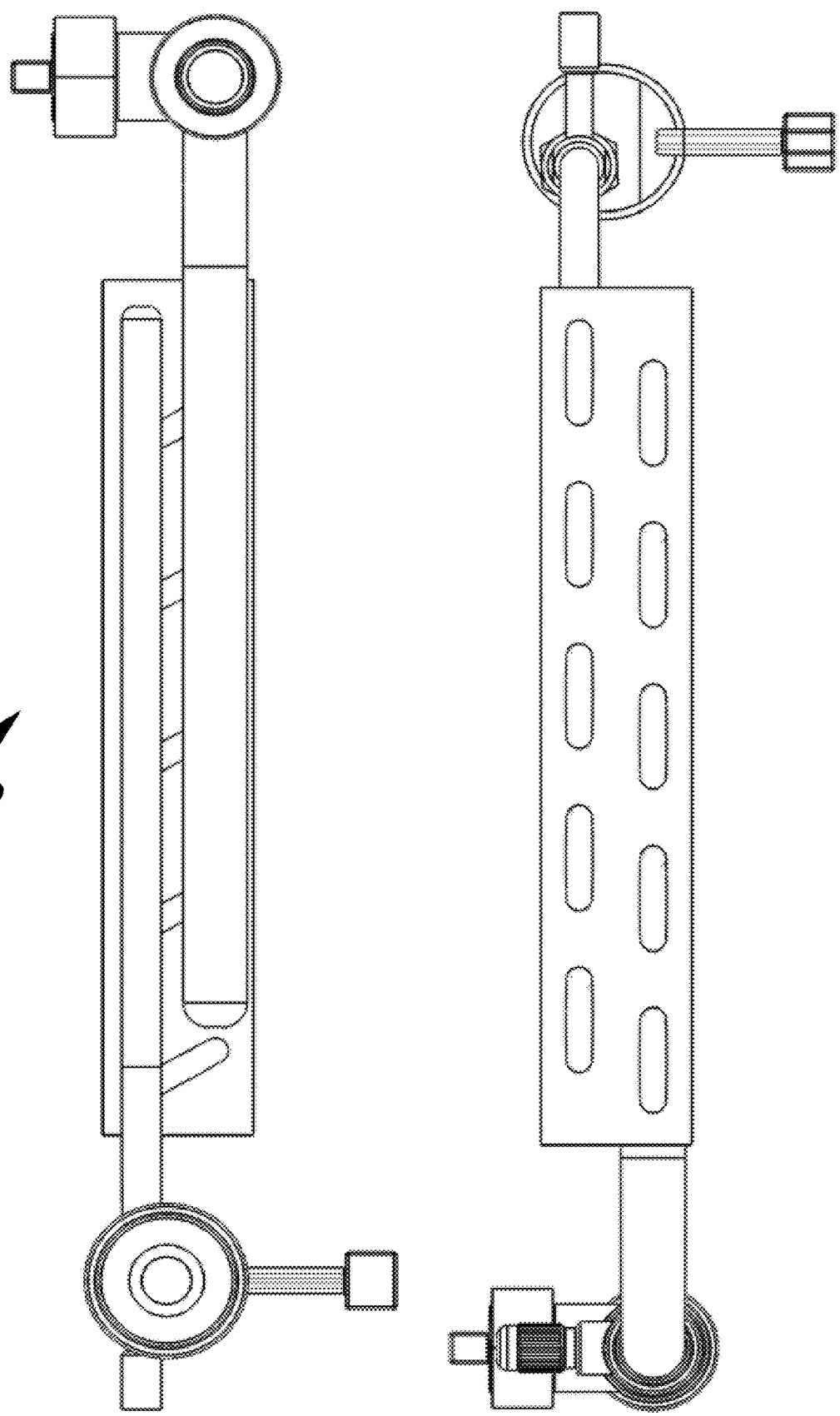
FIG. 118 illustrates front side and rear side views of a preferred exemplary embodiment of the present invention in which a refrigerant evaporator coil (REC) and electronic expansion valve (EEV) configuration are augmented with an evaporator isolation valve (EIV) at the output port of the REC to allow positive isolation of the REC in the event of a refrigerant leak.
Figure 119:
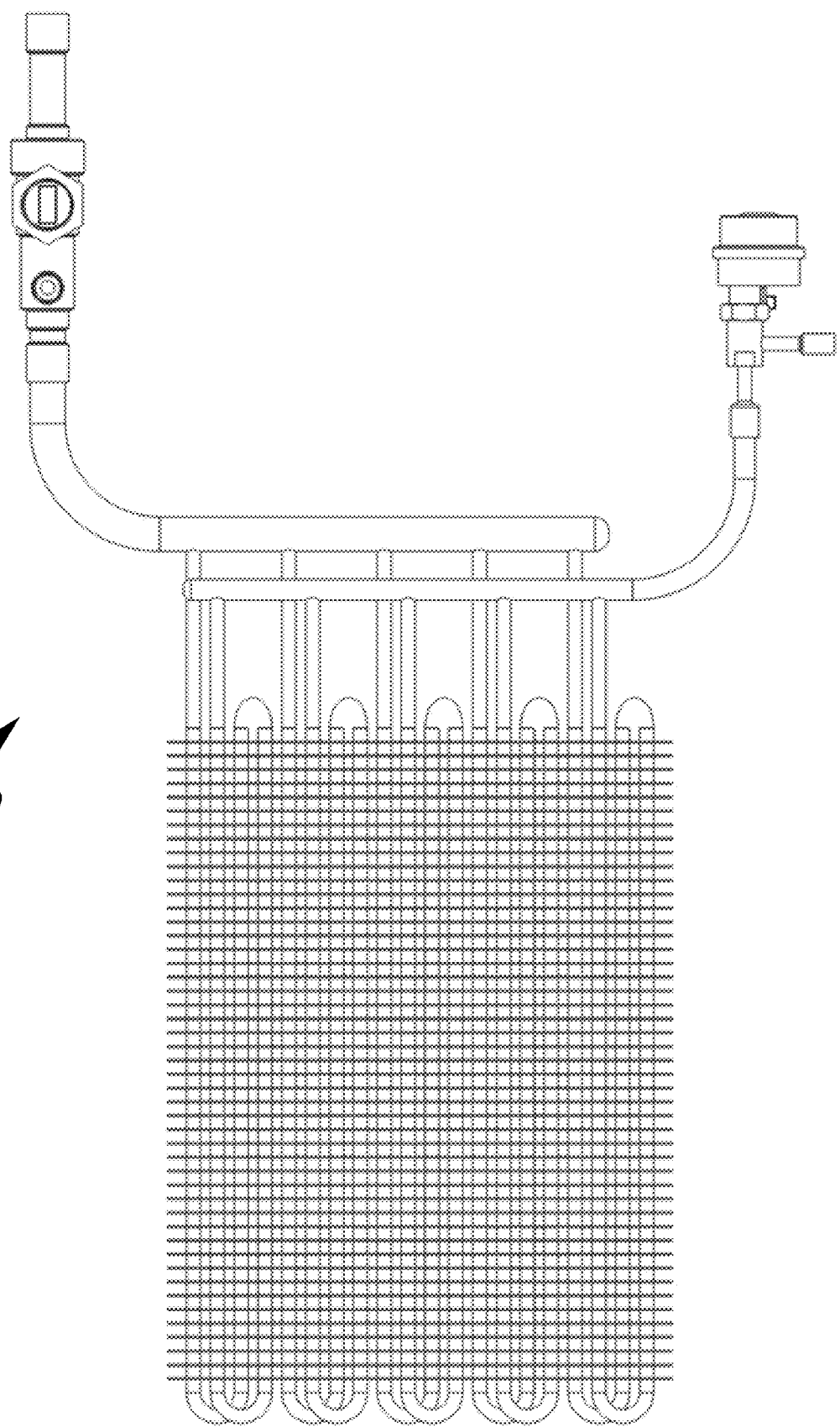
Figure 120:
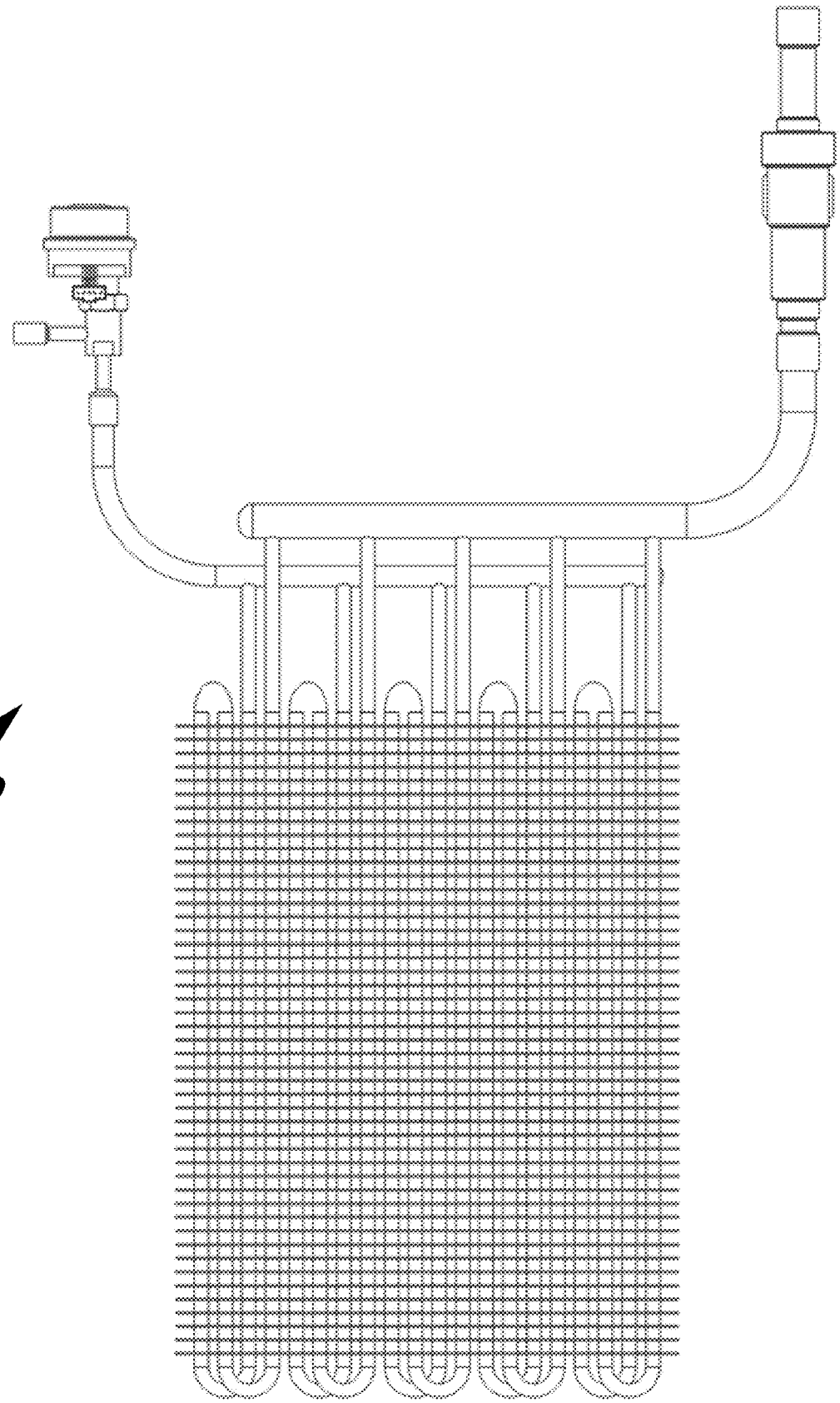

As generally depicted in FIG. 113 (11300)-FIG. 120 (12000), the present invention may be applied to the prior art by augmenting the HVAC system depicted in FIG. 64 (6400)-FIG. 72 (7200) with an evaporator isolation valve (EIV) (11370) such that the DCP acts to deactivate the EEV (11380) when a refrigerant leak in the REC (11360) is detected and alarm an operator/technician who then manually closes the EIV (11370) at the output port of the REC (11360). In this configuration deactivation of the EEV (11380) along with manual closing of the EIV (11370) allows servicing of the REC (11360) in isolation from the HVAC refrigerant loop. A Schrader port (11379) on the EIV allows evacuation of the REC (11360) after replacement/ repair and injection of new refrigerant in the HVAC refrigerant loop.

REC Isolated with FIV+RCV (12100)-(12800)

As generally depicted in FIG. 121 (12100)-FIG. 128 (12800), the present invention may be applied to the prior art by augmenting the HVAC system depicted in FIG. 64 (6400)-FIG. 72 (7200) with flow isolation valve (FIV) (12180) and refrigerant control valve (RCV) (12170) such that the DCP acts to deactivate the EEV (12150) and RCV (12170) when a refrigerant leak in the REC (12160) is detected and alarm an operator/technician who then may manually close the FIV (12180) at the input port of the EEV (12150). In this configuration deactivation of the EEV (12150) and RCV (12170) along with manual closing of the FIV (12180) allows servicing of the EEV (12150) and/or REC (12160) in isolation from the HVAC refrigerant loop. A Schrader port (12189) on the FIV (12180) allows evacuation of the REC (12160) after replacement/repair and injection of new refrigerant in the HVAC refrigerant loop.

Other Configurations Anticipated

The refrigerant isolation scenarios depicted in FIG. 65 (6500)-FIG. 128 (12800) are only exemplary of those anticipated by the present invention. One skilled in the art will recognize that combinations of these particular examples are possible and that these combinations are anticipated by the claimed invention.

RLD System Summary

The present invention system may be broadly generalized as a refrigerant leak detection (RLD) system comprising:
(a) refrigerant gas sensor (RGS);
(b) sensor signal conditioner (SSC);
(c) digital control processor (DCP); and
(d) alarm status indicator (ASI);
wherein:
the RGS detects ambient refrigerant gas (ARG);
the RGS indicates the ARG detection as a refrigerant sensor voltage (RSV);
the RSV is electrically coupled to the SSC;
the SSC is electrically coupled to the DCP;
the SSC and the DCP form a closed control loop (CCL);
the CCL operates such that the DCP dynamically adjusts electrical characteristics of the SSC based on the value of the RSV;
the CCL comprises a WARMUP STATE in which the RGS is heated until it stabilizes to a nominal fresh air resistance (FAR) value;
the CCL comprises a MONITOR STATE in which the SSC is adjusted such that the RSV is maintained within a lower threshold voltage (LTV) and an upper threshold voltage (UTV);
the CCL comprises a GAS DETECTION STATE in which a STEP COUNTER (SCT) is decremented if the RSV falls below the LTV and incremented if the RSV exceeds the UTV;
the CCL comprises an ALARM STATE that triggers a refrigerant leak alarm (RLA) if the SCT exceeds a selected threshold detection count (TDC); and
the DCP is configured to log alarms to the ASI if the RLA is triggered by the ALARM STATE.

This general system summary may be augmented by the various elements described herein to produce a wide variety of invention embodiments consistent with this overall design description.

RLM System Summary

The present invention system may be broadly generalized as a refrigerant leak mitigation (RLM) system comprising:
(a) refrigerant gas sensor (RGS);
(b) sensor signal conditioner (SSC);
(c) digital control processor (DCP);
(d) alarm status indicator (ASI);
(e) refrigerant flow valve (RFV); and
(f) evaporator isolation valve (EIV);
wherein:
the RFV and the EIV are positioned within refrigerant flow lines of a heating, ventilation, and air conditioning (HVAC) system and operate respectively to control refrigerant flow in and out of a refrigerant coil (RFC) in the HVAC system;
the RGS detects ambient refrigerant gas (ARG);
the RGS indicates the ARG detection as a refrigerant sensor voltage (RSV);
the RSV is electrically coupled to the SSC;
the SSC is electrically coupled to the DCP;
the SSC and the DCP form a closed control loop (CCL);
the CCL operates such that the DCP dynamically adjusts electrical characteristics of the SSC based on the value of the RSV;
the CCL comprises a WARMUP STATE in which the RGS is heated until it stabilizes to a nominal fresh air resistance (FAR) value;
the CCL comprises a MONITOR STATE in which the SSC is adjusted such that the RSV is maintained within a lower threshold voltage (LTV) and an upper threshold voltage (UTV);
the CCL comprises a GAS DETECTION STATE in which a STEP COUNTER (SCT) is decremented if the RSV falls below the LTV and incremented if the RSV exceeds the UTV;
the CCL comprises an ALARM STATE that triggers a refrigerant leak alarm (RLA) if the SCT exceeds a selected threshold detection count (TDC);
the DCP is configured to log alarms to the ASI if the RLA is triggered by the ALARM STATE; and
the DCP is configured to close the RFV and the EIV to isolate the RFC when the RLA is triggered by the ALARM STATE.

This general system summary may be augmented by the various elements described herein to produce a wide variety of invention embodiments consistent with this overall design description.

RLC System Summary

The present invention system in some embodiments may be broadly generalized as a refrigerant leak containment (RLC) system comprising:
(a) refrigerant source valve (RSV);
(b) refrigerant return valve (RRV);
(c) refrigerant gas sensor (RGS); and
(d) valve electrical solenoid (VES);
wherein:
the RSV is mechanically coupled between and controls refrigerant flow from a refrigerant source output (RSO) on a condenser heat exchanger (CEX) within an outside heat exchanger (OHE) and an evaporator expansion valve (EEV) within an inside heat exchanger (IHE);
the RRV is mechanically coupled between and controls refrigerant flow from a refrigerant return output (RRO) on an evaporator heat exchanger (EEX) within the IHE and a refrigerant return input (RRI) on a condenser refrigerant compressor (CRC) within the OHE;

the RGS is positioned proximal to the EEX;

the RGS is electrically coupled to the VES;

the VES is activated upon detection of the presence of refrigerant by the RGS; and the VES is mechanically coupled to the RRV and the RSV such that activation of the VES closes the RRV and the RSV.

This general system summary may be augmented by the various elements described herein to produce a wide variety of invention embodiments consistent with this overall design description.

RLD Method Summary

A present invention refrigerant leak detection (RLD) method may be broadly generalized as a method comprising:

(1) with a digital control processor (DCP) and a sensor signal conditioner (SSC), calibrating a refrigerant gas sensor (RGS) (0902);

(2) with the DCP and the SSC, initializing a Vref sensor threshold voltage (STV) for the RGS (0903);

(3) with the DCP, initializing a LEVEL COUNTER to 0 (0904);

(4) with the DCP and the SSC, monitoring a refrigerant sensor voltage (RSV) from the RGS (0905);

(5) with the DCP and the SSC, determining if the RGS RSV is less than the Vref STV, and if so, proceeding to step (1) (0906);

(6) with the DCP and the SSC, determining if the RGS RSV is greater than the Vref STV, and if not, proceeding to step (1) (0907);

(7) with the DCP and the SSC, increasing the Vref STV (1008);

(8) with the DCP, increasing the LEVEL COUNTER (1009);

(9) with the DCP, determining if the LEVEL COUNTER is greater than an ALARM TRIP value, and if so, proceeding to step (14) (1010);

(10) with the DCP and the SSC, determining if the RGS RSV is less than the Vref STV, and if not, proceeding to step (7) (1011);

(11) with the DCP and the SSC, reducing the Vref STV (1012);

(12) with the DCP, decrementing the LEVEL COUNTER (1013);

(13) with the DCP, determining if the LEVEL COUNTER is 0, and if not, proceeding to step (11), otherwise proceeding to step (1) (1014);

(14) with the DCP, activating audible/visual alarms and proceeding to step (14) (1016).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

RLM Method Summary

A present invention refrigerant leak mitigation (RLM) method may be broadly generalized as a method comprising:

(1) with a digital control processor (DCP), enabling refrigerant flow and compressor operation in a HVAC system (0901);

(2) with the DCP and a sensor signal conditioner (SSC), calibrating a refrigerant gas sensor (RGS) (0902);

(3) with the DCP and the SSC, initializing a Vref sensor threshold voltage (STV) for the RGS (0903);

(4) with the DCP, initializing a LEVEL COUNTER to 0 (0904);

(5) with the DCP and the SSC, monitoring a refrigerant sensor voltage (RSV) from the RGS (0905);

(6) with the DCP and the SSC, determining if the RGS RSV is less than the Vref STV, and if so, proceeding to step (2) (0906);

(7) with the DCP and the SSC, determining if the RGS RSV is greater than the Vref STV, and if not, proceeding to step (2) (0907);

(8) with the DCP and the SSC, increasing the Vref STV (1008);

(9) with the DCP, increasing the LEVEL COUNTER (1009);

(10) with the DCP, determining if the LEVEL COUNTER is greater than an ALARM TRIP value, and if so, proceeding to step (15) (1010);

(11) with the DCP and the SSC, determining if the RGS RSV is less than the Vref STV, and if not, proceeding to step (8) (1011);

(12) with the DCP and the SSC, reducing the Vref STV (1012);

(13) with the DCP, decrementing the LEVEL COUNTER (1013);

(14) with the DCP, determining if the LEVEL COUNTER is 0, and if not, proceeding to step (11), otherwise proceeding to step (1) (1014);

(15) with the DCP, disabling refrigerant flow and/or compressor operation in the HVAC system (1015);

(16) with the DCP, activating audible/visual alarms and proceeding to step (15) (1016).

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

RLC Method Summary

The present invention method in some embodiments may be broadly generalized as a refrigerant leak containment (RLC) method comprising:

(1) inserting and mechanically coupling a refrigerant source valve (RSV) between a refrigerant source output (RSO) on a condenser heat exchanger (CEX) within an outside heat exchanger (OHE) and an evaporator expansion valve (EEV) within an inside heat exchanger (IHE);

(2) inserting and mechanically coupling a refrigerant return valve (RRV) between a refrigerant return output (RRO) on an evaporator heat exchanger (EEX) within the IHE and a refrigerant return input (RRI) on a condenser refrigerant compressor (CRC) within the OHE;

(3) placing a refrigerant gas sensor (RGS) proximal to the EEX;

(4) electrically coupling the RGS to a valve electrical solenoid (VES);

(5) mechanically coupling the VES to the RRV and the RSV such that activation of the VES closes the RRV and the RSV; and (6) activating the VES upon detection of the presence of refrigerant by the RGS.

This general method may be modified heavily depending on a number of factors, with rearrangement and/or addition/deletion of steps anticipated by the scope of the present invention. Integration of this and other preferred exemplary embodiment methods in conjunction with a variety of preferred exemplary embodiment systems described herein is anticipated by the overall scope of the present invention.

System/Method Variations

The present invention anticipates a wide variety of variations in the basic theme of construction. The examples presented previously do not represent the entire scope of possible usages. They are meant to cite a few of the almost limitless possibilities.

This basic system, method, and product-by-process may be augmented with a variety of ancillary embodiments, including but not limited to:
- An embodiment wherein the SSC comprises a sensor digital potentiometer (SDP), a sensor digital rheostat (SDR), and a sensor analog amplifier (SAA).
- An embodiment wherein the DCP comprises an internal analog comparator (IAC) having a negative input electrically coupled to a wiper of the SDP and a positive input electrically coupled to an output of the SAA.
- An embodiment wherein the ASI comprises a light emitting diode (LED) that is activated with a duty cycle or frequency based on an operational state of the CCL.
- An embodiment wherein the ASI comprises an audible alarm that is activated with a duty cycle or audible frequency based on an operational state of the CCL.
- An embodiment wherein the ASI comprises an alarm indicator selected from a group consisting of: visual alarm indicator; digital SCT display; and audible alarm indicator.
- An embodiment further comprising an air intake fan (AIF) positioned to force ambient air toward the RGS.
- An embodiment wherein the DCP controls an air intake fan (AIF) that is positioned to force ambient air toward the RGS.
- An embodiment wherein the CCL incorporates time delays to account for dynamic response characteristics in the RGS.
- An embodiment further comprising a temperature/humidity sensor (THS) electrically coupled to the DCP.
- An embodiment wherein the DCP further comprises a sensor record memory (SRM) that logs the time and SCT associated with the RLA.
- An embodiment wherein the DCP is configured to transmit an indication of the RLA via a wireless communication interface (WCI) to a mobile user device (MUD).
- An embodiment wherein the RFV comprises an electronic expansion valve (EEV).
- An embodiment wherein the DCP is configured to deactivate an electrical component within the HVAC system when the RLA is triggered by the ALARM STATE, the electrical component selected from a group consisting of: contactor; solenoid; refrigerant valve; and electronic expansion valve (EEV).
- An embodiment wherein the DCP is configured to activate an electrical component within the HVAC system when the RLA is triggered by the ALARM STATE, the electrical component selected from a group consisting of: contactor; solenoid; refrigerant valve; and electronic expansion valve (EEV).
- An embodiment wherein the DCP is configured to change the state of an electrical component within the HVAC system when the RLA is triggered by the ALARM STATE, the electrical component selected from a group consisting of: contactor; solenoid; refrigerant valve; and electronic expansion valve (EEV).
- An embodiment wherein the DCP is configured to deactivate a refrigerant compressor (RFC) within the HVAC system when the RLA is triggered by the ALARM STATE.
- An embodiment wherein the DCP is configured to change the state of an electrical component within the HVAC system when a command is received from a mobile user device (MUD) via a wireless communication interface (WCI), the electrical component selected from a group consisting of: contactor; solenoid; refrigerant valve; and electronic expansion valve (EEV).
- An embodiment wherein the activation of the VES simultaneously illuminates a visual light source indicator.
- An embodiment wherein the activation of the VES simultaneously displays a mechanical fault indicator.
- An embodiment wherein the activation of the VES simultaneously activates an audible alarm.
- An embodiment wherein the activation of the VES simultaneously transmits a wireless communication indicating a refrigerant leak fault.
- An embodiment wherein the activation of the VES simultaneously opens an electrical switch controlling electrical power to the OHE.
- An embodiment wherein the VES incorporates a mechanical latch such that any activation of the VES mechanically closes the RRV and the RSV until the VES is manually reset.
- An embodiment wherein the VES, the RRV, and the RSV are contained in a single unitary structure.
- An embodiment wherein the RRV and the RSV have pipe fitting connections configured to mate with refrigerant connections corresponding to the RSO and the RRI on the OHE.
- An embodiment wherein the VES, the RRV, and the RSV are contained in a single unitary structure having pipe fitting connections configured to mate with refrigerant connections corresponding to the RSO and the RRI on the OHE.

One skilled in the art will recognize that other embodiments are possible based on combinations of elements taught within the above invention description.

CONCLUSION

A refrigerant leak detection and mitigation system/method for use in heating, ventilation, and air conditioning (HVAC) systems that incorporates a refrigerant gas sensor (RGS), sensor signal conditioner (SSC), alarm status indicator (ASI), and digital control processor (DCP) has been disclosed. The RGS detects ambient refrigerant gas (ARG) and indicates this as a refrigerant sensor voltage (RSV) to the SSC. The DCP and SSC form a closed control loop (CCL) in which the SSC electrical characteristics are adjusted by the DCP such that the RSV is continuously and dynamically recalibrated to account for background refrigerant gas levels, changes in ambient air conditions, RGS manufacturing tolerances, and other field-specific operational conditions that impact the RGS detection capabilities. The DCP is configured to log alarms to the ASI if a RGS refrigerant leak is detected and optionally shutdown one or more HVAC system components such as a specific air handler leaking refrigerant.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A refrigerant leak detection (RLD) system comprising:
(a) refrigerant gas sensor (RGS);
(b) sensor signal conditioner (SSC);
(c) digital control processor (DCP); and
(d) alarm status indicator (ASI);
wherein:
said RGS detects ambient refrigerant gas (ARG);
said RGS indicates said ARG detection as a refrigerant sensor voltage (RSV);
said RSV is electrically coupled to said SSC;
said SSC is electrically coupled to said DCP;
said SSC and said DCP form a closed control loop (CCL);
said CCL operates such that said DCP dynamically adjusts electrical characteristics of said SSC based on the value of said RSV;
said CCL comprises a WARMUP STATE in which said RGS is heated until it stabilizes to a nominal fresh air resistance (FAR) value;
said CCL comprises a MONITOR STATE in which said SSC is adjusted such that said RSV is maintained within a lower threshold voltage (LTV) and an upper threshold voltage (UTV);
said CCL comprises a GAS DETECTION STATE in which a STEP COUNTER (SCT) is iteratively decremented if said RSV falls below said LTV and iteratively incremented if said RSV exceeds said UTV;
said GAS DETECTION STATE is iteratively executed with a variable sample time between readings of said RSV from said RGS;
said CCL comprises an ALARM STATE that triggers a refrigerant leak alarm (RLA) if said SCT exceeds a selected threshold detection count (TDC); and
said DCP is configured to log alarms to said ASI if said RLA is triggered by said ALARM STATE.

2. The refrigerant leak detection (RLD) system of claim 1 wherein said SSC comprises a sensor digital potentiometer (SDP), a sensor digital rheostat (SDR), and a sensor analog amplifier (SAA).

3. The refrigerant leak detection (RLD) system of 2 wherein said DCP comprises an internal analog comparator (IAC) having a negative input electrically coupled to a wiper of said SDP and a positive input electrically coupled to an output of said SAA.

4. The refrigerant leak detection (RLD) system of claim 1 wherein said ASI comprises a light emitting diode (LED) that is activated with a duty cycle or frequency based on an operational state of said CCL.

5. The refrigerant leak detection (RLD) system of claim 1 wherein said ASI comprises an audible alarm that is activated with a duty cycle or audible frequency based on an operational state of said CCL.

6. The refrigerant leak detection (RLD) system of claim 1 wherein said ASI comprises an alarm indicator selected from a group consisting of: visual alarm indicator; digital SCT display; and audible alarm indicator.

7. The refrigerant leak detection (RLD) system of claim 1 further comprising an air intake fan (AIF) positioned to force ambient air toward said RGS.

8. The refrigerant leak detection (RLD) system of claim 1 wherein said DCP controls an air intake fan (AIF) that is positioned to force ambient air toward said RGS.

9. The refrigerant leak detection (RLD) system of claim 1 wherein said CCL incorporates time delays to account for dynamic response characteristics in said RGS.

10. The refrigerant leak detection (RLD) system of claim 1 further comprising a temperature and/or humidity sensor (THS) electrically coupled to said DCP.

11. The refrigerant leak detection (RLD) system of claim 1 wherein said DCP further comprises a sensor record memory (SRM) that logs the time and SCT associated with said RLA.

12. The refrigerant leak detection (RLD) system of claim 1 wherein said DCP is configured to transmit an indication of said RLA via a wireless communication interface (WCI) to a mobile user device (MUD).

13. A refrigerant leak mitigation (RLM) system comprising:
  (a) refrigerant gas sensor (RGS);
  (b) sensor signal conditioner (SSC);
  (c) digital control processor (DCP);
  (d) alarm status indicator (ASI);
  (e) refrigerant flow valve (RFV); and
  (f) evaporator isolation valve (EIV);
  wherein:
  said RFV and said EIV are positioned within refrigerant flow lines of a heating, ventilation, and air conditioning (HVAC) system and operate respectively to control refrigerant flow in and out of a refrigerant coil (RFC) in said HVAC system;
  said RGS detects ambient refrigerant gas (ARG);
  said RGS indicates said ARG detection as a refrigerant sensor voltage (RSV);
  said RSV is electrically coupled to said SSC;
  said SSC is electrically coupled to said DCP;
  said SSC and said DCP form a closed control loop (CCL);
  said CCL operates such that said DCP dynamically adjusts electrical characteristics of said SSC based on the value of said RSV;
  said CCL comprises a WARMUP STATE in which said RGS is heated until it stabilizes to a nominal fresh air resistance (FAR) value;
  said CCL comprises a MONITOR STATE in which said SSC is adjusted such that said RSV is maintained within a lower threshold voltage (LTV) and an upper threshold voltage (UTV);
  said CCL comprises a GAS DETECTION STATE in which a STEP COUNTER (SCT) is decremented if said RSV falls below said LTV and incremented if said RSV exceeds said UTV;
  said GAS DETECTION STATE is iteratively executed with a variable sample time between readings of said RSV from said RGS;
  said CCL comprises an ALARM STATE that triggers a refrigerant leak alarm (RLA) if said SCT exceeds a selected threshold detection count (TDC);
  said DCP is configured to log alarms to said ASI if said RLA is triggered by said ALARM STATE; and
  said DCP is configured to close said RFV and said EIV to isolate said RFC when said RLA is triggered by said ALARM STATE.

14. The refrigerant leak mitigation (RLM) system of claim 13 wherein said SSC comprises a sensor digital potentiometer (SDP), a sensor digital rheostat (SDR), and a sensor analog amplifier (SAA).

15. The refrigerant leak mitigation (RLM) system of claim 14 wherein said DCP comprises an internal analog comparator (IAC) having a negative input electrically coupled to a wiper of said SDP and a positive input electrically coupled to an output of said SAA.

16. The refrigerant leak mitigation (RLM) system of claim 13 wherein said ASI comprises a light emitting diode (LED) that is activated with a duty cycle or frequency based on an operational state of said CCL.

17. The refrigerant leak mitigation (RLM) system of claim 13 wherein said ASI comprises an audible alarm that is activated with a duty cycle or audible frequency based on an operational state of said CCL.

18. The refrigerant leak mitigation (RLM) system of claim 13 wherein said ASI comprises an alarm indicator selected from a group consisting of: visual alarm indicator; digital SCT display; and audible alarm indicator.

19. The refrigerant leak mitigation (RLM) system of claim 13 further comprising an air intake fan (AIF) positioned to force ambient air toward said RGS.

20. The refrigerant leak mitigation (RLM) system of claim 13 wherein said DCP controls an air intake fan (AIF) that is positioned to force ambient air toward said RGS.

21. The refrigerant leak mitigation (RLM) system of claim 13 wherein said CCL incorporates time delays to account for dynamic response characteristics in said RGS.

22. The refrigerant leak mitigation (RLM) system of claim 13 further comprising a temperature and/or humidity sensor (THS) electrically coupled to said DCP.

23. The refrigerant leak mitigation (RLM) system of claim 13 wherein said DCP further comprises a sensor record memory (SRM) that logs the time and SCT associated with said RLA.

24. The refrigerant leak mitigation (RLM) system of claim 13 wherein said DCP is configured to transmit an indication of said RLA via a wireless communication interface (WCI) to a mobile user device (MUD).

25. The refrigerant leak mitigation (RLM) system of claim 13 wherein said RFV comprises an electronic expansion valve (EEV).

26. The refrigerant leak mitigation (RLM) system of claim 13 wherein said DCP is configured to deactivate an electrical component within said HVAC system when said RLA is triggered by said ALARM STATE, said electrical component selected from a group consisting of: a contactor; a solenoid; a refrigerant valve; and an electronic expansion valve (EEV).

27. The refrigerant leak mitigation (RLM) system of claim 13 wherein said DCP is configured to activate an electrical component within said HVAC system when said RLA is triggered by said ALARM STATE, said electrical component selected from a group consisting of: a contactor; a solenoid; a refrigerant valve; and an electronic expansion valve (EEV).

28. The refrigerant leak mitigation (RLM) system of claim 13 wherein said DCP is configured to change the state of an electrical component within said HVAC system when said RLA is triggered by said ALARM STATE, said electrical component selected from a group consisting of: a contactor; a solenoid; a refrigerant valve; and an electronic expansion valve (EEV).

29. The refrigerant leak mitigation (RLM) system of claim 13 wherein said DCP is configured to deactivate a refrigerant compressor (RFC) within said HVAC system when said RLA is triggered by said ALARM STATE.

30. The refrigerant leak mitigation (RLM) system of claim 13 wherein said DCP is configured to change the state of an electrical component within said HVAC system when a command is received from a mobile user device (MUD) via a wireless communication interface (WCI), said electrical component selected from a group consisting of: a contactor; a solenoid; a refrigerant valve; and an electronic expansion valve (EEV).

31. A refrigerant leak detection (RLD) method comprising:
- (1) with a digital control processor (DCP) and a sensor signal conditioner (SSC), calibrating a refrigerant gas sensor (RGS) (0902);
- (2) with said DCP and said SSC, initializing a sensor threshold voltage (STV) for said RGS (0903);
- (3) with said DCP, initializing a LEVEL COUNTER to 0 (0904);
- (4) with said DCP and said SSC, monitoring a refrigerant sensor voltage (RSV) from said RGS (0905);
- (5) with said DCP and said SSC, determining if said RSV from said RGS is less than said STV, and if so, proceeding to step (1) (0906);
- (6) with said DCP and said SSC, determining if said RSV from said RGS is greater than said STV, and if not, proceeding to step (1) (0907);
- (7) with said DCP and said SSC, increasing said STV (1008);
- (8) with said DCP, increasing said LEVEL COUNTER (1009);
- (9) with said DCP, determining if said LEVEL COUNTER is greater than an ALARM TRIP value, and if so, proceeding to step (14) (1010);
- (10) with said DCP and said SSC, determining if said RSV from said RGS is less than said STV, and if not, proceeding to step (7) (1011);
- (11) with said DCP and said SSC, reducing said STV (1012);
- (12) with said DCP, decrementing said LEVEL COUNTER (1013);
- (13) with said DCP, determining if said LEVEL COUNTER is 0, and if not, proceeding to step (11), otherwise proceeding to step (1) (1014);
- (14) with said DCP, activating audible and/or visual alarms and proceeding to step (14) (1016).

32. A refrigerant leak mitigation (RLM) method comprising:
- (1) with a digital control processor (DCP), enabling refrigerant flow and compressor operation in a HVAC system (0901);
- (2) with said DCP and a sensor signal conditioner (SSC), calibrating a refrigerant gas sensor (RGS) (0902);
- (3) with said DCP and said SSC, initializing a sensor threshold voltage (STV) for said RGS (0903);
- (4) with said DCP, initializing a LEVEL COUNTER to 0 (0904);
- (5) with said DCP and said SSC, monitoring a refrigerant sensor voltage (RSV) from said RGS (0905);
- (6) with said DCP and said SSC, determining if said RSV from said RGS is less than said STV, and if so, proceeding to step (2) (0906);
- (7) with said DCP and said SSC, determining if said RSV from said RGS is greater than said STV, and if not, proceeding to step (2) (0907);
- (8) with said DCP and said SSC, increasing said STV (1008);
- (9) with said DCP, increasing said LEVEL COUNTER (1009);
- (10) with said DCP, determining if said LEVEL COUNTER is greater than an ALARM TRIP value, and if so, proceeding to step (15) (1010);
- (11) with said DCP and said SSC, determining if said RSV from said RGS is less than said STV, and if not, proceeding to step (8) (1011);
- (12) with said DCP and said SSC, reducing said STV (1012);
- (13) with said DCP, decrementing said LEVEL COUNTER (1013);
- (14) with said DCP, determining if said LEVEL COUNTER is 0, and if not, proceeding to step (11), otherwise proceeding to step (1) (1014);
- (15) with said DCP, disabling refrigerant flow and/or compressor operation in said HVAC system (1015);
- (16) with said DCP, activating audible and/or visual alarms and proceeding to step (15) (1016).

* * * * *